US009489111B2

(12) United States Patent
van Os

(10) Patent No.: US 9,489,111 B2
(45) Date of Patent: Nov. 8, 2016

(54) DEVICE, METHOD, AND GRAPHICAL USER INTERFACE FOR NAVIGATING THROUGH A RANGE OF VALUES

(71) Applicant: Apple Inc., Cupertino, CA (US)

(72) Inventor: Marcel van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 529 days.

(21) Appl. No.: 13/963,455

(22) Filed: Aug. 9, 2013

(65) Prior Publication Data

US 2013/0326401 A1    Dec. 5, 2013

Related U.S. Application Data

(63) Continuation of application No. 12/789,433, filed on May 27, 2010, now Pat. No. 8,510,677.

(60) Provisional application No. 61/292,822, filed on Jan. 6, 2010.

(51) Int. Cl.
*G06F 3/048* (2013.01)
*G06F 3/0484* (2013.01)
(Continued)

(52) U.S. Cl.
CPC ......... *G06F 3/04842* (2013.01); *G06F 3/0482* (2013.01); *G06F 3/0483* (2013.01); *G06Q 10/107* (2013.01); *G06Q 10/109* (2013.01)

(58) Field of Classification Search
CPC ............. G06F 3/0482; G06F 3/04842; G06F 3/0483; G06Q 10/107; G06Q 10/109
USPC ................................. 715/769, 822, 833, 835
See application file for complete search history.

(56) References Cited

U.S. PATENT DOCUMENTS

| 4,837,798 A | 6/1989 | Cohen et al. ............... 379/88 |
| 4,935,954 A | 6/1990 | Thompson et al. .......... 379/89 |

(Continued)

FOREIGN PATENT DOCUMENTS

| CN | 101477558 A | 7/2009 | |
| DE | 10 2004 029 203 | 12/2005 | ............. B60R 16/02 |

(Continued)

OTHER PUBLICATIONS

Arons, B., "The Audio-Graphical Interface to a Personal Integrated Telecommunications System," Massachusetts Institute of Technology, Department of Architecture Master Thesis, Jun. 1984, 88 pages.

(Continued)

*Primary Examiner* — William Bashore
*Assistant Examiner* — Gregory A Distefano
(74) *Attorney, Agent, or Firm* — Morrison & Foerster, LLP

(57) ABSTRACT

A multifunction device displays a navigation user interface that includes: a navigation bar having a plurality of unit regions and a plurality of subunit regions. Each of the unit regions represents a range of values. Each subunit region represents a subset of a respective range of values. The navigation user interface also includes a content area for displaying content associated with subunit regions. In response to detecting an input that selects a respective subunit region, the multifunction device updates the content area in accordance with the respective selected subunit region. In response to detecting an input that selects a respective unit region, the multifunction device updates the navigation bar to include subunit regions in accordance with the selected unit region and updates the content area in accordance with at least one of the subunit regions in the updated navigation bar.

27 Claims, 88 Drawing Sheets

(51) Int. Cl.
*G06F 3/0482* (2013.01)
*G06F 3/0483* (2013.01)
*G06Q 10/10* (2012.01)

(56) References Cited

U.S. PATENT DOCUMENTS

| | | | |
|---|---|---|---|
| 4,972,462 A | 11/1990 | Shibata | 379/89 |
| 5,003,577 A | 3/1991 | Ertz et al. | 379/89 |
| 5,164,982 A | 11/1992 | Davis | 379/96 |
| 5,283,818 A | 2/1994 | Klausner et al. | 379/67 |
| 5,333,266 A | 7/1994 | Boaz et al. | 395/200 |
| 5,390,236 A | 2/1995 | Klausner et al. | 379/67 |
| 5,392,388 A | 2/1995 | Gibson | |
| 5,524,140 A | 6/1996 | Klausner et al. | 379/67 |
| 5,553,225 A | 9/1996 | Perry | |
| 5,559,301 A | 9/1996 | Bryan, Jr. et al. | 84/653 |
| 5,572,576 A | 11/1996 | Klausner et al. | 379/67 |
| 5,655,094 A | 8/1997 | Cline et al. | |
| 5,710,899 A | 1/1998 | Eick | |
| 5,936,623 A | 8/1999 | Amro | 345/348 |
| 5,943,052 A | 8/1999 | Allen et al. | 345/341 |
| 5,963,623 A | 10/1999 | Kim | 379/100.01 |
| 5,973,676 A | 10/1999 | Kawakura | 345/173 |
| 6,542,171 B1 | 4/2003 | Satou et al. | 345/833 |
| 6,954,899 B1 | 10/2005 | Anderson | 715/701 |
| 7,007,239 B1 | 2/2006 | Hawkins et al. | 715/780 |
| 7,117,450 B1 | 10/2006 | Chaudhri | |
| 7,444,599 B1 | 10/2008 | Chaudhri et al. | |
| 7,956,847 B2 | 6/2011 | Christie | |
| 8,510,677 B2 | 8/2013 | Van Os | |
| 2002/0032907 A1 | 3/2002 | Daniels | |
| 2002/0063737 A1 | 5/2002 | Feig et al. | |
| 2002/0080151 A1 | 6/2002 | Venolia | 345/660 |
| 2002/0100044 A1 | 7/2002 | Daniels | |
| 2002/0154173 A1 | 10/2002 | Etgen et al. | |
| 2002/0186252 A1 | 12/2002 | Himmel et al. | |
| 2002/0191029 A1 | 12/2002 | Gillespie et al. | 345/810 |
| 2003/0095149 A1* | 5/2003 | Fredriksson | G06F 3/0481 715/797 |
| 2005/0024345 A1 | 2/2005 | Eastty et al. | 345/173 |
| 2005/0057584 A1* | 3/2005 | Gruen | G06Q 10/107 715/752 |
| 2005/0108253 A1* | 5/2005 | Metsatahti | G06F 17/30274 |
| 2005/0192930 A1 | 9/2005 | Hightower et al. | |
| 2006/0007174 A1 | 1/2006 | Shen | 345/173 |
| 2006/0015819 A1 | 1/2006 | Hawkins et al. | 715/780 |
| 2006/0028917 A1* | 2/2006 | Wigginton | G06Q 10/109 368/28 |
| 2006/0038796 A1 | 2/2006 | Hinckley et al. | 345/173 |
| 2006/0090141 A1 | 4/2006 | Loui et al. | 715/764 |
| 2006/0236262 A1 | 10/2006 | Bathiche et al. | 715/786 |
| 2007/0146337 A1 | 6/2007 | Ording et al. | 345/173 |
| 2007/0156565 A1 | 7/2007 | Singer et al. | |
| 2007/0192744 A1 | 8/2007 | Reponen | 715/833 |
| 2007/0198111 A1 | 8/2007 | Oetzel et al. | 700/94 |
| 2007/0271532 A1* | 11/2007 | Nguyen | G06F 3/0482 715/854 |
| 2008/0005087 A1* | 1/2008 | Sato | G06F 12/0862 |
| 2008/0071663 A1 | 3/2008 | Busby | 705/37 |
| 2008/0155417 A1 | 6/2008 | Vallone et al. | 715/700 |
| 2008/0163131 A1 | 7/2008 | Hirai et al. | 715/863 |
| 2008/0172287 A1 | 7/2008 | Tien et al. | 705/10 |
| 2008/0320391 A1 | 12/2008 | Lemay et al. | 715/702 |
| 2009/0174667 A1 | 7/2009 | Kocienda et al. | 345/169 |
| 2009/0177998 A1 | 7/2009 | Barrios et al. | |
| 2009/0222768 A1 | 9/2009 | Roe et al. | |
| 2009/0241048 A1 | 9/2009 | Augustine et al. | 715/769 |
| 2009/0273571 A1 | 11/2009 | Bowens | |
| 2009/0322692 A1 | 12/2009 | Kim et al. | 345/173 |
| 2010/0070913 A1 | 3/2010 | Murrett et al. | |
| 2010/0231354 A1 | 9/2010 | Nishiguchi et al. | |
| 2010/0231534 A1 | 9/2010 | Chaudhri et al. | 345/173 |
| 2010/0251167 A1 | 9/2010 | DeLuca et al. | |
| 2010/0283743 A1 | 11/2010 | Coddington | |
| 2011/0202834 A1 | 8/2011 | Mandryk et al. | |
| 2011/0202837 A1 | 8/2011 | Fong et al. | |

FOREIGN PATENT DOCUMENTS

| | | | |
|---|---|---|---|
| EP | 0 684 543 A1 | 11/1995 | G06F 3/033 |
| EP | 0 795 811 A1 | 9/1997 | G06F 3/033 |
| EP | 1 615 109 A2 | 1/2006 | G06F 3/00 |
| EP | 1 942 401 A1 | 7/2008 | G06F 3/048 |
| JP | 09152856 A | 6/1997 | |
| JP | 2001 202176 | 7/2001 | G06F 3/00 |
| WO | WO 99/16181 A | 4/1999 | H04B 1/38 |
| WO | WO 00/63766 A1 | 10/2000 | G06F 3/00 |

OTHER PUBLICATIONS

Coleman, D., "Meridian Mail Voice Mail System Integrates Voice Processing and Personal Computing," Speech Technology, vol. 4, No. 2, Mar./Apr. 1988, 7 pages.

Microsoft Corporation, Microsoft Office Word 2003 (SP2), 1983-2003, Microsoft Corporation, SP3 as 2005, pp. MSWord2003 Figures 1-5.

Microsoft Word 2000 (9.0.2720), 1999, Microsoft Corporation, pp. MSWord figures 1-5.

Muyers, B., "Shortcutter for Palm," The Pittsburgh Pebbles PDA Project, printed Dec. 19, 2006, http://www.cs.cmu.edu/~pebbles/v5/shortcutter/palm/index.html, 11 pages.

Schmandt, C. et al., "A Conversational Telephone Messaging System," IEEE Transactions on Consumer Electronics, Aug. 1954, vol. CE-30, 4 pages.

Schmandt, C. et al., "Phone Slave: A Graphical Telecommunications Interface," Proceeding of the SID, vol. 26/1, 1985, 4 pages.

Schmandt, C. et al., "Phone Slave: A Graphical Telecommunications Interface," Society for Information Display, 1984 International Symposium Digest of Technical Papers, Jun. 1984, San Francisco, CA, 4 pages.

Temple, "The Complete Idiot's Guide, Microsoft Outlook 2000," by Temple, published 1999, p. 186.

International Search Report and Written Opinion dated Feb. 21, 2008, received in International Application No. PCT/US2007/077443, which corresponds to U.S. Appl. No. 11/770,720, 11 pages. (Anzures).

Internationai Search Report and Written Opinion dated Jul. 4, 2008, received in International Application No. PCT/US2008/050083, which corresponds to U.S. Appl. No. 11/968,064, 14 pages (Ording).

International Search Report and Written Opinion dated Jun. 18, 2010, received in International Application No. PCT/US2010/027088, which corresponds to U.S. Appl. No. 12/568,669, 13 pages (Chaudhri).

International Search Report and Written Opinion dated Apr. 15, 2011, received in International Application No. PCT/US2010/062313, which corresponds to U.S. Appl. No. 12/789,430.

Office Action dated Feb. 17, 2010, received in Australian Patent Application No. 2007292473, which corresponds to U.S. Appl. No. 11/770,720, 1 page (Anzures).

Office Action dated Jun. 7, 2010, received in German Patent Application No. 11 2007 002 090.3-53, which corresponds to U.S. Appl. No. 11/770,720, 8 pages (Anzures).

Office Action dated Feb. 24, 2010, received in European Patent Application No. 07 814 635.4-2212, which corresponds to U.S. Appl. No. 11/770,720, 4 pages (Anzures).

Office Action dated May 15, 2009, received in U S. Appl. No. 11/968,064, 20 pages (Ording).

Final Office dated Jan. 5, 2010, received in U.S. Appl. No. 11/968,064, 20 pages (Ording).

Office Action dated Sep. 13, 2012, received in U.S. Appl. No. 12/789,433, 15 pages (van Os).

Notice of Allowance dated Apr. 4, 2013, received in U.S. Appl. No. 12/789,433, 27 pages (Os).

(56) References Cited

OTHER PUBLICATIONS

Office Action received for Chinese Patent Application No. 201080064146.2, mailed on Jun. 12, 2014, 22 pages (11 pages English Translation and 11 pages Official Copy).

International Preliminary Report on Patentability received for PCT Patent Application No. PCT/US2010/062313, mailed on Jul. 19, 2012, 10 pages.

"Bing Search", q=resize%20scrollbar&qs=n&form=OBRE&, Nov. 29, 2015.

"Bing Search", q=scaling+scrollbar&src=I E-SearchBox, Nov. 29, 2015.

Non Final Office Action received for U.S. Appl. No. 13/323,761, mailed on Dec. 14, 2015, 45 pages.

* cited by examiner

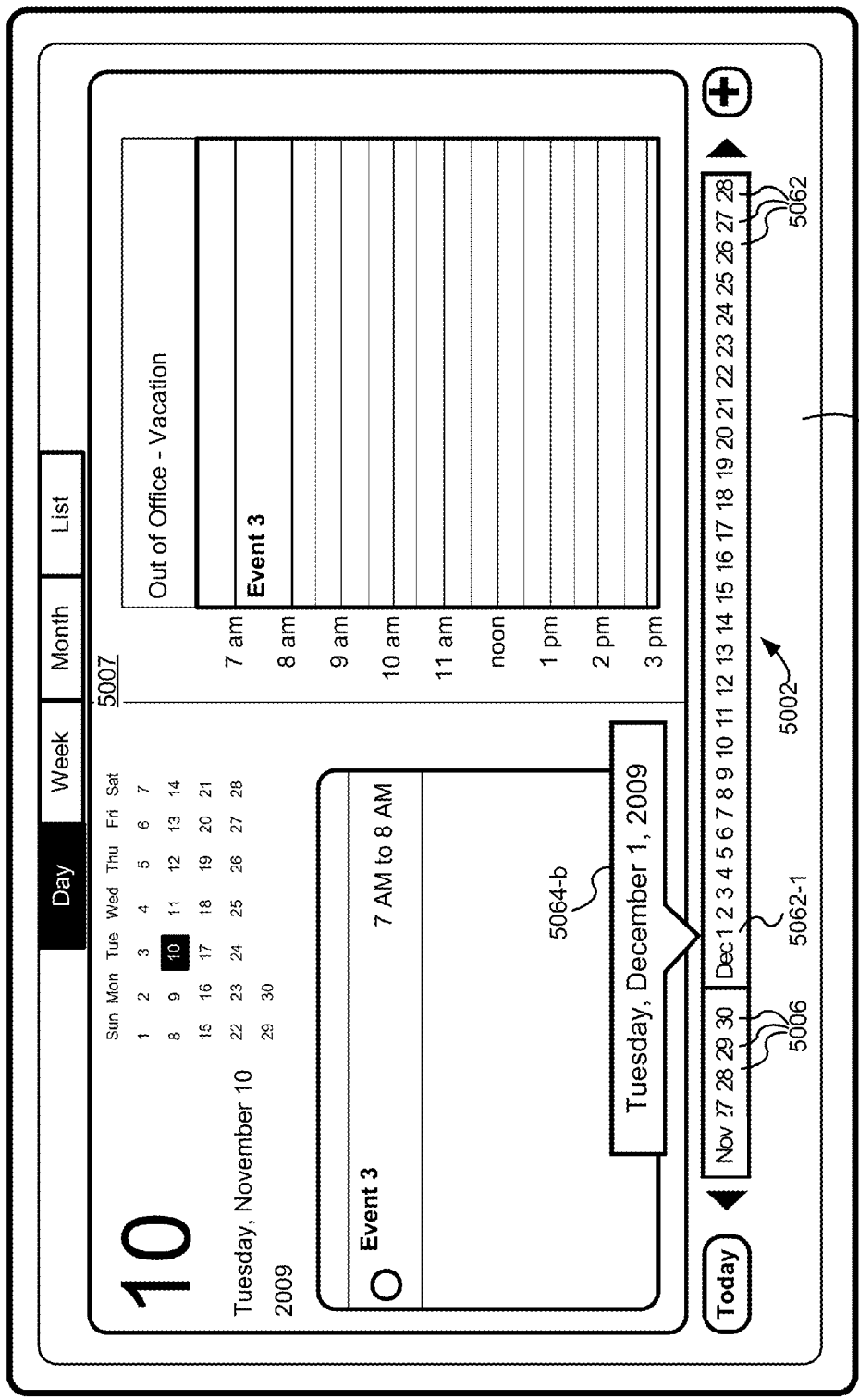

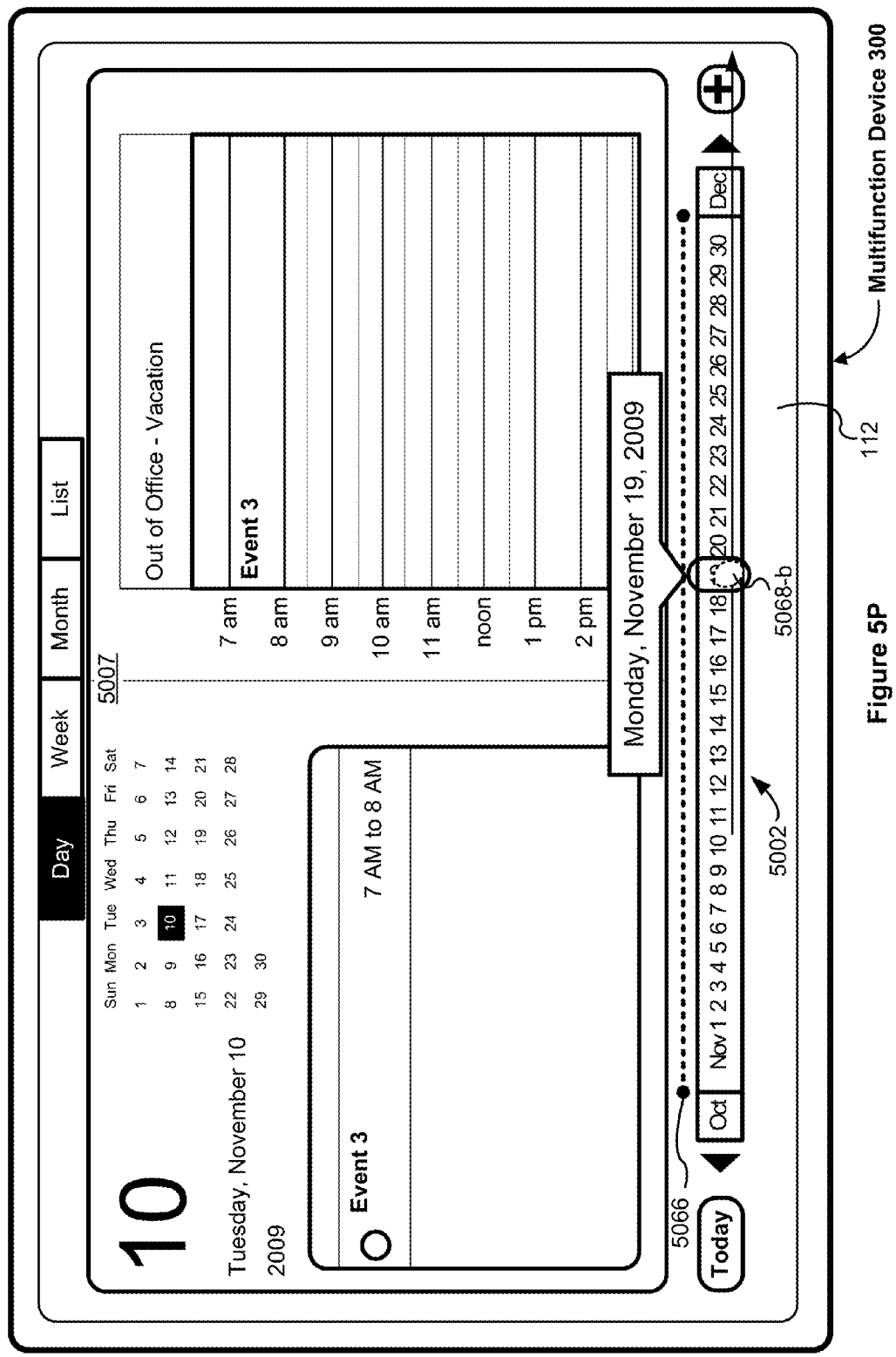

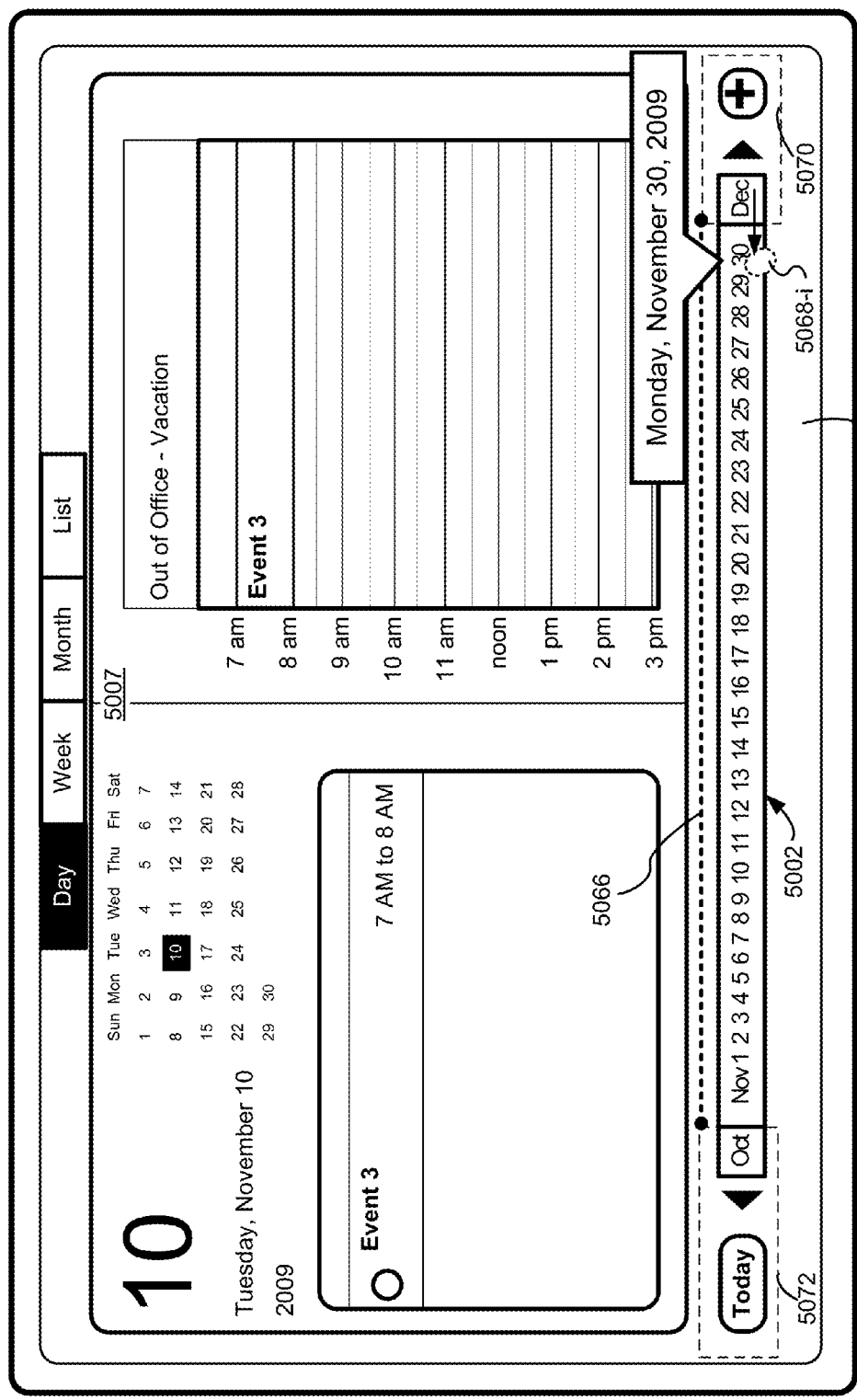

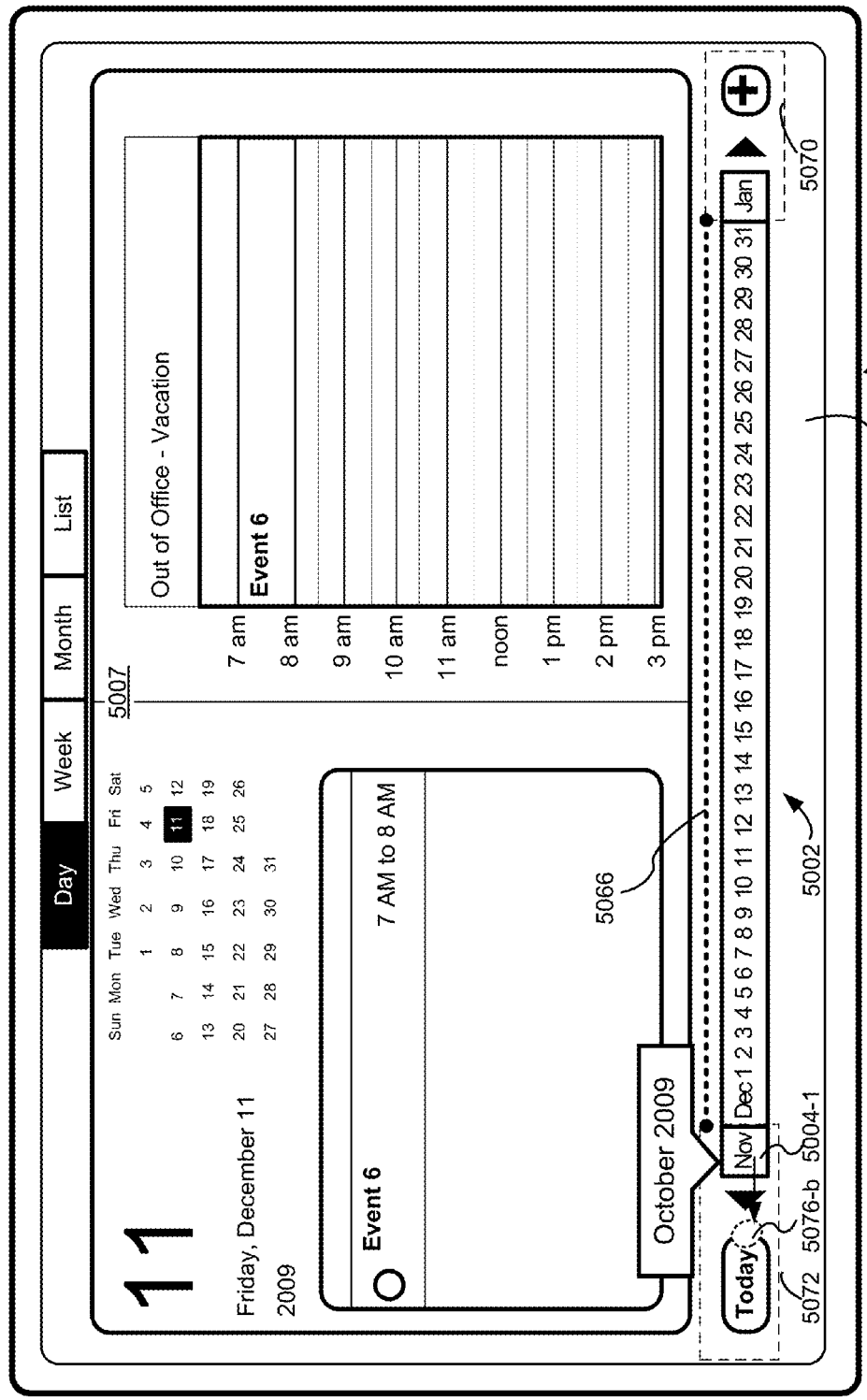

Figure 5SS

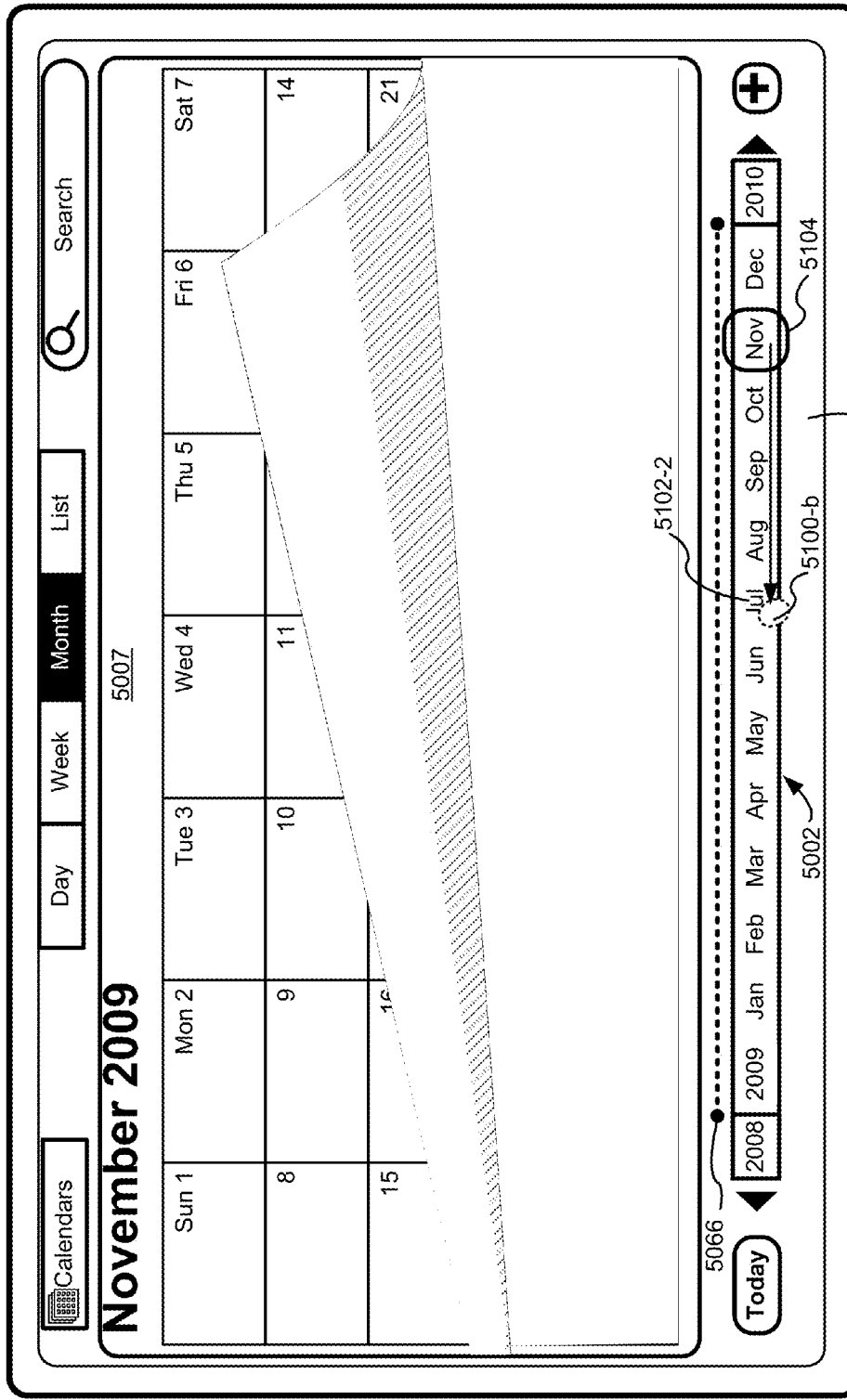

Figure 5VV

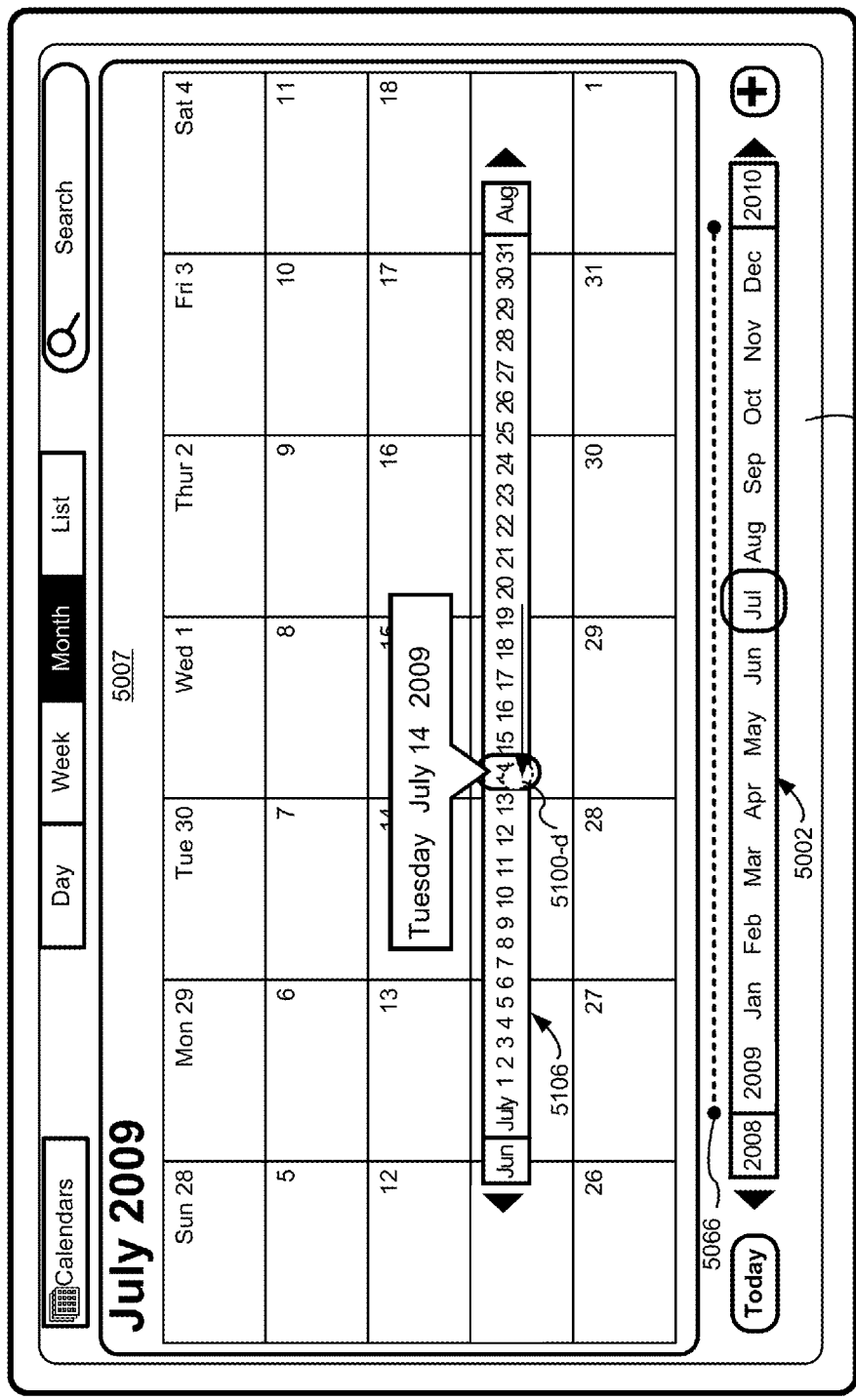

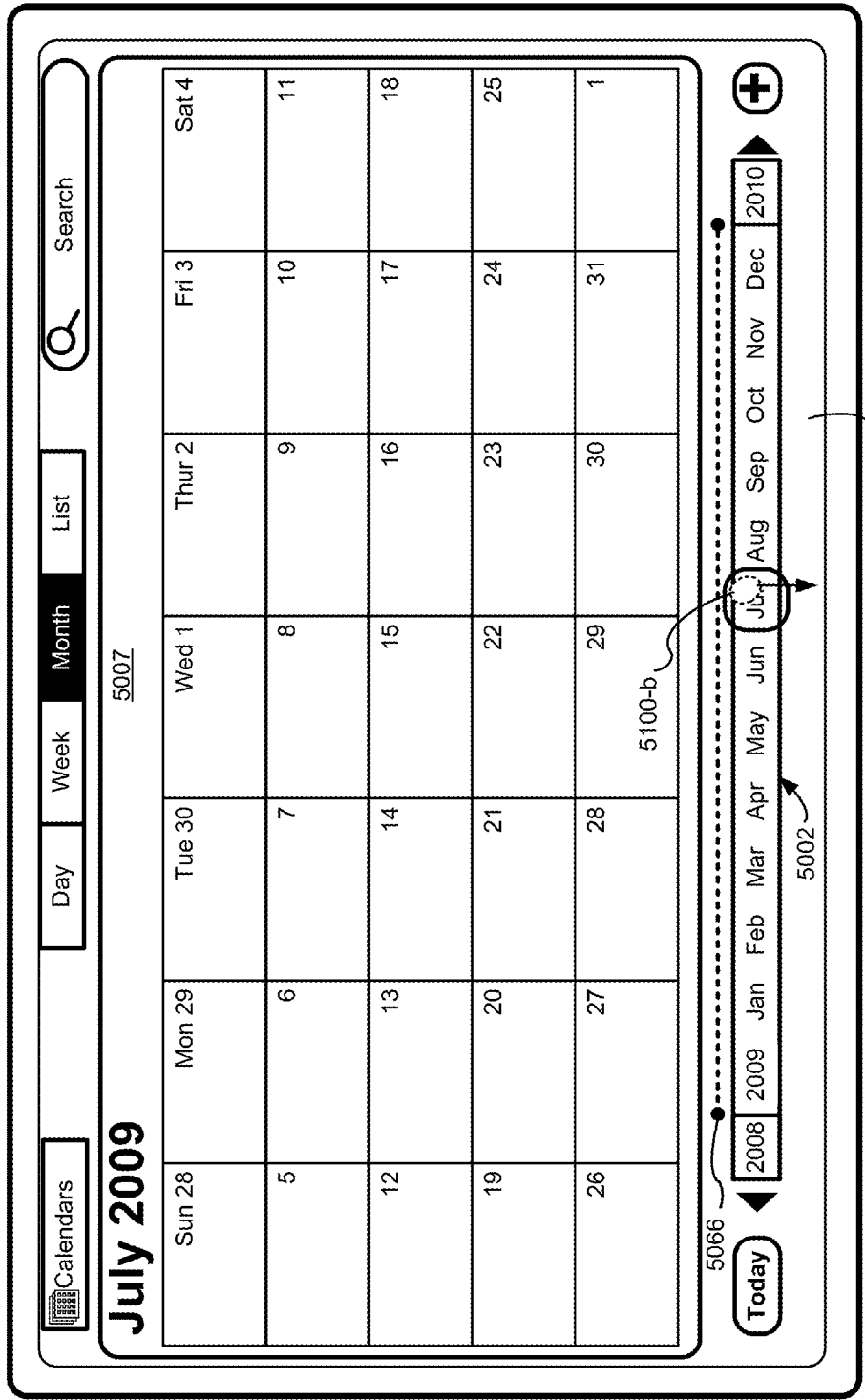
Figure 5AAA

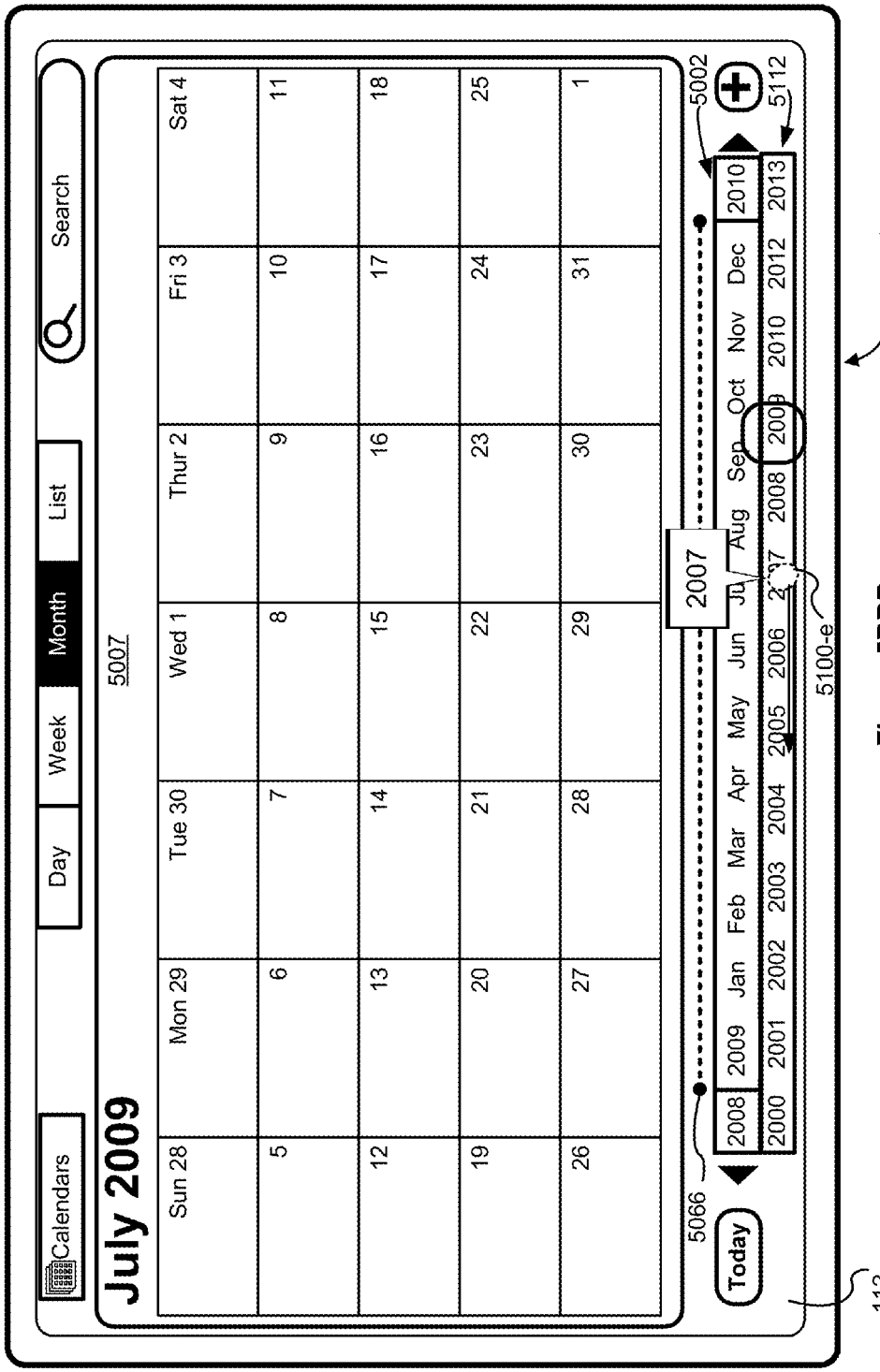
Figure 5BBB

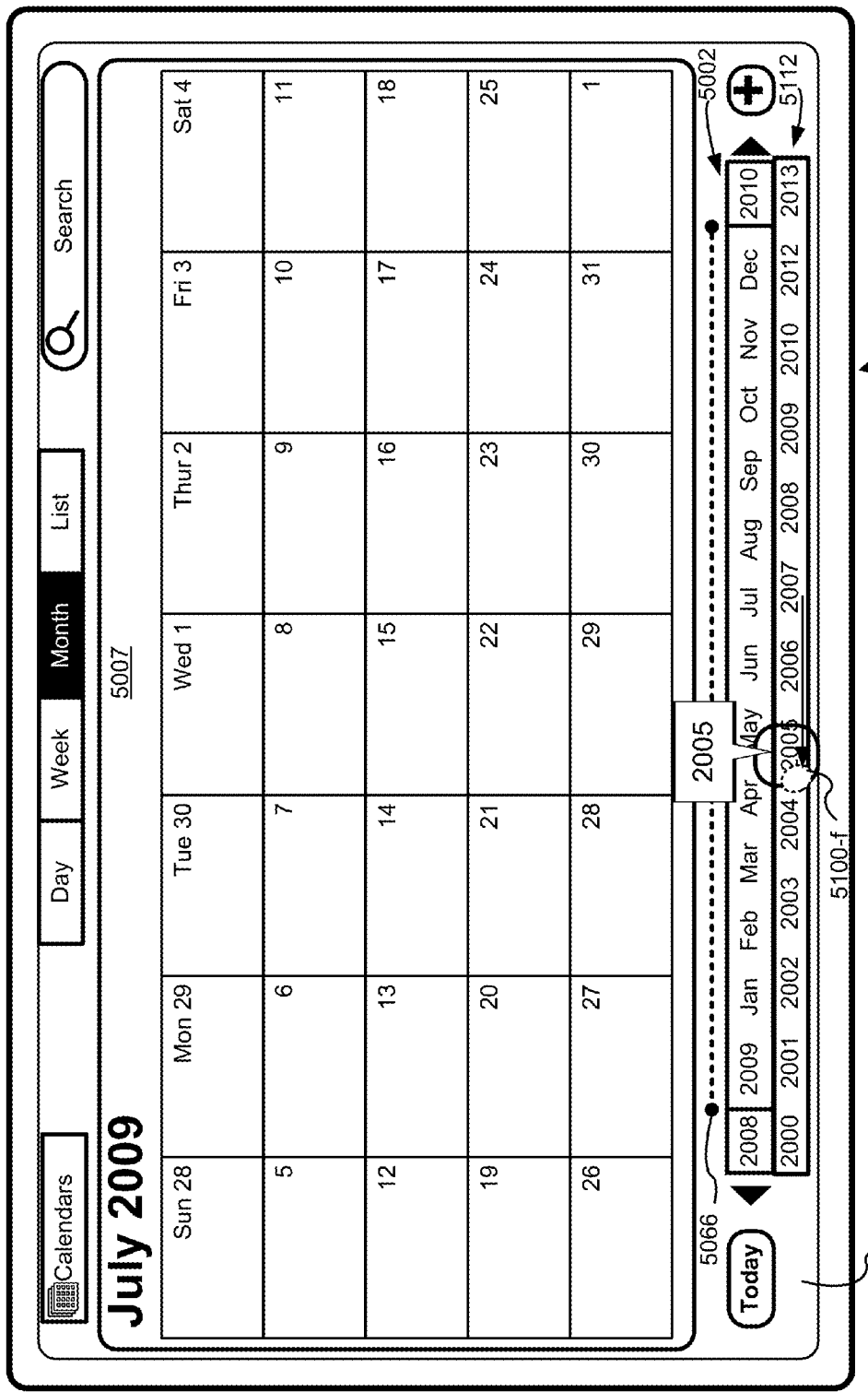
Figure 5CCC

DEVICE, METHOD, AND GRAPHICAL USER INTERFACE FOR NAVIGATING THROUGH A RANGE OF VALUES

RELATED APPLICATIONS

This application is a continuation of U.S. application Ser. No. 12/789,433, filed May 27, 2010, and which claims priority to U.S. Provisional Application No. 61/292,822, filed Jan. 6, 2010, entitled "Device, Method, and Graphical User Interface for Navigating Through a Range of Values," which are incorporated herein by reference in their entirety.

TECHNICAL FIELD

This relates generally to electronic devices with touch-sensitive surfaces, including but not limited to electronic devices with touch-sensitive surfaces that are used to navigate through a range of values.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to control applications that require navigation through values in a range of values.

Exemplary modes of navigation through a range of values include identifying a predetermined target value and navigating to the target value, scanning forward through the range of values, scanning backwards through the range of values or skipping from one value to a next value. Exemplary ranges of values that could be navigated through include navigating through periods of time of a predefined length (e.g., days, weeks, months, years, etc.), navigating through units of distance of a predefined size (e.g., centimeters, meters, kilometers, etc.), navigating through units of mass of a predefined size (e.g., grams, kilograms, etc.), navigating through files based on file size (e.g., number of bytes), and navigating through files based on creation date. A user may need to perform such navigation tasks in a diverse range of applications, such as a calendar program (e.g., iCal from Apple Inc. of Cupertino, Calif.), a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for navigating through values in a range of values are cumbersome and inefficient. For example, using a sequence of mouse-based inputs to scroll through a large range of values is tedious and creates a significant cognitive burden on a user. In addition, existing methods take longer than necessary, thereby wasting energy. This latter consideration is particularly important in battery-operated devices.

SUMMARY

Accordingly, there is a need for computing devices with faster, more efficient methods and interfaces for navigating through a range of values. Such methods and interfaces may complement or replace conventional methods for navigating through a range of values. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include calendaring, image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. The method includes: displaying a navigation user interface that includes: a navigation bar having a plurality of unit regions and a plurality of subunit regions associated with a respective unit region, wherein each of the unit regions represents a range of values and each subunit region of the plurality of subunit regions represents a subset of a respective range of values for the respective unit region, and the navigation user interface also includes a content area for displaying content associated with subunit regions. Prior to detecting a first input, the plurality of unit regions include a prior unit region, a current unit region and a subsequent unit region, and the plurality of subunit regions includes a first set of subunit regions associated with the current unit region. The method further includes detecting the first input. In response to detecting the first input: when the first input corresponds to a request to select a particular subunit region from the first set of subunit regions, the method further includes displaying in the content area content associated with the particular subunit region; when the first input corresponds to a request to select the prior unit region: the method further includes ceasing to display the first set of subunit regions; displaying in the navigation bar a second set of subunit regions associated with the prior unit region; and displaying in the content area content associated with a subunit region from the second set of subunit regions; and, when the first input corresponds to a request to select the subsequent unit region: the method further includes ceasing to display the first set of subunit regions; displaying in the navigation bar a third set of subunit regions associated with the subsequent unit region; and displaying in the content area content associated with a subunit region from the third set of subunit regions.

In accordance with some embodiments, a method is performed at a multifunction device with a display and a touch-sensitive surface. The method includes: displaying a navigation user interface that includes: a navigation bar having a plurality of unit regions and a plurality of subunit regions associated with a respective unit region of the plurality of unit regions. Each of the unit regions represents a range of values. Each subunit region of the plurality of subunit regions represents a subset of a respective range of values for the respective unit region. The unit regions and subunit regions are linearly arranged within the navigation bar in accordance with the values represented by the plurality of unit regions and the plurality of subunit regions. The navigation user interface also includes a content area for displaying content associated with subunit regions. The method further includes, in response to detecting an input that selects a respective subunit region in the navigation bar, updating the content area in accordance with the respective selected subunit region. The method also includes, in response to detecting an input that selects a respective unit region in the navigation bar, updating the navigation bar to include subunit regions in accordance with the selected unit region and updating the content area in accordance with at least one of the subunit regions in the updated navigation bar.

In accordance with some embodiments, a method is performed at a multifunction device with a touch-sensitive display. The method includes: displaying a navigation bar that represents a range of values, the navigation bar having a primary axis with a minimum endpoint and a maximum endpoint that represent a minimum value and a maximum value of the range of values, respectively. The method further includes detecting a first part of a multipart gesture. The first part of the multipart gesture corresponds to movement of a contact to a first position on the display that is between the minimum endpoint and the maximum endpoint. The method also includes, in response to detecting the first part of the multipart gesture, navigating to a value in the range of values that corresponds to the first position on the display. The method further includes detecting a second part of the multipart gesture that is a continuation of the multipart gesture. The second part of the multipart gesture corresponds to movement of the contact within a predefined region proximate to a respective one of the endpoint. The method further includes, in response to detecting the second part of the multipart gesture while the contact with the touch-sensitive display continues: when the second part of the multipart gesture corresponds to continued movement of the contact within the predefined region to a second position that is outside of the displayed range of values for the navigation bar, navigating to a value outside of the range of values based on a distance between the second position and the respective endpoint.

In accordance with some embodiments, a method is performed at a multifunction device with a touch-sensitive display. The method includes: displaying a navigation bar that presents a range of values, the navigation bar having a primary axis with a minimum endpoint and a maximum endpoint that represent a minimum value and a maximum value of the range of values, respectively. The method further includes detecting movement of a contact from a position on the touch-sensitive display that is between the minimum endpoint and the maximum endpoint to a position in a predefined region proximate to a respective one of the endpoints; and, in response to detecting the movement of the contact, when the position in the predefined region is outside of the displayed range of values for the navigation bar, navigating to a value outside of the range of values based on a distance between the position in the predefined region and the respective endpoint.

In accordance with some embodiments, a method is performed at a multifunction device with a display and a touch-sensitive surface. The method includes: displaying a navigation bar that represents a range of date/time values, the navigation bar including: a plurality of currently displayed subunits, including a first subunit that is initially selected. Each of the subunits represents a subset of date/time values of the range of date/time values. The navigation bar also includes a focus region. An initial position of the focus region is determined based at least in part on a current date/time and a date/time of the first subunit, and the first subunit is displayed in the focus region. The method further includes displaying, in a content window, content associated with a date/time in the subset of date/time values of the first subunit; and detecting a first input that selects a second subunit. The method further includes, in response detecting to the first input: determining an updated position for the focus region based on the current date/time and a date/time of the second subunit; when the updated position is distinct from the initial position of the focus region, the method includes moving the focus region of the navigation bar to the updated position; when the updated position is the same as the initial position of the focus region, the method includes leaving the focus region of the navigation bar in the initial position; and the method includes adjusting the subunits in the navigation bar so as to display the second subunit in the focus region of the navigation bar.

In accordance with some embodiments, a method is performed at a multifunction device with a display and a touch-sensitive surface. The method includes: displaying a navigation bar that represents a range of values; and detecting a first part of a multipart gesture. The first part of the multipart gesture corresponds to selection of a first value in the range of values. The method further includes, in response to detecting the first part of the multipart gesture, displaying a callout proximate to a location of a representation of the first value on the navigation bar, the callout including first text that is descriptive of the first value, the callout having a plurality of horizontally adjacent regions, includes: a first region that includes a beginning part of the first text and has an initial first region size, wherein the initial first region size is based on a length of the beginning part of the first text; a second region that includes a middle part of the first text and has an initial second region size, wherein the initial second region size is based on a length of the middle part of the first text; and a third region that includes an end part of the first text and has an initial third region size, wherein the initial third region size is based on a length of the end part of the first text. The method further includes detecting a second part of the multipart gesture that is a continuation of the multipart gesture. The second part of the multipart gesture corresponds to selection of a second value of the range of values. The method further includes, in response to detecting the second part of the multipart gesture, displaying the callout proximate to a location of a representation of the second value on the navigation bar, the callout including second text that is descriptive of the second value, the callout having an updated plurality of horizontally adjacent regions, including: a first region that includes a beginning part of the second text and has an updated first region size, wherein the updated first region size is the larger of the initial first region size and a size based on a length of the beginning part of the second text; a second region that includes a middle part of the second text and has an updated second region size, wherein the updated second region size is the larger of the initial second region size and a size based on a length of the middle part of the second text; and a third region that includes an end part of the second text and has an updated third region size, wherein the updated third region size is the larger of the initial third region size and a size based on a length of the end part of the second text.

In accordance with some embodiments, a method is performed at a multifunction device with a display and a touch-sensitive surface. The method includes: displaying a first navigation bar. The first navigation bar has a primary axis and represents a range of values having a first scale. The method further includes detecting a first part of a continuous multipart gesture. The first part of the multipart gesture corresponds to movement of a contact that is along the primary axis of the first navigation bar. The method further includes, in response to detecting the first part of the multipart gesture, navigating through values in the range of values in accordance with the first part of the multipart gesture. The method further includes detecting a second part of the multipart gesture that corresponds to movement away from the primary axis; and in response to detecting the second part of the multipart gesture, displaying a second navigation bar. The second navigation bar represents a subset of the range of values and has a second scale that is distinct from the first scale. The method further includes, after detecting the second part of the multipart gesture, detecting a third part of the multipart gesture that includes a component of movement along the primary axis; and, in response to detecting the third part of the multipart gesture, navigating through values in the subset of the range of values in the second navigation bar in accordance with the third part of the multipart gesture.

In accordance with some embodiments, a multifunction device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a multifunction device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a multifunction device with a display and a touch-sensitive surface, cause the device to perform the operations of any of the methods described above. In accordance with some embodiments, a multifunction device includes: a display; a touch-sensitive surface; and means for performing the operations of any of the methods described above. In accordance with some embodiments, an information processing apparatus, for use in a multifunction device with a display and a touch-sensitive surface, includes means for performing the operations of any of the methods described above.

Thus, multifunction devices with displays and touch-sensitive surfaces are provided with faster, more efficient methods and interfaces for navigating through a range of values, thereby increasing the effectiveness, efficiency, and user satisfaction with such devices. Such methods and interfaces may complement or replace conventional methods for navigating through ranges of values.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
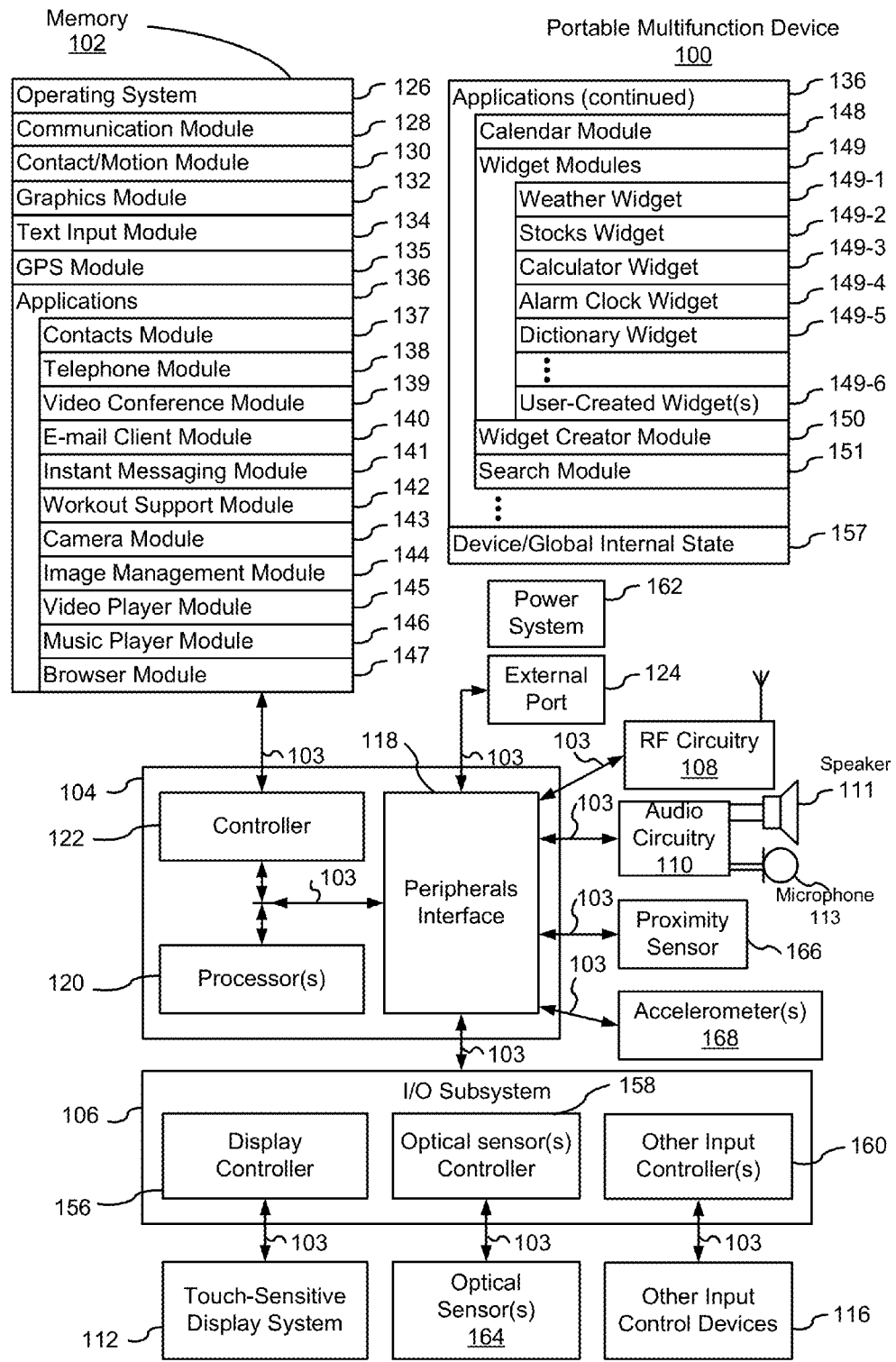
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It will also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It will be understood, however, that the computing device may include one or more other physical user-interface devices, such as a physical keyboard, a mouse and/or a joystick.

The device supports a variety of applications, such as one or more of the following: a calendar application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
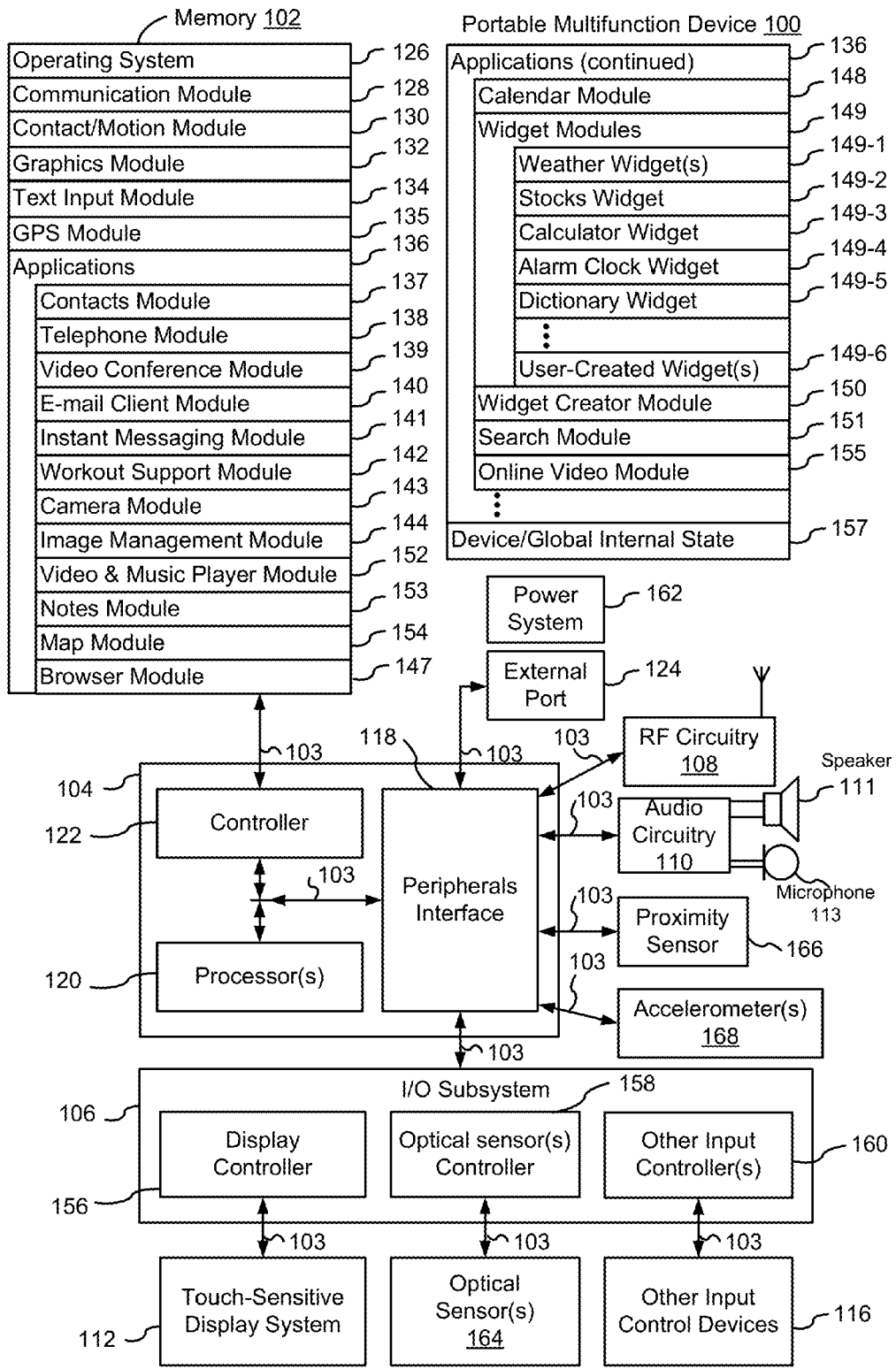

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
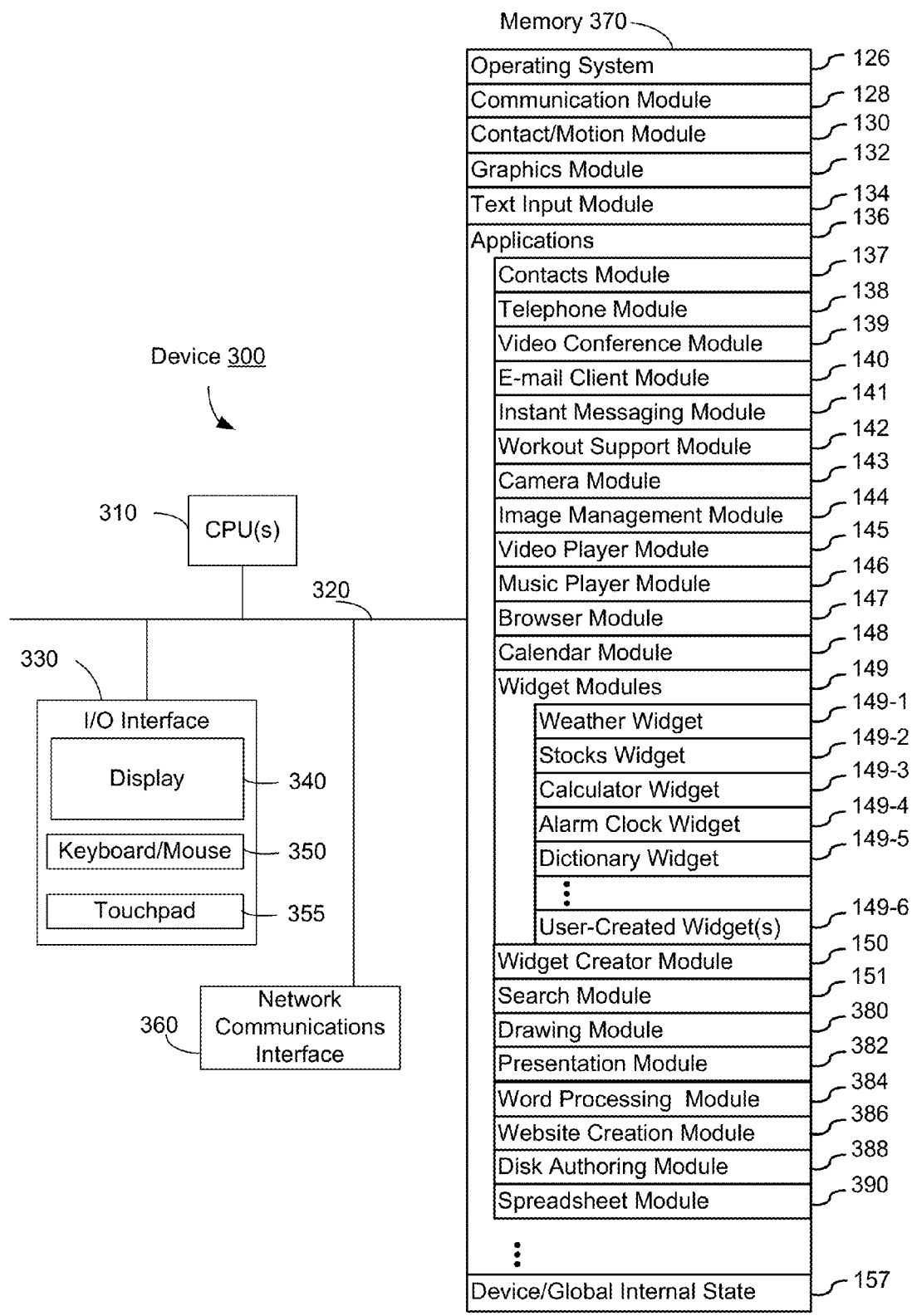
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
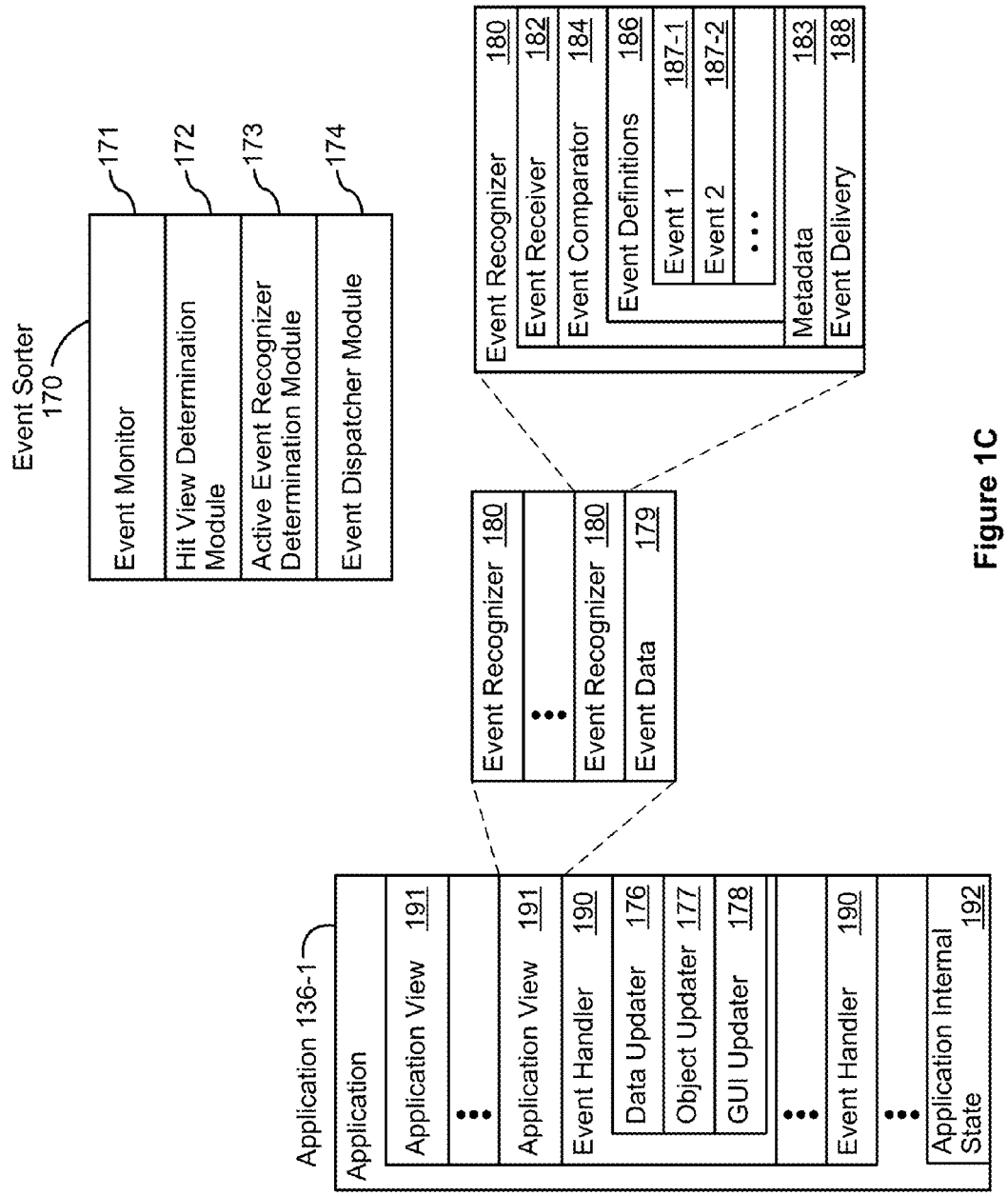
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
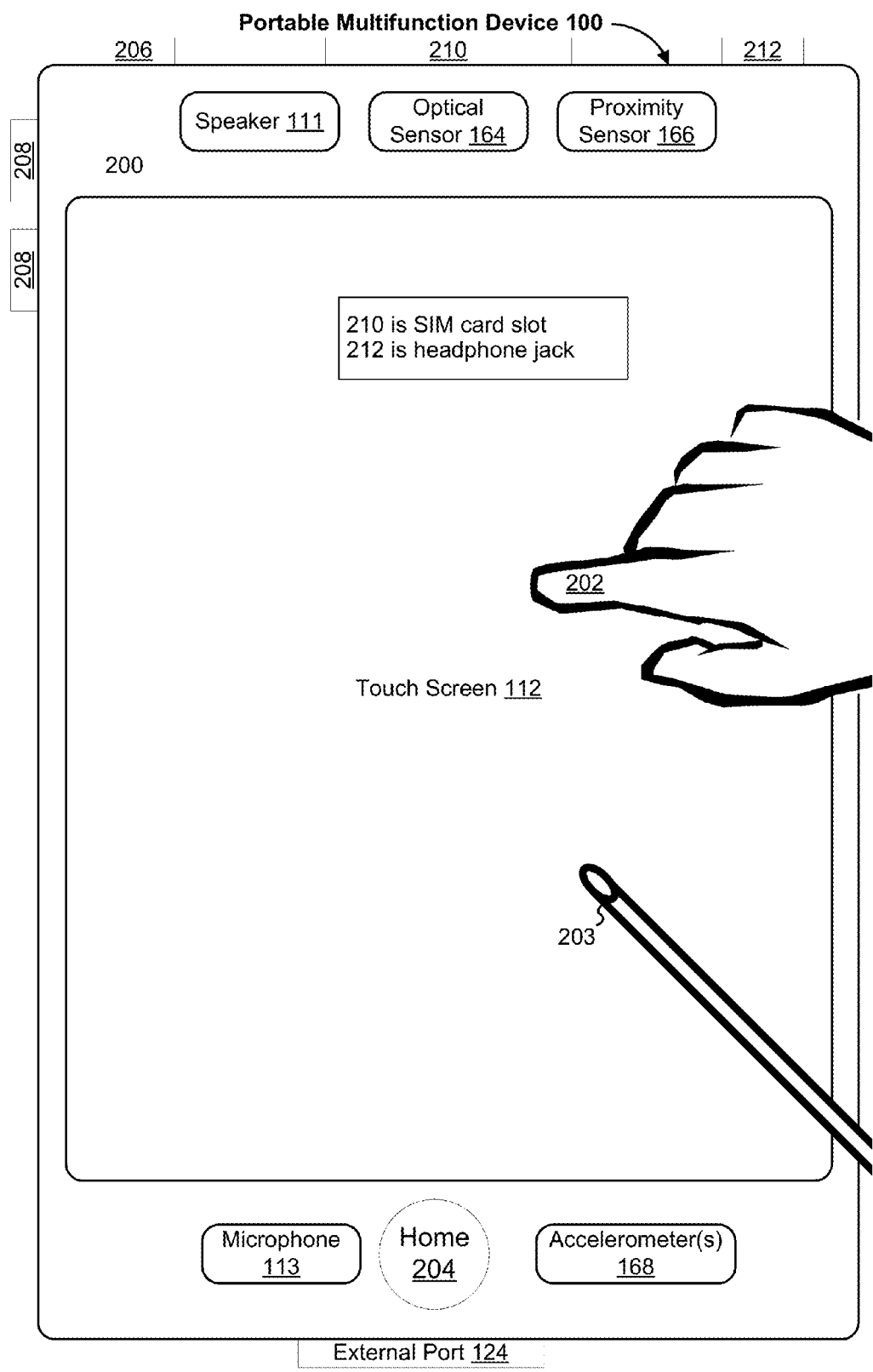
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
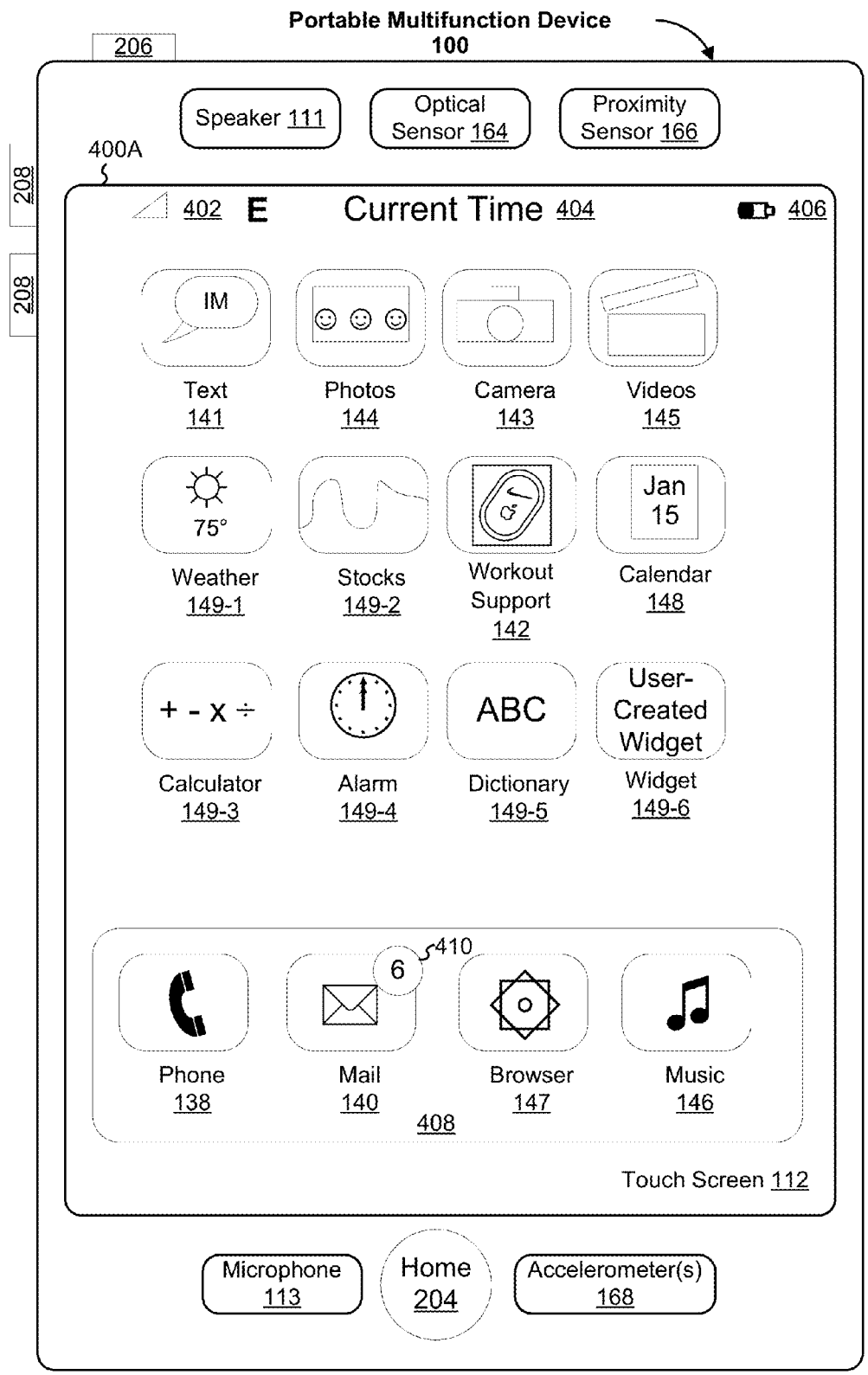
FIGS. 4A and 4B illustrate exemplary user interfaces for a menu of applications on a portable multifunction device in accordance with some embodiments.
Figure 4B:
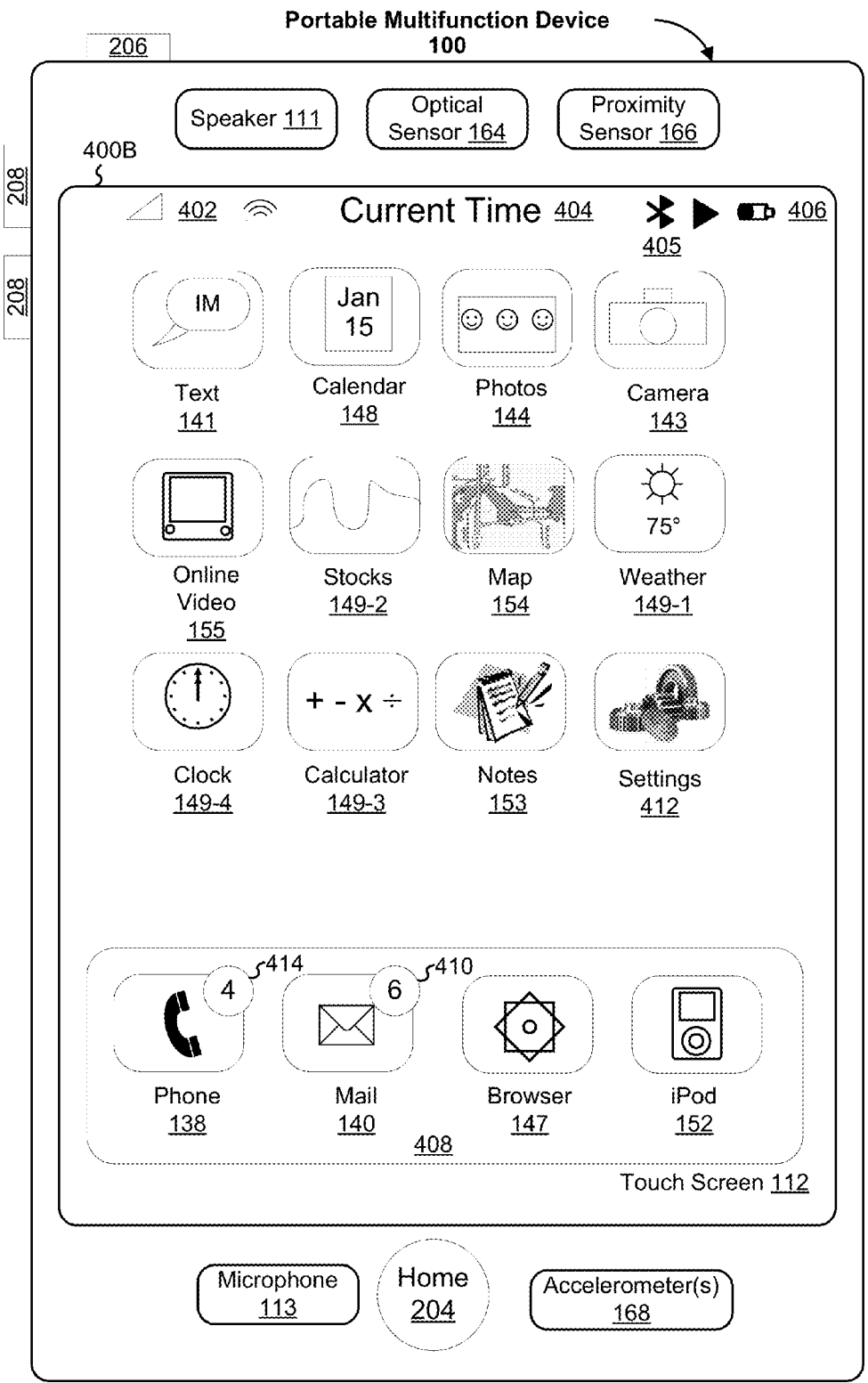

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
 Phone 138, which may include an indicator 414 of the number of missed calls or voicemail messages;
 E-mail client 140, which may include an indicator 410 of the number of unread e-mails;
 Browser 147; and
 Music player 146; and
Icons for other applications, such as:
 IM 141;
 Image management 144;
 Camera 143;
 Video player 145;
 Weather 149-1;
 Stocks 149-2;
 Workout support 142;
 Calendar 148;
 Calculator 149-3;
 Alarm clock 149-4;
 Dictionary 149-5; and
 User-created widget 149-6.

In some embodiments, user interface 400B includes the following elements, or a subset or superset thereof:
 402, 404, 405, 406, 141, 148, 144, 143, 149-3, 149-2, 149-1, 149-4, 410, 414, 138, 140, and 147, as described above;
 Map 154;
 Notes 153;
 Settings 412, which provides access to settings for device 100 and its various applications 136, as described further below;
 Video and music player module 152, also referred to as iPod (trademark of Apple Inc.) module 152; and
 Online video module 155, also referred to as YouTube (trademark of Google Inc.) module 155.

Figure 4C:
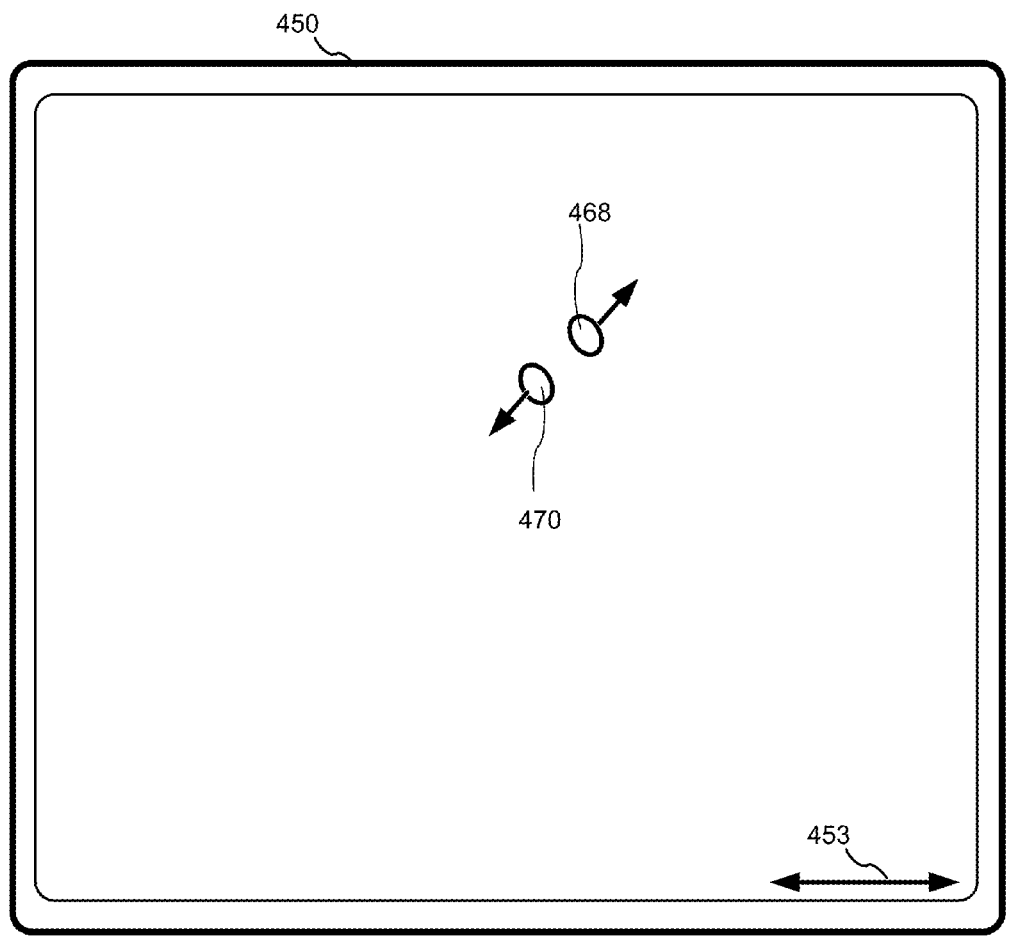
FIG. 4C illustrates an exemplary user interface for a multifunction device with a touch-sensitive surface that is separate from the display in accordance with some embodiments.
Figure 4C:
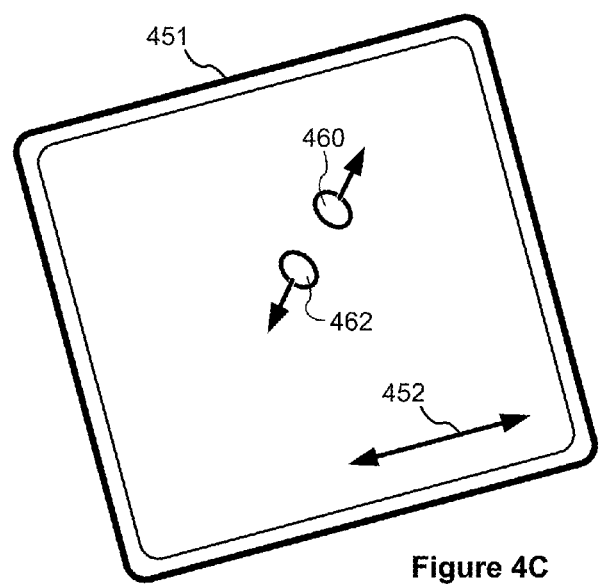

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch-sensitive surface and the display are combined), in some embodiments, the device detects inputs on a touch-sensitive surface that is separate from the display, as shown in FIG. 4C. In some embodiments the touch-sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It will be understood that similar methods may be used for other user interfaces described herein.

Additionally, while the following examples are given primarily with reference to finger inputs (e.g., finger contacts, finger tap gestures, finger swipe gestures), it will be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it will be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

Figure 5A:
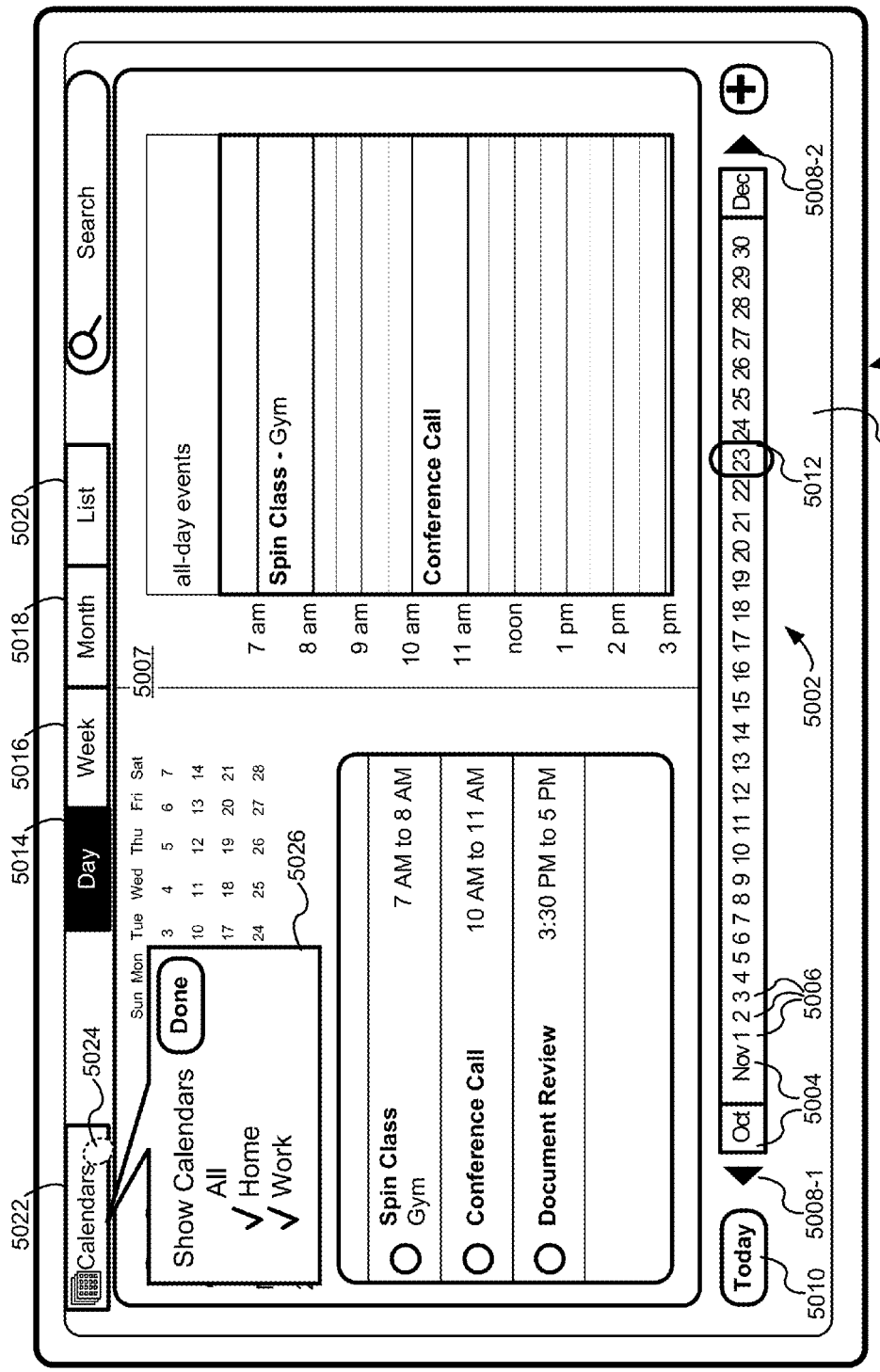
FIGS. 5A-5CCC illustrate exemplary user interfaces for navigating through ranges of values in accordance with some embodiments.
Figure 5B:
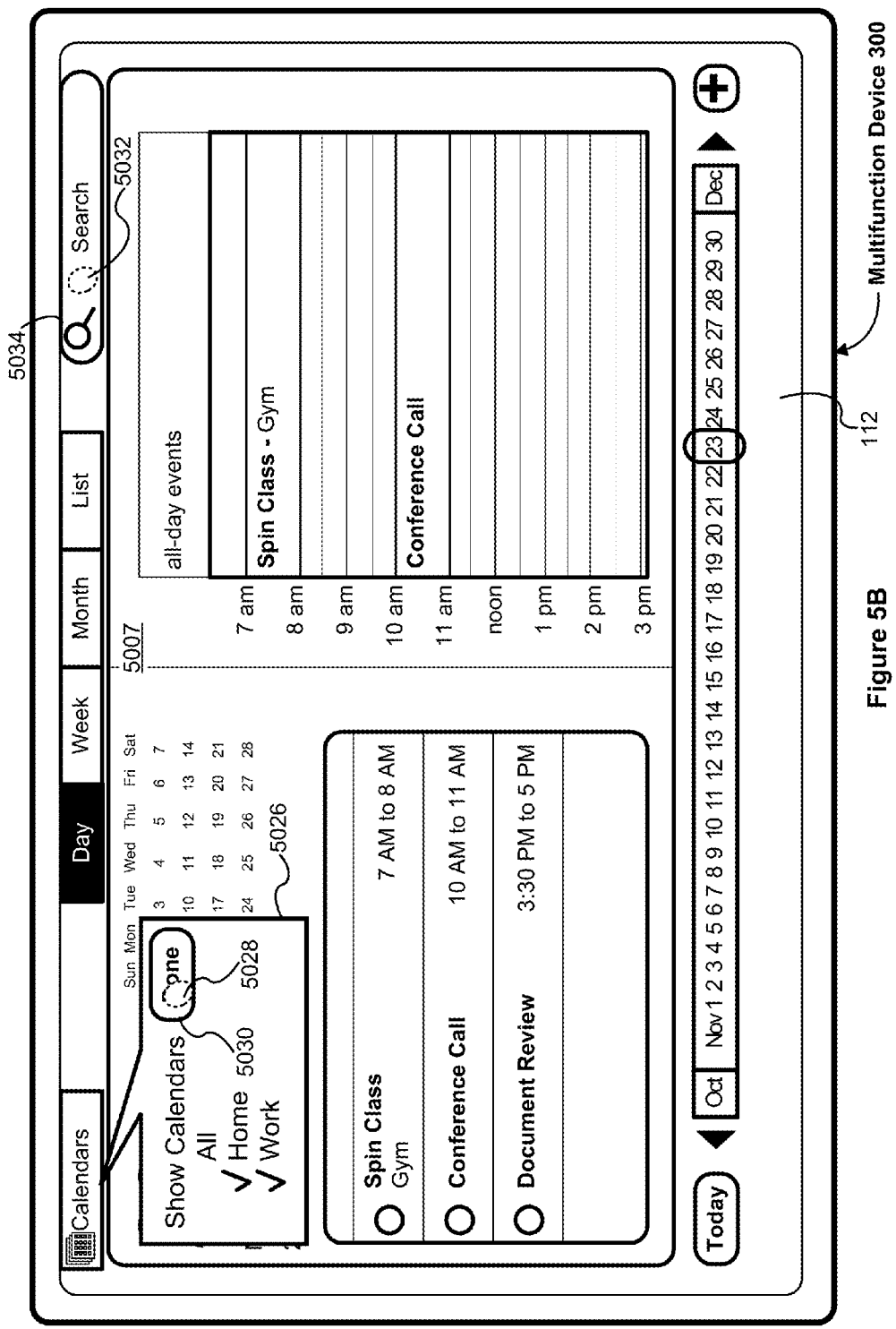
Figure 5C:
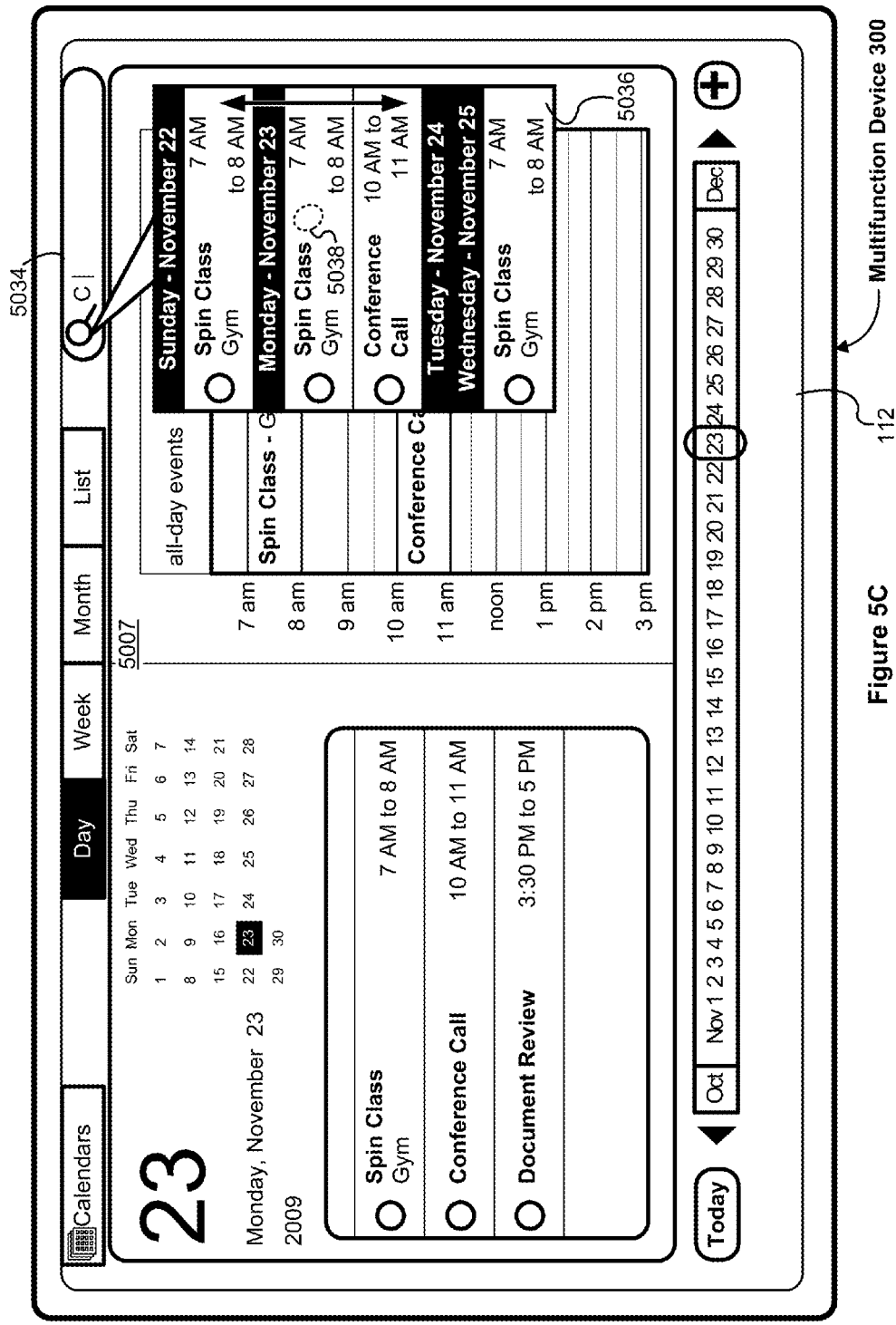

FIGS. 5A-5CCC illustrate exemplary user interfaces for navigating through a range of values in accordance with some embodiments. The user interfaces in these figures are used to illustrate the processes described below, including the processes in FIGS. 6A-6D, 7, 8A-8H, 9, 10A-10D, 11A-11D and 12A-12C.

FIG. 5A illustrates an exemplary calendar "day view" user interface with a navigation user interface. In some embodiments, the navigation user interface includes a navigation bar 5002. In some embodiments, the navigation user interface includes a plurality of units regions 5004 that represent units of time (e.g., months including October, November, December, etc.) and a plurality of subunit regions 5006 that represent subunits of time (e.g., days in November including November 1st, November 2nd, November 3rd, etc.). In some embodiments, data that is representative of a currently selected subunit is displayed in a display area 5007 of the display (e.g., Nov. 23, 2009 in FIG. 5A). In some embodiments the navigation user interface includes one or more advancement icons 5008, for advancing the currently selected subunit by a predefined amount (e.g., one day or one month). In some embodiments, the navigation user interface also includes a "today" button 5010 for navigating to a current date/time. In some embodiments, the navigation user interface includes a visual indication (e.g., selection indicator 5012) of a currently selected subunit region (e.g., Nov. 23, 2009 in FIG. 5A).

In some embodiments, the navigation user interface is for a calendar application, which includes a plurality of modes (e.g., "day view," "week view," "month view" and "list view"), and buttons for switching between the modes (e.g., day 5014, week 5016, month 5018 and list 5020, respectively). In some embodiments the different modes include different graphical displays of events in the calendar application at different levels of detail. In some embodiments, when switching between modes, the device continues to display information associated with a currently selected subunit of time (e.g., when switching from day to week mode, the week mode displays the week that includes the day that is currently displayed in the day mode). Exemplary user interfaces for the "day view" are illustrated in FIGS. 5A-5EE, as described in greater detail below. Exemplary user interfaces for the "week view" are illustrated in FIGS. 5FF-5MM, as described in greater detail below. Exemplary user interfaces for the "month view" are illustrated in FIGS. 5TT-5CCC, as described in greater detail below.

In some embodiments, the calendar application includes a calendar button 5022 (FIG. 5A) for selecting particular calendars of a plurality of calendars to display (e.g., the user can select to only display calendar items associated with a particular calendar). For example, when the device detects a contact 5024 on the touch-sensitive surface that corresponds to a location of the calendar selection button 5022 on the display, the device displays a calendar selection menu 5026 including a list of the calendars that can be selected and deselected in response to inputs.

FIGS. 5B-5C illustrate the device dismissing the calendar selection menu 5026 in response to detecting an input (e.g., contact 5028 in FIG. 5B) with a calendar selection menu dismissal button (e.g., "done" button 5030 in FIG. 5B).

Figure 5D:
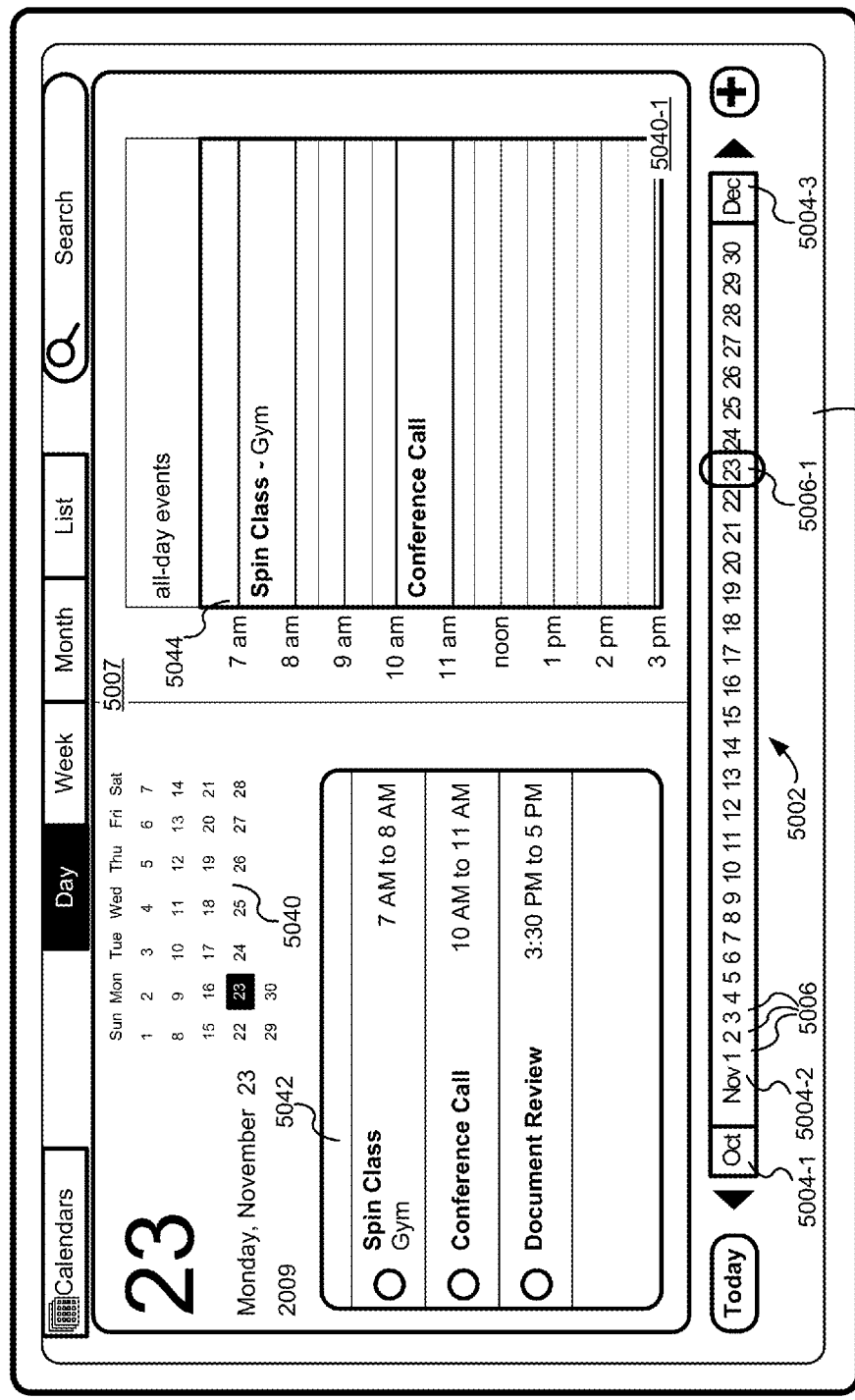

FIGS. 5C-5D illustrate exemplary user interfaces for searching through events in a calendar application. In response to the selection (e.g., tap gesture 5032 in FIG. 5B) at a location on the touch-sensitive surface (e.g., touch screen 112) that corresponds to a search field 5034 on the display, the device displays a cursor in the search field, and in response to receiving an input of one or more search characters (e.g., "C" in FIG. 5D), the device searches through events in the calendar application. Events that match the search characters are displayed in a search result window 5036. In some embodiments, the search result window 5036 is scrollable, as indicated by the double sided arrow in FIG. 5C. In some embodiments, upon selection (e.g., tap gesture 5038 in FIG. 5C) of an event from the list of events in the search result window 5036, the device displays a subunit of time that includes the selected event (e.g., Nov. 23, 2009), and ceases to display the search result window 5036, as illustrated in FIG. 5D.

Figure 5E:
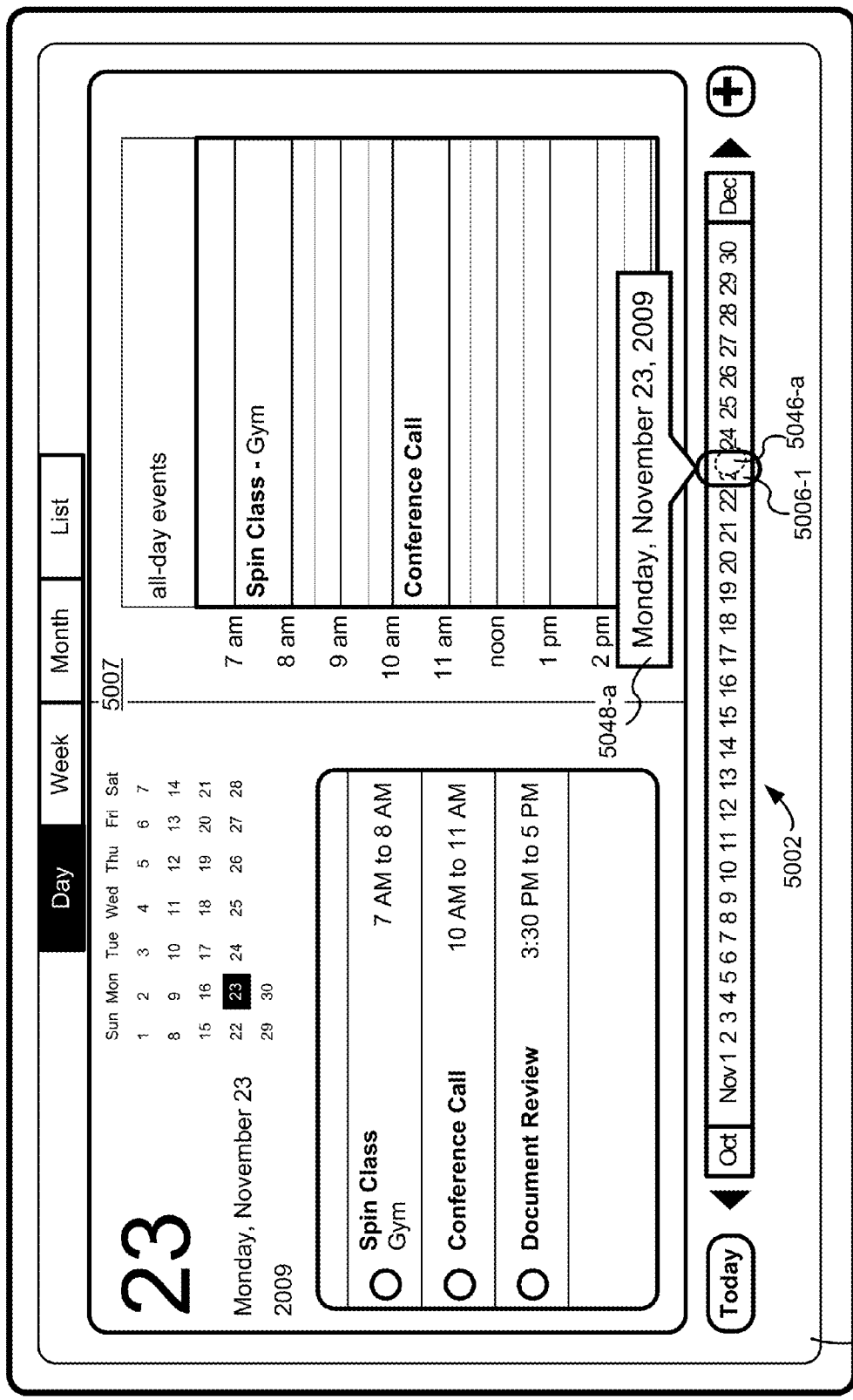
Figure 5F:
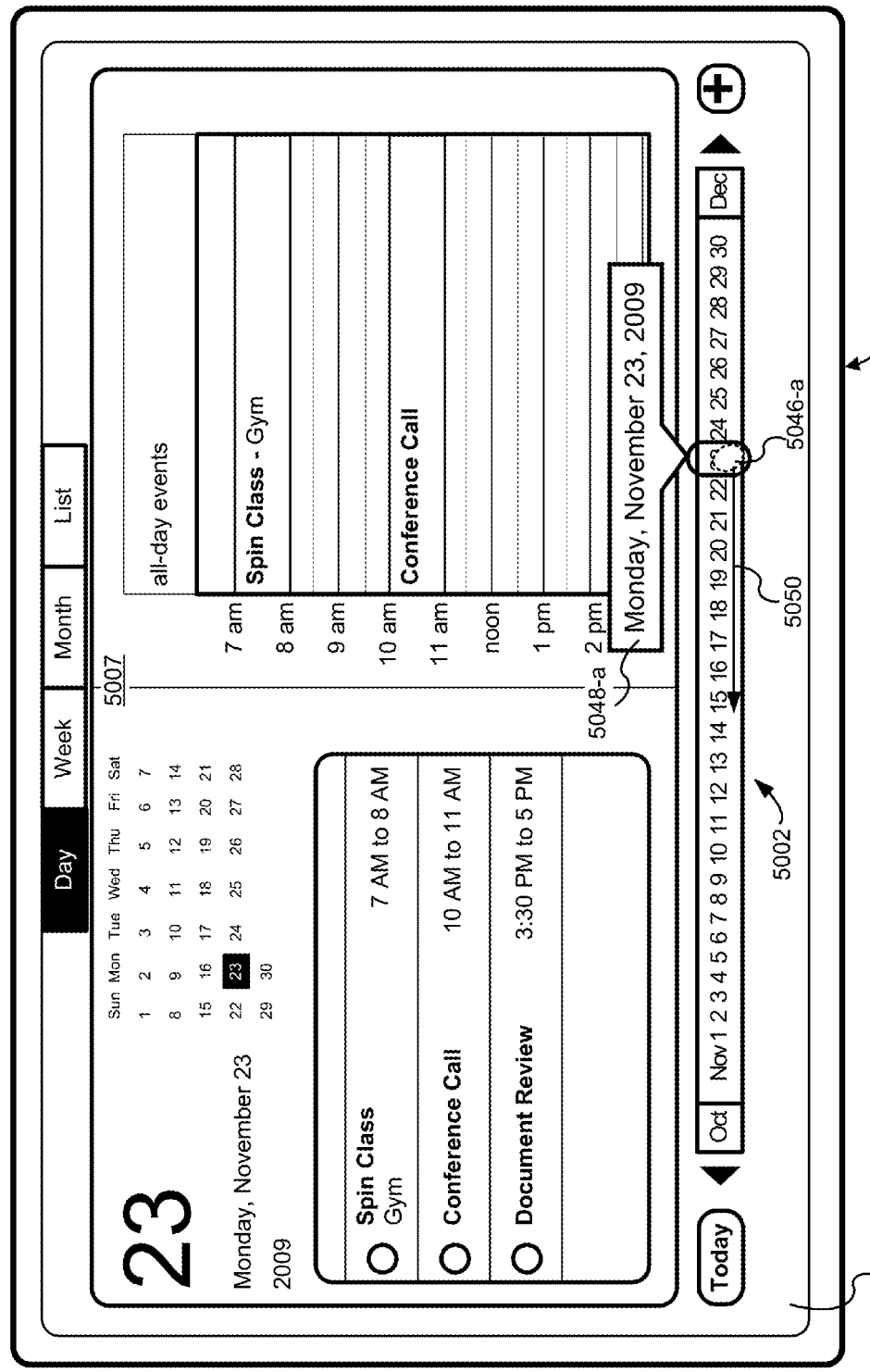
Figure 5G:
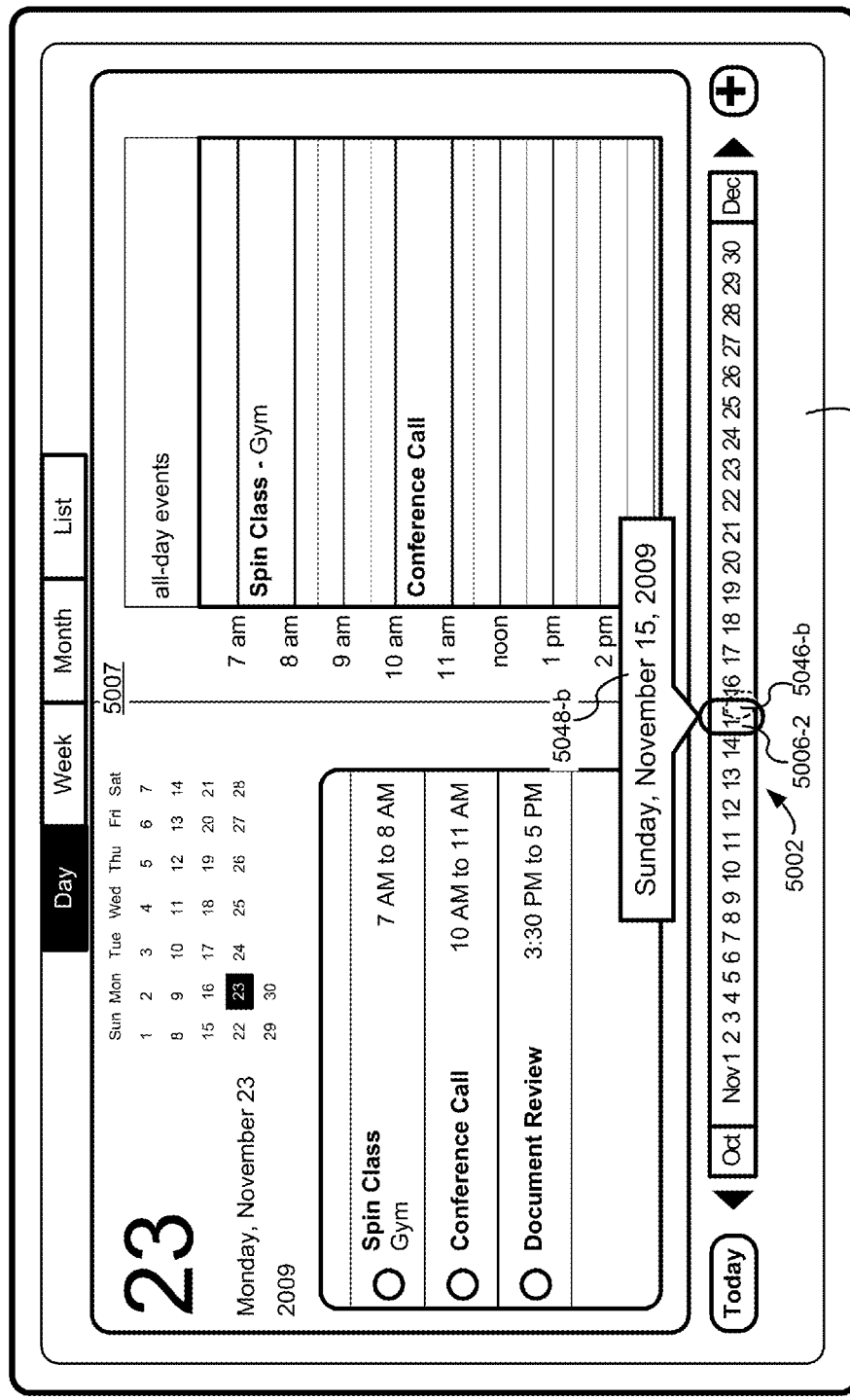
Figure 5H:
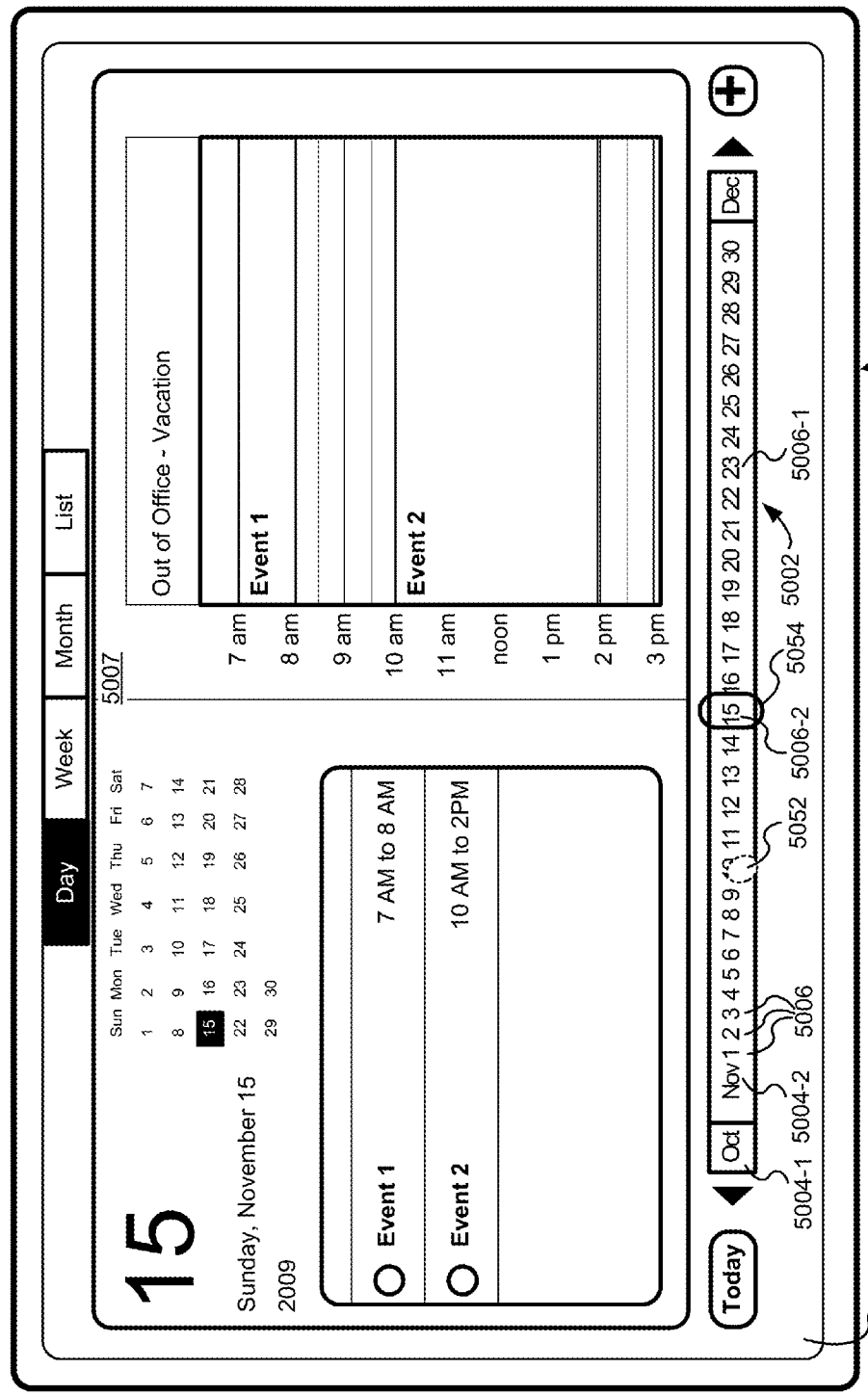

FIGS. 5E-5H illustrate exemplary user interfaces for initially displaying content (e.g., events associated with Nov. 23, 2009) associated with a value represented by a first subunit region in a first set of subunit regions and, in response to a user input at a location that corresponds to a second subunit region in the first set of subunit regions (e.g., contact 5046 and subsequent movement of the contact from a first location 5046-a in FIG. 5E to a second location 5046-b in FIG. 5G), navigating from the first value (e.g., Nov. 23, 2009) to a second value (e.g., Nov. 15, 2009) in the range of values associated with the first set of subunit regions, and after navigating to the second value in the range of values associated with the first set of subunit regions, displaying content associated with the second value (e.g., events associated with Nov. 15, 2009), in a content area 5007 in the user interface, as illustrated in FIG. 5H.

Figure 5I:
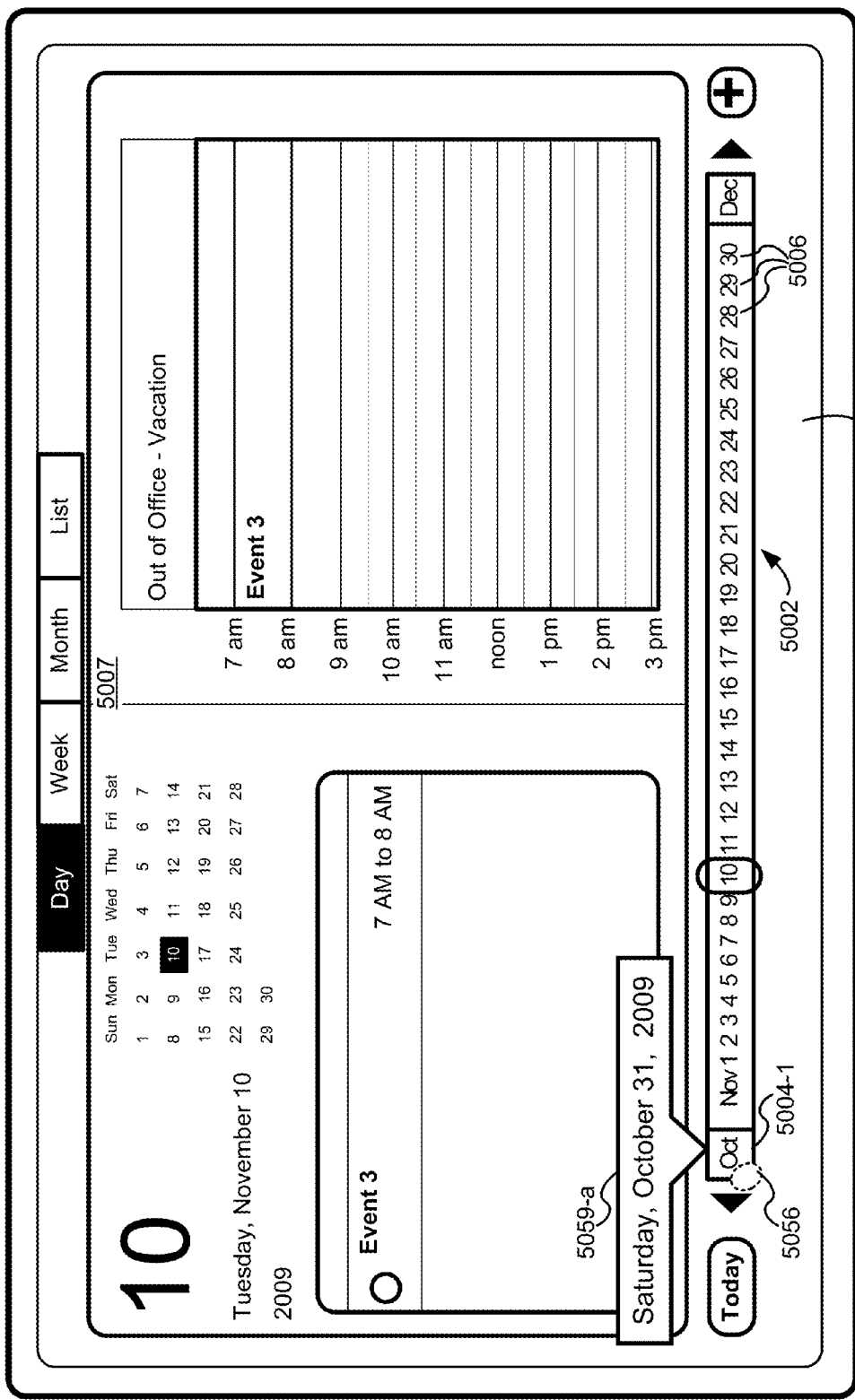

FIGS. 5H-5I illustrate exemplary user interfaces for initially displaying content (e.g., events associated with Nov. 15, 2009) associated with a value represented by a first subunit region in the first set of subunit regions and, in response to a user input at a location that corresponds to a second subunit region in the first set of subunit regions (e.g., tap gesture 5052 in FIG. 5H), navigating from the first value (e.g., Nov. 15, 2009) to a second value (e.g., Nov. 10, 2009) in the range of values associated with the first set of subunit regions, and after navigating to the second value in the range of values, displaying content associated with the second value (e.g., events associated with Nov. 10, 2009), as illustrated in FIG. 5I.

Figure 5J:
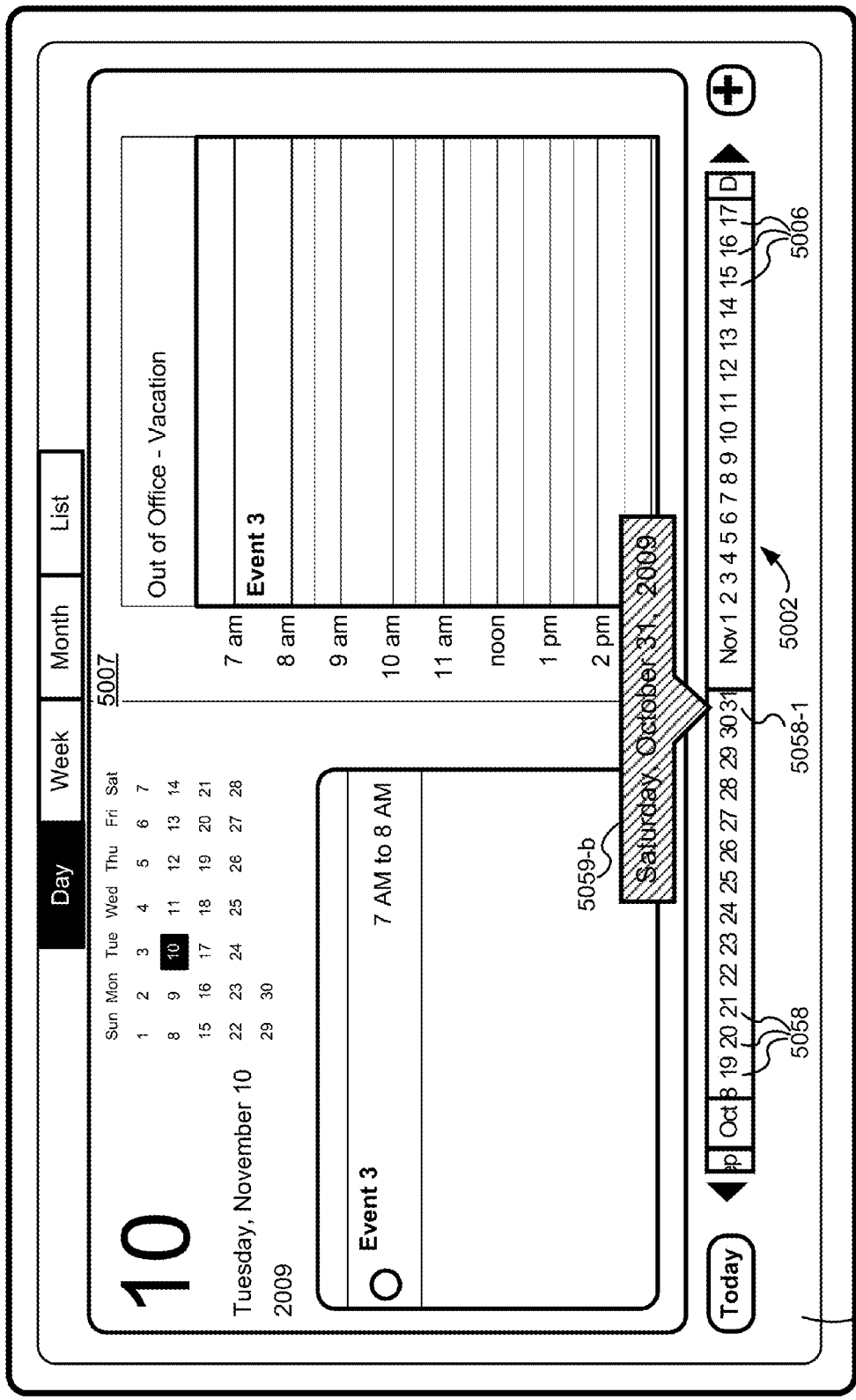
Figure 5K:
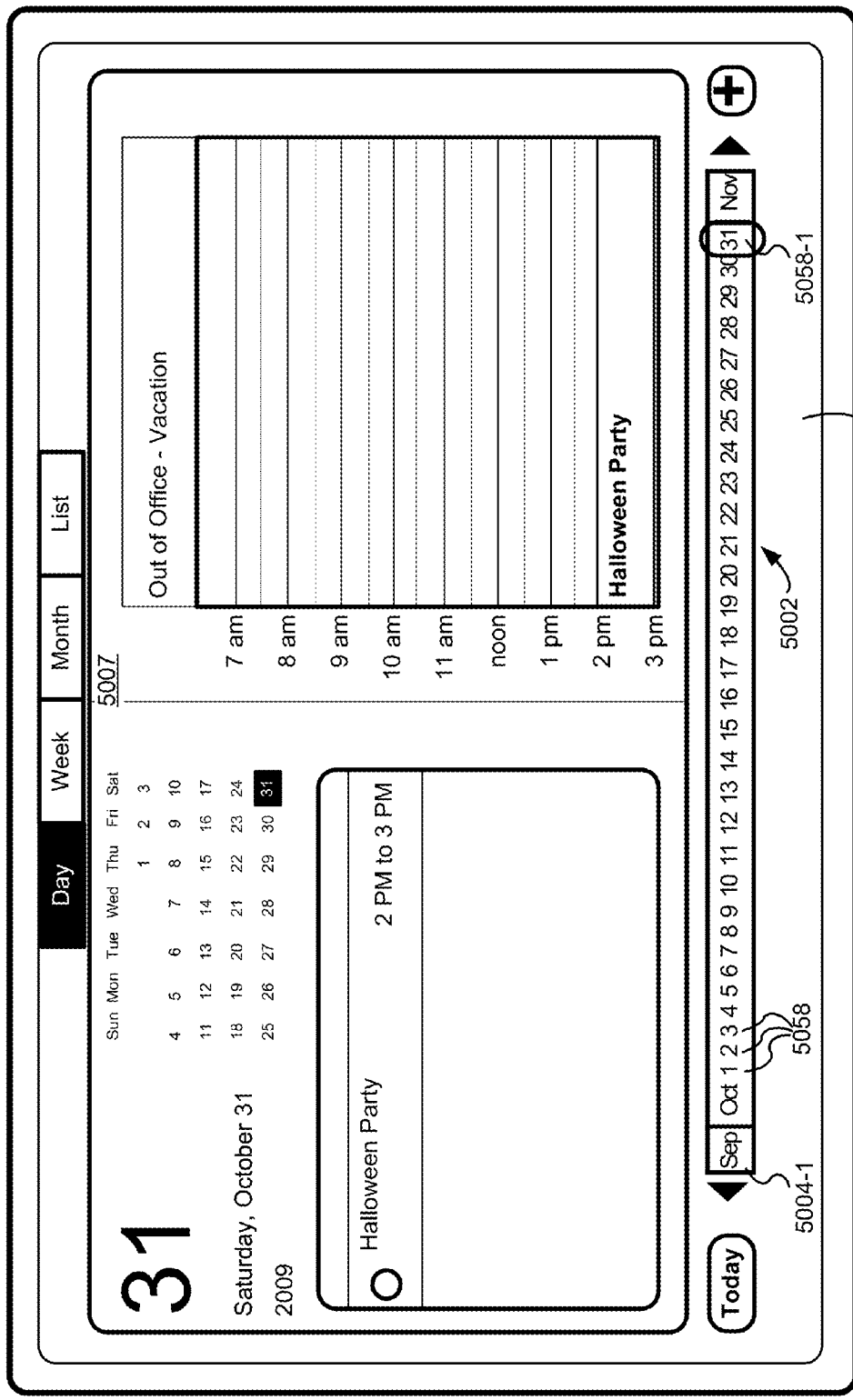

FIGS. 5I-5K illustrate exemplary user interfaces for initially displaying content (e.g., events associated with Nov. 10, 2009) associated with a value represented by a first subunit region in the first set of subunit regions and, in response to a user input at a location that corresponds to a prior unit region (e.g., tap gesture 5056 in FIG. 5I at a location on the touch screen display 112 that corresponds to prior unit region October 5004-1), navigating from the first value (e.g., Nov. 10, 2009) to a second value (e.g., Oct. 31, 2009) that is outside of the range of values represented by the first set of subunit regions (e.g., 5006 in FIGS. 5I-5J). The second value is associated with a subunit region of a second set of subunit regions (e.g., 5058 in FIGS. 5J-5K) that is associated with the prior unit region (e.g., October 5004-1 in FIG. 5I), and after navigating to the second value (e.g., Oct. 31, 2009) that is outside of the range of values that is associated with the first set of subunit regions, displaying content associated with the second value (e.g., events associated with Oct. 31, 2009), as illustrated in FIG. 5K. FIG. 5J shows an exemplary user interface illustrating a transition animation between displaying the content associated with the first value and displaying the content associated with the second value, where the first set of subunit regions 5006 slide off the screen to the right while the second set of subunit regions 5058 slide onto the screen from the left.

Figure 5L:
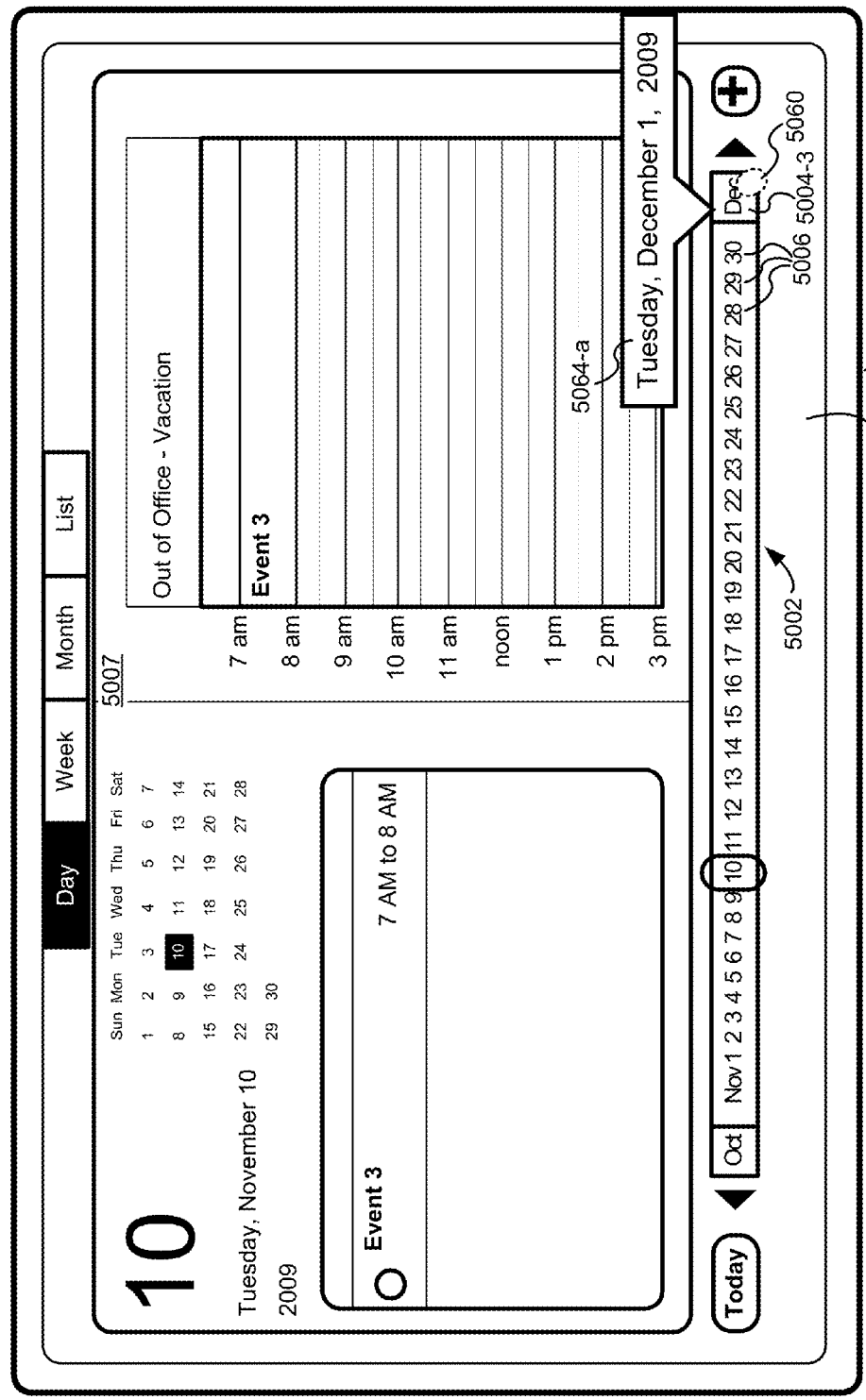
Figure 5N:
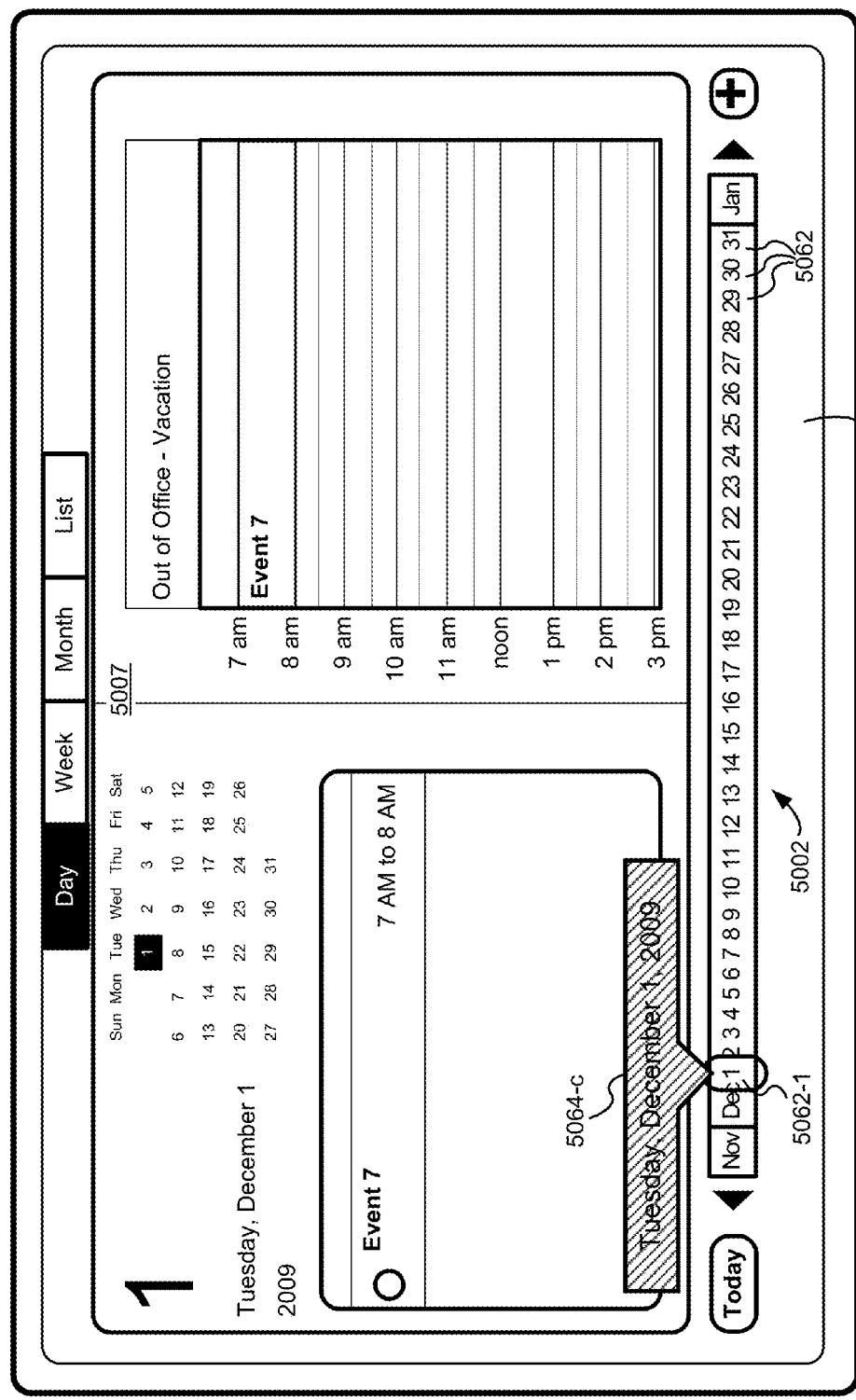
Figure 5O:
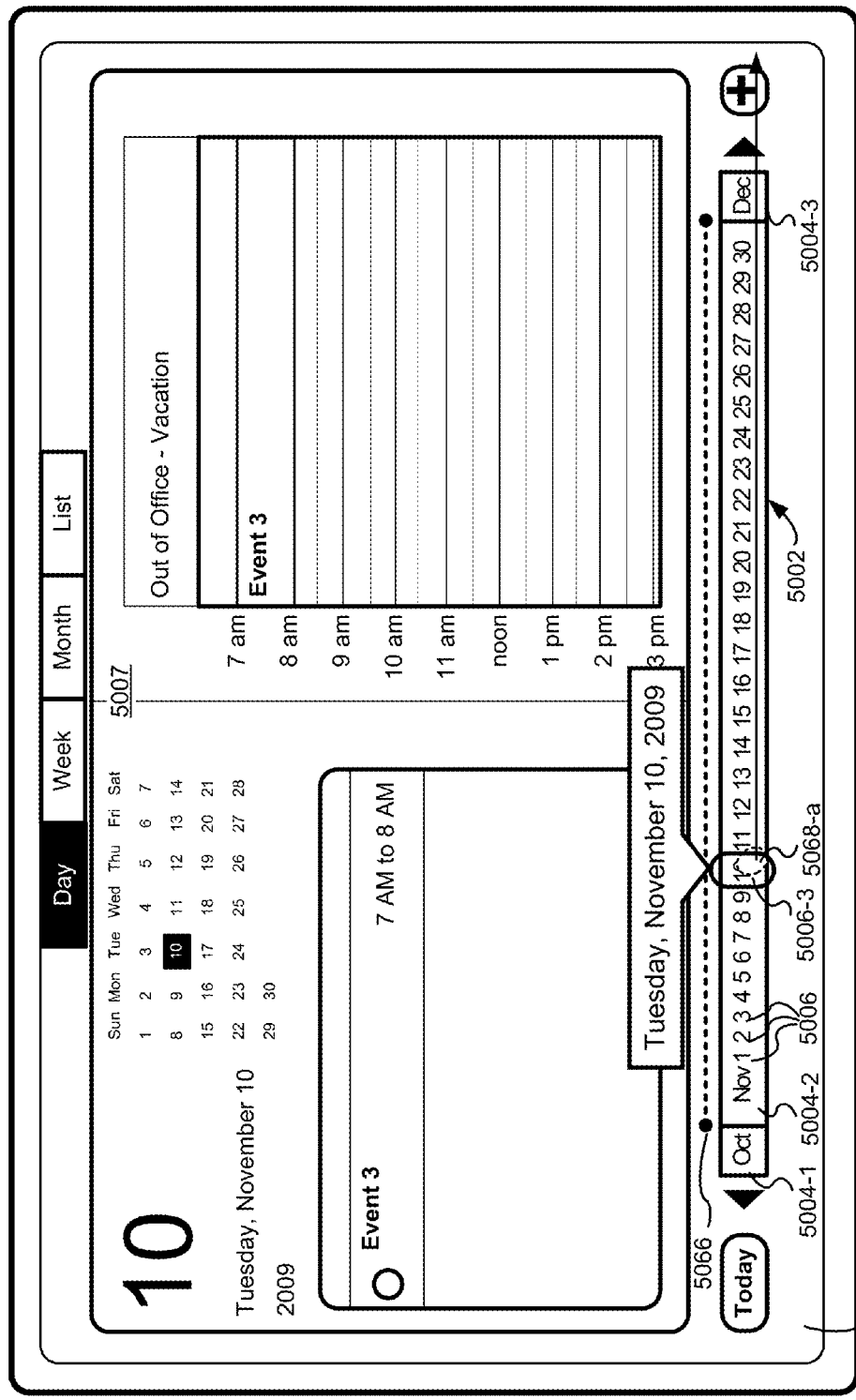
Figure 5Q:
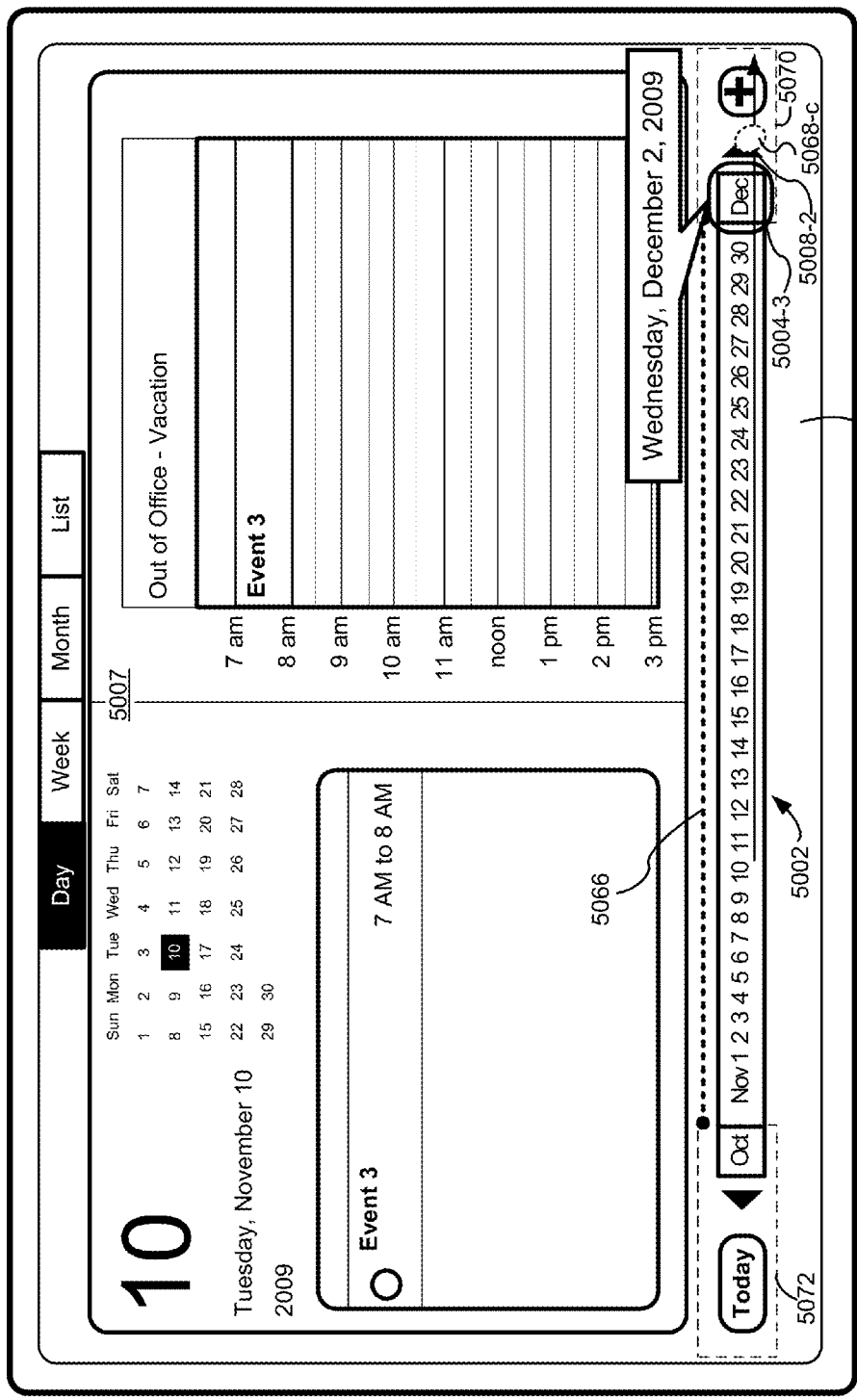
Figure 5R:
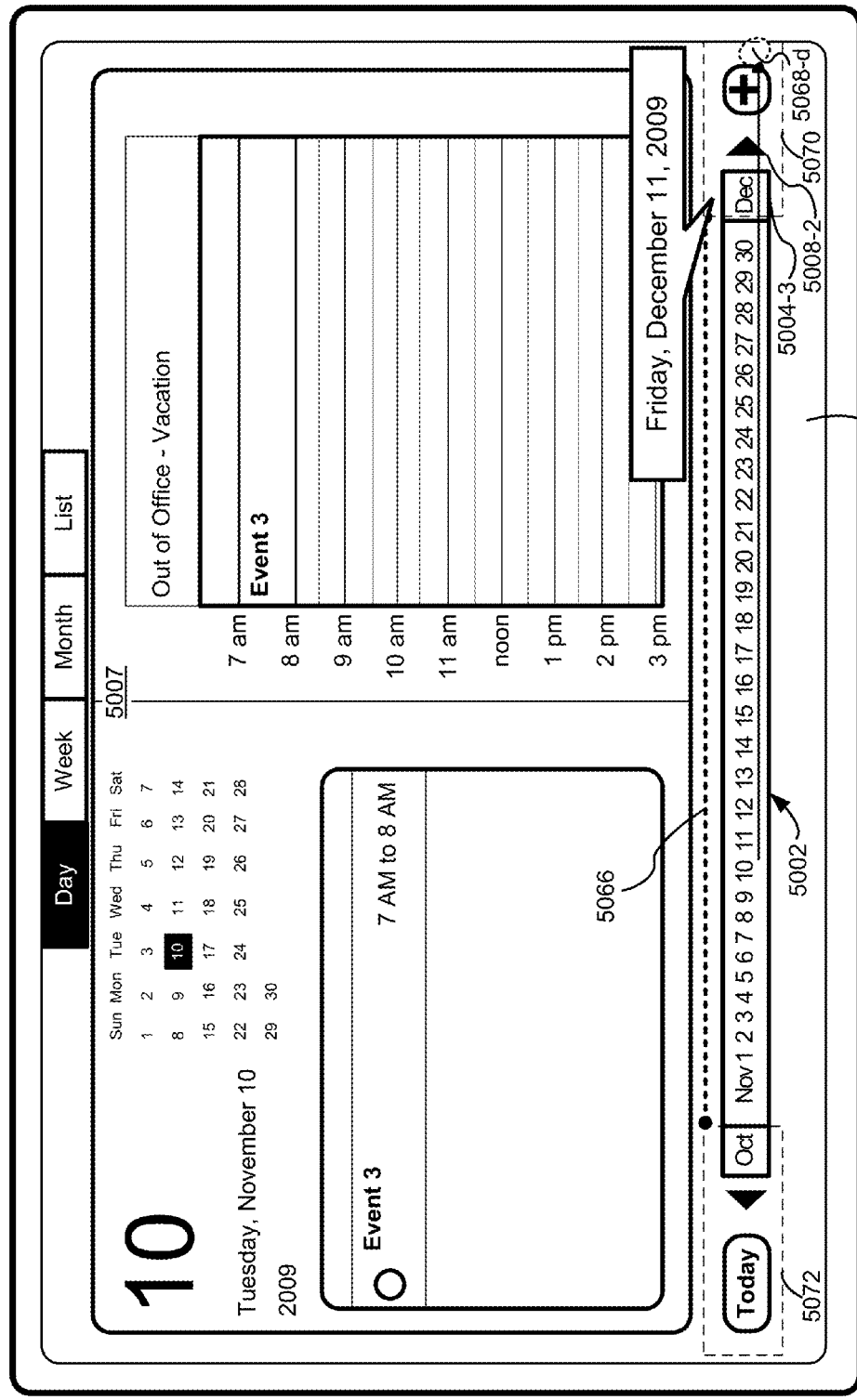
Figure 5S:
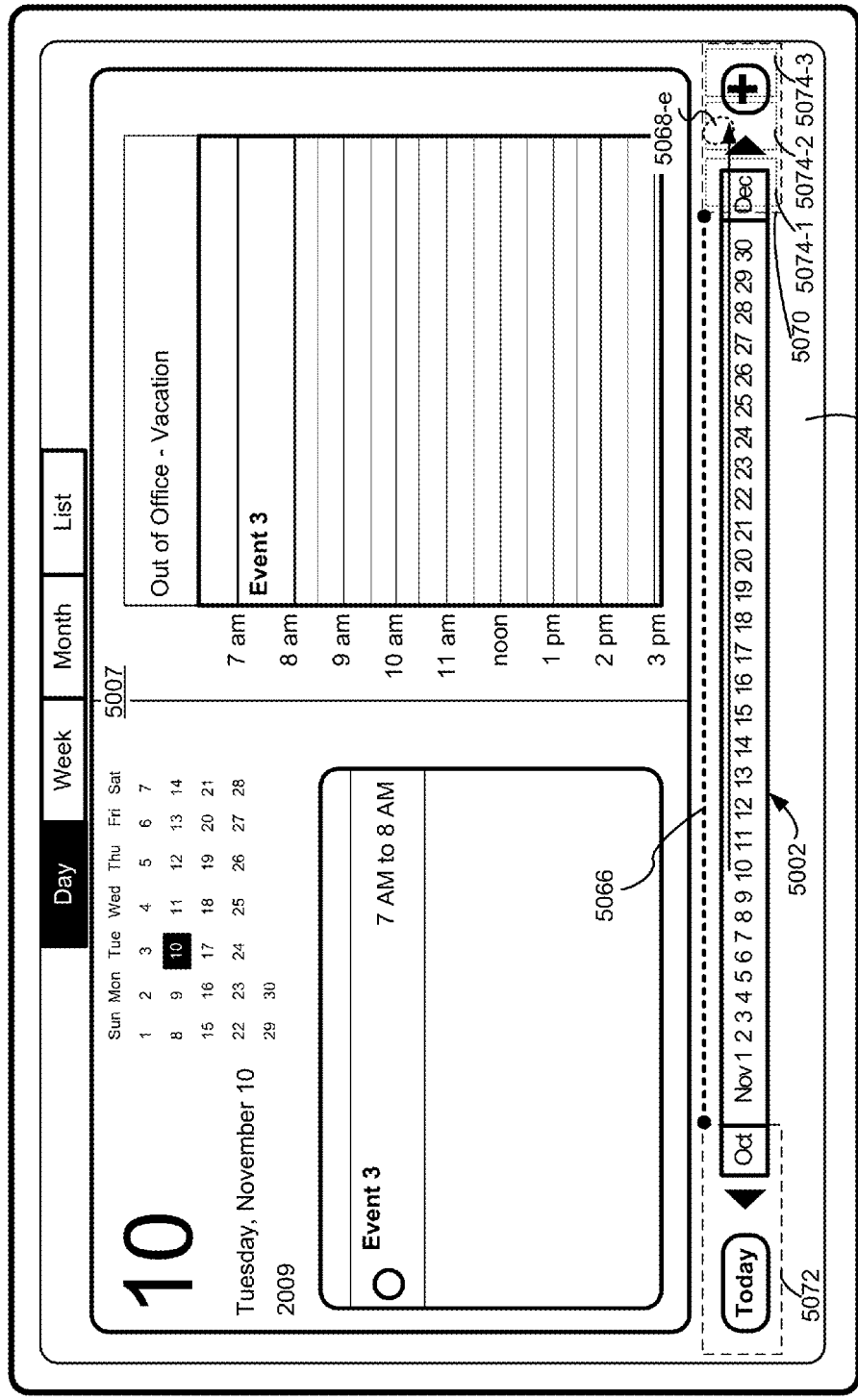
Figure 5T:
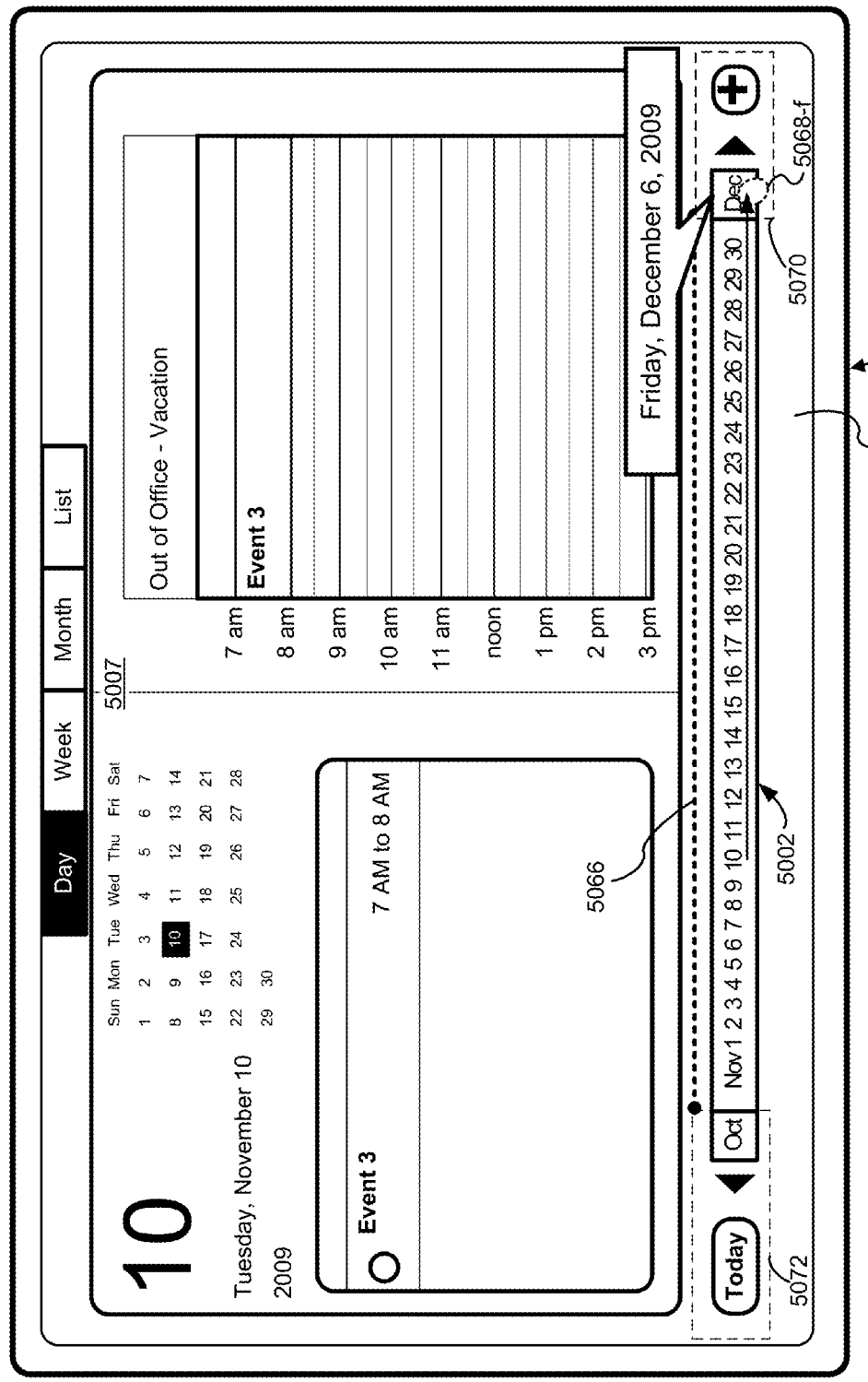
Figure 5U:
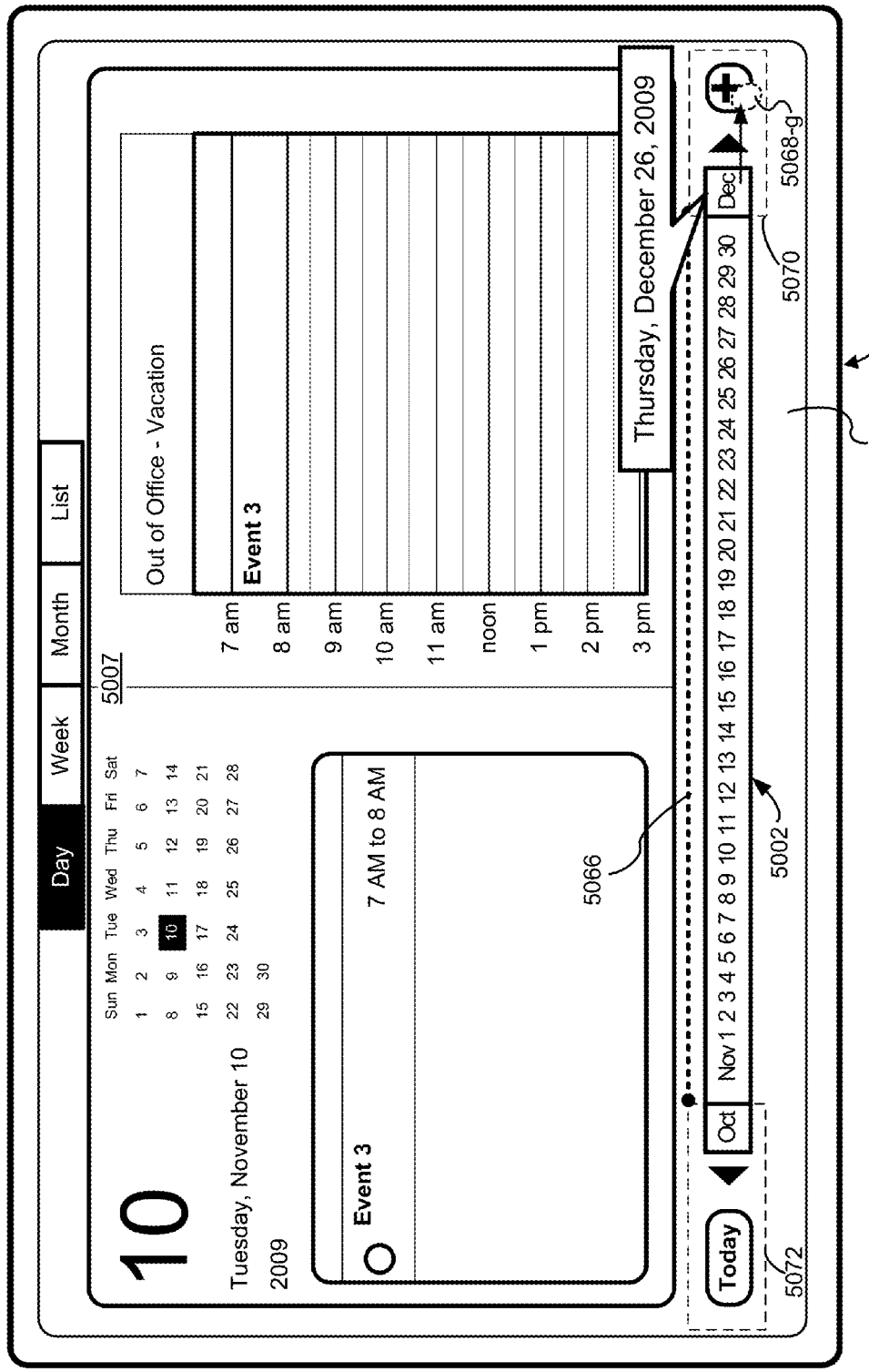
Figure 5V:
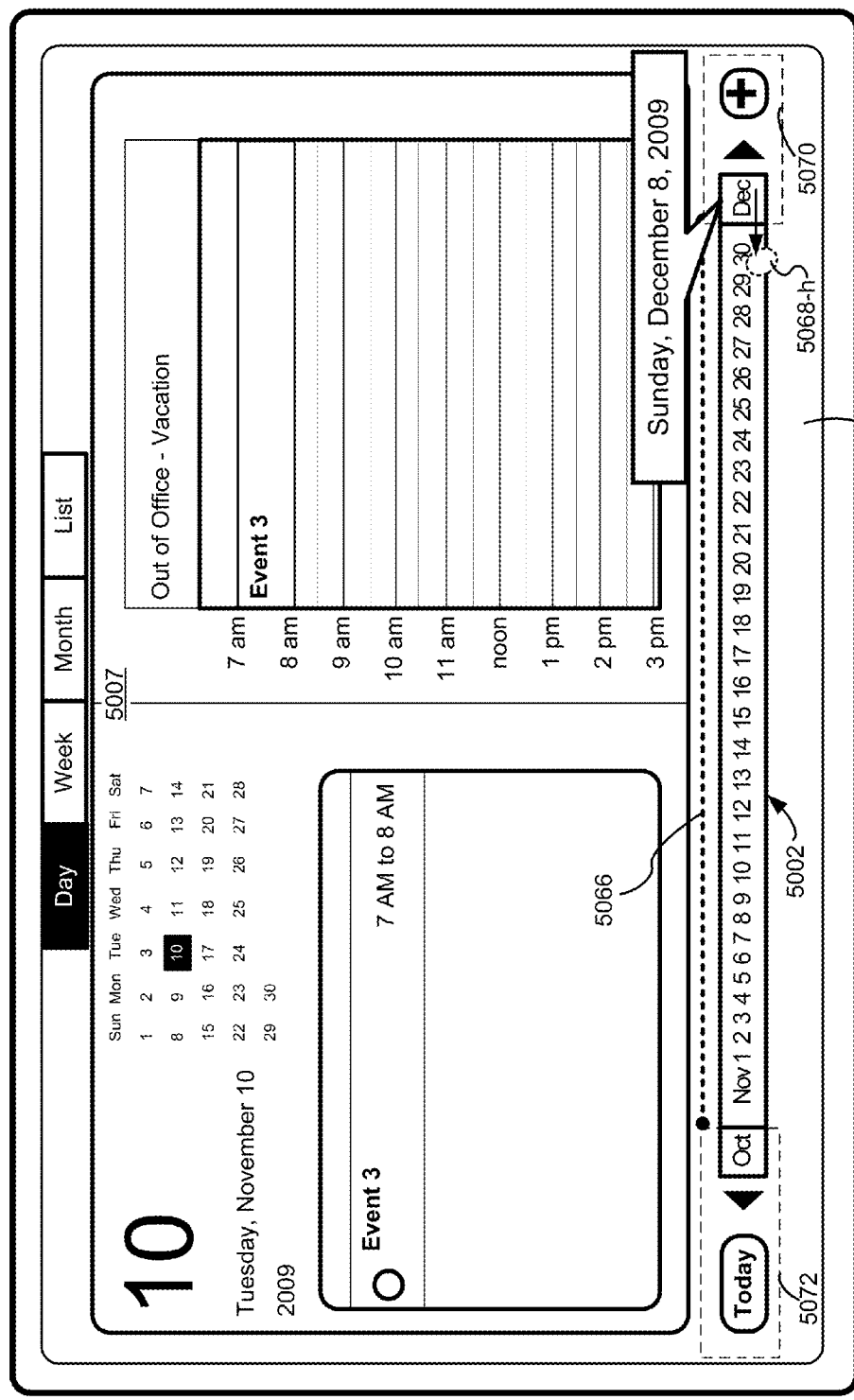
Figure 5X:
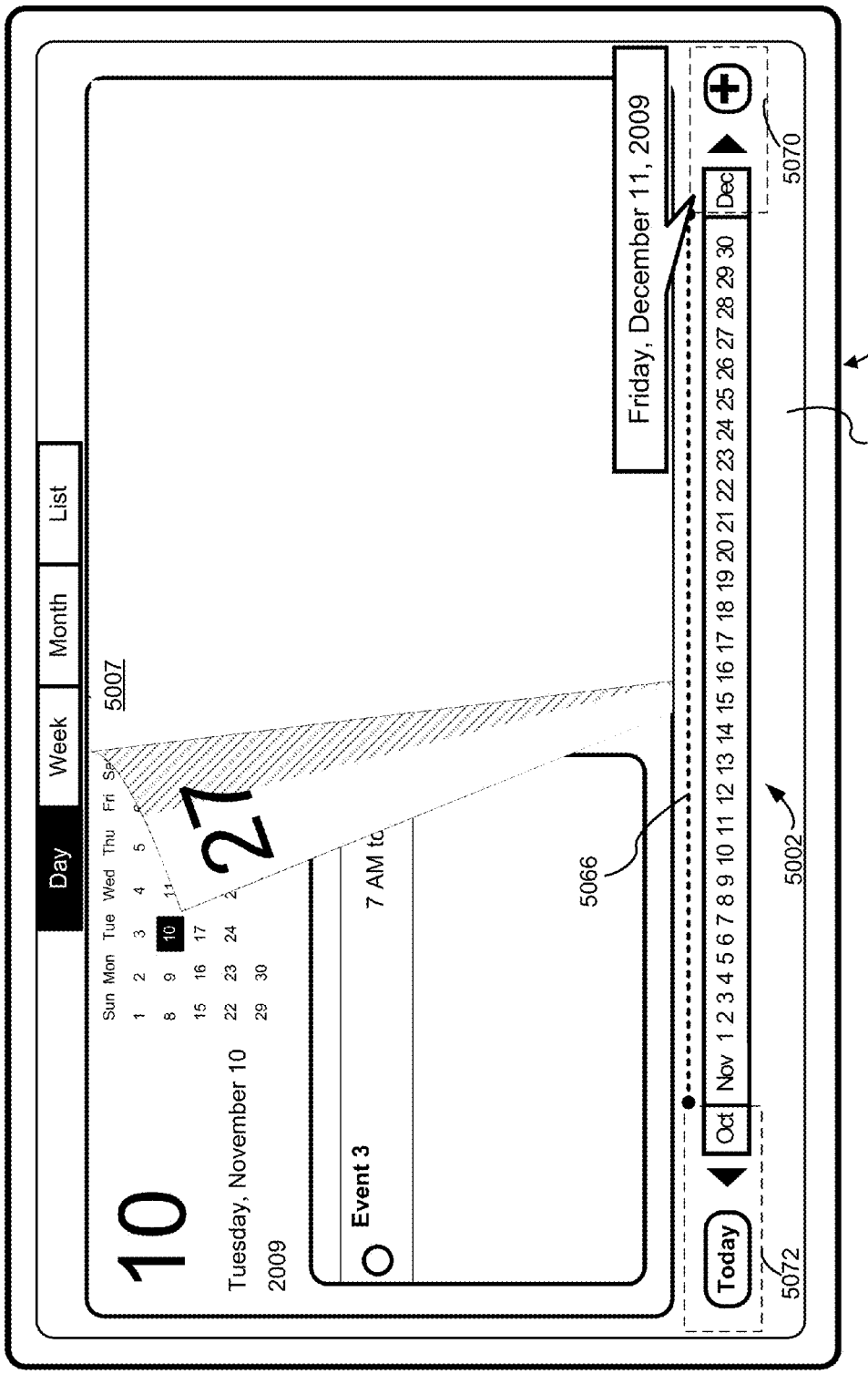
Figure 5Y:
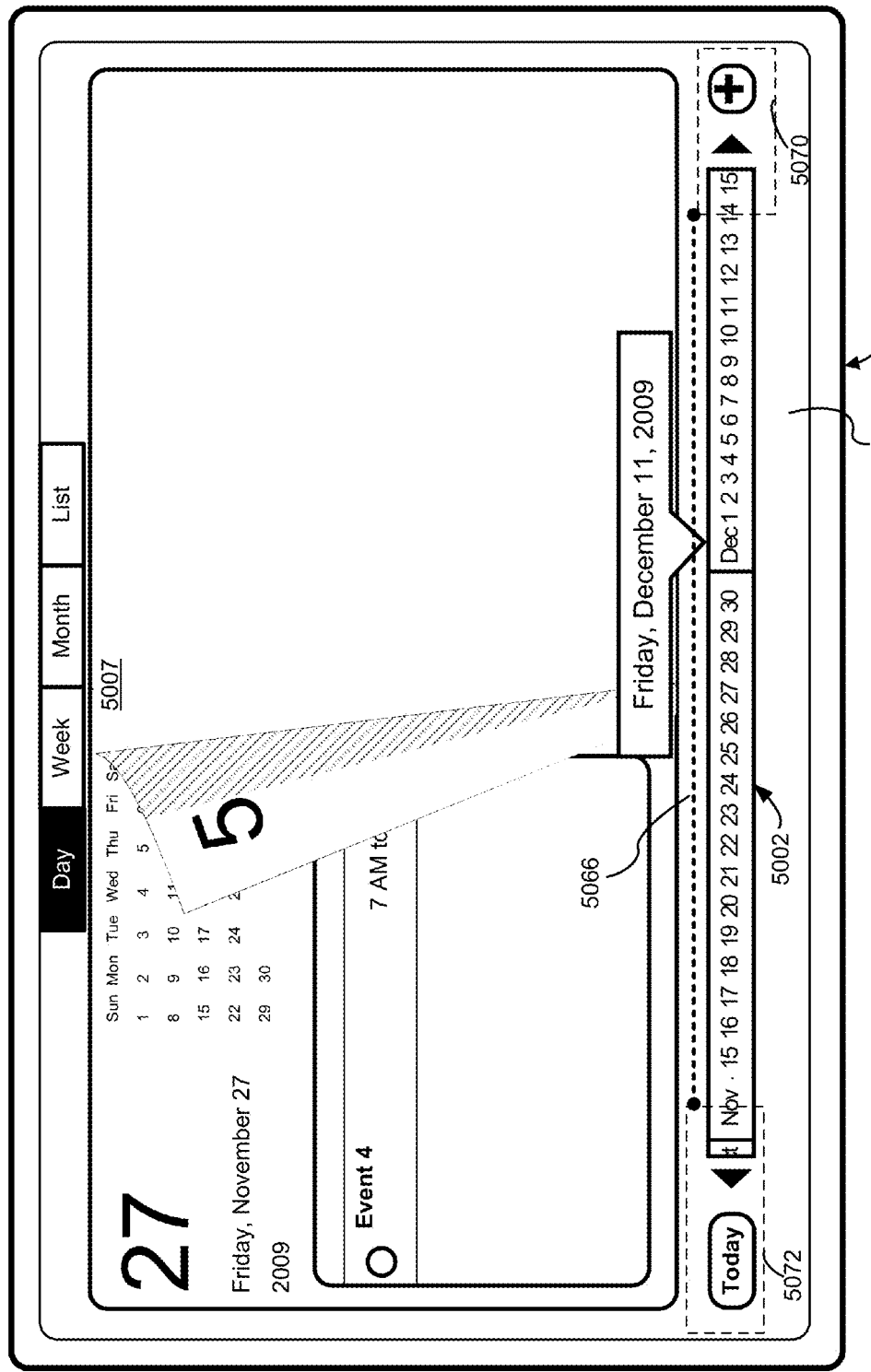
Figure 5Z:
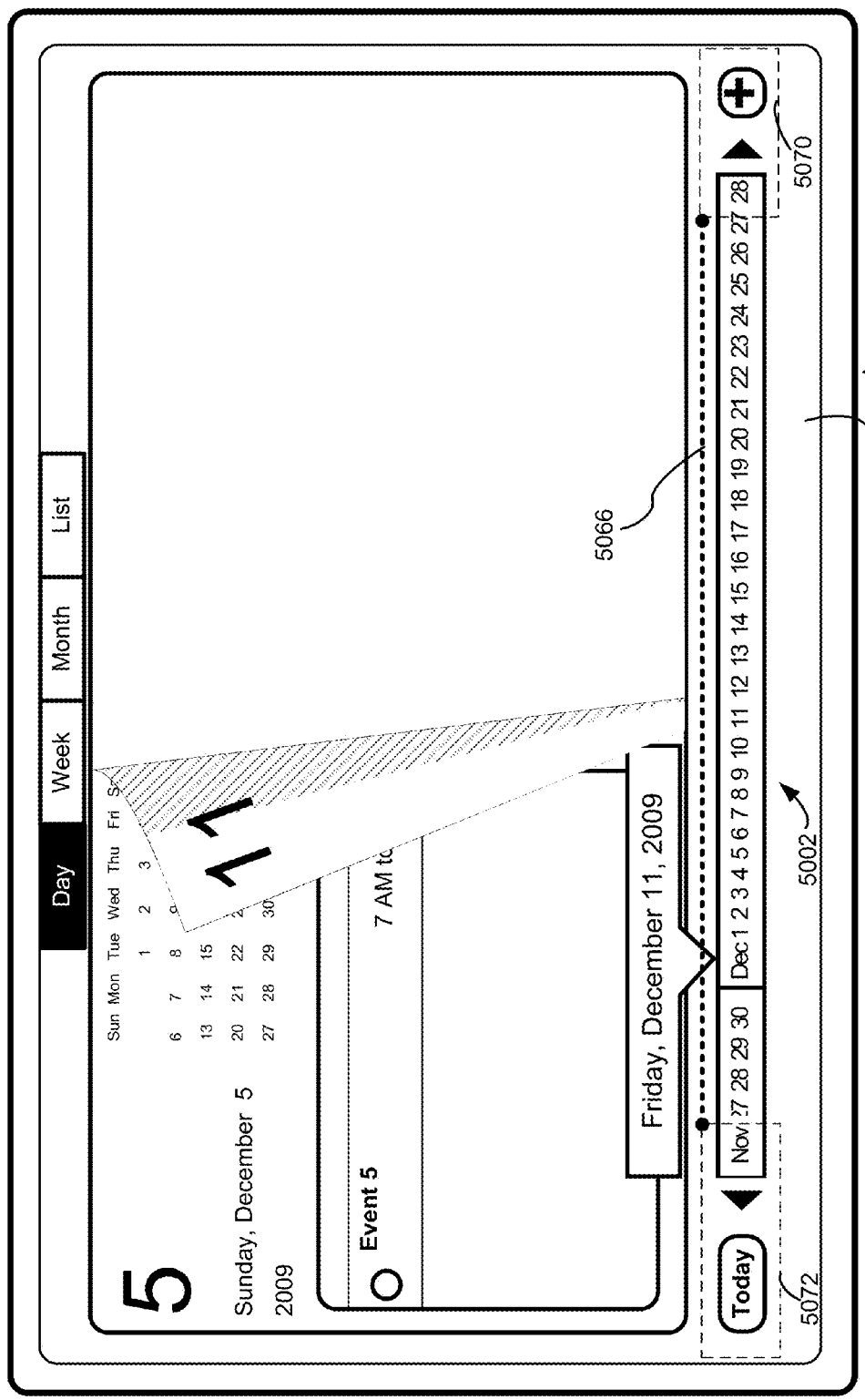
Figure 5A:
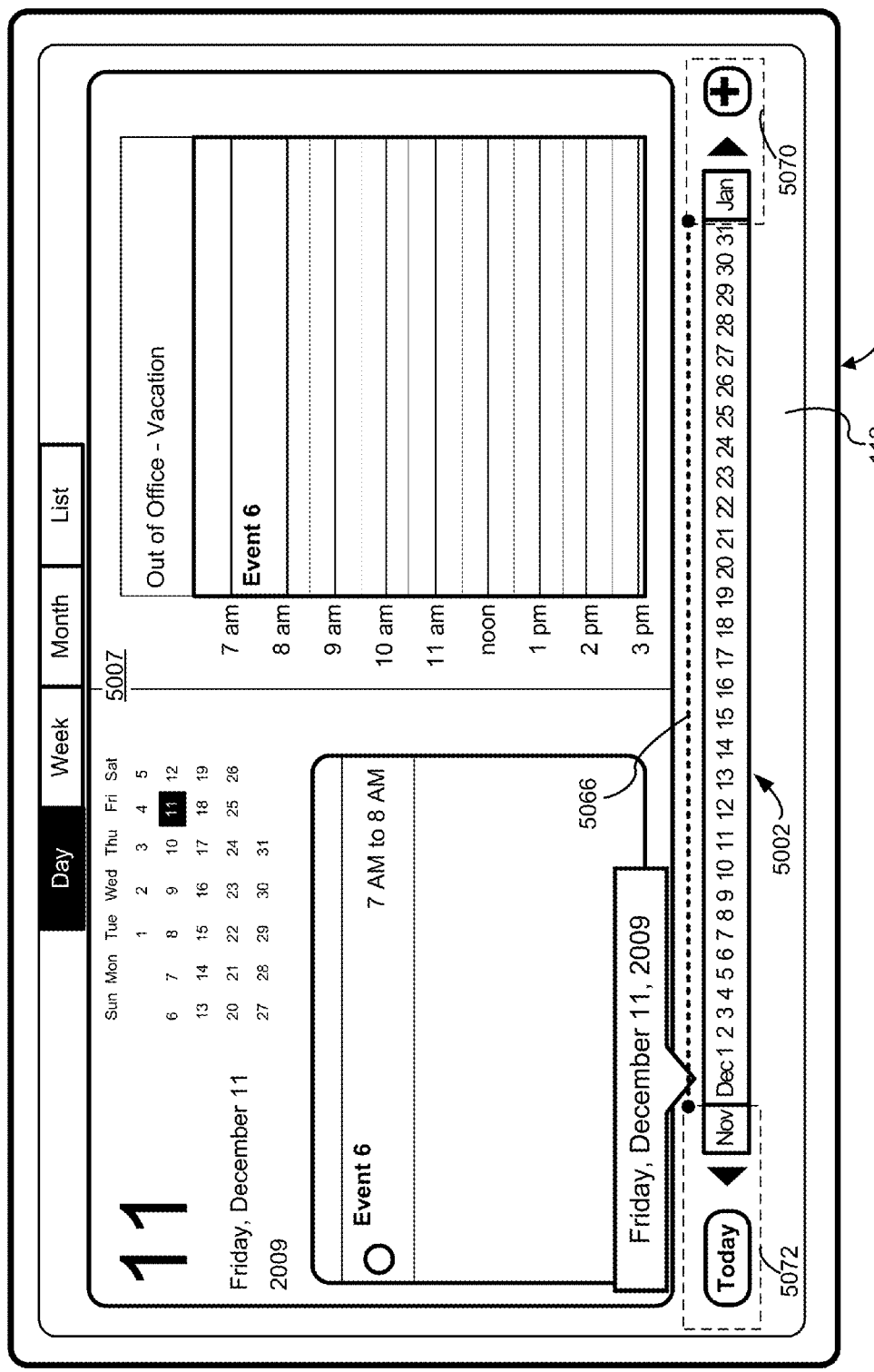
Figure 5B:
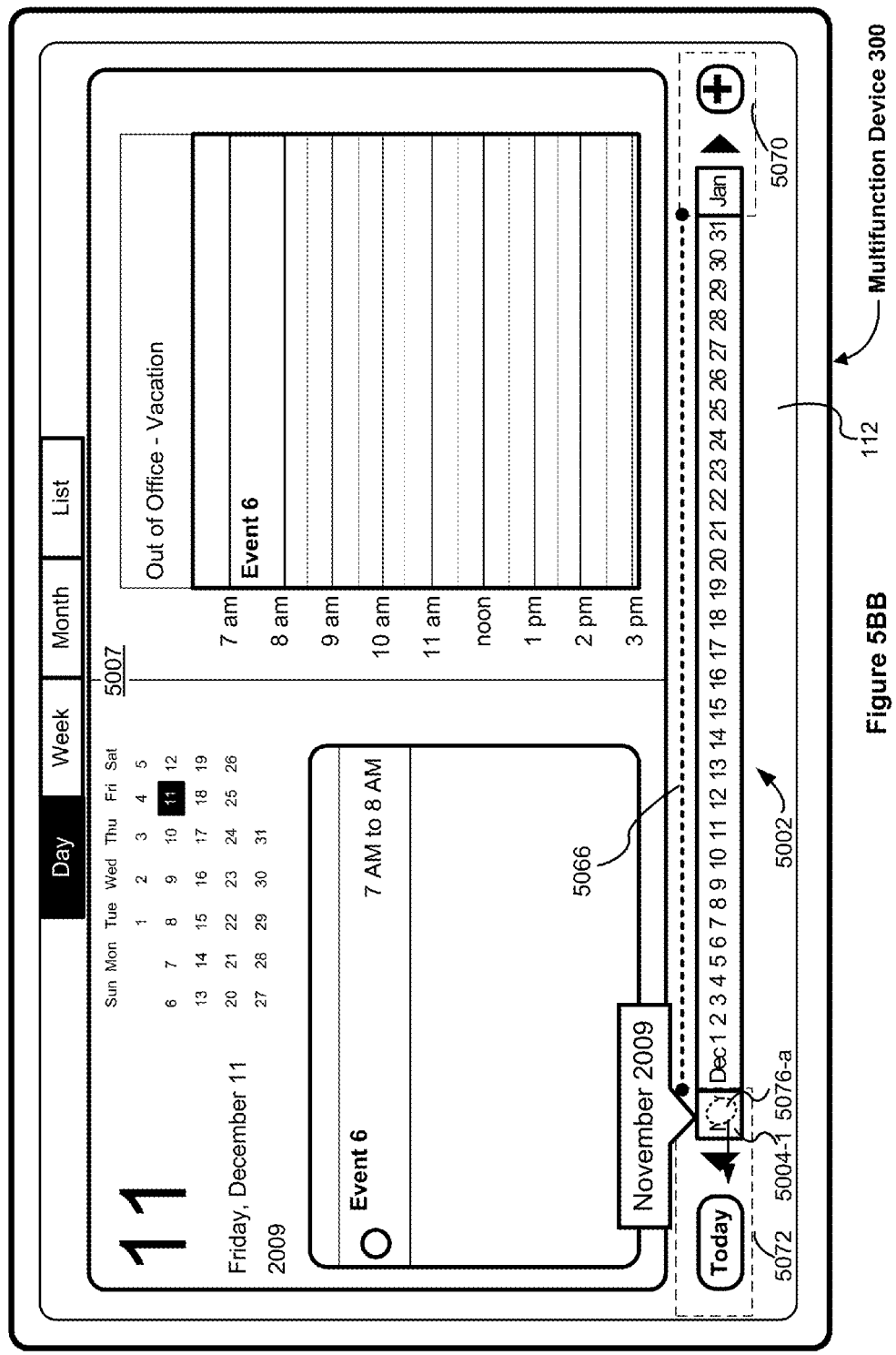
Figure 5D:
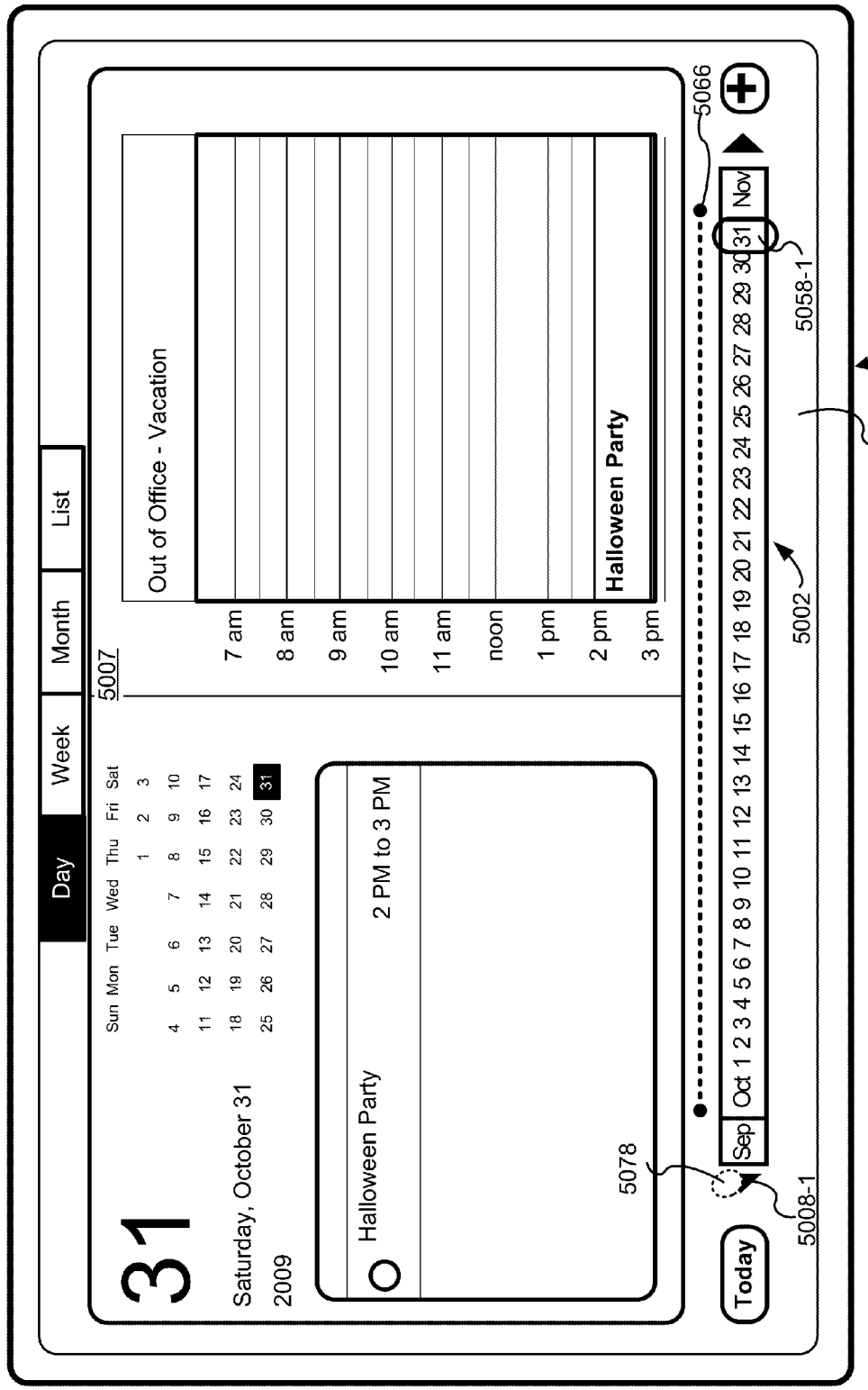
Figure 5E:
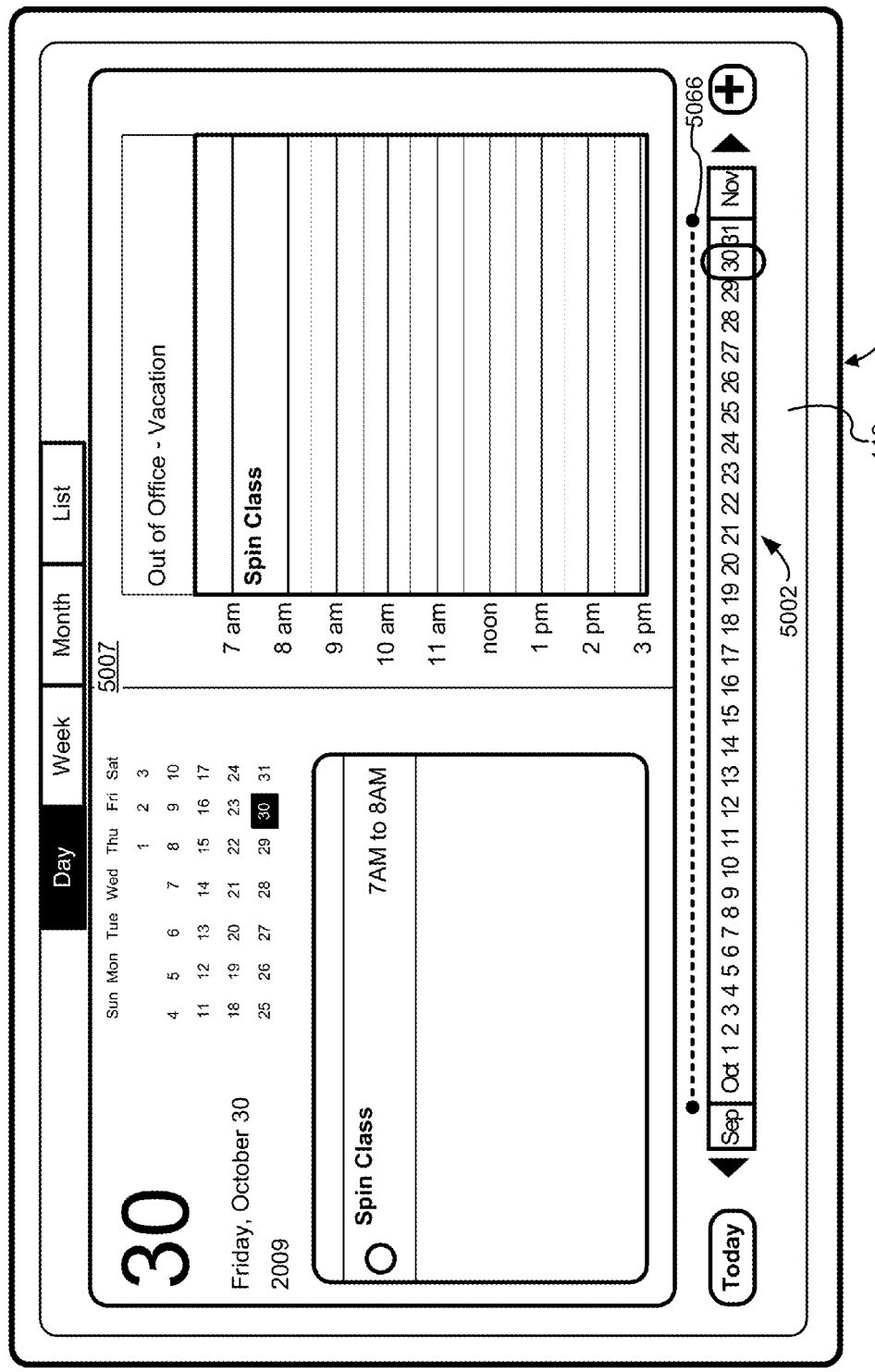
Figure 5F:
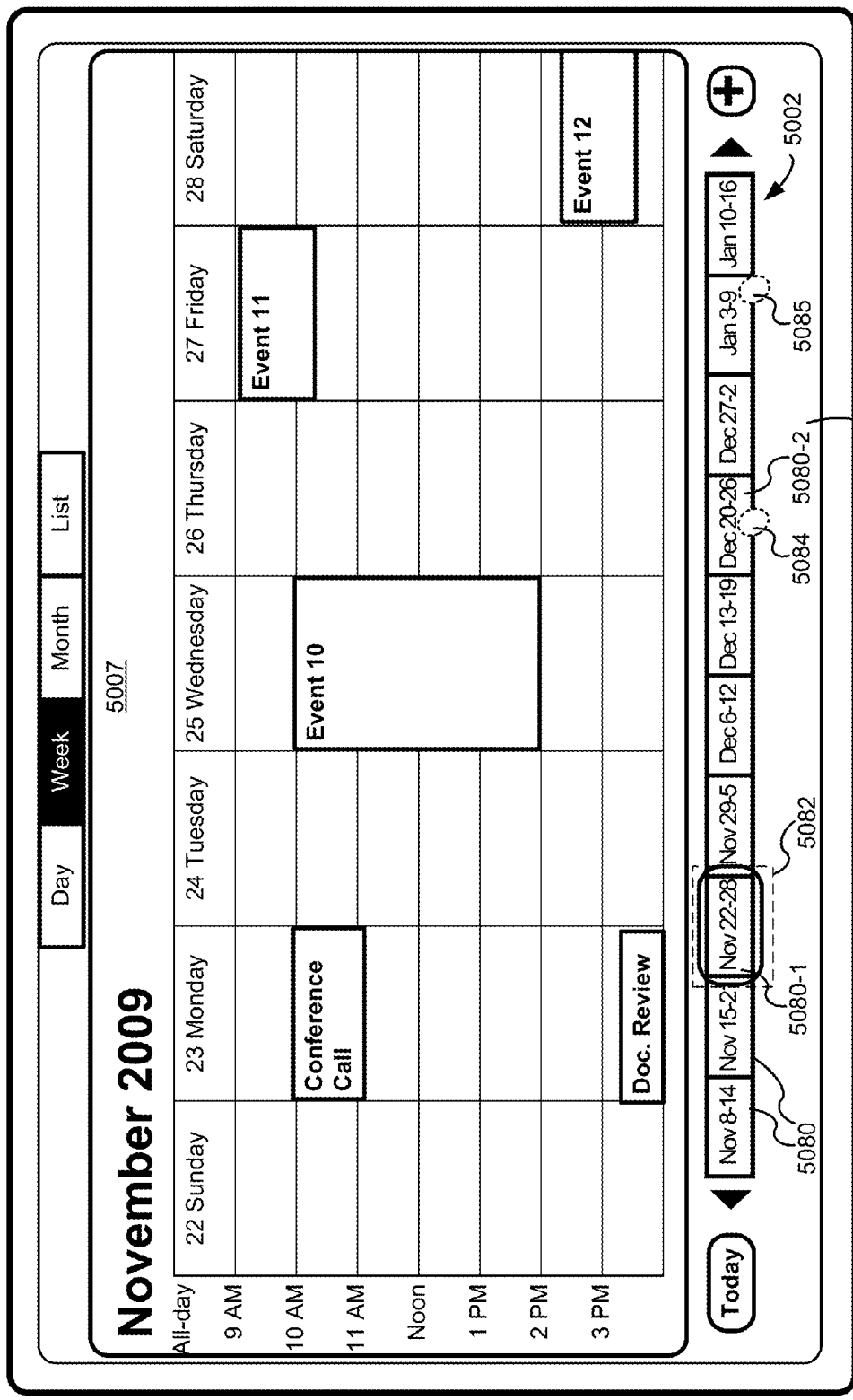
Figure 5G:
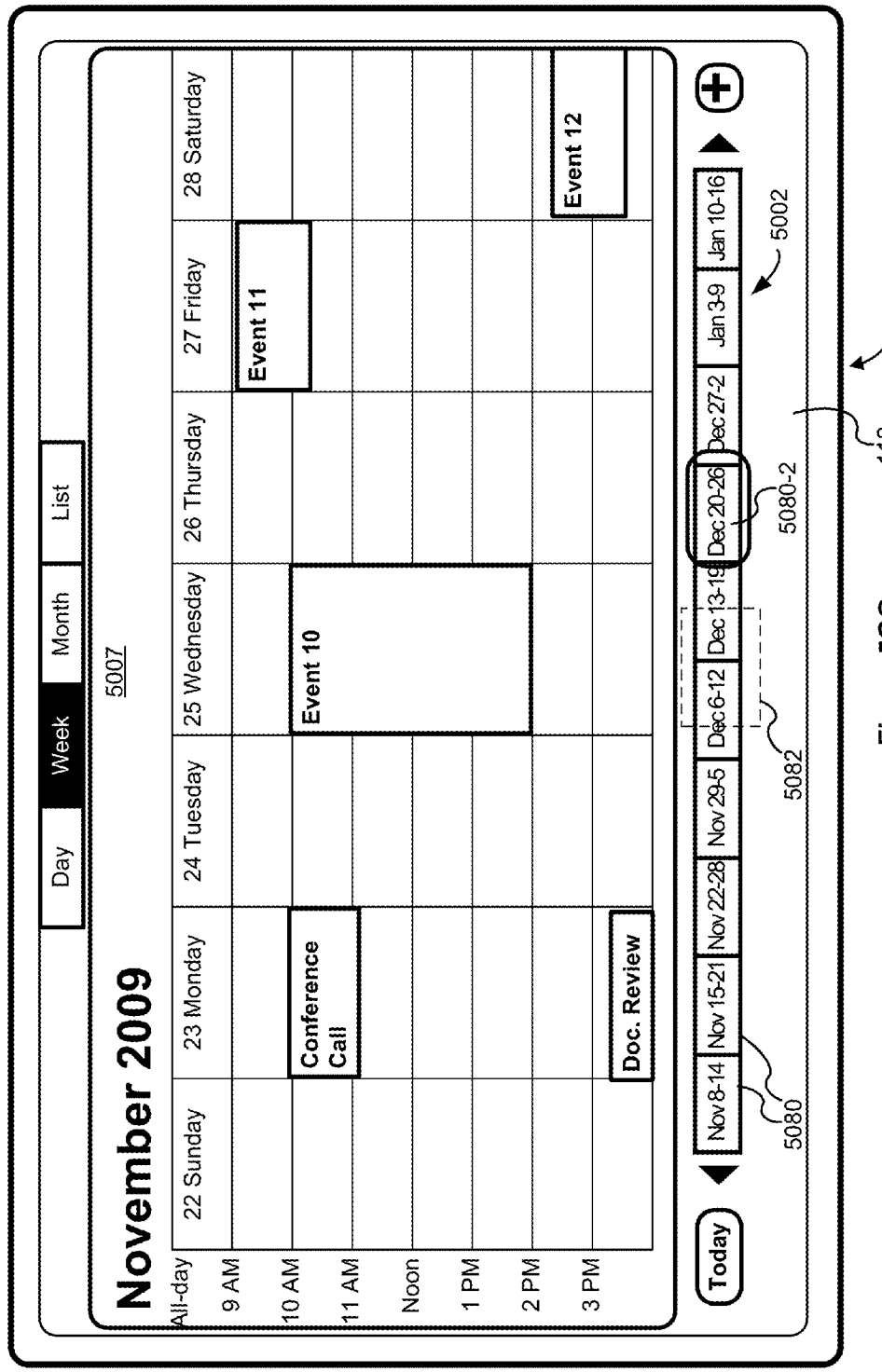
Figure 5H:
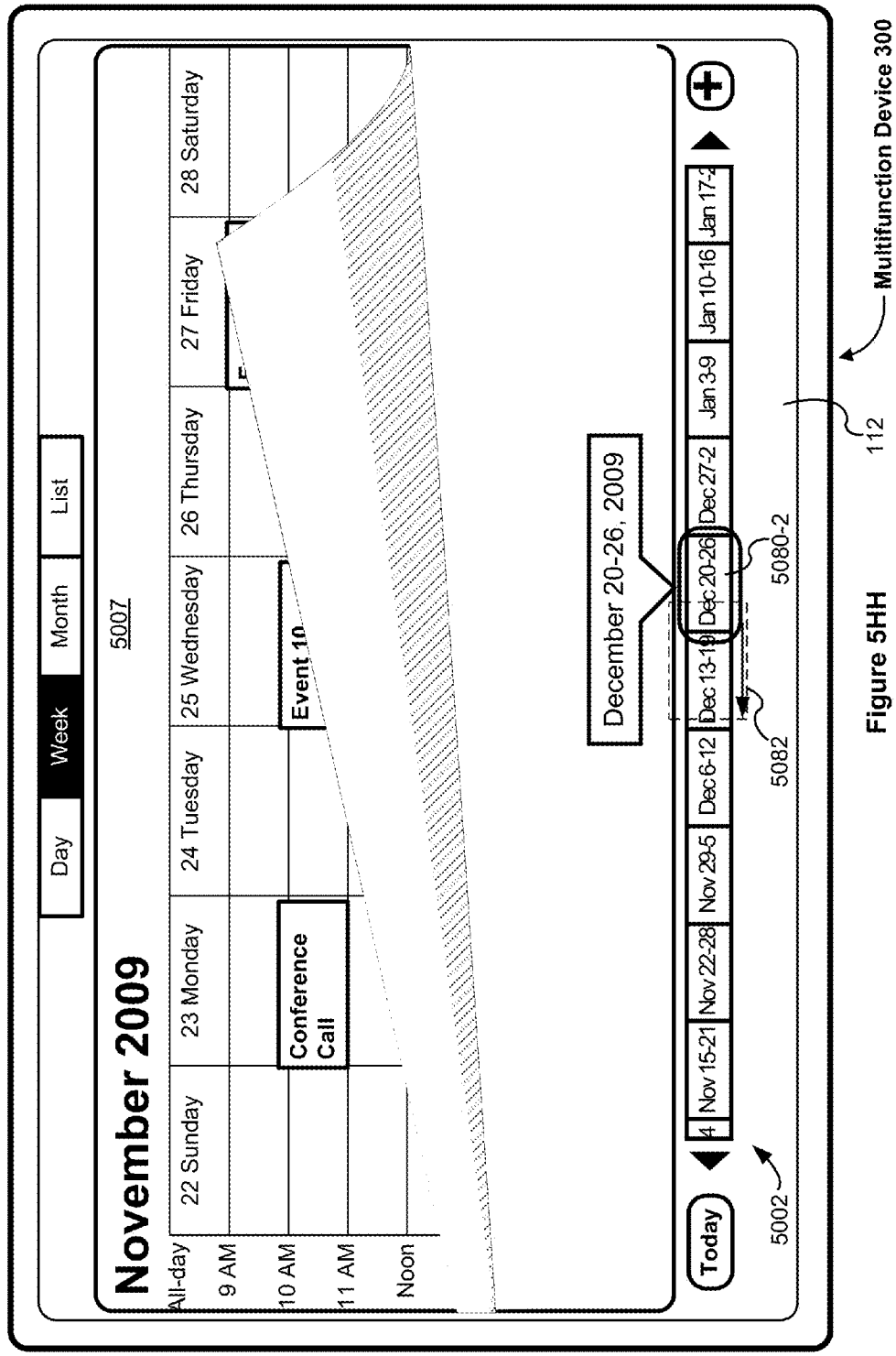
Figure 5I:
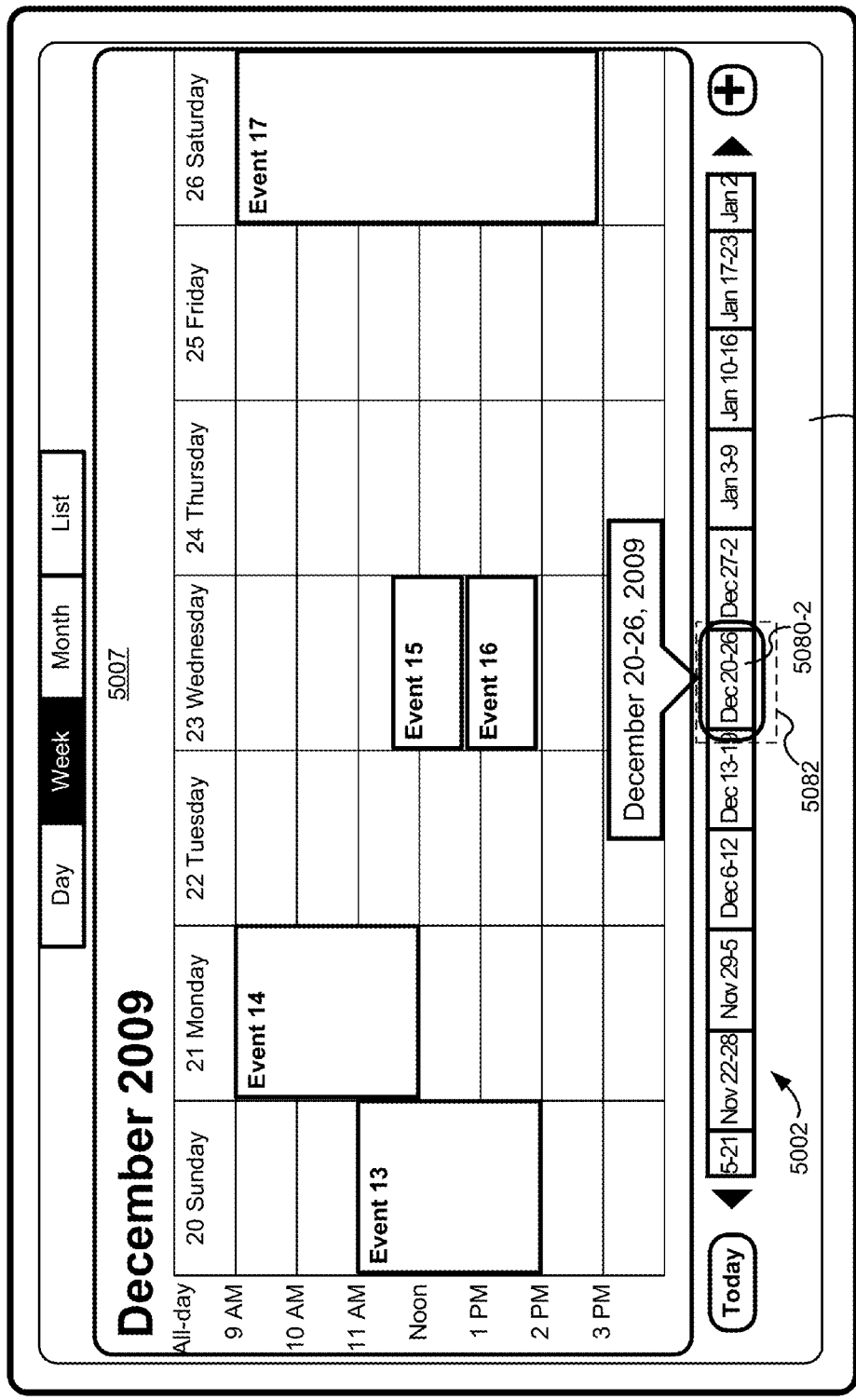
Figure 5J:
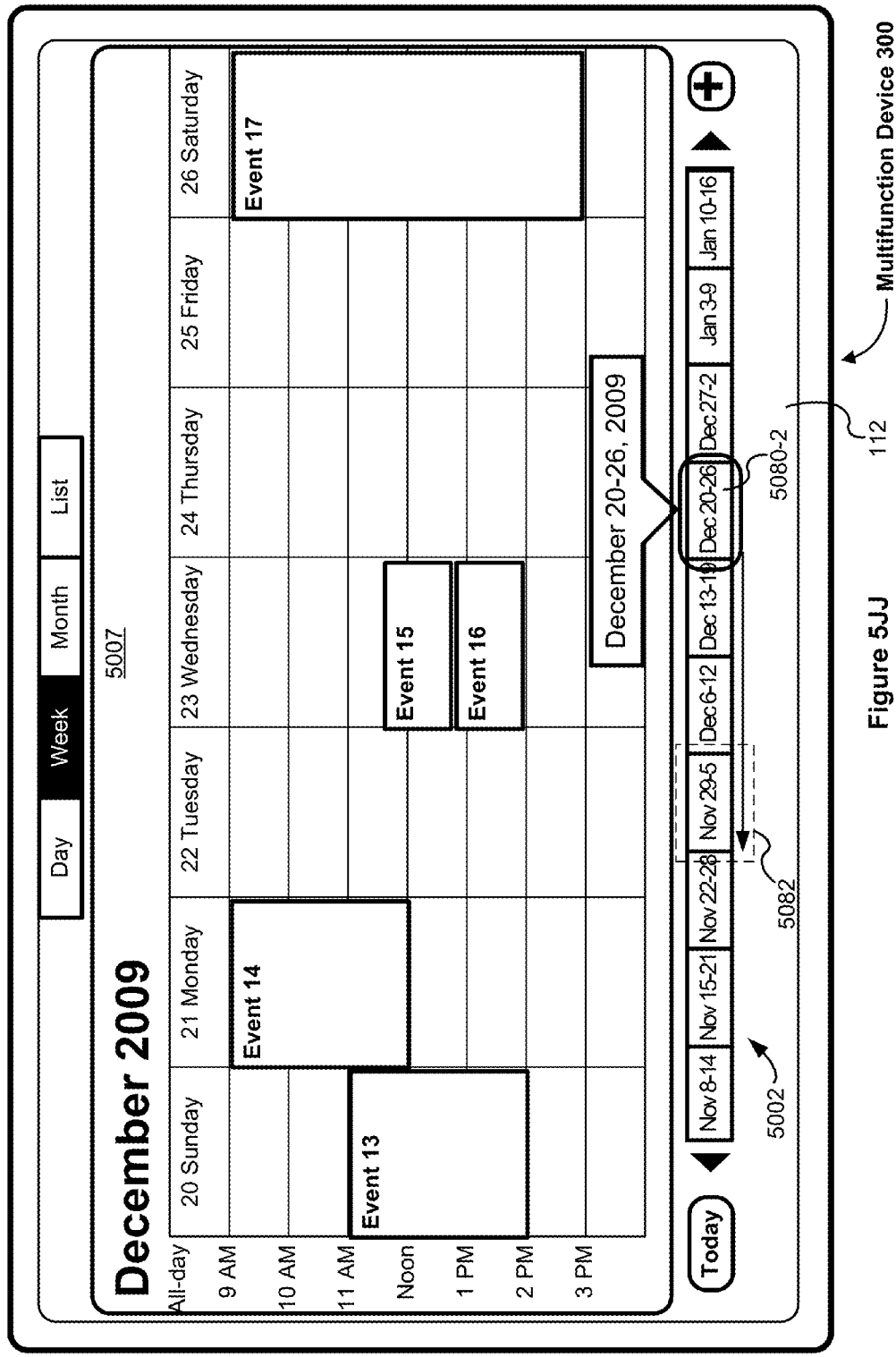
Figure 5K:
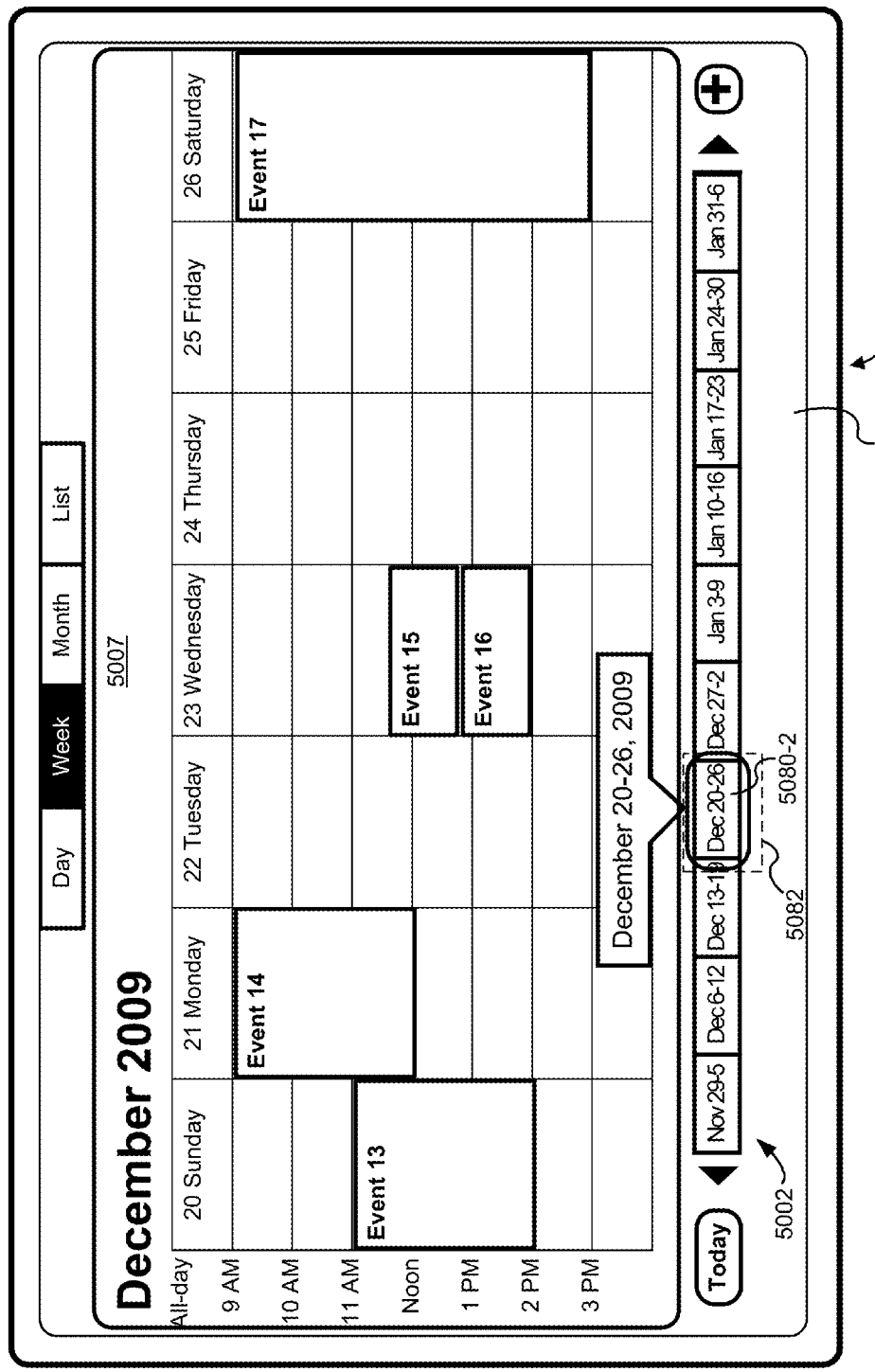
Figure 5L:
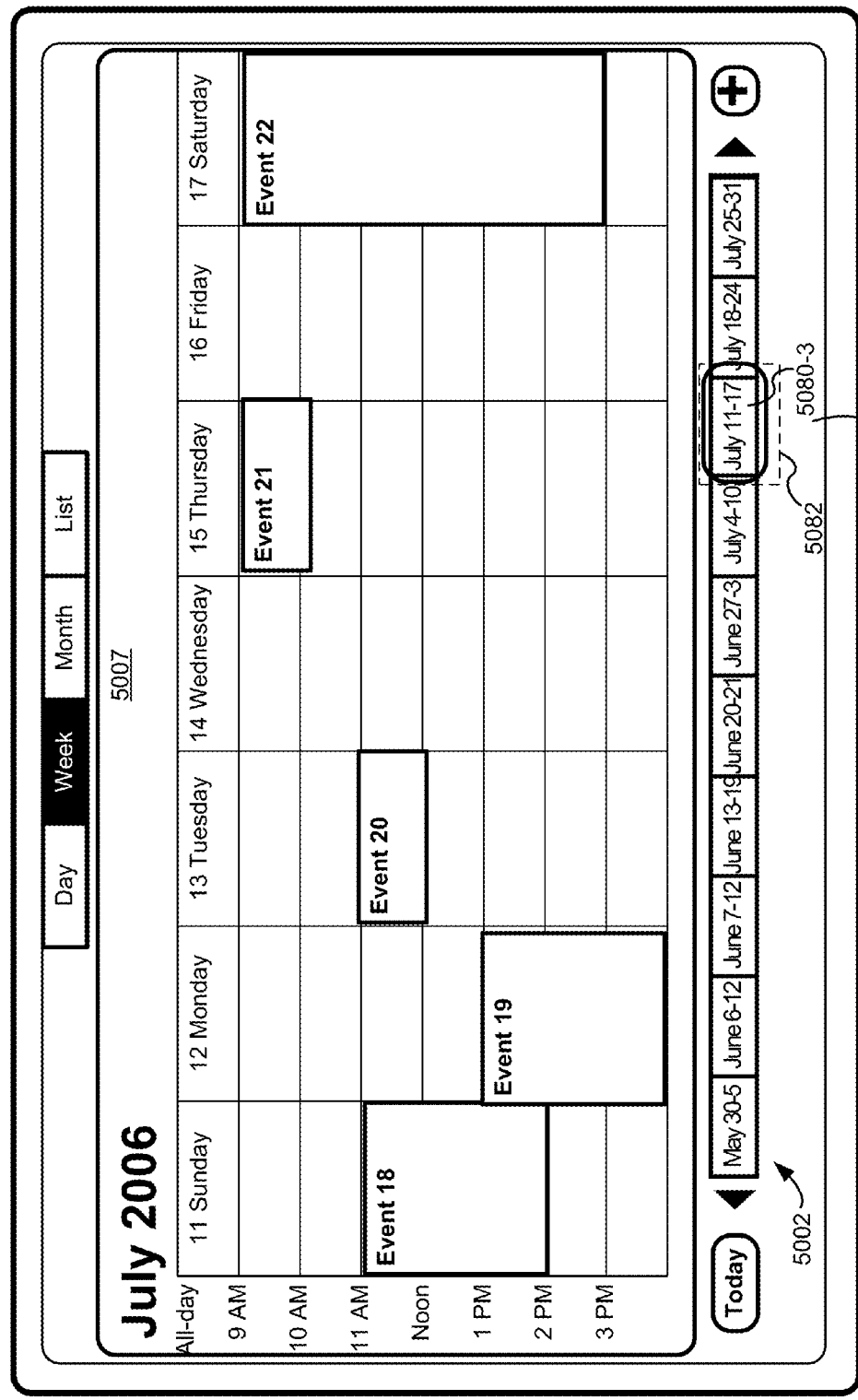
Figure 5M:
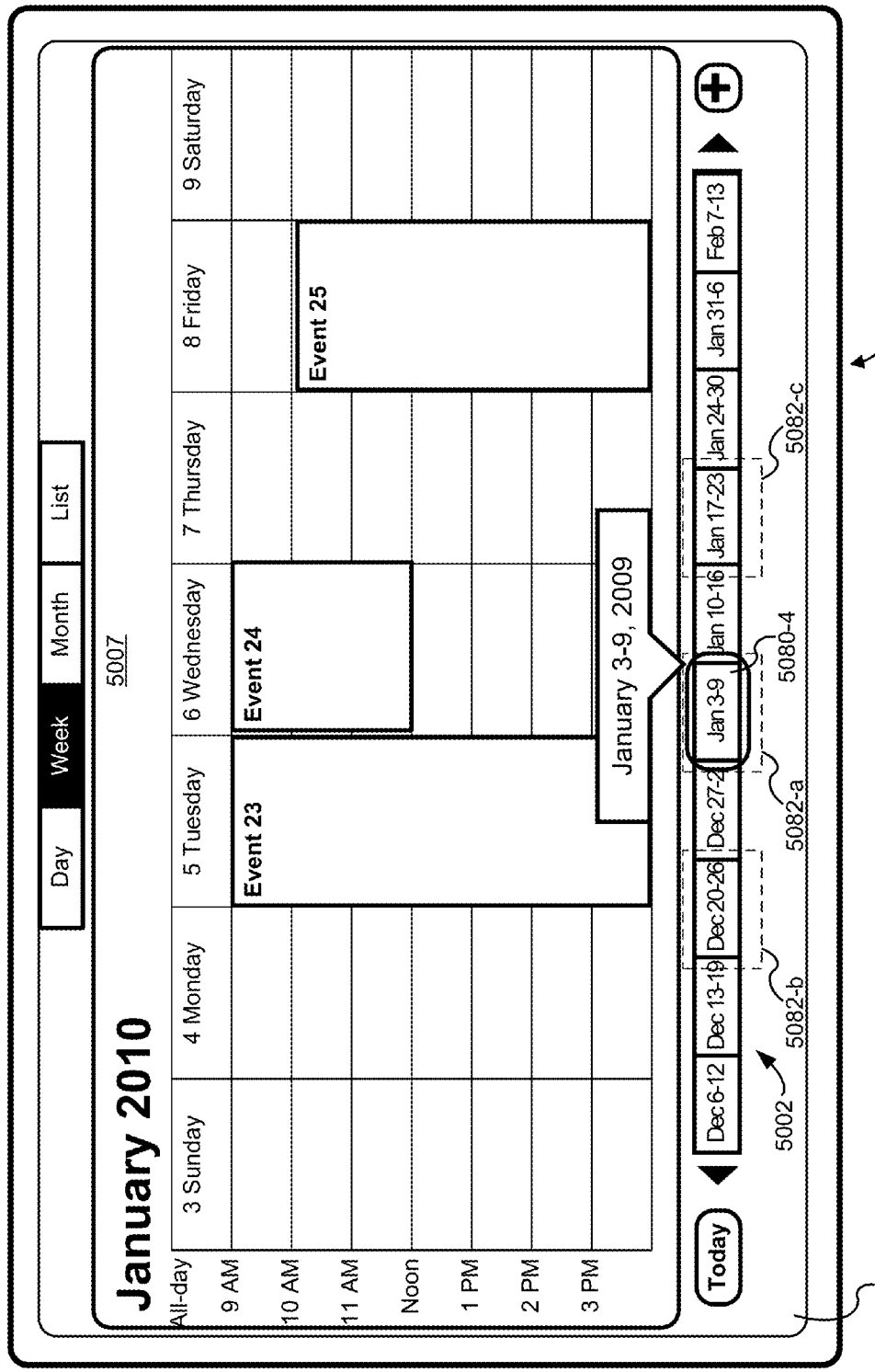
Figure 5N:
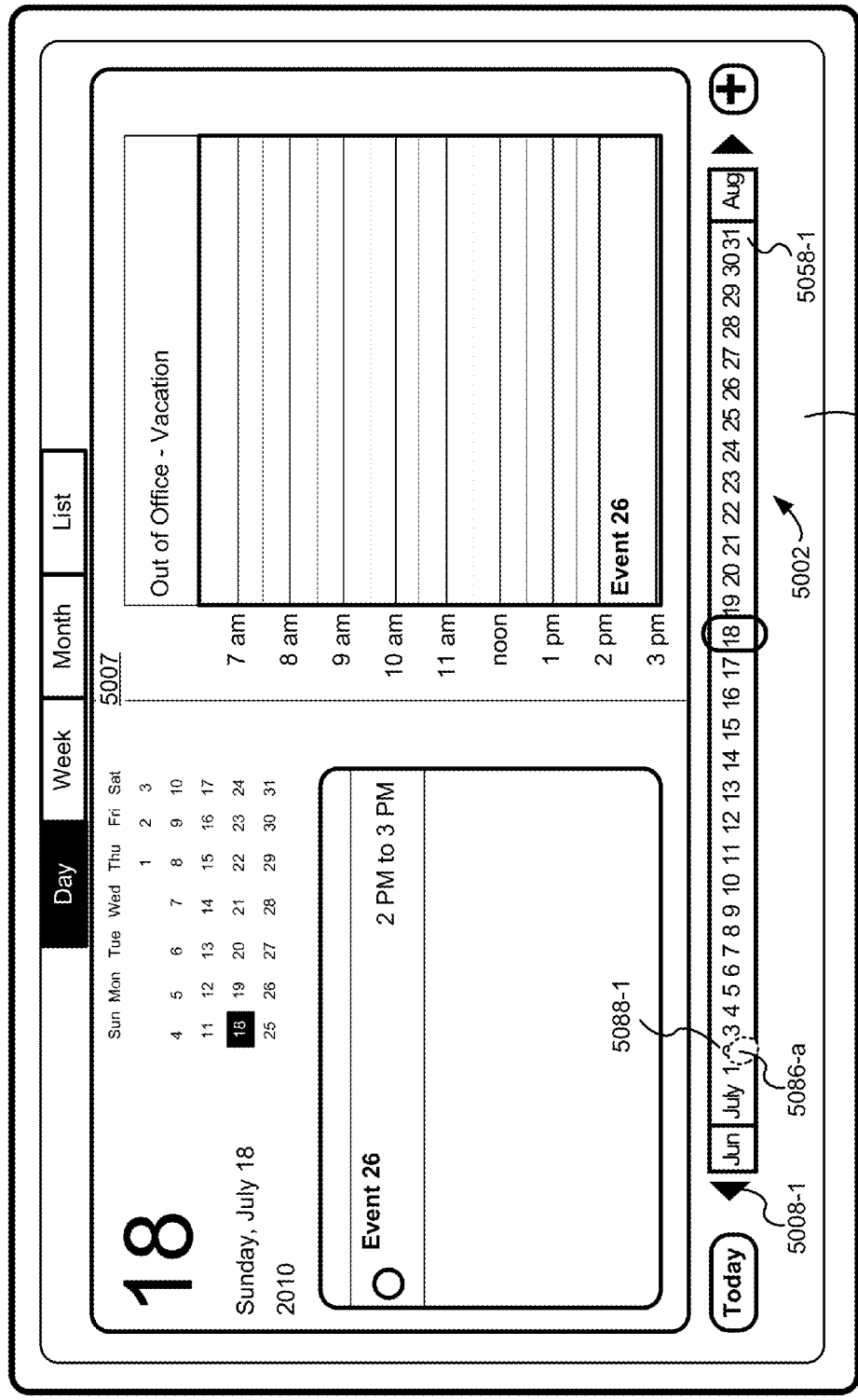
Figure 5O:
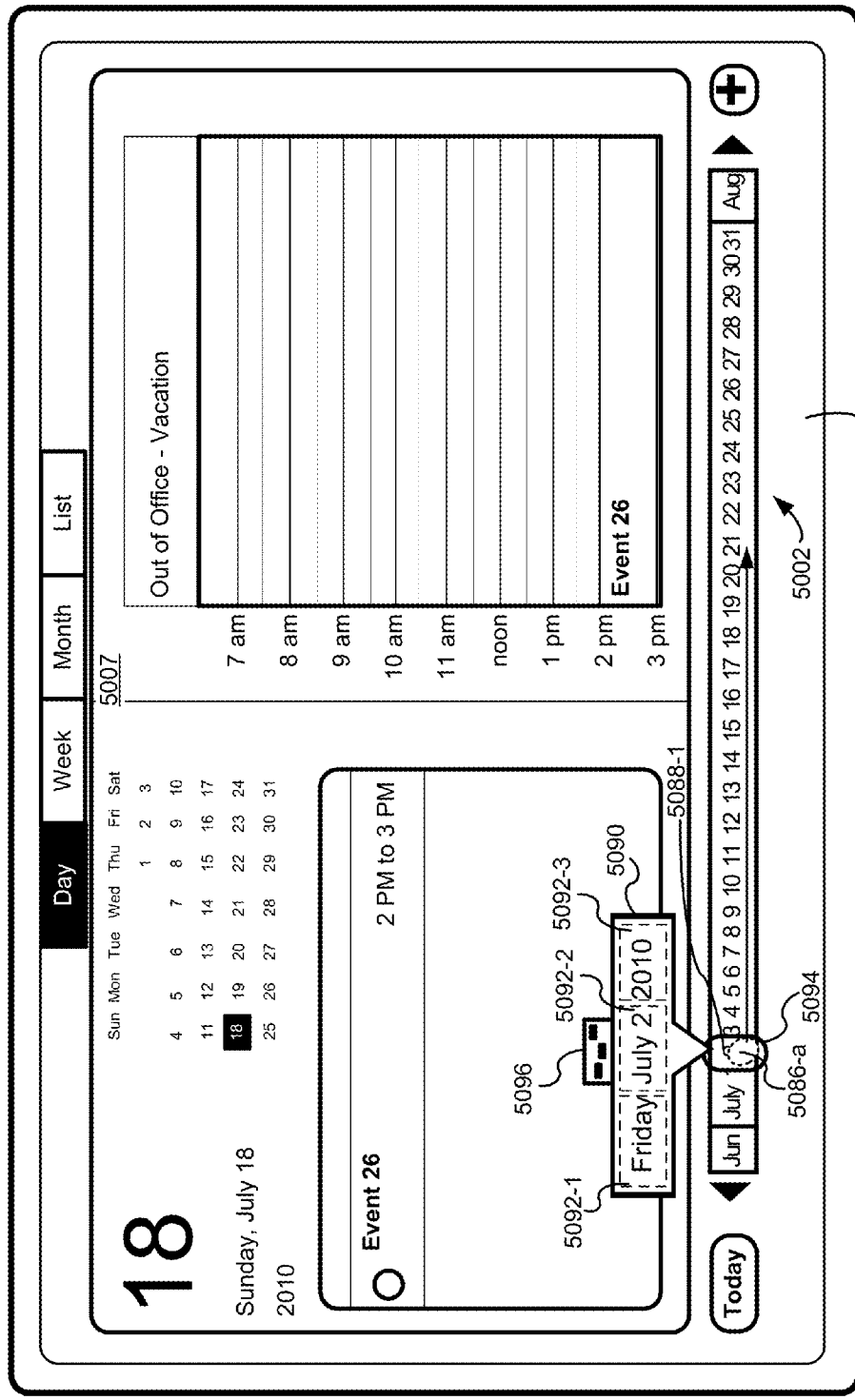

FIGS. 5L-5N illustrate exemplary user interfaces for initially displaying content (e.g., events associated with Nov. 10, 2009) associated with a value represented by a first subunit region in the first set of subunit regions and, in response to a user input at a location that corresponds to a subsequent unit region (e.g., tap gesture 5060 in FIG. 5L at a location on the touch screen 112 that corresponds to subsequent unit region 5004-3), navigating from the first value (e.g., Nov. 10, 2009) to a second value (e.g., Dec. 1, 2009) that is outside of the range of values represented by the first set of subunit regions. The second value is associated with a subunit region of a third set of subunit regions (e.g., 5062 in FIGS. 5M-5N) that is associated with the subsequent unit region (e.g., December 5004-3 in FIG. 5L), and after navigating to the second value outside of the range of values that is associated with the first set of subunit regions, displaying content associated with the second value (e.g., events associated with Dec. 1, 2009), as illustrated in FIG. 5N. FIG. 5M shows an exemplary user interface illustrating a transition animation between displaying the content associated with the first value and displaying the content associated with the second value, where the first set of subunit regions 5006 slide off the screen to the left while the third set of subunit regions 5062 slide onto the screen from the right.

FIGS. 5O-5R illustrate exemplary user interfaces for navigating through a primary range of values (e.g., the days in November 2009) in response to detecting a multipart gesture (e.g., movement of contact 5068 from a first location 5068-*a* to a second location 5068-*b* to a third location 5068-*c* to a fourth location 5068-*d*) along a navigation bar 5002 having a primary axis 5066 with a minimum endpoint and a maximum endpoint. Note that while the primary axis 5066 with the minimum endpoint and the maximum endpoint is shown in some figures, the primary axis 5066 with the minimum endpoint and the maximum endpoint is not displayed on display 112. In addition, for clarity, the primary axis 5066 with the minimum endpoint and the maximum endpoint is shown in the figures adjacent to the navigation bar, rather than overlaid on the navigation bar (e.g., 5002). It will also be understood that, as used herein, a multipart gesture is a gesture that includes a plurality of separately detectable parts.

In response to detecting the multipart gesture, when the location of the contact corresponds to a location on the display that is between the endpoints of the primary axis 5066 the device selects a value within the primary range of values that corresponds to location on the display that corresponds to the current location of the contact (e.g., when the current location of the contact 5068-*b* (FIG. 5P) corresponds to a subunit region that represents Nov. 19, 2009, the device selects Nov. 19, 2009.) In response to detecting the multipart gesture, when the location of the contact corresponds to a region of the display (e.g. region 5070 in FIG. 5Q) that is proximate to one of the endpoints of the primary axis 5066, the device selects a value outside of the primary range of values based on the movement of the contact (e.g., when movement of the contact is detected to 5068-*d* (FIG. 5R), the device selects Dec. 11, 2009).

FIG. 5S illustrates an exemplary user interface for navigating to a value outside of the primary range of values represented by the navigation bar 5002 when the multipart gesture includes a contact at a location that corresponds to the region of the display (e.g., 5070) that is proximate to an endpoint of a primary axis 5066 of the navigation bar 5002. The rate at which the values are navigated through is determined based on a current zone (e.g., 5074-2) on the display that corresponds to the current location of the contact (e.g., 5068-*e*) on the touch-sensitive surface.

FIGS. 5T-5W illustrate exemplary user interfaces for navigating to a value outside of the primary range of values represented by the navigation bar 5002 when the multipart gesture includes a contact (e.g., 5068-*f* in FIG. 5T) at a location that corresponds to the region of the display (e.g., 5070) that is proximate to an endpoint of a primary axis 5066 of the navigation bar 5002. The values are navigated through at an initial rate. In response to movement of the contact, an updated rate at which the values are navigated through is determined based on a movement of a contact from a paused location (e.g., 5068-*f* in FIG. 5T) to an updated location (e.g., 5068-*g* in FIG. 5U, 5068-*h* in FIG. 5V or 5068-*i* in FIG. 5W). For example, in FIG. 5U, the device detects movement of the contact to an updated location (e.g., 5068-*g*) that corresponds to a location on the display that is outside of the endpoints of the primary axis 5066, and thus the device advances through the range of values at a rate that is faster than the initial rate. As another example, in FIG. 5V, the device detects movement of the contact to an updated location (e.g., 5068-*h*) that corresponds to a location on the display that is within of the endpoints of the primary axis 5066, and thus the device advances through the range of values at a rate that is slower than the initial rate. As another example, in FIG. 5W, the device detects movement of the contact to an updated location (e.g., 5068-*i*) that corresponds to a location on the display that is within of the endpoints of the primary axis 5066, and thus the device advances through the range of values in accordance with the location on the display that corresponds to the location of the contact on the touch-sensitive surface (e.g., the device ceases to navigate through values at the initial rate and switches to navigating through values within the range of values associated with the navigation bar 5002).

FIGS. 5X-5AA illustrate exemplary user interfaces for loading content associated with the currently selected subunit in the content area 5007 in the display in response to detecting an end of the multipart gesture (e.g., movement of contact 5068 in FIGS. 5T-5W that ends with Dec. 11, 2009 as the currently selected subunit in FIG. 5X). FIGS. 5X-5AA also illustrate an animation of calendar pages flipping that includes displaying, in the content area 5007, interstitial content that is associated with interstitial subunits (e.g., subunits that are between the respective subunit such as Nov. 10, 2009 that is associated with the content that was previously displayed in the content area and the currently selected subunit such as Dec. 11, 2009). For example, in FIG. 5X, the calendar page for Nov. 27, 2009 is shown flipping over the calendar page for Nov. 10, 2009. Likewise in FIG. 5Y, the calendar page for Dec. 5, 2009 is shown flipping over the calendar page for Nov. 27, 2009. Similarly in FIG. 5Z, the calendar page for Dec. 11, 2009 is shown flipping over the calendar page for Dec. 5, 2009, and the calendar page for Dec. 11, 2009 is fully displayed in FIG. 5AA.

FIGS. 5BB-5CC illustrate exemplary user interfaces for navigating to a value outside of the primary range of values represented by the navigation bar when the multipart gesture includes contact at a location that corresponds to a region of the display (e.g., region 5072) that is proximate to an endpoint of a primary axis of the navigation bar. The values are navigated through at an initial rate. In response to movement of the contact, an updated rate at which the values are navigated through is determined based on a movement of a contact from a paused location (e.g., 5076-*a* in FIG. 5BB) to an updated location (e.g., 5076-*b* in FIG. 5CC). In the examples above, the initiation location for the gesture corresponded to a location on the display within a subunit region, and therefore the device navigated through the values in increments that were equal to the size of the subunits (e.g. days). However, in FIG. 5BB the initiation location for the gesture (e.g., paused location 5076-*a*) corresponds to a location on the display within a unit region, and as a result, the device navigates through the values in increments that are equal to the size of the units (e.g., months).

FIGS. 5DD-5EE illustrate exemplary user interfaces for advancing through content using an advancement icon (e.g., 5008-1 in FIG. 5DD) in response to detecting a tap gesture (e.g., 5078 in FIG. 5DD) on the advancement icon (e.g., 5008-1 in FIG. 5DD), and replacing the displayed content that is associated with the currently selected subunit (e.g., events occurring on Oct. 31, 2009, as illustrated in FIG. 5DD) with content associated with the an adjacent subunit (e.g., events associated with Oct. 30, 2009, as illustrated in FIG. 5EE).

FIGS. 5FF-5II illustrate exemplary user interfaces for navigating through a range of values with a navigation bar 5002 that has a focus region 5082, where the focus region is moved from an initial location (e.g., 5082 in FIG. 5FF) to an updated location (e.g., 5082 in FIGS. 5GG-5HH), and the currently selected value (e.g., "Dec 20-26" 5080-2 in FIG. 5II) is displayed within the updated focus region (e.g., 5082 in FIG. 5II). FIGS. 5GG-5HH illustrate an animation of the subunit regions (e.g., 5080) of the navigation bar shifting so as to display the currently selected subunit region (e.g., 5080-2) within the focus region 5082 of the navigation bar 5002. In FIGS. 5GG-5II the updated focus region 5082 is in a center of the navigation bar 5002 when the currently selected subunit region 5080-2 includes a current date/time.

FIGS. 5FF and 5JJ-5KK illustrate exemplary user interfaces for navigating through a range of values with a navigation bar 5002 that has a focus region 5082, where the focus region is moved from an initial location (e.g., 5082 in FIG. 5FF) to an updated location (e.g., 5082 in FIGS. 5JJ-5KK), and the currently selected value (e.g., 5080-2 in FIG. 5KK) is displayed within the updated focus region (e.g., 5082 in FIG. 5KK). FIGS. 5JJ-5KK illustrate an animation of the subunit regions (e.g., 5080) of the navigation bar shifting so as to display the currently selected subunit region (e.g., 5080-2) into the focus region of the navigation bar 5002. In FIGS. 5JJ-5KK the updated focus region 5082 is in offset from the center of the navigation bar 5002 when the currently selected subunit region 5080-2 includes a current date/time.

FIGS. 5FF and 5LL illustrate exemplary user interfaces for navigating through a range of values with a navigation bar 5002 that has a focus region 5082, where the focus region is moved from an initial location (e.g., 5082 in FIG. 5FF) to an updated location (e.g., 5082 in FIG. 5LL), and the currently selected value (e.g., "July 11-17" 5080-3 in FIG. 5LL) is displayed within the updated focus region (e.g., 5082 in FIG. 5LL). In FIG. 5LL the updated focus region is offset from the center of the navigation bar when the currently selected date/time includes a date/time that is more than a predefined amount of time in the past.

FIGS. 5FF and 5MM illustrate exemplary user interfaces for navigating through a range of values with a navigation bar 5002 that has a focus region 5082, where the focus region is moved from an initial location (e.g., 5082 in FIG. 5FF) to an updated location (e.g., 5082-*a* in FIG. 5MM), and the currently selected value (e.g., 5080-4 in FIG. 5MM) is displayed within the updated focus region (e.g., 5082-*a* in FIG. 5MM). In FIG. 5MM the updated focus region is offset from the center of the navigation bar when the currently selected date/time includes a date/time that is more than a predefined amount of time in the future. Additionally, FIG. 5MM illustrates alternative locations for the focus region (e.g., 5082-*b* and 5082-*c*) based on activity levels in time periods proximate to the currently selected subunit of time.

Figure 5P:
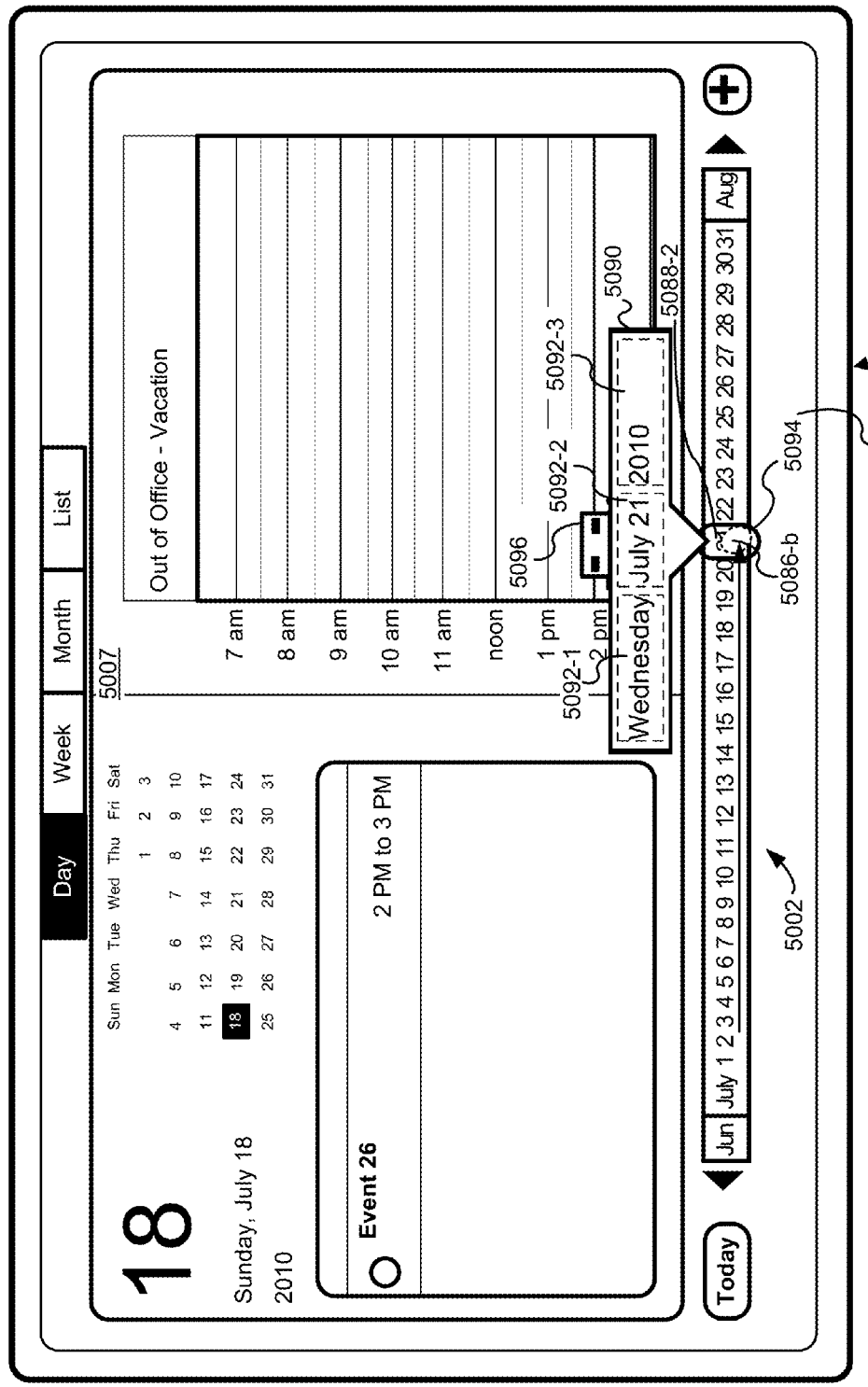
Figure 5Q:
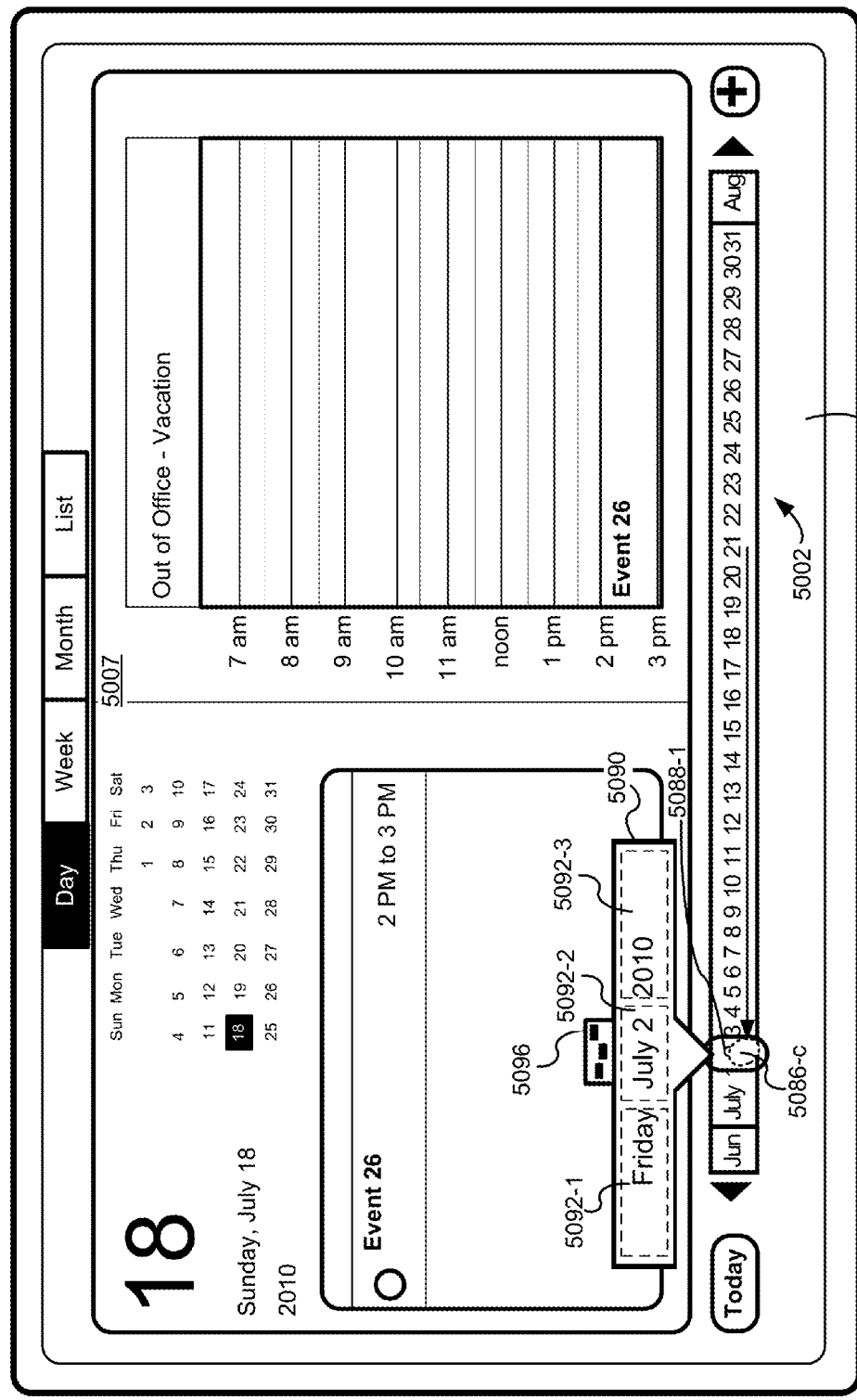
Figure 5R:
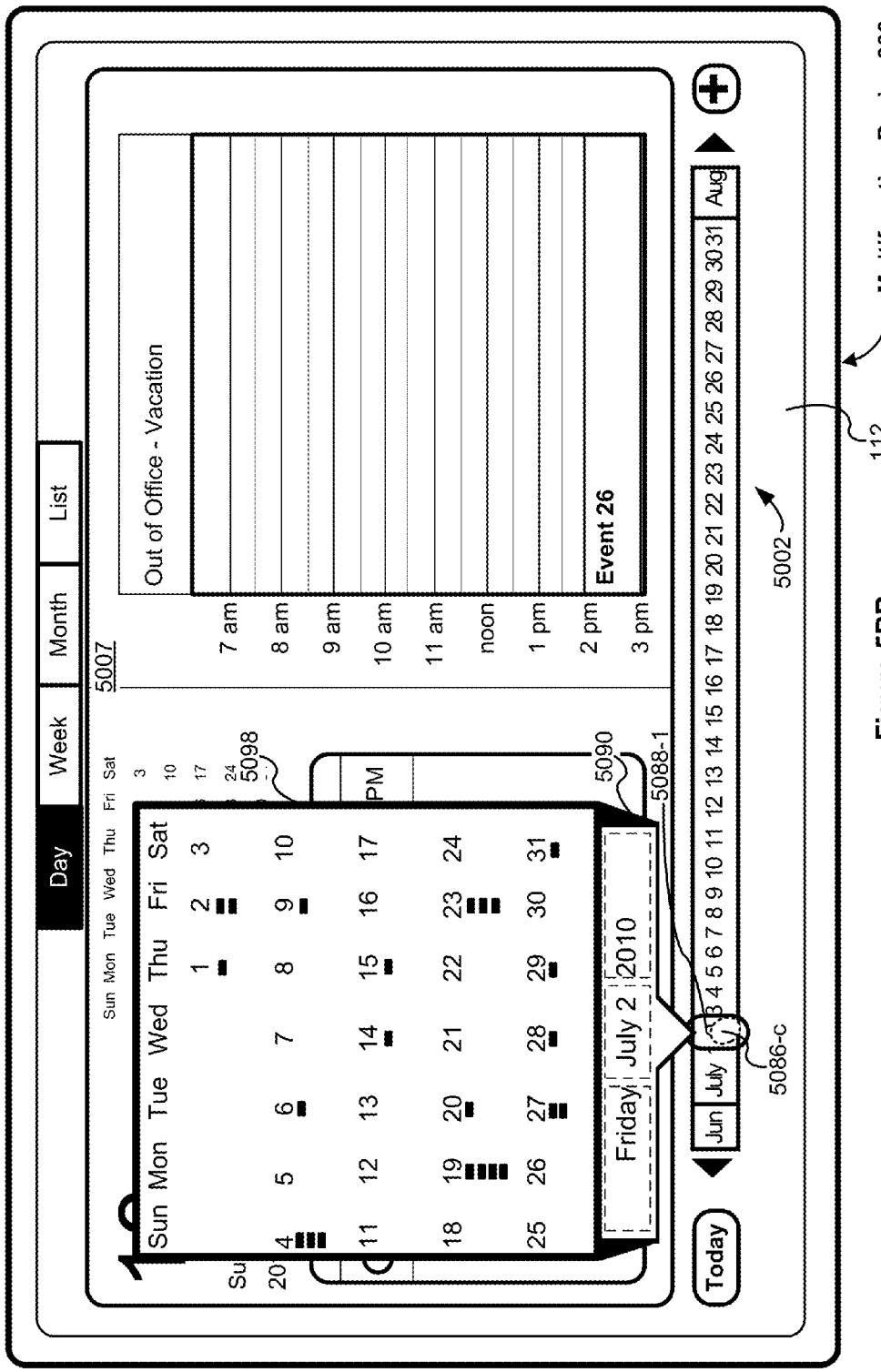
Figure 5T:
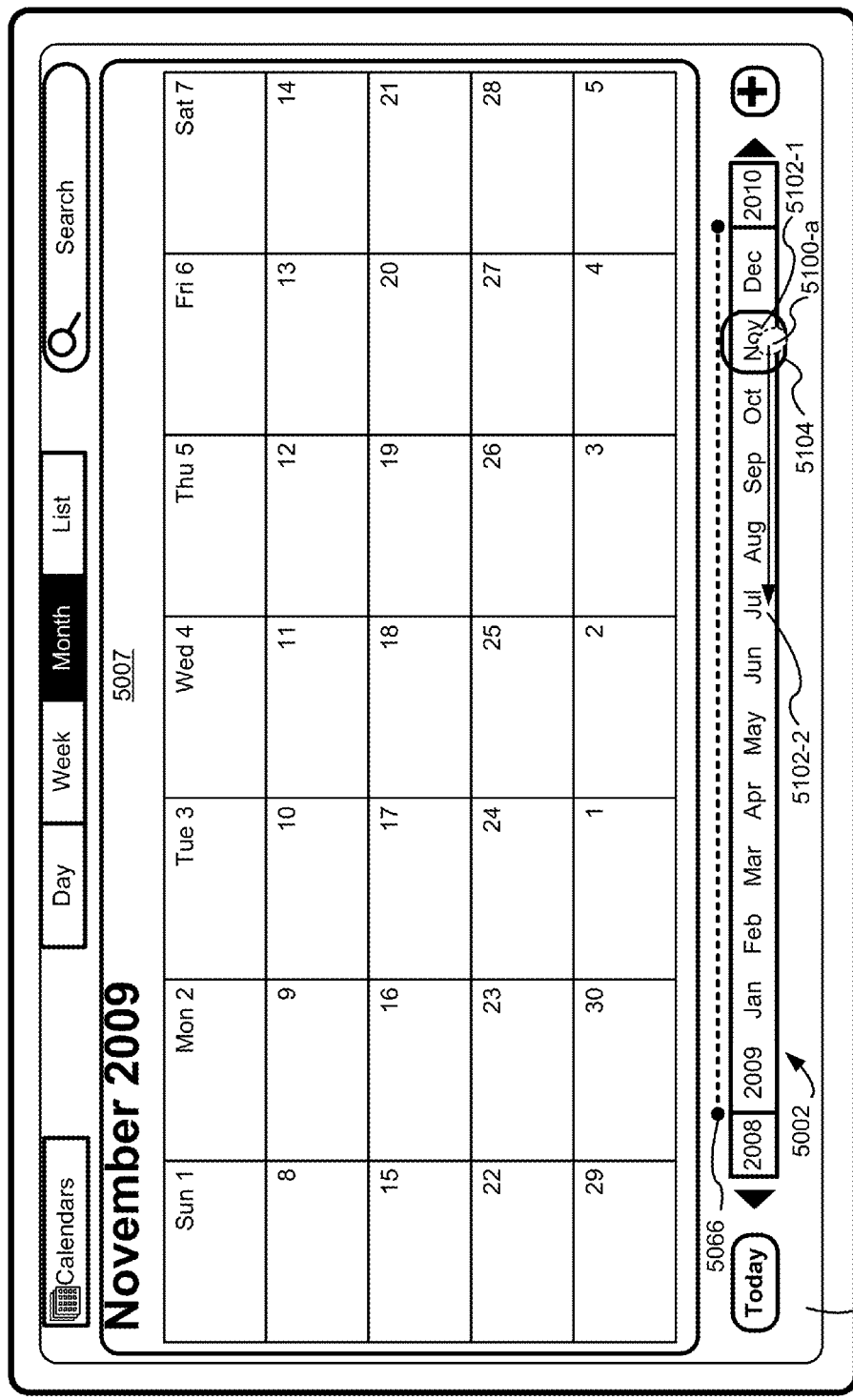

FIGS. 5NN-5SS illustrate exemplary user interface for displaying a callout (e.g., 5090 in FIGS. 5OO-5RR) while navigating through a range of values, where the callout includes text (e.g., Friday, Jul. 2, 2010 in FIG. 5OO) that is indicative of a currently selected value of the range of values, and the callout includes three regions, each of the regions including a part of the text. As illustrated in FIG. 5OO, callout 5090 is displayed in response to detecting an input (e.g., contact 5086-*a* in FIG. 5OO) at a location on the touch screen 112 that corresponds to a region (e.g., 5092-1, 5092-2 and 5092-3 in FIG. 5OO) on a navigation bar (e.g., 5002) that is associated with the value. When the device detects a continuous multipart gesture that includes the initial contact (e.g., movement of the contact 5086 along the touch-sensitive surface from a location 5086-*a* that corresponds to a location of the first value on the display to a location 5086-*b* that corresponds to a location of a second value on the display, as illustrated in FIG. 5PP), the device replaces the text that is indicative of the first value (e.g., Friday, Jul. 2, 2010 in FIG. 5OO) with updated text (e.g., Wednesday, Jul. 21, 2010 in FIG. 5PP) that is indicative of the second value, and adjusts the size of the regions (e.g., 5092-1, 5092-2 and 5092-3 in FIG. 5PP) in callout 5090 to fit the part of the updated text that is in a respective region (e.g., as illustrated in FIG. 5PP). Additionally, in these embodiments, when the device adjust the size of the regions 5092, the regions are adjusted to the larger of their current size or the size required to fit the new text, as illustrated in FIG. 5QQ. In some embodiments, the location of the callout on the display does not move with contact 5086 and/or is not displayed adjacent to the navigation bar 5002. For example, in some embodiments, callout 5090 is displayed in a fixed, central region of the display as contact 5086 moves over the navigation bar (not shown). It will be understood that, for touch gestures, "continuous" refers to the requirement that contact is maintained with the touch-sensitive surface throughout the continuous multipart gesture. A continuous multipart gesture may include pauses in movement of the contact and/or changes in the direction of movement of the contact, but the continuous multipart gesture ends when lift off of the contact is detected. Similarly, for mouse-based gestures, a "continuous" multipart gesture refers to the mouse movements and/or pauses detected between detecting a mouse-down event and the next mouse-up event.

FIG. 5RR illustrates an exemplary user interface for, in response to continuing to detect an input for a predetermined period of time at a location that corresponds to a value in the range of values (e.g., continuing to detect contact 5086-c for a predetermined period of time), displaying an expanded representation (e.g., the expanded portion 5098 of the callout 5090 in FIG. 5RR) that includes a graphical representation of activity levels for a period of time (e.g., the month of July 2010) that is associated with the currently selected value (e.g., Jul. 2, 2010). FIG. 5SS illustrates, in response to detecting an end of the continuous multipart gesture (e.g., ceasing to detect contact 5086 on the touch-sensitive surface), ceasing to display the callout on the display and displaying content associated with the currently selected value (e.g., Jul. 2, 2010) in the content area 5007 of the display.

FIGS. 5TT-5UU illustrate exemplary user interfaces for navigating through a first range of values (e.g., the months in 2009) in response to detecting a continuous multipart gesture (e.g., movement of a contact 5100 along the touch-sensitive surface from a location 5100-a that corresponds to a location of the first value on the display to a location 5100-b that corresponds to a location of a second value on the display, as illustrated in FIG. 5UU) along a first navigation bar (e.g., 5002 in FIGS. 5TT-5UU).

Figure 5W:
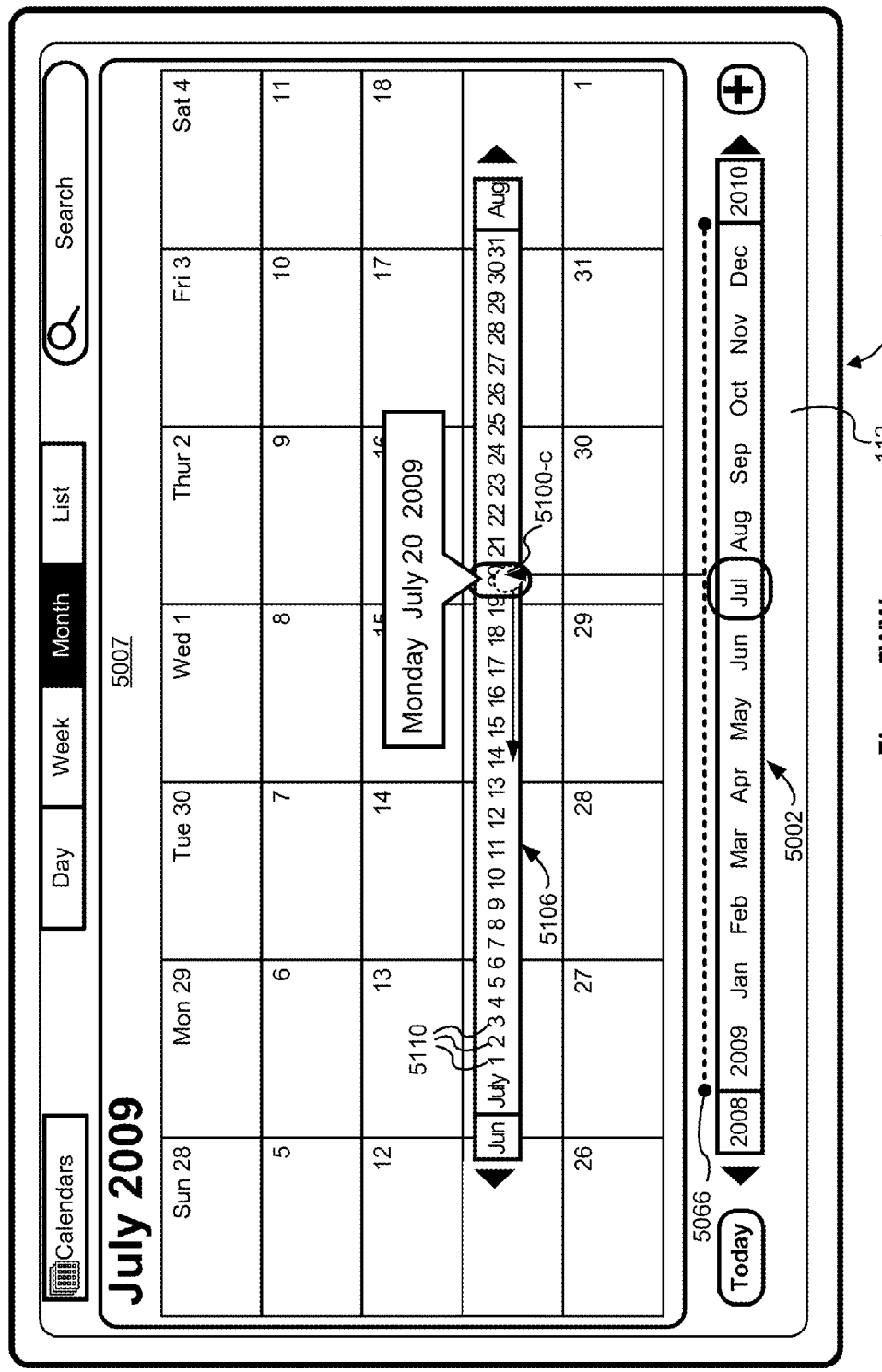
Figure 5Y:
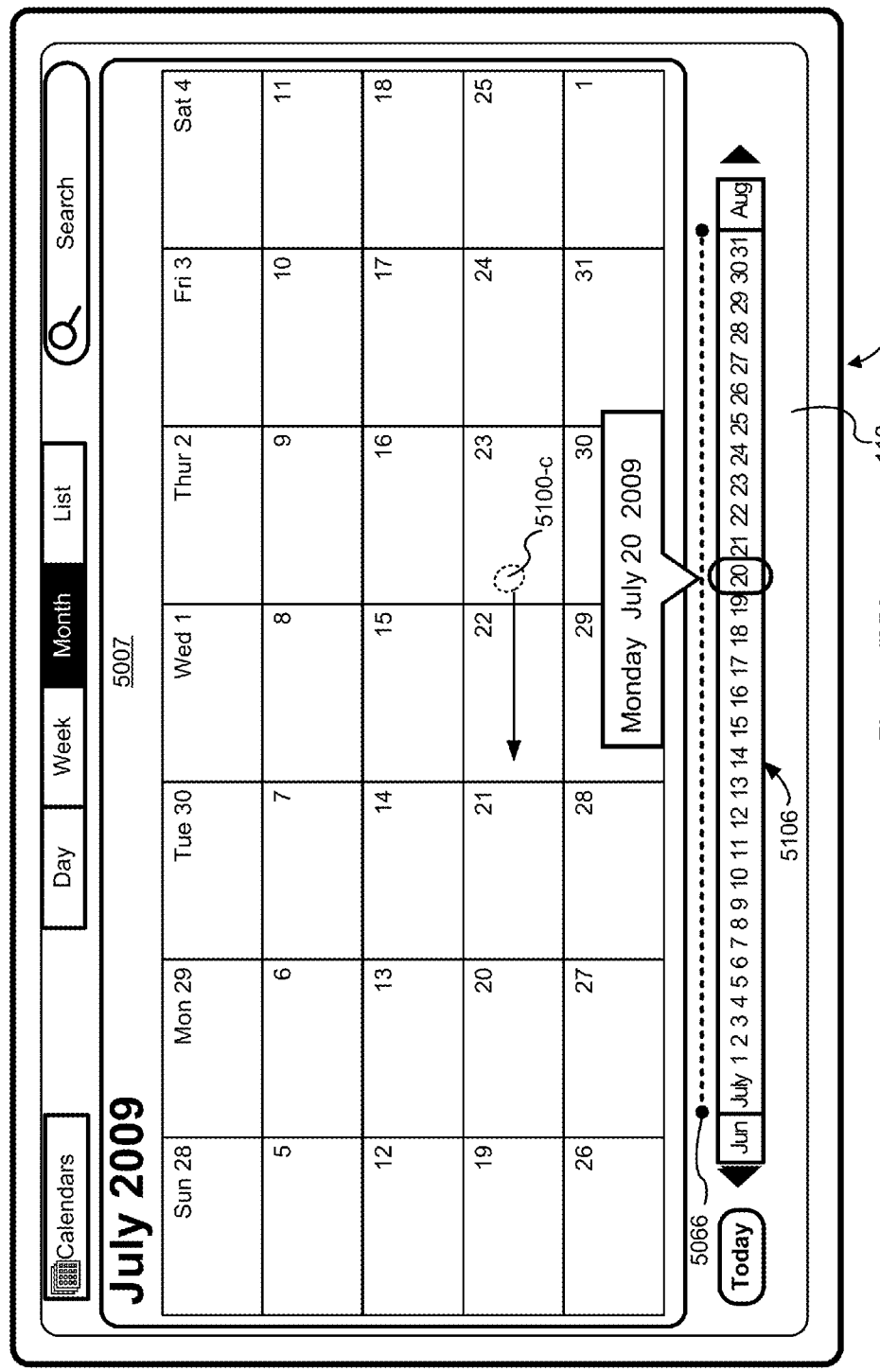
Figure 5Z:
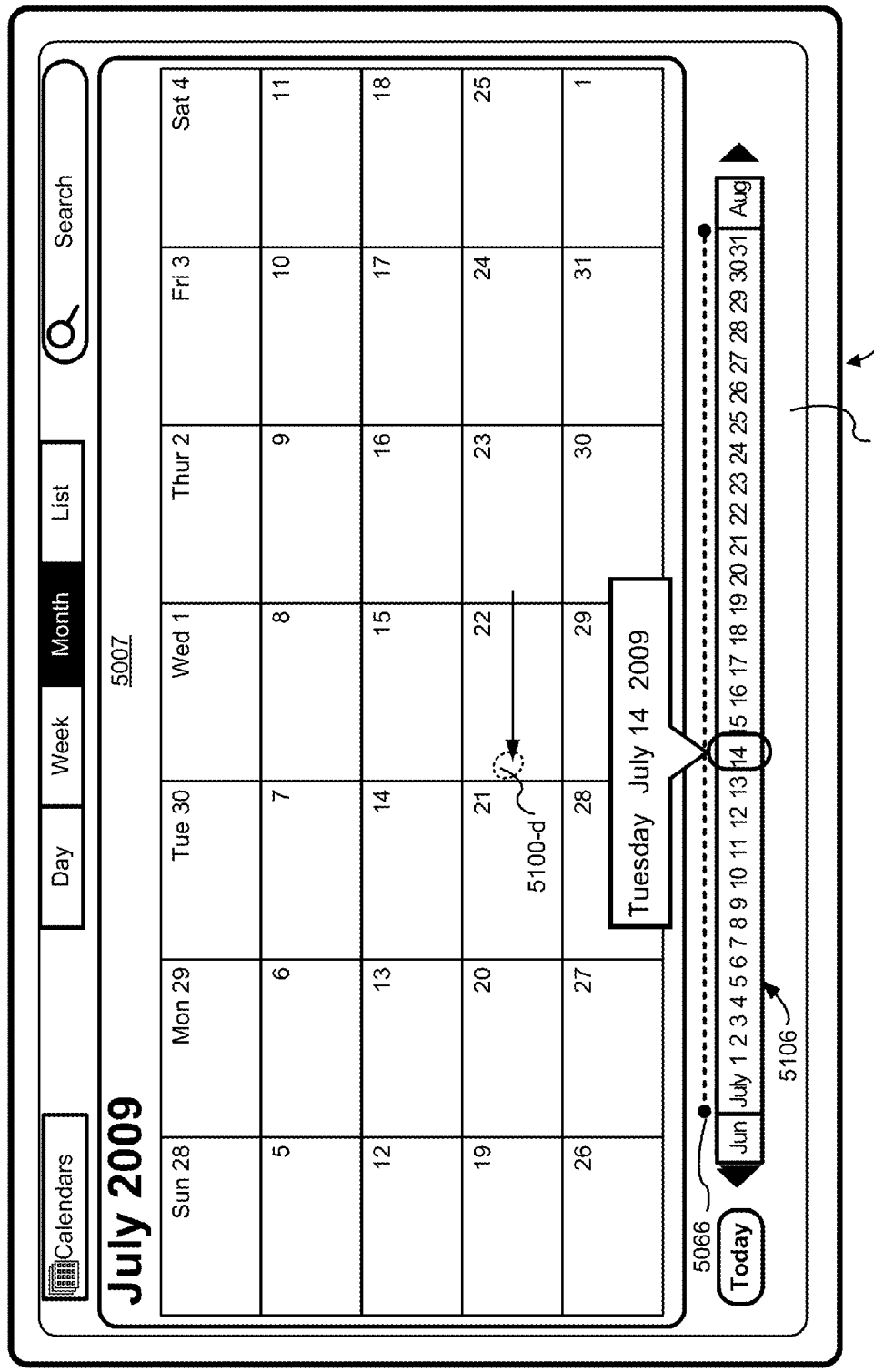
Figure 6A:
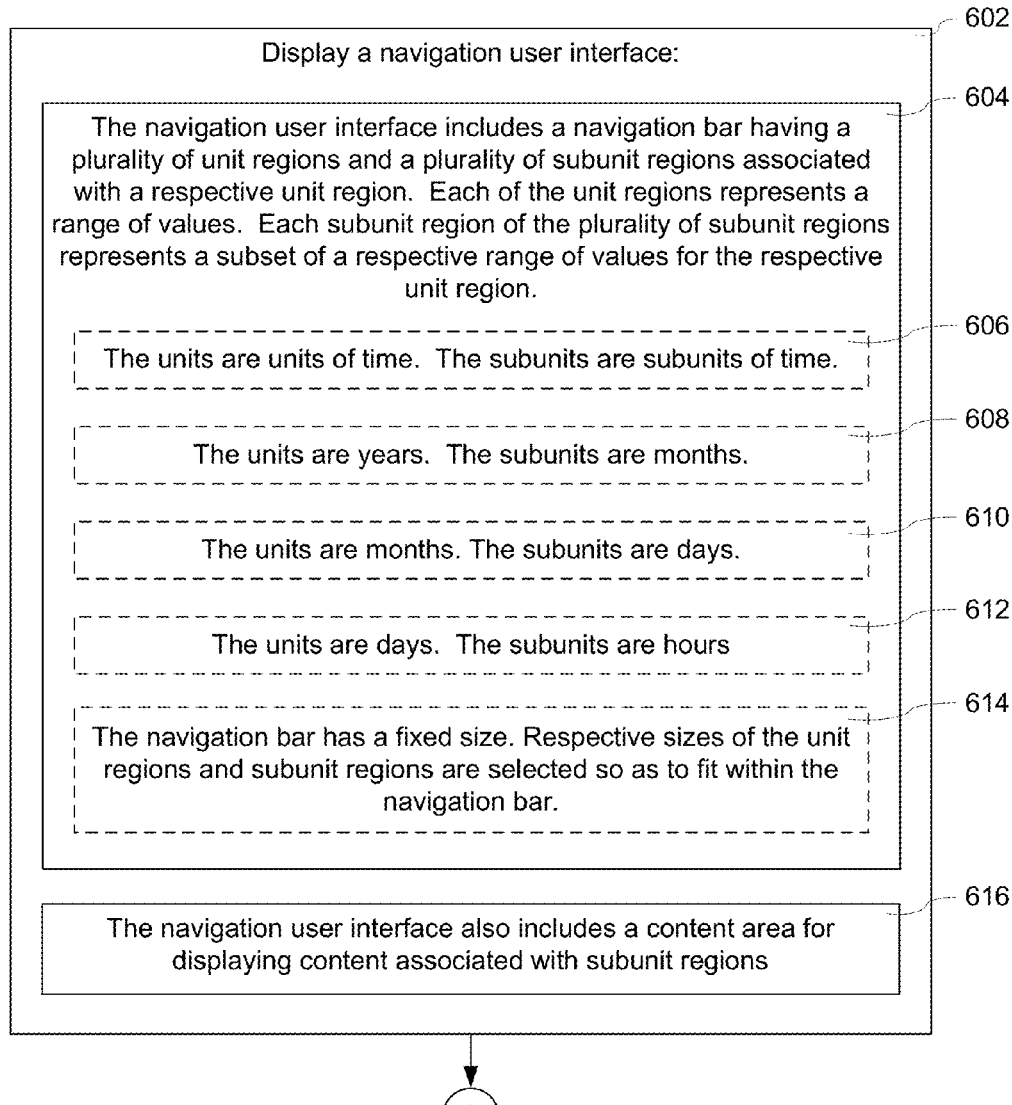
FIGS. 6A-6D are flow diagrams illustrating a method of navigating through a range of values using a navigation bar that includes unit regions and subunit regions in accordance with some embodiments.
Figure 6B:
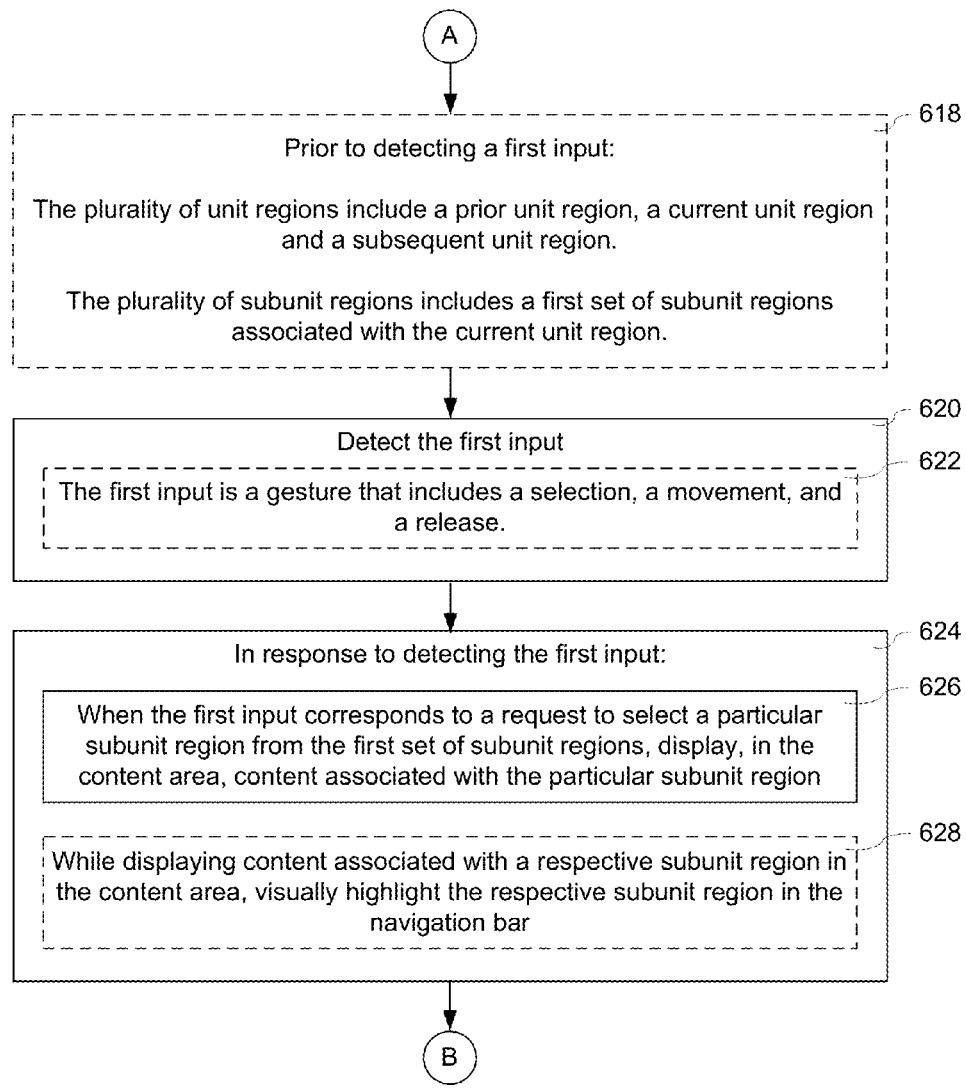
Figure 6C:
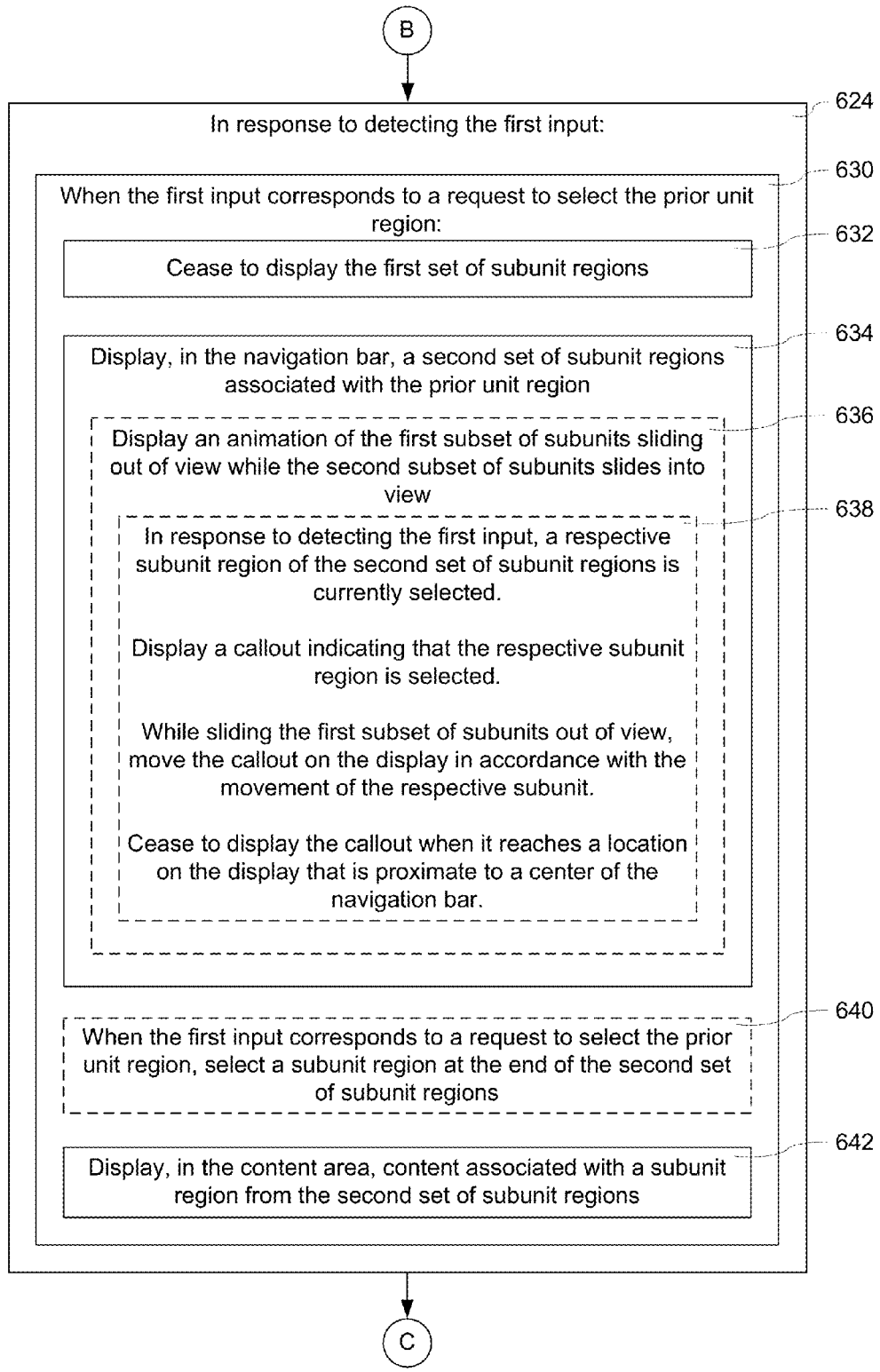
Figure 6D:
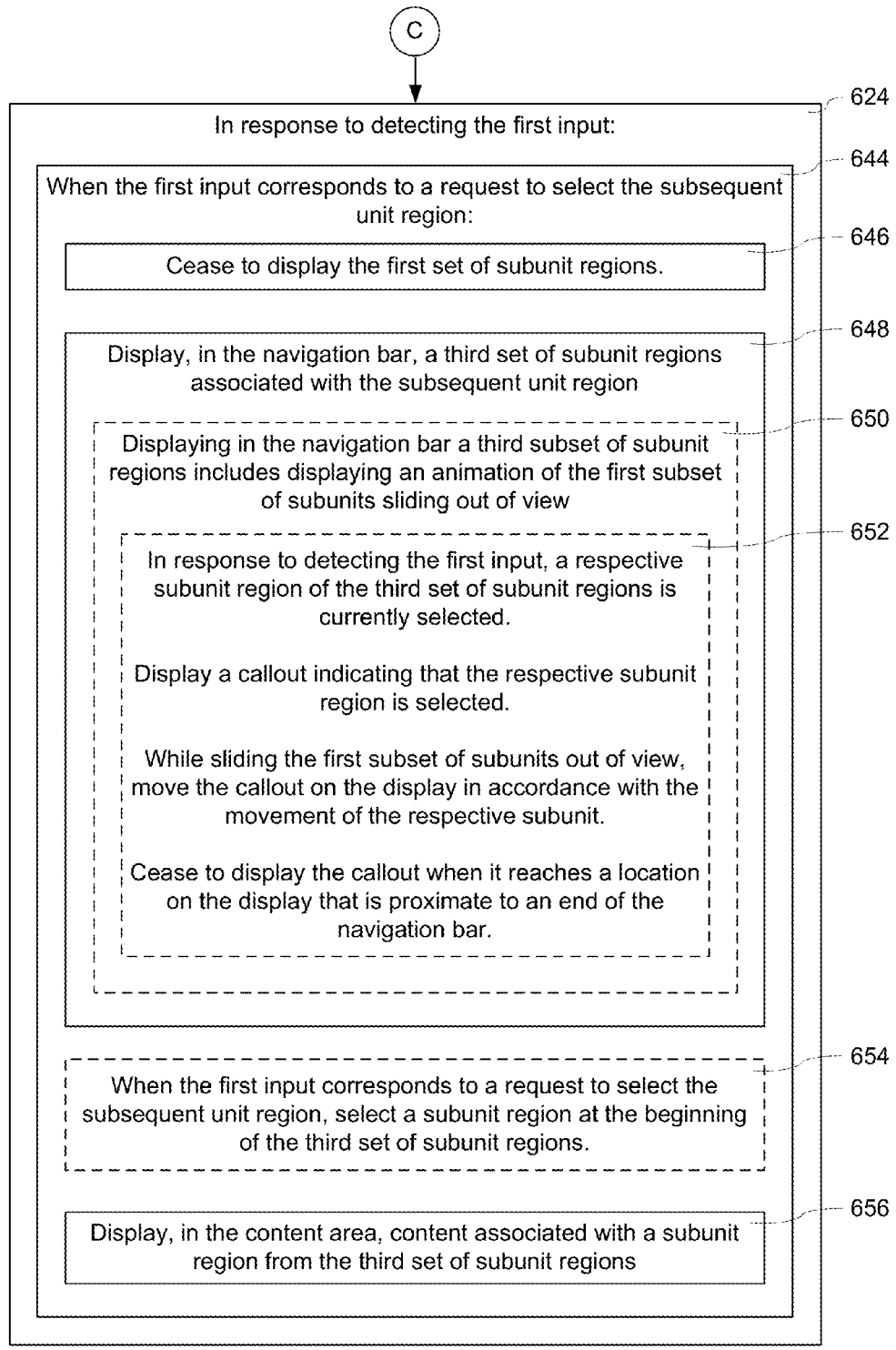

FIGS. 5VV-5XX illustrate exemplary user interfaces for, in response to detecting a part of the gesture that includes movement away from the navigation bar (e.g., movement of a contact 5100 along the touch-sensitive surface from a location 5100-b that corresponds to a location of the second value on the display to a location 5100-c that corresponds to a location on the display that is away from the first navigation bar, as illustrated in FIGS. 5VV-5XX) the device displays a second navigation bar (e.g., 5106 in FIGS. 5WW-5XX) that has a scale that is distinct from a scale of the first navigation bar (e.g., 5002 in FIGS. 5WW-5XX). In response to detecting a continuation of the continuous multipart gesture that includes movement along the second navigation bar (e.g., movement of a contact 5100 along the touch-sensitive surface from a location 5100-c that corresponds to a location that is away from the first navigation bar to a location 5100-d that corresponds to a location along the second navigation bar, as illustrated in FIG. 5XX), the device navigates through a second range of values (e.g., the days in July 2009) that is associated with the second navigation bar (e.g., 5106 in FIGS. 5WW-5XX).

FIGS. 5VV and 5YY-5ZZ illustrate exemplary user interfaces for, in response to detecting a part of the gesture that includes movement away from the navigation bar (e.g., movement of a contact 5100 along the touch-sensitive surface from a location 5100-b (FIG. 5VV) that corresponds to a location of the second value on the display to a location 5100-c (FIG. 5YY) that corresponds to a location on the display that is away from the first navigation bar), the device replaces the first navigation bar (e.g., 5002 in FIG. 5VV) with a second navigation bar (e.g., 5106 in FIGS. 5YY and 5ZZ) that has a scale that is distinct from a scale of the first navigation bar (e.g., 5002 in FIG. 5VV). In response to detecting a continuation of the continuous multipart gesture (e.g., movement of a contact 5100 along the touch-sensitive surface from location 5100-c (FIG. 5YY) to location 5100-d (FIG. 5ZZ), the device navigates through a second range of values (e.g., the days in July 2009) that is associated with the second navigation bar (e.g., 5106 in FIGS. 5YY and 5ZZ).

FIGS. 5AAA-5CCC illustrate exemplary user interfaces for, in response to detecting a part of the gesture that includes movement away from the navigation bar (e.g., movement of a contact 5100 along the touch-sensitive surface from a location 5100-b (FIG. 5AAA) to a location 5100-e (FIG. 5BBB) that corresponds to a location on the display that is away from the first navigation bar 5002), the device displays a second navigation bar (e.g., 5112 in FIGS. 5BBB-5CCC) that has a scale that is distinct from a scale of the first navigation bar (e.g., 5002 in FIG. 5AAA). In response to detecting a continuation of the continuous multipart gesture that includes movement along the second navigation bar (e.g., movement of a contact 5100 along the touch-sensitive surface from a location 5100-e that corresponds to a location that is away from the first navigation bar to a location 5100-f that corresponds to a location along the second navigation bar, as illustrated in FIGS. 5BBB-5CCC), the device navigates through a second range of values (e.g., the years between 2000 and 2013) that is associated with the second navigation bar (e.g., 5112 in FIGS. 5BBB-5CCC).

FIGS. 6A-6D are flow diagrams illustrating a method 600 of navigating through a range of values using a navigation bar that includes unit regions and subunit regions in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to navigate through a range of values. The method reduces the cognitive burden on a user when navigating through a range of values, thereby creating a more efficient human-machine interface. For battery-operated computing devices, enabling a user to navigate through ranges of values faster and more efficiently conserves power and increases the time between battery charges.

The device displays (602) a navigation user interface. The navigation user interface includes (604) a navigation bar (e.g., navigation bar 5002 in FIGS. 5D-5N) having a plurality of unit regions (e.g., 5004 in FIG. 5D) and a plurality of subunit regions (e.g., 5006 in FIG. 5D) associated with a respective unit region. Each of the unit regions represents a range of values (e.g., the "Oct" unit region 5004-1 represents the month of October, 2009, which includes 31 days, while the "Nov" unit region 5004-2 represents the month of November 2009 which includes 30 days, and the "Dec" unit region 5004-3 represents the month of December 2009 which includes 31 days). Each subunit region 5006 of the plurality of subunit regions represents a subset of a respective range of values for the respective unit region (e.g., in FIG. 5D, the "1" subunit represents the first day of November, 2009, while the "2" subunit represents the second day of November, 2009, etc.).

In some embodiments, the units are (606) units of time and the subunits are subunits of time (e.g., as illustrated in FIG. 5D). In some embodiments, the units are (608) years and the subunits are months. In some embodiments, the units are (610) months and the subunits are days (e.g., as illustrated in FIG. 5D). In some embodiments, the units are (612) days and the subunits are hours. While the examples given herein will be described primarily with respect to units and subunits of time, it will be understood that the methods described herein may be applied in an analogous manner to any set of values that can be divided into units that include multiple subunits (e.g., measures of distance, weight, file size, temperature, etc.). It will also be understood that the methods described herein may be applied in an analogous manner to data sets that can be divided into categories that include multiple sub-categories of ordered items (e.g., products, services, articles, content, and the like, which may be ordered by part number, a ranking metric, chronologically, alphabetically, etc.).

In some embodiments, the navigation bar 5002 has (614) a fixed size, and respective sizes of the unit regions and subunit regions are selected so as to fit within the navigation bar 5002. In some embodiments, the first set of subunit regions (e.g., the days in November) consists of a first number of subunit regions (e.g., 30 days) and the second and/or third sets of subunit regions (e.g., the days in October and the days in December, respectively) consist of a number of subunit regions that are different from the first number of subunits (e.g., 31 days). In other words, while November has 30 days and December has 31 days, the size of the navigation bar is fixed. Thus, when the thirty subunits for November are displayed, they take up the same amount of room as the thirty one subunits for December. Therefore, in these embodiments, the subunit regions in the first set of subunit regions (e.g., the subunit regions for days in November) are larger than the subunit regions in the second set of subunit regions (e.g., the subunit regions for days in December).

The navigation user interface also includes (616) a content area (e.g., 5007 in FIGS. 5D-5N) for displaying content associated with subunit regions (e.g., 5006 in FIGS. 5D-5I). For example, in FIG. 5D, the currently selected subunit region 5006-1 corresponds to Nov. 23, 2009, and the content area 5007 (e.g., the area above the navigation bar) displays a representation of events that occur on Nov. 23, 2009, and other information regarding that day. For example, in FIG. 5D, the device displays a "day view" of Nov. 23, 2009, including: a mini-calendar 5040 that displays the location of the day within the month to which it belongs; a list view 5042 that includes a list of all of the events in associated with the selected day, which is scrollable in with some embodiments (e.g., when there are more events than will fit in the list view, a swipe gesture up or down along the list view will scroll the list view); and/or a timeline view 5044 that includes a virtual timeline with the events that are associated with the day. In some embodiments, the timeline view is scrollable.

Prior to detecting (618) a first input (e.g., in FIG. 5D), the plurality of unit regions include a prior unit region (e.g., 5004-1 in FIG. 5D), a current unit region (e.g., 5004-2 in FIG. 5D) and a subsequent unit region (e.g., 5004-3 in FIG. 5D), and the plurality of subunit regions include a first set of subunit regions (e.g., subunit regions 5006 in FIG. 5D) that are associated with the current unit region (e.g., 5004-2 in FIG. 5D). For example, in FIG. 5D, the current unit region 5004-2 includes a representation of the month associated with the currently selected day (e.g., November) and the prior unit region 5004-1 is a representation the month (e.g., October) that occurs immediately prior to the month associated with the currently selected day, while the subsequent unit region 5004-3 is a representation of the month (e.g., December) that occurs immediately after the month associated with the currently selected day. Also, in this example, the subunit regions 5006 are representations of at least a subset of the days associated with the month of the currently selected day (e.g., the days in November).

The device detects (620) the first input. In some embodiments, the first input is a gesture that includes a selection, a movement, and a release (622) (e.g., as described in greater detail below with reference to FIGS. 5E-5H below). In some embodiments, the first input is a gesture that includes a touch and release with no intervening movement. For example, if the device detects a tap gesture on a respective subunit region that is not associated with the currently displayed information in the content area, the device replaces the information in the content area 5007 with information that is associated with the respective subunit region. In some embodiments, the first input is a finger gesture or a stylus gesture on touch-sensitive surface such as a touch screen (e.g., 112 in FIGS. 5A-5N) or trackpad. In some embodiments, the first input is another kind of input gesture (e.g., an input received via a mouse). It will be understood that, while the examples herein are described primarily with reference to a contact on a touch screen, other methods of input can be used in an analogous manner to achieve similar results, as described above with reference to FIG. 4C.

Operations 626-656 are performed (624) in response to detecting the first input. When the first input corresponds to a request to select a particular subunit region from the first set of subunit regions, the device displays (626) in the content area content associated with the particular subunit region. For example, in FIG. 5E, the device detects a contact 5046-*a* at a location on the touch screen 112 that corresponds to a subunit region 5006-1 for Nov. 23, 2009. In response to detecting the contact (e.g., 5046-*a* in FIG. 5E), the device displays a callout (5048-*a*) that includes text that is representative of the range of values associated with the subunit region (e.g., "Monday, Nov. 23, 2009"). In some embodiments, the device subsequently detects movement (e.g., 5050 in FIG. 5F) of the contact to a new location (e.g., 5046-*b* in FIG. 5G) on the touch screen display 112 that corresponds to movement to location that corresponds to another subunit region (e.g., 5006-2 in FIG. 5G) within the first set of subunit regions that is associated with a different value (e.g., Nov. 15, 2009) in the range of values.

In some embodiments, both the information displayed in the callout (e.g., 5048 in FIGS. 5E-5G) and the content displayed in the content area 5007 are updated by the device as the contact moves across the navigation bar 5002. In some embodiments, while the contact 5046 is moving across the navigation bar 5002, the device updates the callout to display information about the subunit that is associated with the current location of the contact on the touch-sensitive surface, but does not update the content in the content area 5007 immediately. In these embodiments, the content displayed in the content area 5007 is updated (e.g., to display information for Sunday Nov. 15, 2009, as illustrated in FIG. 5H) only when the device detects an end of the first input (e.g., the device ceases to detect contact 5046, as illustrated in FIG. 5H). It will be understood that updating the information that is displayed content area only when the device detects an end of the first input is advantageous in situations where the device incurs significant processing and/or data transfer/storage costs when fetching, rendering and displaying information in the content area, because it reduces the quantity of data that is displayed on the device. In such situations, reducing the quantity of data that must be transferred and subsequently processed increases the responsiveness and efficiency of the device, thereby improving battery life and ease-of-use of the device.

In some embodiments, the first input is a tap gesture on a respective subunit region of the first set of subunit regions, and in response to the first input, the device displays content associated with the respective subunit region in the content area content associated with the particular subunit region. For example, in FIG. 5H, the device detects a tap gesture 5052 with the subunit region for Nov. 10, 2009, and in response, the device ceases to display the content associated with Nov. 15, 2009 and displays content associated with Nov. 10, 2009 in the content area 5007 on the display, as illustrated in FIG. 5I.

In some embodiments, while displaying content associated with a respective subunit region in the content area, the device visually highlights (628) the respective subunit region in the navigation bar. In some embodiments, the respective (e.g., currently selected) subunit region (e.g., 5006-2 in FIG. 5H) is highlighted by displaying an emphasis ring (e.g., 5054 in FIG. 5H). However, it will be understood that the visual highlighting could include one or more of adjusting the color, saturation, brightness, contrast, color, hue, size or other characteristic of the subunit region. Additionally, it will be understood that in some embodiments the subunit region that is associated with the currently displayed content in the content area is highlighted (e.g., the highlighting shows the user the location of the subunit region for the currently displayed subunit region), without regard for the currently selected subunit region (e.g., the subunit region that is associated with the current location of the contact on the touch screen display 112).

When the first input (e.g., tap gesture 5056 in FIG. 5I) corresponds (630) to a request to select the prior unit region (e.g., 5004-1 in FIG. 5I), the device ceases (632) to display the set plurality of subunit regions (e.g., 5006 in FIG. 5I) and the device displays (634) in the navigation bar (e.g., 5002 in FIG. 5K) a second set of subunit regions associated with the prior unit region (e.g., subunit regions 5058 for the days in October 2009, as illustrated in FIG. 5K). In some embodiments, displaying in the navigation bar a second subset of subunit regions includes displaying (636) an animation of the first subset of subunits sliding out of view while the second subset of subunits slides into view. For example, in FIG. 5I the device detects a tap gesture (e.g., 5056 in FIG. 5I at a location on the touch screen 112 that corresponds to a location of the prior unit region 5004-1, which represents October 2009) and, in response to detecting the tap gesture, the device displays an animation (e.g., as illustrated in FIG. 5J) of the first set of subunit regions sliding out of view to the right while the second set of subunit regions slide into view from the left (e.g., in FIG. 5J the subunit regions 5006 that represent the days of November slide out of view to the right, while in the subunit regions 5058 that represent the days of October simultaneously slide into view from the left). In some embodiments, in response to detecting the tap gesture, the device selects a subunit (e.g., Oct. 31, 2009) from the second set of subunits associated with the prior unit (e.g., October) and displays a callout (e.g., 5059-a in FIG. 5I) that includes information indicative of the subunit region that has been selected.

In some embodiments, in response to detecting the first input (e.g., tap gesture 5056 in FIG. 5I), a respective subunit region (e.g., 5058-1 in FIGS. 5J-5K) of the second set of subunit regions is currently selected; and the device displays (638) the callout (e.g., 5059 in FIGS. 5I-5J) indicating that the respective subunit region (e.g., 5058-1 in FIGS. 5J-5K) is selected. While displaying the animation of sliding the first subset of subunits out of view, the device moves the callout on the display in accordance with the movement of the respective subunit (e.g., the callout moves from a first position 5059-a in FIG. 5I to a second position 5059-b in FIG. 5J as the subunit region 5058-1 slides to the right on the touch screen 112). In these embodiments, the device ceases to display the callout when it reaches a location on the display that is proximate to a center of the navigation bar (e.g., in FIG. 5J, the callout 5059-b is beginning to fade out as it reaches a center of the navigation bar).

In some of these embodiments, when the first input corresponds to a request to select the prior unit region the device selects (640) a subunit region at the end of the second set of subunit regions. For example, in FIG. 5I, the first input was a tap gesture 5056 on the prior unit region (e.g., 5004-1 in FIG. 5I), and the device selected a subunit region that was at the end of the second set of subunit regions (e.g., the last day in October, October 31st).

The device displays (642), in the content area (e.g., 5007 in FIG. 5K), content (e.g., events that occur on the 31st of October) associated with a subunit region (e.g., 5058-1 in FIG. 5K) from the second set of subunit regions. In some embodiments this content is displayed after the animations have been displayed. In some embodiments, the content is displayed immediately after an end of the first input is detected without any intervening animations.

When the first input (e.g., tap gesture 5060 in FIG. 5L) corresponds (644) to a request to select the subsequent unit region (e.g., 5004-3 in FIG. 5L): the device ceases (646) to display the first set of subunit regions (e.g., 5006 in FIG. 5L), and the device displays (648) in the navigation bar a third set of subunit regions associated with the subsequent unit region (e.g., subunit regions 5062 for the days in December 2009, as illustrated in FIG. 5N). In some embodiments, displaying in the navigation bar a third subset of subunit regions includes displaying (650) an animation of the first subset of subunits sliding out of view. For example, in FIG. 5L, the subunit region associated with Nov. 10, 2009 is currently selected. In this example, in FIG. 5L, the device detects a tap gesture (e.g., 5060 in FIG. 5L with the subsequent unit region 5004-3, which represents December 2009). In some embodiments, in response to detecting the tap gesture (e.g., 5060 in FIG. 5L), the device displays an animation (e.g., as illustrated in FIG. 5M) of the first set of subunit regions sliding out of view to the left while the third set of subunit regions slide into view from the right (e.g., in FIG. 5M the subunit regions 5006 that represent the days of November slide out of view, while the subunit regions 5062 that represent the days of October simultaneously slide into view from the left). In some embodiments, in response to detecting the tap gesture, the device selects a subunit (e.g., Dec. 1, 2009) from the third set of subunits associated with the subsequent unit (e.g., December) and displays a callout (e.g., 5064 in FIGS. 5L-5N) that includes information indicative of the subunit that has been selected.

In some embodiments, in response to detecting the first input (e.g., tap gesture 5060 in FIG. 5L), a respective subunit region (e.g., 5062-1 in FIGS. 5M-5N) of the third set of subunit regions is currently selected; and the device displays (652) a callout (e.g., 5064-*a* in FIG. 5L) indicating that the respective subunit region is selected. While displaying the animation of sliding the first subset of subunits out of view, the device moves the callout (e.g., 5064 in FIGS. 5L-5N) on the display in accordance with the movement of the respective subunit (e.g., the callout moves from a first position 5064-*a* in FIG. 5L to a second position 5064-*b* in FIG. 5M and to a third position 5064-*c* in FIG. 5N as the subunit region 5062-1 slides to the left on the touch screen 112). In these embodiments, the device ceases to display the callout when it reaches a location on the display that is proximate to an end of the navigation bar (e.g., in FIG. 5N, the callout 5064-*c* is beginning to fade out as it reaches an end of the navigation bar).

In some of these embodiments, when the first input corresponds to a request to select the subsequent unit region, the device selects (654) a subunit region at the beginning of the third set of subunit regions. For example, in FIG. 5L, the first input is a tap gesture 5060 on the subsequent unit region (e.g., 5004-3 in FIG. 5L), and the device selects a subunit region 5062-1 that is at the beginning of the third set of subunit regions (e.g., the first day in December, December 1st).

It will be understood that by displaying both unit and subunit regions in the navigation bar described above, a user is able to quickly select a particular value by quickly skipping through unit regions to a unit region that includes a range of values that is of particular interest to the user. Once the device has skipped to the desired range of values, the user can quickly select the subunit region that is associated with a particular value of the range of values that the user is interested in selecting. For example, if the currently displayed day is Jan. 15, 2009 and the user wants to display Nov. 26, 2009, instead of scrolling through all of the days in between January 15 and November 26, the user can simply tap on the subsequent unit region several times to advance by a month each time, and then, once the subunit regions for the month of November are displayed, the user can simply select the subunit region associated with November 26. Thus, a navigation bar that includes subunit regions and unit regions increases the speed and efficiency of navigation through a range of values, thereby enabling a user to work more efficiently, conserving power, and increasing the time between battery charges.

The device displays (656), in the content area (e.g., 5007 in FIG. 5N), content (e.g., events that occur on the 1st of December) associated with a subunit region (e.g., 5062-1 in FIG. 5N) from the third set of subunit regions. In some embodiments this content is displayed after the animations have completed. In some embodiments, the content is displayed immediately after an end of the first input is detected.

Note that details of the processes described above with respect to method 600 (e.g., FIGS. 6A-6D) of navigating through a range of values are also applicable in an analogous manner to the method 700 described below with reference to FIG. 7. For example the unit regions and subunit regions described below may have one or more of the characteristics of the unit and subunit regions described with reference to method 600. Likewise, in some embodiments, at least a subset of the animations and callouts described with reference to method 600 are similarly applicable to the method 700 described below. For brevity, these details are not repeated below.

Figure 7:
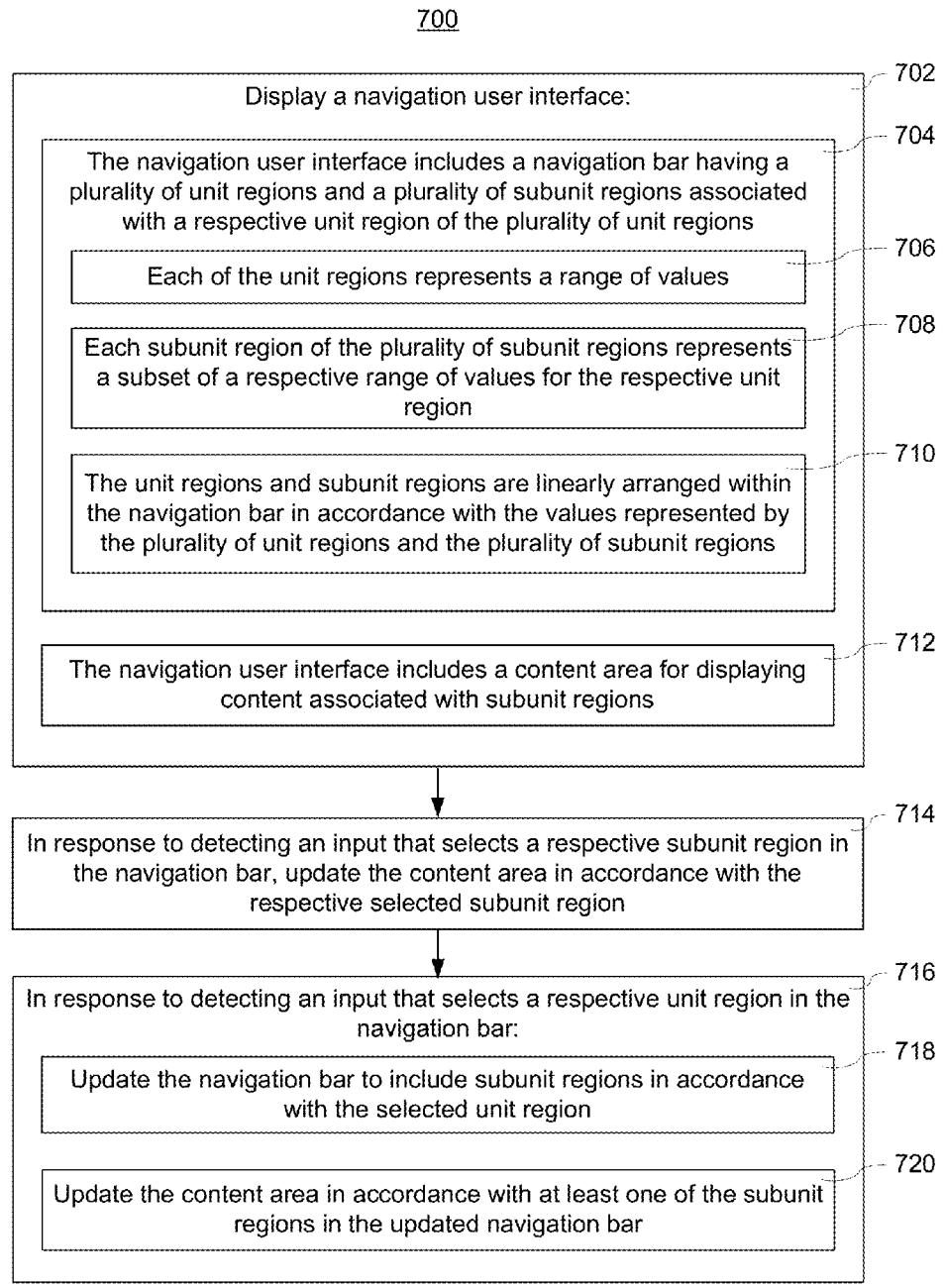
FIG. 7 is a flow diagram illustrating a method of navigating through a range of values using a navigation bar that includes unit regions and subunit regions in accordance with some embodiments.
Figure 8A:
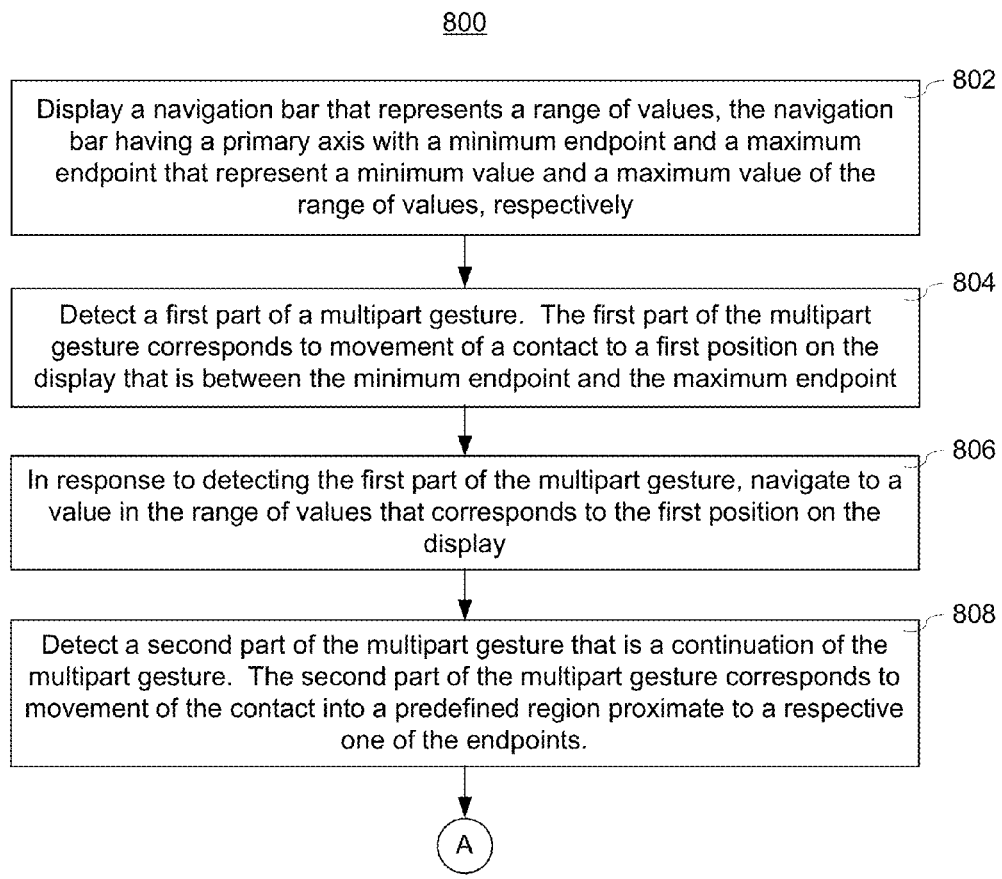
FIGS. 8A-8H are flow diagrams illustrating a method of navigating through a range of values using a navigation bar that has a primary axis with a minimum endpoint and a maximum endpoint in accordance with some embodiments.
Figure 8B:
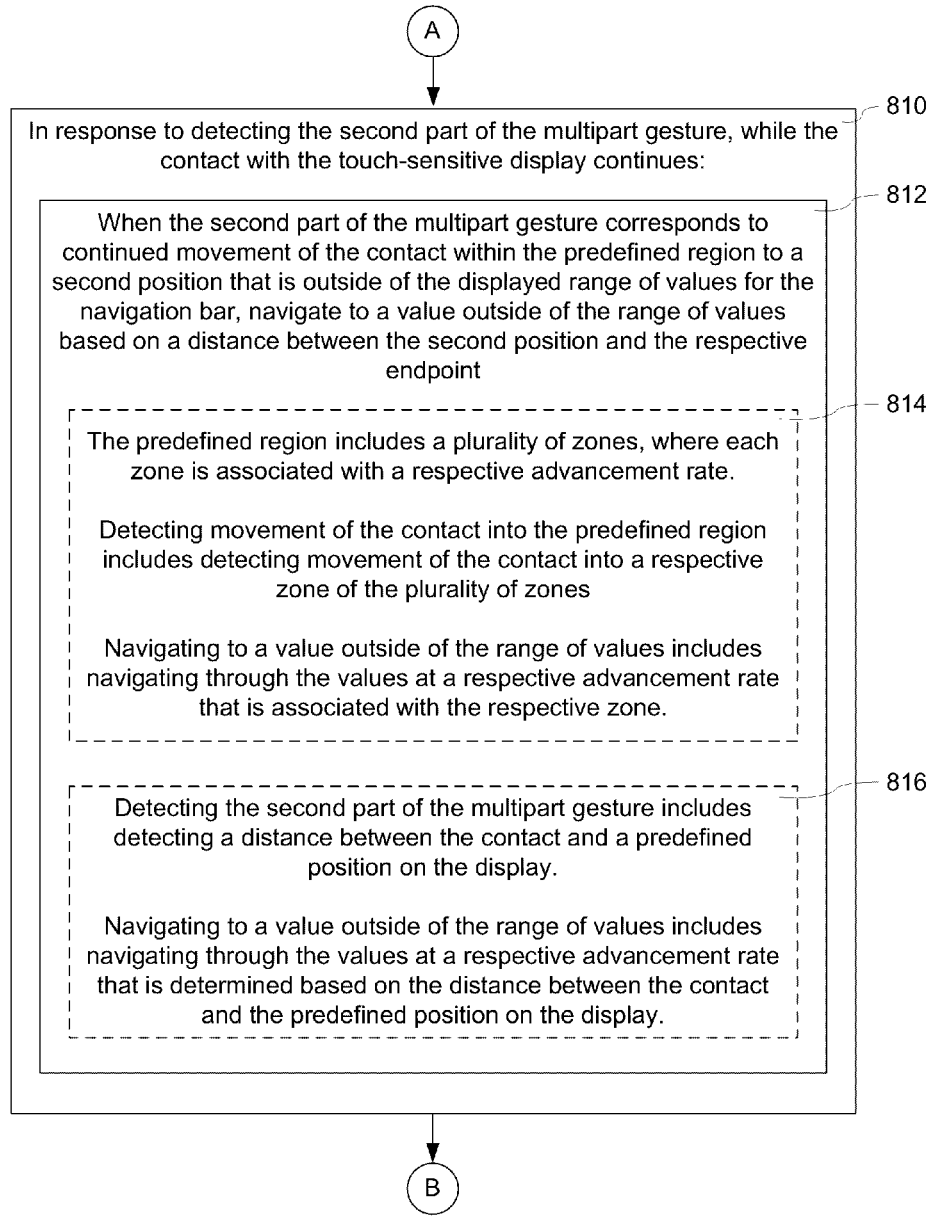
Figure 8C:
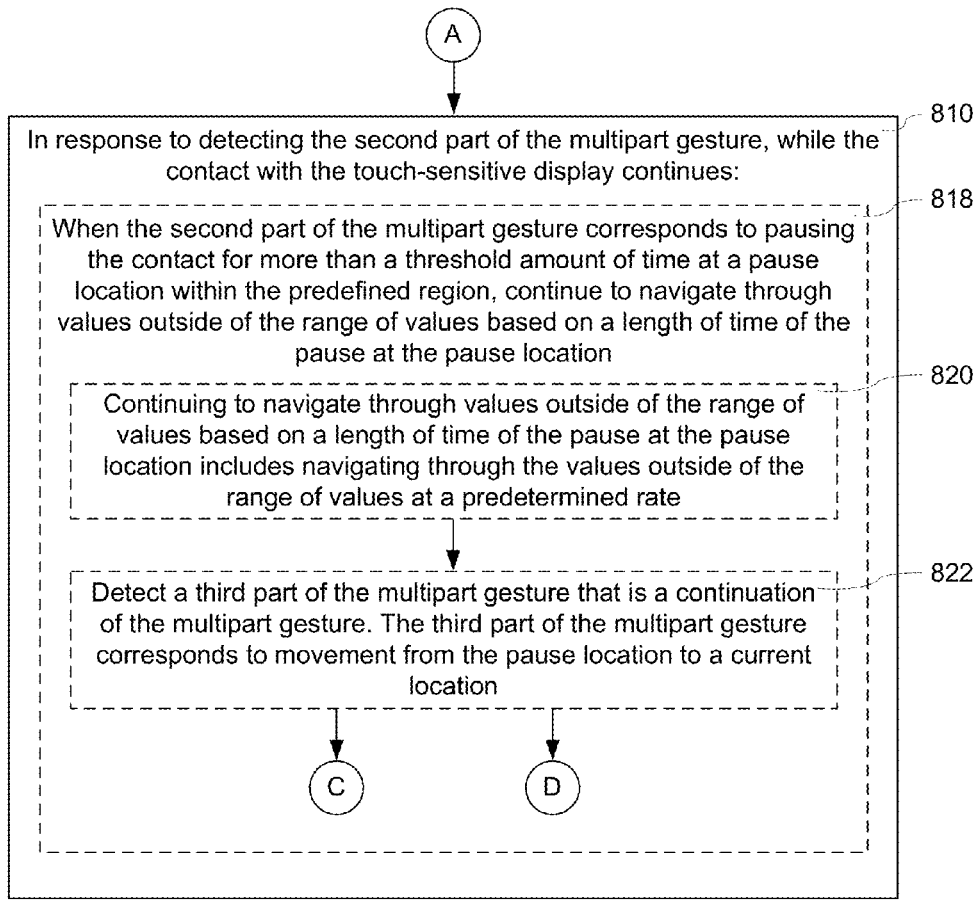
Figure 8D:
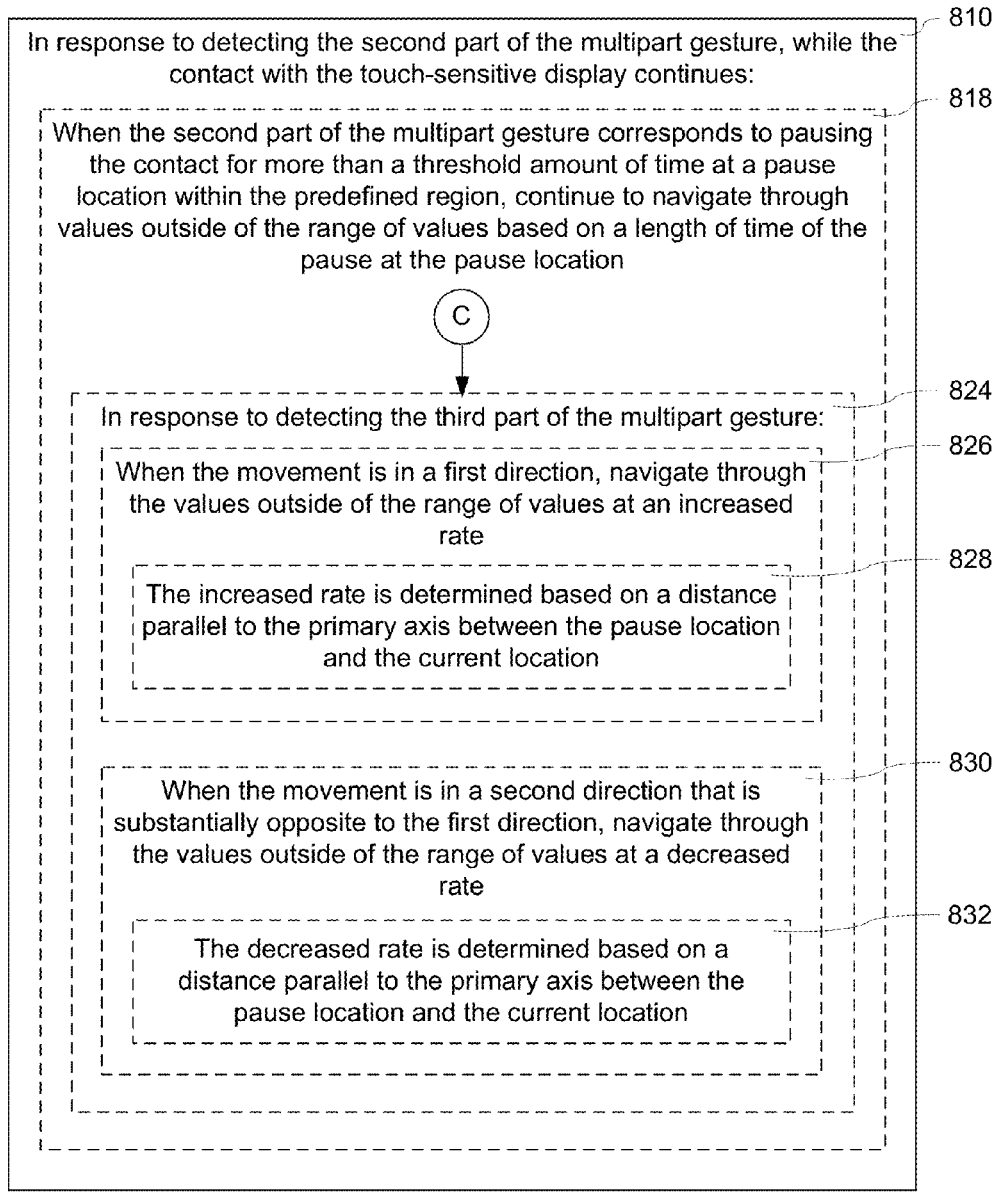
Figure 8E:
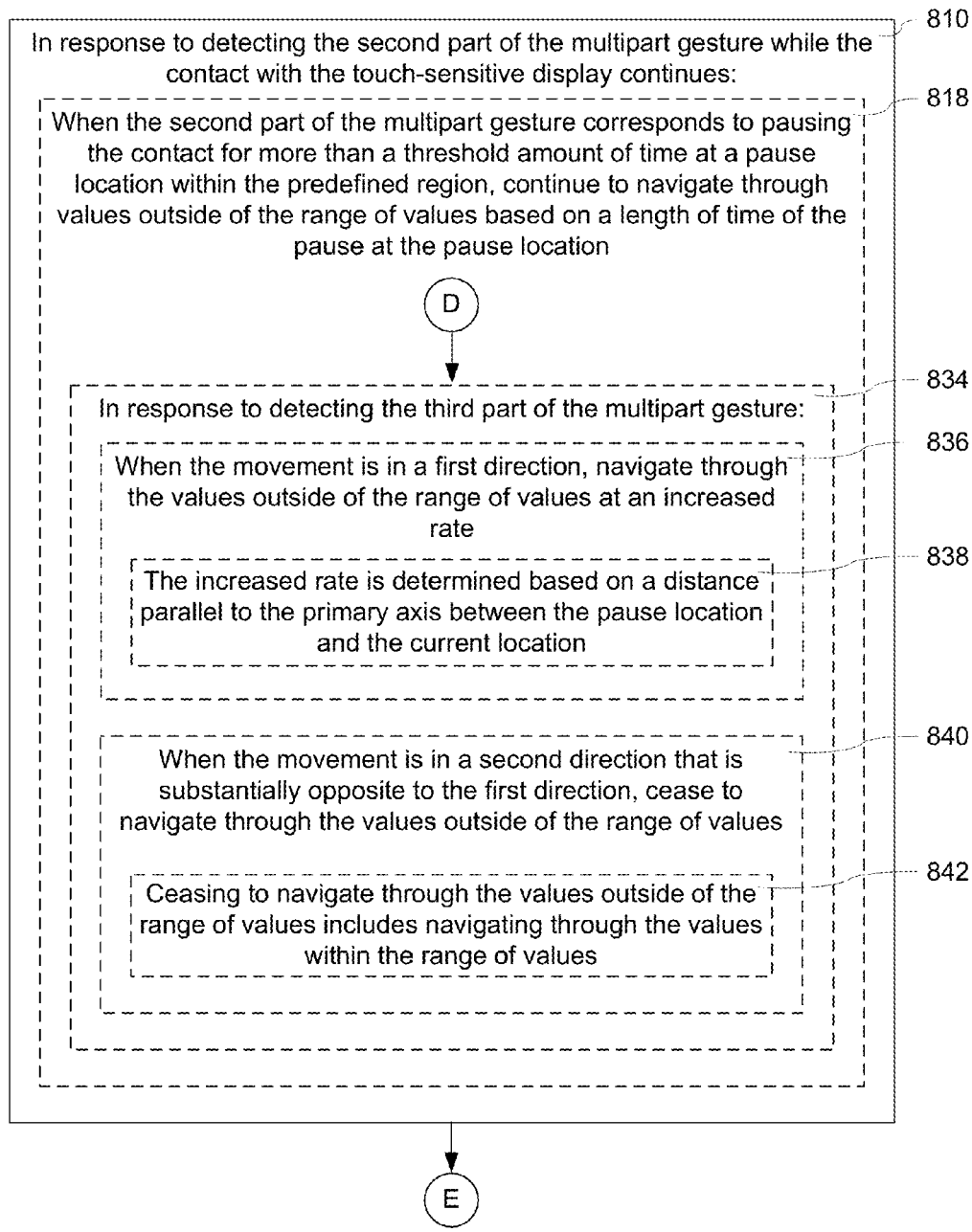
Figure 8F:
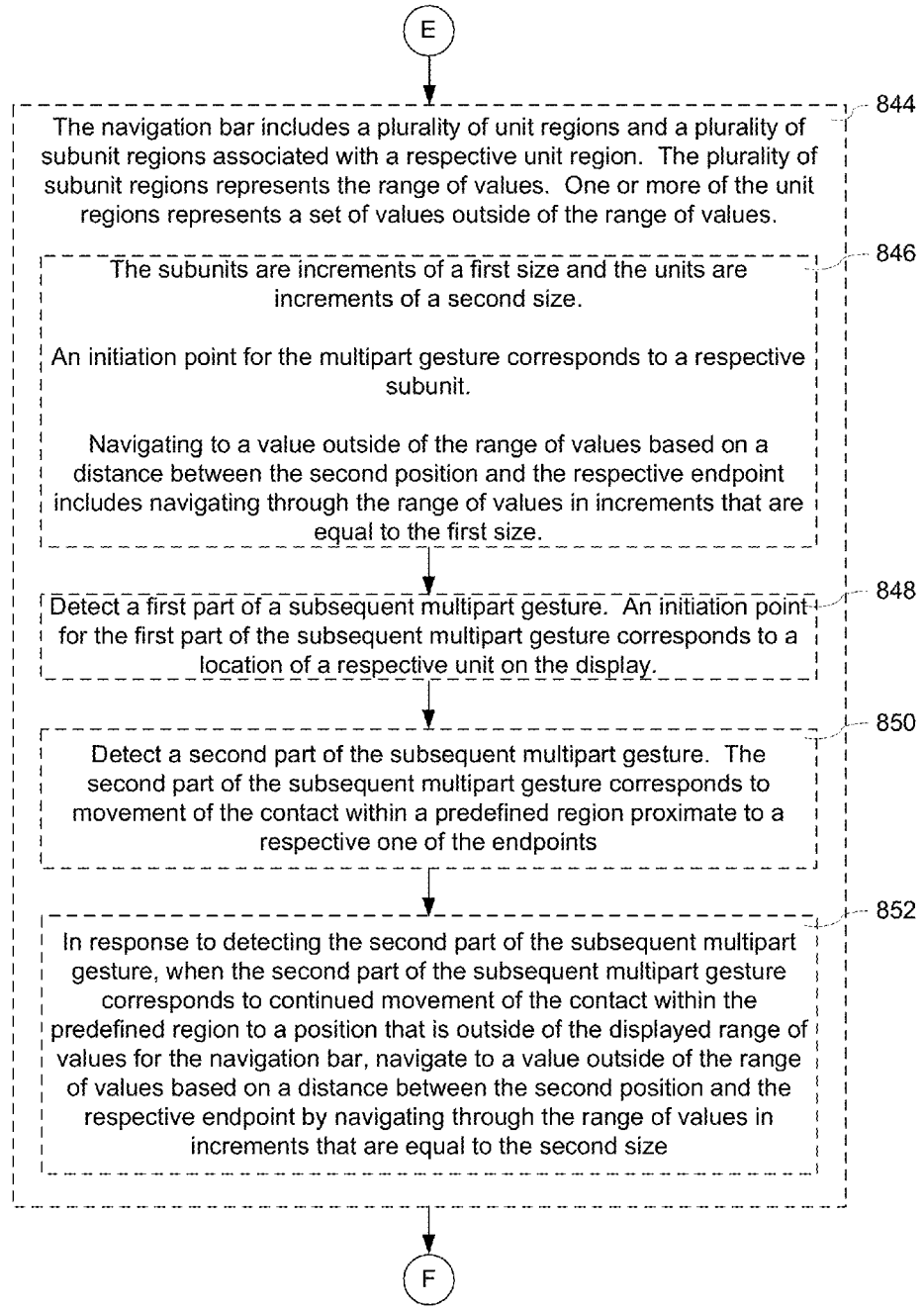
Figure 8G:
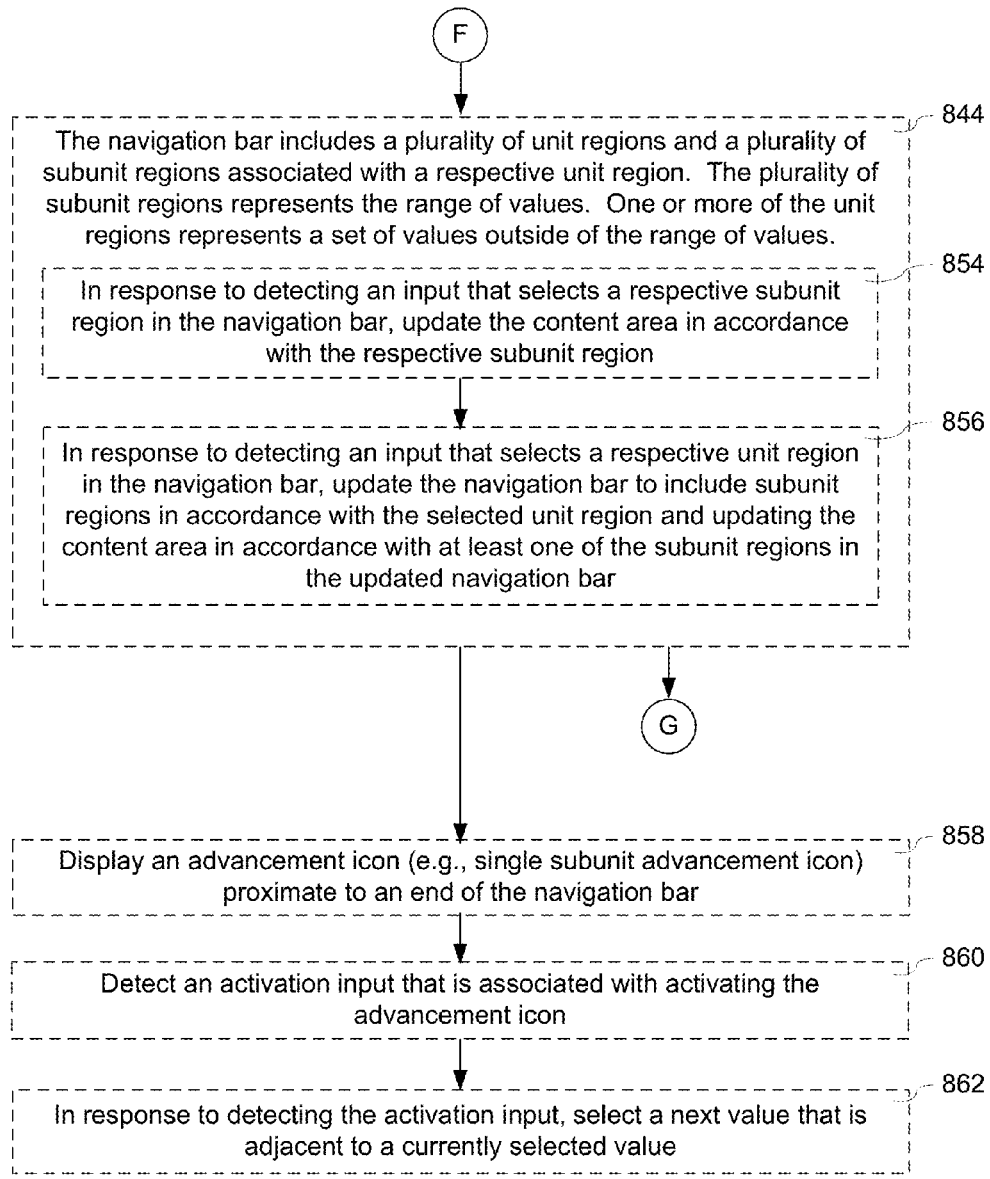
Figure 8H:
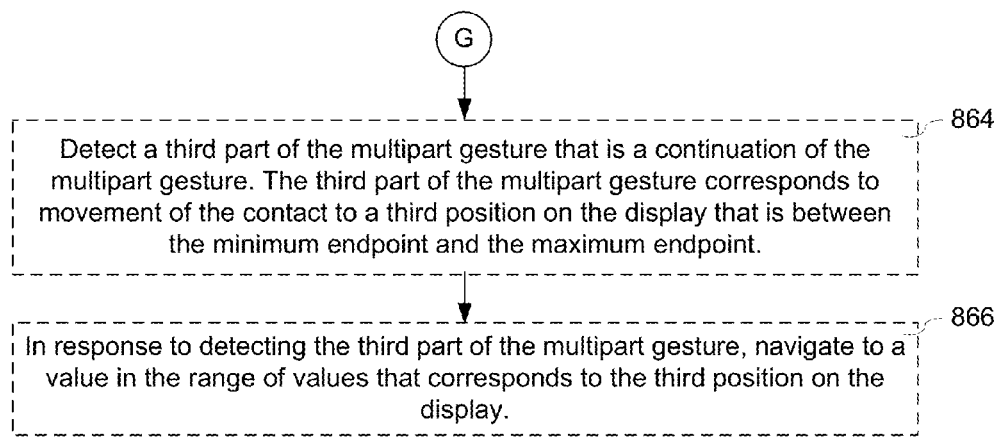

FIG. 7 is a flow diagram illustrating a method 700 of navigating through a range of values using a navigation bar that includes unit regions and subunit regions in accordance with some embodiments. The method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to navigate through ranges of values. The method reduces the cognitive burden on a user when navigating through ranges of values, thereby creating a more efficient human-machine interface. For battery-operated computing devices, enabling a user to navigate through ranges of values faster and more efficiently conserves power and increases the time between battery charges.

The device displays (702) a navigation user interface. The navigation user interface includes a navigation bar (e.g., 5002 in FIG. 5H) having (704) a plurality of unit regions (e.g., 5004 in FIG. 5H) and a plurality of subunit regions (e.g., 5006 in FIG. 5H) associated with a respective unit region (e.g., 5004-2 in FIG. 5H) of the plurality of unit regions. Each of the unit regions represents (706) a range of values. For example, in FIG. 5H a first unit region 5004-1 represents the month of October 2009, and all of the days in October, while a second unit region 5004-2 represents the month of November 2009 and all of the days in November. Each subunit region of the plurality of subunit regions represents (708) a subset of a respective range of values for the respective unit region (e.g., subunit region 5006-1 represents Nov. 23, 2009).

The unit regions and subunit regions are linearly arranged (710) within the navigation bar in accordance with the values represented by the plurality of unit regions and the plurality of subunit regions. For example, in FIG. 5H the unit regions and the subunit regions are arranged in a line in chronological order. In FIG. 5H, the date/time of the unit regions and subunit regions move forward in time in a first direction along the navigation bar and move backward in time in a second direction along the navigation bar (e.g., the dates to the right of the currently selected date are dates that occur after the currently selected date, while the dates that occur to the left of the currently selected date are dates that occur before the currently selected date).

The navigation user interface also includes a content area (e.g., 5007 in FIGS. 5D-5N) for displaying (712) content associated with subunit regions (e.g., for displaying content that is associated with a currently selected subunit region).

In response to detecting an input (e.g., tap gesture 5052 in FIG. 5H) that selects a respective subunit region in the navigation bar, the device updates (714) the content area (e.g., 5007 in FIG. 5I) in accordance with the respective selected subunit region. For example in FIG. 5H, the device is displaying content associated with Nov. 15, 2009 in the content area 5007. In this example, the device detects a tap gesture (e.g., 5052 in FIG. 5I) with the respective subunit region for Nov. 10, 2009, and, in response to detecting the tap gesture, updates the content area by replacing content associated with the initially selected subunit region with content associated with the respective subunit region that was selected by the input (e.g., by replacing the events associated with Nov. 15, 2009 with events associated with Nov. 10, 2009).

In response to detecting (716) an input (e.g., tap gesture 5056 in FIG. 5I) that selects a respective unit region (e.g., 5004-1 in FIG. 5I) in the navigation bar (e.g., 5002 in FIG. 5I), the device updates (718) the navigation bar 5002 to include subunit regions in accordance with the selected unit region and the device also updates (720) the content area in accordance with at least one of the subunit regions in the updated navigation bar. For example, in FIG. 5I, the device detects a tap gesture 5056 with the unit region 5004-1 in the navigation bar 5002 that represents the month of October 2009. In this example, in response to detecting gesture 5056, the device displays a plurality of subunit regions (e.g., 5058 in FIG. 5K) that are associated with days in the month of October 2009. Continuing this example, the device also selects a subunit region (e.g., 5058-1 in FIGS. 5J-5K) associated with one of the days (e.g., Oct. 31, 2009) in the month (e.g., October) associated with the selected unit region, and displays content (e.g., events that occur on Oct. 31, 2009) in the content area (e.g., 5007 in FIG. 5K) that is associated with the selected subunit region (e.g., 5058-1 in FIGS. 5J-5K).

FIGS. 8A-8H are flow diagrams illustrating a method 800 of navigating through a range of values using a navigation bar that has a primary axis with a minimum endpoint and a maximum endpoint in accordance with some embodiments. The method 800 is performed at a multifunction device (e.g., device 300, FIG. 3, or portable multifunction device 100, FIG. 1) with a touch-sensitive display. Some operations in method 800 may be combined and/or the order of some operations may be changed.

As described below, the method 800 provides an intuitive way to navigate through a range of values. The method reduces the cognitive burden on a user when navigating through a range of values, thereby creating a more efficient human-machine interface. For battery-operated computing devices, enabling a user to navigate through ranges of values faster and more efficiently conserves power and increases the time between battery charges.

The device displays (802) a navigation bar (e.g., 5002 in FIGS. 5O-5EE) that represents a range of values (e.g., the range of values of the navigation bar in FIG. 5O is the days in the month of November, 2009). The navigation bar (e.g., 5002 in FIG. 5O) has a primary axis (e.g., 5066 in FIG. 5O-5EE) with a minimum endpoint and a maximum endpoint that represent a minimum value (e.g., Nov. 1, 2009 in FIG. 5O) and a maximum value (e.g., Nov. 30, 2009 in FIG. 5O) of the range of values, respectively. As noted above, while the primary axis 5066 with the minimum endpoint and the maximum endpoint is shown in some figures, the primary axis 5066 with the minimum endpoint and the maximum endpoint is not displayed on display 112. In addition, for clarity, the primary axis 5066 with the minimum endpoint and the maximum endpoint is shown in the figures adjacent to the navigation bar, rather than overlaid on the navigation bar (e.g., 5002). It will also be understood that a navigation bar, as used herein, does not necessarily refer to a rectangular navigation bar. Rather, the navigation bar may be any shape that assists in navigation. In some embodiments, the navigation bar and the primary axis of the navigation bar are linear or substantially linear. In some embodiments, the navigation bar and the primary axis are curved. In addition, while the navigation bar is shown in a horizontal orientation in the figures, it will be understood that the navigation bar may also be vertical, diagonal, or any orientation that assists in navigation. In some embodiments, the navigation bar is displayed so as to have a 3D appearance, and the primary axis of the navigation bar is adjusted accordingly.

In some embodiments, the device displays content associated with a currently selected value in the range of values in a content area (e.g., 5007 in FIGS. 5O-5EE).

The device detects (804) a first part of a multipart gesture. The first part of the multipart gesture corresponds to movement of a contact to a first position on the display that is between the minimum endpoint and the maximum endpoint (e.g., movement of contact 5068 from an initial position 5068-*a* on the touch screen 112 in FIG. 5O to a first position 5068-*b* on the touch screen 112 in FIG. 5P).

In response to detecting the first part of the multipart gesture, the device navigates (806) to a value (e.g., Nov. 19, 2009) in the range of values (e.g., the days in November, 2009) that corresponds to the first position (e.g., 5068-*b* in FIG. 5P) on the display.

The device detects (808) a second part of the multipart gesture that is a continuation of the multipart gesture. The second part of the multipart gesture corresponds to movement of the contact (e.g., movement of contact 5068 from the first position 5068-*b* in FIG. 5P to a second position 5068-*c* in FIG. 5Q and/or a third position 5068-*d* in FIG. 5R) into a predefined region proximate to a respective one of the endpoints (e.g., predefined region 5070 is proximate to a maximum endpoint of the primary axis, while predefined region 5072 is proximate to a minimum endpoint of the primary axis in FIGS. 5Q-5CC).

In some embodiments the predefined region is a region that is adjacent to the respective endpoint along the direction of the primary axis. In some embodiments, the predefined region is an area that includes one or more icons that are functionally associated with the navigation bar. For example, in FIGS. 5Q-5CC the predefined region 5070 includes an icon that represents a subsequent unit region 5003-4 and a subunit advancement icon 5008. In some embodiments, these functionally associated icons have distinct behaviors when activated. For example, when subsequent unit region 5003-4 is activated (e.g., in response to a tap gesture at a location on a touch-sensitive surface that corresponds to the location of the subsequent unit region 5003-4), the device replaces the range of values with an updated range of values (e.g., the days in the month of December, 2009), as described in greater detail above with reference to FIGS. 5L-5N. As another example, when subunit advancement icon 5008 is activated (e.g., in response to a tap gesture at a location on a touch-sensitive surface that corresponds to the location of the advancement icon 5008), the device navigates to a next value within the range of values (e.g., navigates from Nov. 10, 2009 to Nov. 11, 2009).

In some embodiments, the predefined region is empty or includes one or more other unrelated buttons/controls. For example, in FIGS. 5Q-5R, the predefined region 5070 includes an add events ("+") button that is to the right of the advancement icon 5008, and is for adding events to the calendar. In some embodiments, while these unrelated buttons/controls have predefined behaviors when they are individually activated, when the device detects a continuation of a multipart gesture that includes movement from the navigation bar into the predefined region, instead of activating these buttons/controls, the device continues to navigate through values in accordance with the multipart gesture, as described in greater detail below. For example, gestures which originate at a location that corresponds to a location within the navigation bar are treated differently by the device than gestures which originate at locations that correspond to locations outside of the navigation bar (e.g., a tap gesture to activate subunit advancement icon 5008). In other words, in some embodiments, the method described below allows the user to continue gestures that originate within the navigation bar outside of the navigation bar without accidentally activating other icons on the user interface. This differentiation between gestures that originate within the navigation bar and gestures that originate outside of the navigation bar increases the efficiency and accuracy of the user interface, providing the user with a more intuitive user interface, thereby conserving energy and extending the time between battery charges.

Operations 812-842 are performed (810) in response to detecting the second part of the multipart gesture while the contact with the touch-sensitive display continues. When the second part of the multipart gesture corresponds to continued movement of the contact within the predefined region to a second position (e.g., 5068-*c* in FIG. 5Q) that is outside of the displayed range of values (e.g., the days in November, 2009) for the navigation bar, the device navigates (812) to a value (e.g., Dec. 2, 2009) outside of the range of values based on a distance between the second position and the respective endpoint. For example, in FIG. 5Q, if the horizontal distance between the maximum endpoint of the primary axis 5066 and the second position of the contact 5068-*c* is equal to twice the width of the subunit regions for the values in the range of values, then the device navigates forward in time by two subunits from the end of the range of values (e.g., two days after the last day in the range of values, which is Dec. 2, 2009). In other words, in these embodiments, when the device detects a continuous movement beyond the end of the navigation bar, the device continues to navigate through values adjacent to values in the displayed range of values as though the navigation bar extended into the predefined region. Continuing to smoothly scroll through values adjacent to the displayed range of values when the device detects continuous movement beyond an end of a navigation bar is particularly advantageous in applications where the user in navigating through a set of values (e.g., dates) that does not have a predetermined end point. By continuing to smoothly scroll through additional adjacent values, the device enables the user to scroll beyond the displayed values to a value that is just outside of the range of values in a single smooth movement, thereby reducing the cognitive burden on the user and reducing the time required to navigate through values (e.g., from values within the displayed range of values to values outside of the displayed range of values).

In some embodiments, the predefined region includes a plurality of zones (e.g., 5074-1, 5074-2 and 5074-3 in FIG. 5S), where each zone is associated with a respective advancement rate. For example, a first zone 5074-1 is associated with advancing at one day per 0.5 seconds, a second zone 5074-2 is associated with advancing at one day per 0.2 seconds, while a third zone is associated with advancing at one day per 0.1 seconds. In these embodiments, detecting movement of the contact into the predefined region includes detecting movement of the contact into a respective zone of the plurality of zones (e.g., in FIG. 5S, contact 5068-*e* has moved into the second zone 5074-2. In these embodiments, navigating to a value outside of the range of values includes navigating (814) through the values at a respective advancement rate that is associated with the respective zone. For example, starting at the last value in the range of values, the device will advance through subsequent values at the advancement rate (e.g., one day per 0.2 seconds) for as long as the device continues to detect the input in the corresponding zone (e.g., until the device detects a liftoff of the contact from the second zone 5074-2).

In some embodiments, detecting the second part of the multipart gesture includes detecting a distance between the contact and a predefined position on the display. In these embodiments, navigating to a value outside of the range of values includes navigating (816) through the values at a respective advancement rate that is determined based on the distance between the contact and the predefined position on the display. In some of these embodiments, the predefined position on the display is a predefined position on the navigation bar (e.g., an end of the bar, a beginning of the bar, a middle of the bar, etc.). In some of these embodiments, the predefined position on the display is another predefined position (e.g., the pause location, an edge of the display, etc.). For example, in FIG. 5Q where the contact 5068-*c* is at a location that is 1.5 centimeters from a maximum endpoint of the primary axis, the advancement rate is a first advancement rate (e.g., one day per 0.5 seconds). As another Example, in FIG. 5R, where the contact 5068-*d* is at a location that is 3 centimeters from a maximum endpoint of the primary axis, the advancement rate is a second advancement rate (e.g., one day per 0.1 seconds). In some embodiments the advancement rate increases linearly as the distance from the predefined position on the display increases. In some embodiments, the advancement rate increases at an increasing rate as the distance increases (e.g., as the contact moves further towards the edge of the touch screen 112, the advancement rate increases more quickly, thereby giving the user finer control over the advancement rate when the contact is located at a position that is close to the predefined position on the display and coarser controls when the contact is located at a position on the touch-sensitive surface that is proximate to an edge of the display).

In some embodiments, when the second part of the multipart gesture corresponds to pausing the contact for more than a threshold amount of time (e.g., 0.5 seconds, 0.2 seconds, 0.1 second or any reasonable time period) at a pause location (e.g., 5068-*f* in FIG. 5T) within the predefined region, the device continues (818) to navigate through values outside of the range of values based on a length of time of the pause at the pause location (e.g., when the respective one of the endpoints is a maximum endpoint, the device navigates forward in the values at one day per 0.5 seconds, or when the respective one of the endpoints is a minimum endpoint, the device navigates backward in the values at one day per 0.5 seconds). For example, in FIG. 5T, the device detects a contact 5068 paused on a subsequent unit region 5004-3 that is within the predefined region 5070 for three seconds and navigates six values forward (to Dec. 6, 2009) from the last value in the range of values (e.g., Nov. 30, 2009).

In some embodiments, continuing to navigate through values outside of the range of values based on a length of time of the pause at the pause location includes navigating (820) through the values outside of the range of values at a predetermined rate, as described above with reference to FIG. 5T. In some embodiments, the device detects (822) a third part of the multipart gesture that is a continuation of the multipart gesture. The third part of the multipart gesture corresponds to movement from the pause location to a current location (e.g., movement of the contact 5068 from the paused location 5068-*f* in FIG. 5T to a current location 5068-*g* in FIG. 5U or movement of the contact 5068 from the paused location 5068-*f* in FIG. 5T to a current location 5068-*h* in FIG. 5V).

In some embodiments, operations 826-832 are performed (824) in response to detecting the third part of the multipart gesture. When the movement is in a first direction (e.g., away from a center of the navigation bar as illustrated in FIG. 5U), the device navigates (826) through the values outside of the range of values at an increased rate (e.g., at one day per 0.1 seconds, thereby advancing to Thursday December 26, if the contact is maintained for two seconds). In some of these embodiments, the increased rate is determined (828) based on a distance parallel to the primary axis between the pause location and the current location (e.g., the increased rate is one day per 0.2 seconds when the distance between the paused location 5068-*f* and the current location 5068-*g* is 1 centimeter and the increased rate is one day per 0.1 seconds when the distance between the paused location 5068-*f* and the current location 5068-*g* is 2 centimeters). In these embodiments, when the movement is in a second direction (e.g., towards a center of the navigation bar as illustrated in FIG. 5V) that is opposite or substantially opposite to the first direction, the device navigates (830) through the values outside of the range of values at a decreased rate (e.g., at one day per 1 second, thereby advancing to Sunday December 8, if the contact is maintained for two seconds). In some of these embodiments, the decreased rate is determined (832) based on a distance parallel to the primary axis between the pause location and the current location (e.g., the decreased rate is one day per second when the distance between the paused location 5068-*f* and the current location 5068-*h* is 1 centimeter and the increased rate is one day per 2 seconds when the distance between the paused location 5068-*f* and the current location 5068-*h* is 2 centimeters).

In other embodiments, operations 836-842 are performed (834) in response to detecting the third part of the multipart gesture. In these embodiments, when the movement is in a first direction (e.g., away from a center of the navigation bar as illustrated in FIG. 5U), the device navigates (836) through the values outside of the range of values at an increased rate (e.g., at one day per 0.1 seconds, thereby advancing to Thursday December 26, if the contact is maintained for two seconds). In some of these embodiments, the increased rate is determined (838) based on a distance parallel to the primary axis between the pause location and the current location (e.g., the increased rate is one day per 0.2 seconds when the distance between the paused location 5068-*f* and the current location 5068-*g* is 1 centimeter and the increased rate is one day per 0.1 seconds when the distance between the paused location 5068-*f* and the current location 5068-*g* is 2 centimeters). In these embodiments, when the movement is in a second direction that is opposite or substantially opposite to the first direction (e.g., towards a center of the navigation bar as illustrated in FIG. 5W), the device ceases (840) to navigate through the values outside of the range of values. In some of these embodiments, ceasing to navigate through the values outside of the range of values includes navigating (842) through the values within the range of values. For example, when the device detects movement of the contact 5068 from the pause location 5068-*f* in FIG. 5T to a current location 5068-*i* in FIG. 5W, the device navigates to a value (e.g., Nov. 30, 2009) that is within the range of values (e.g., the days in November 2009).

In some embodiments, the navigation bar includes (844) a plurality of unit regions (e.g., 5004 in FIG. 5O) and a plurality of subunit regions (e.g., 5006 in FIG. 5O) associated with a respective unit region (e.g., 5004-2 in FIG. 5O). In some embodiments, the plurality of subunit regions represents the range of values (e.g., one subunit region is displayed for each day in November when the range of values is the days in November), and one or more of the unit regions (e.g., 5004-1 and 5004-3 in FIG. 5O) represent a set of values outside of the range of values.

In some embodiments, the subunits are increments of a first size (e.g., days) and the units are increments of a second size (e.g., months), an initiation point for the multipart gesture corresponds to a respective subunit (e.g., 5006-3 in FIG. 5O), and navigating to a value outside of the range of values based on a distance between the second position and the respective endpoint includes navigating (846) through the range of values in increments that are equal to the first size (e.g., days), as described in greater detail above with reference to FIGS. 5P-5W. In other words, when the initiation point for the multipart gesture corresponds to a respective subunit, the device navigates through values in increments equal to the size of the subunits (e.g., navigating from a first day to a second day).

In some embodiments, the device detects an end of the multipart gesture (e.g., a liftoff of contact 5068-*d* in FIG. 5R) and, in response to detecting the end of the multipart gesture, the device loads content associated with the currently selected subunit in the content area 5007 in the display. In some embodiments, the device displays an animation of calendar pages flipping. In some embodiments, the animation of calendar pages flipping includes displaying, in the content area interstitial content that is associated with interstitial subunits (e.g., subunits that are between the respective subunit such as Nov. 10, 2009 that is associated with the content that was previously displayed in the content area and the currently selected subunit such as Dec. 11, 2009). In some embodiments the interstitial content includes content associated with each of the interstitial subunits. In some embodiments, the interstitial content includes representations of the content associated with a subset of the interstitial subunits (e.g., a calendar page is shown for each day between the previously selected day and the currently selected day). For example, in FIG. 5X, the calendar page for Nov. 27, 2009 is shown flipping over the calendar page for Nov. 10, 2009. Likewise in FIG. 5Y, the calendar page for Dec. 5, 2009 is shown flipping over the calendar page for Nov. 27, 2009. Similarly in FIG. 5Z, the calendar page for Dec. 11, 2009 is shown flipping over the calendar page for Dec. 5, 2009, and the calendar page for Dec. 11, 2009 is fully displayed in FIG. 5AA. In some embodiments, no interstitial content is displayed.

In some embodiments, after detecting the end of the multipart gesture, the device detects (848) a first part of a subsequent multipart gesture, and an initiation point for the first part of the subsequent multipart gesture corresponds to a location of a respective unit on the display (e.g., the device detects a contact 5076 at a location that corresponds to the location of the prior unit region 5004-1 on the display). In these embodiments, the device detects (850) a second part of the subsequent multipart gesture. The second part of the subsequent multipart gesture corresponds to movement of the contact within a predefined region proximate to a respective one of the endpoints (e.g., movement of contact 5076 from a location 5076-*a* on the touch-sensitive surface that corresponds to the location of the prior unit region 5004-1 on the display to a second location 5076-*b* that corresponds to a location on the display within the predefined region 5072, as illustrated in FIGS. 5BB and 5CC).

In these embodiments, in response to detecting the second part of the subsequent multipart gesture: when the second part of the subsequent multipart gesture corresponds to continued movement of the contact within the predefined region to a position that is outside of the displayed range of values for the navigation bar, the device navigates (852) to a value outside of the range of values based on a distance between the second position and the respective endpoint by navigating through the range of values in increments that are equal to the second size (e.g., month units of time). In other words, when the initiation point for the multipart gesture corresponds to a respective unit, the device navigates through values in increments equal to the size of the units (e.g., on navigating from a first month to a second month). For example, in FIG. 5CC, the device navigates from November 2009 to October 2009, rather than navigating from Dec. 1, 2009 to Nov. 30, 2009.

In some embodiments, the device detects an end of the subsequent multipart gesture (e.g., a liftoff of contact 5076-*b* in FIG. 5CC) and, in response to detecting the end of the subsequent multipart gesture, the device loads content associated with the currently selected subunit in the content area 5007 in the display (e.g., as illustrated in FIG. 5DD, events that occur on Oct. 31, 2009 are displayed in the content area 5007).

In some embodiments, in response to detecting an input that selects a respective subunit region in the navigation bar 5002, the device updates (854) the content area 5007 in accordance with the respective subunit region, as described in greater detail above with reference to FIGS. 5H-5I and methods 600 and 700. In some embodiments, in response to detecting an input that selects a respective unit region in the navigation bar, the device updates (856) the navigation bar to include subunit regions in accordance with the selected unit region and updates the content area 5007 in accordance with at least one of the subunit regions in the updated navigation bar 5002, as described in greater detail above with reference to FIGS. 5H-5I and methods 600 and 700.

In some embodiments, the device displays (858) an advancement icon (e.g., single subunit advancement icon 5008-1 in FIGS. 5DD-5EE) proximate to an end of the navigation bar (e.g., 5002 in FIGS. 5DD-5EE). In these embodiments, the device detects (860) an activation input (e.g., tap gesture 5078 in FIG. 5DD) that is associated with activating the advancement icon (e.g., 5008-1 in FIG. 5DD). In some embodiments, in response to detecting the activation input, the device selects (862) a next value that is adjacent to a currently selected value. For example, in FIG. 5DD, the currently selected value is Oct. 31, 2009, and in response to detecting the tap gesture 5078 on advancement icon 5008-1, the device advances the content backwards one unit to Oct. 30, 2009.

In some embodiments, the device detects (864) a third part of the multipart gesture that is a continuation of the multipart gesture. In these embodiments, the third part of the multipart gesture corresponds to movement of the contact to a third position on the display that is between the minimum endpoint and the maximum endpoint. In these embodiments, in response to detecting the third part of the multipart gesture, the device navigates (866) to a value in the range of values that corresponds to the third position on the display (e.g., dragging back onto the bar results in cancelling the auto advancement and returning to simple scrolling). For example in FIG. 5W the third part of the multipart gesture includes movement of the contact 5068 from the pause location (e.g., 5068-*f* in FIG. 5T) to a location (e.g., 5068-*i* in FIG. 5W) that is between the minimum endpoint and the maximum endpoint of the primary axis (e.g., 5066 in FIG. 5W), and the device navigates to a value (e.g., Nov. 30, 2009) that is within the range of values (e.g., the days in November).

Note that details of the processes described above with respect to method 800 (e.g., FIGS. 8A-8H) of navigating through values including a range of values using a navigation bar are also applicable in an analogous manner to the methods described below with reference to FIG. 9. For example the navigation bar described below may have one or more of the characteristics of the navigation bar described with reference to method 800. For brevity, these details are not repeated below.

Figure 9:
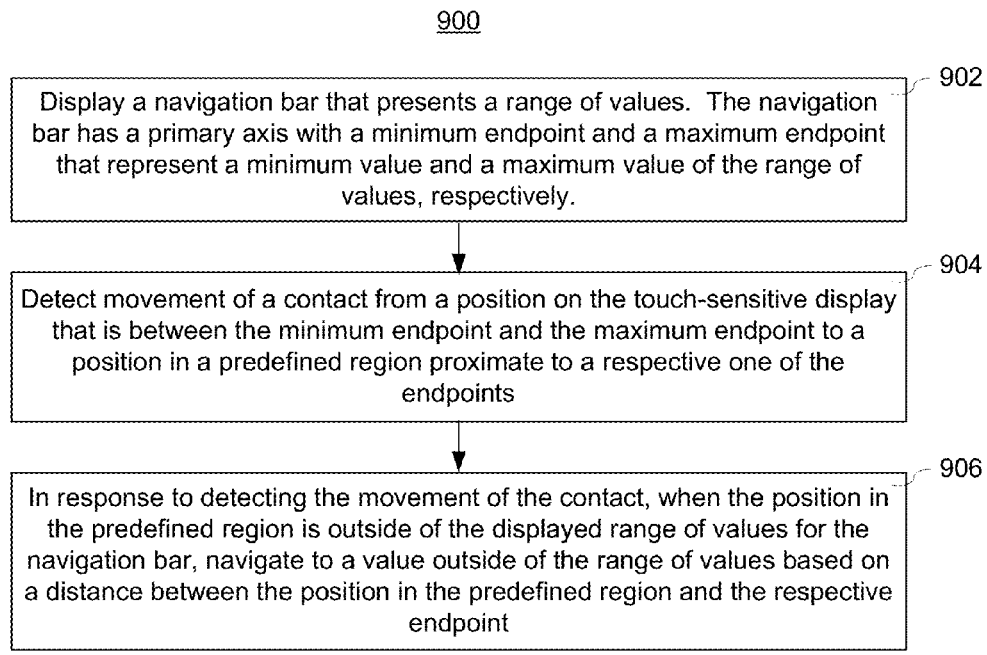
FIG. 9 is a flow diagram illustrating a method of navigating through a range of values using a navigation bar that has a primary axis with a minimum endpoint and a maximum endpoint in accordance with some embodiments.
Figure 10A:
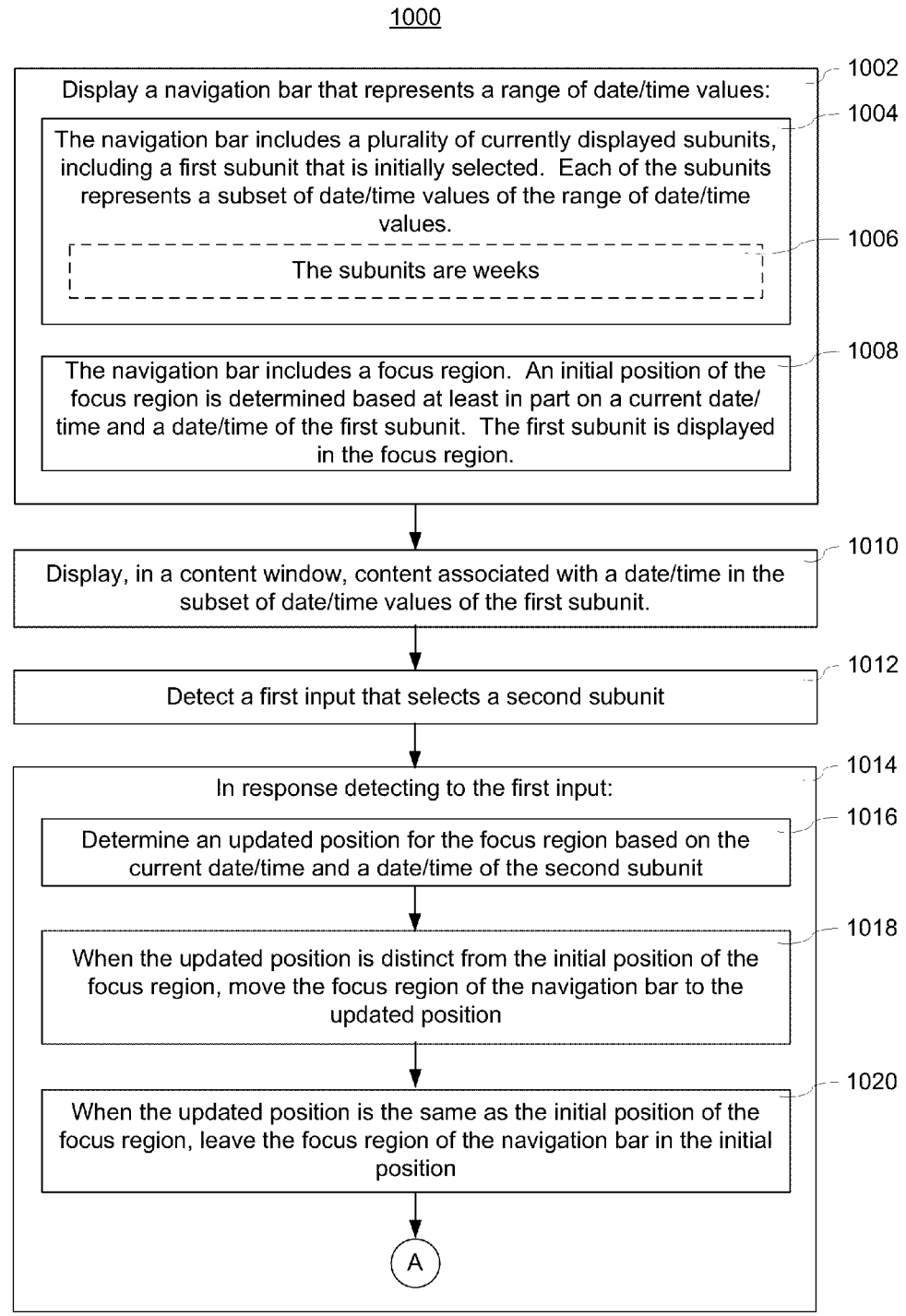
FIGS. 10A-10D are flow diagrams illustrating a method of navigating through a range of values using a navigation bar that has a focus region in accordance with some embodiments.
Figure 10B:
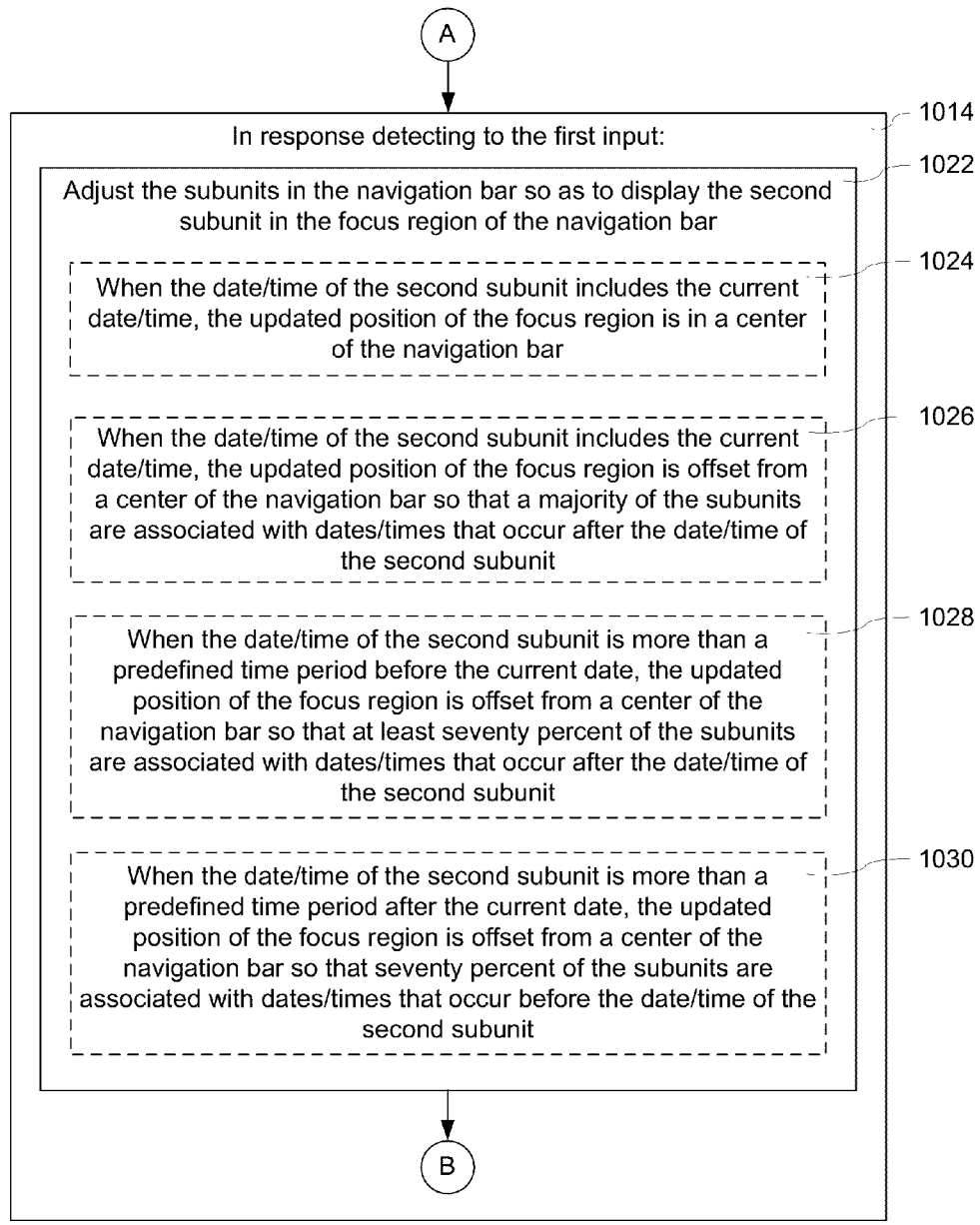
Figure 10C:
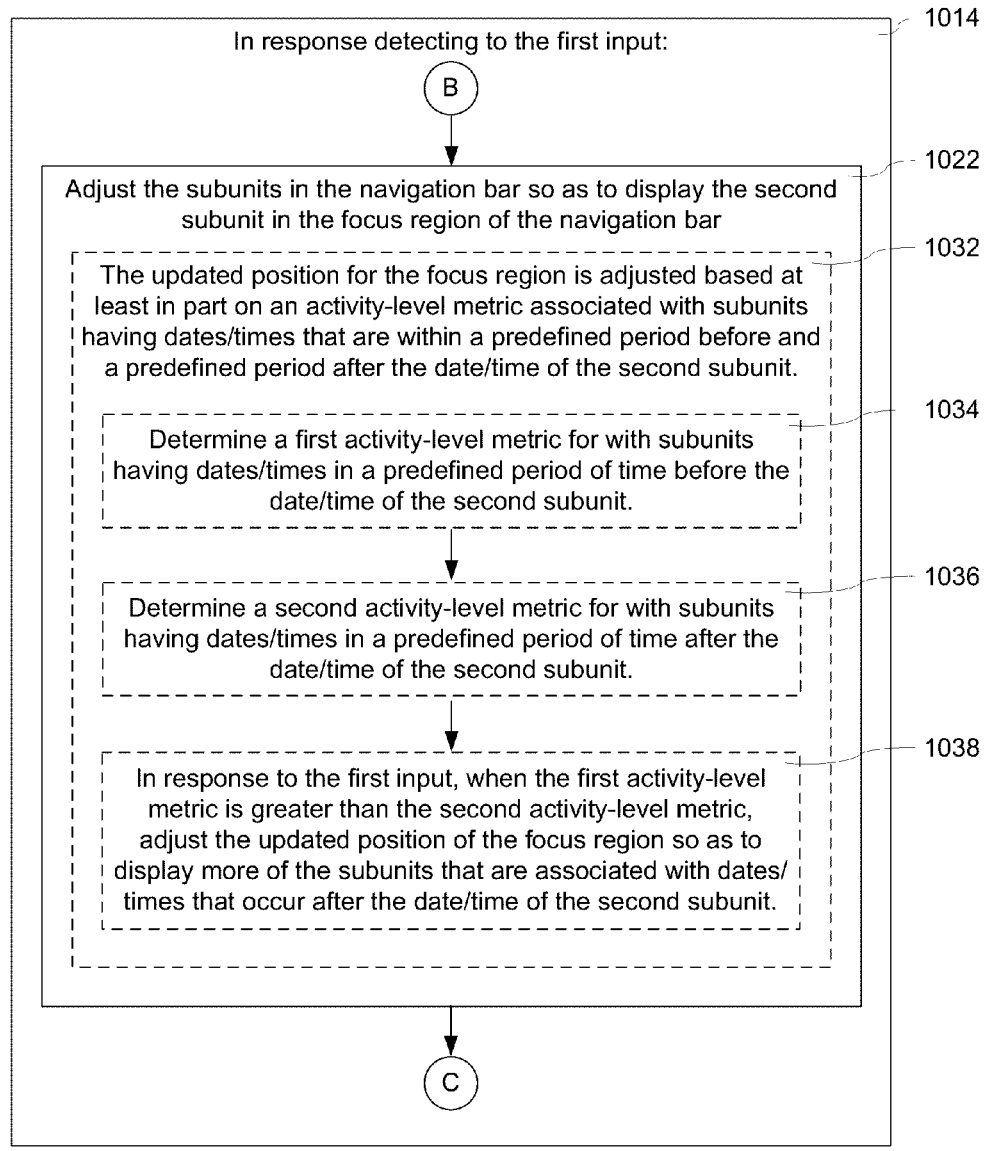
Figure 10D:
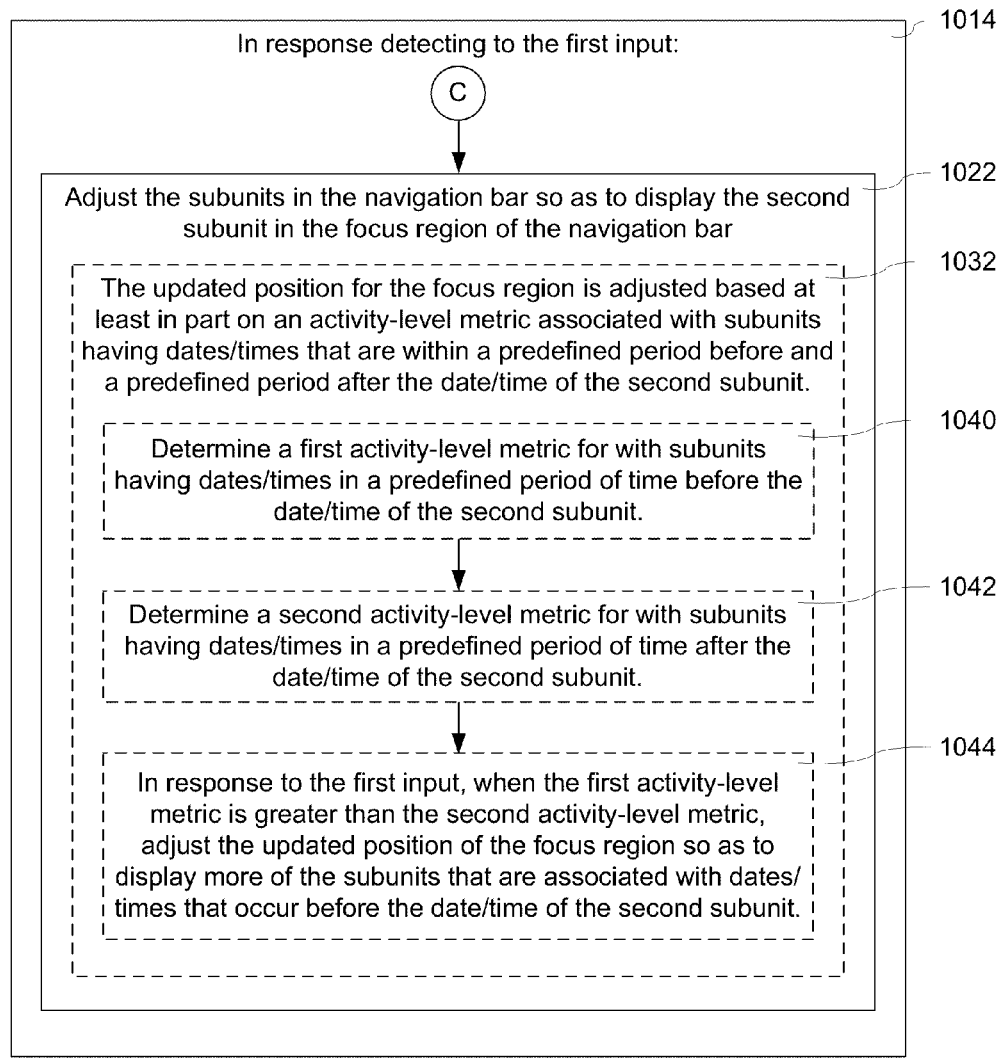
Figure 11A:
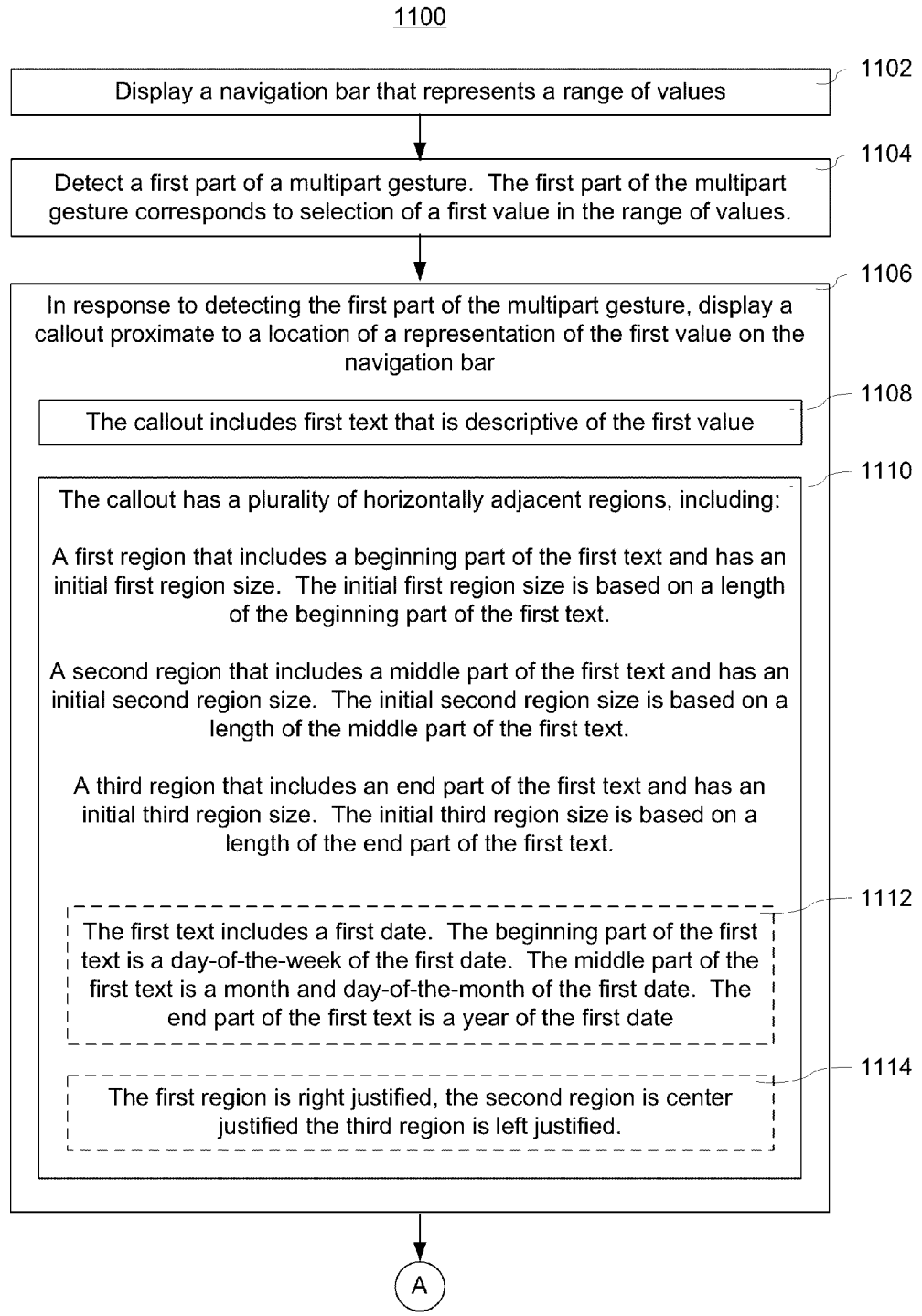
FIGS. 11A-11D are flow diagrams illustrating a method of navigating through a range of values including displaying a callout having text associated with a currently selected value of the range of values in accordance with some embodiments.
Figure 11B:
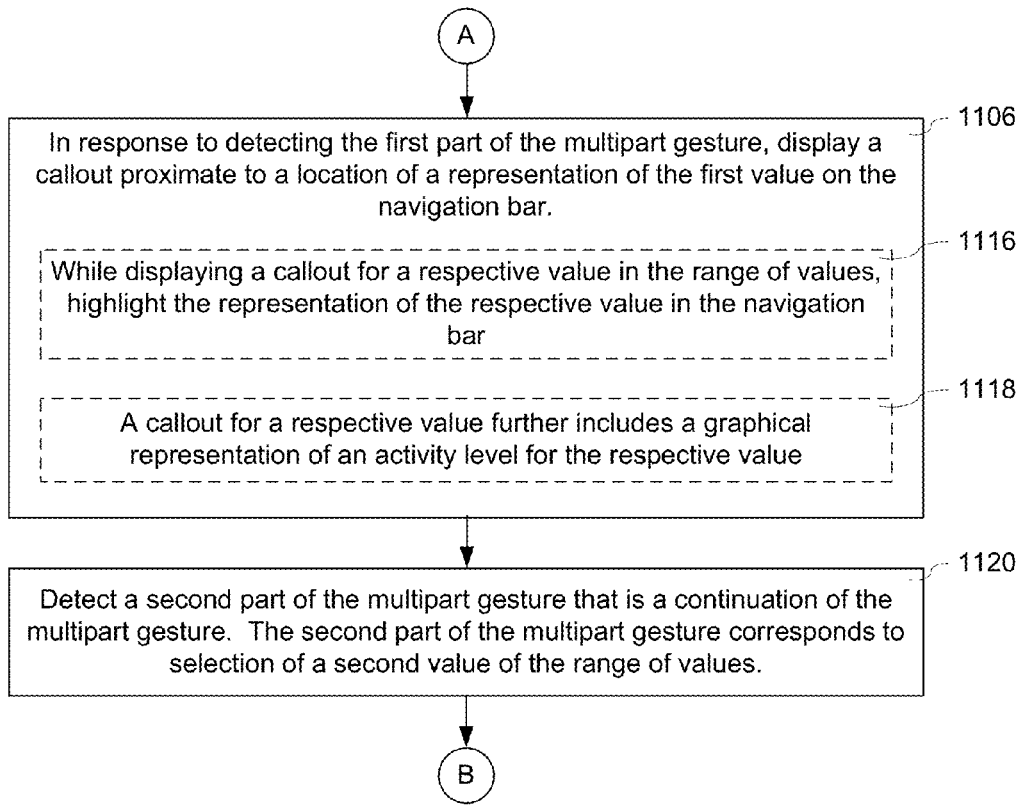
Figure 11C:
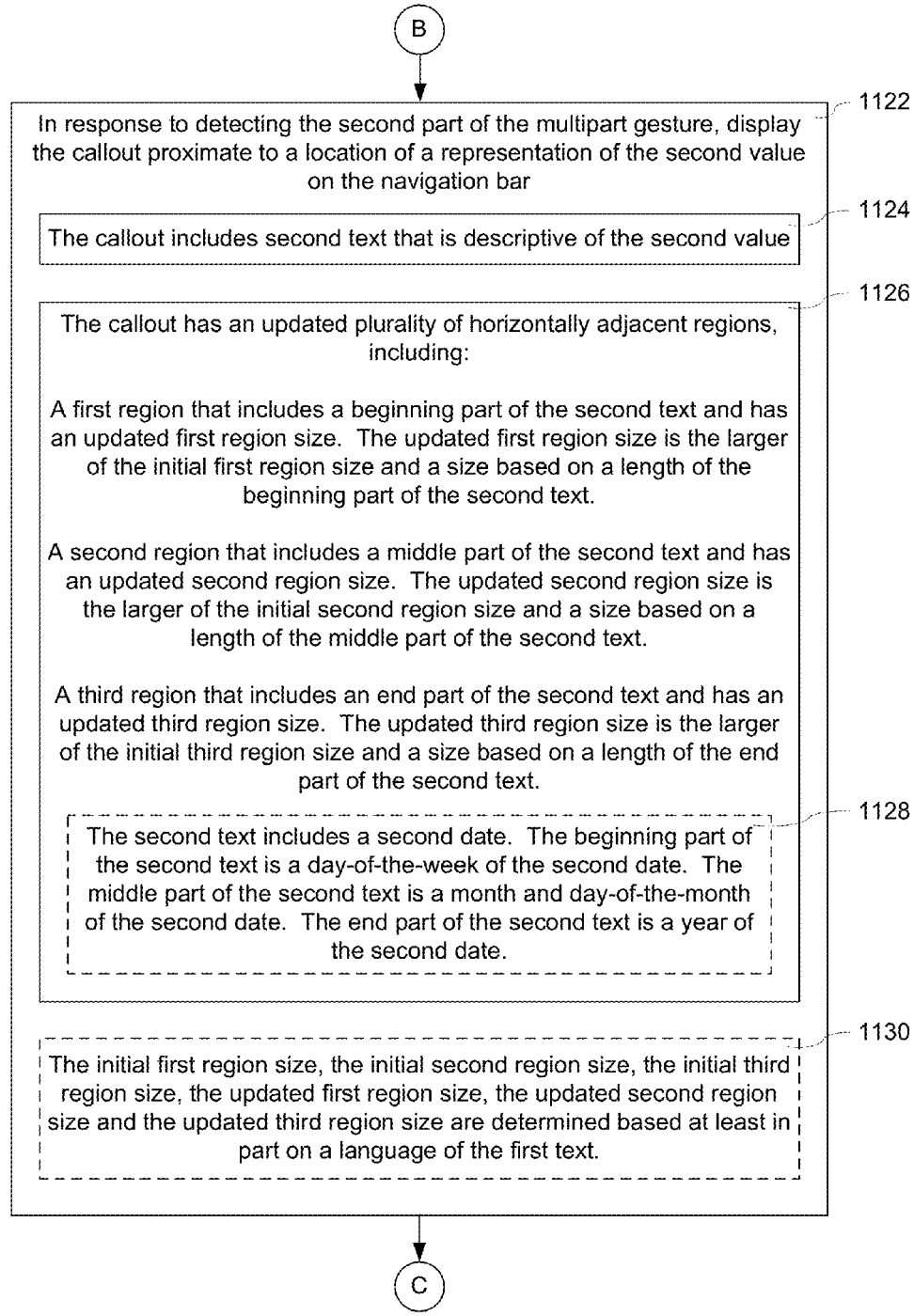
Figure 11D:
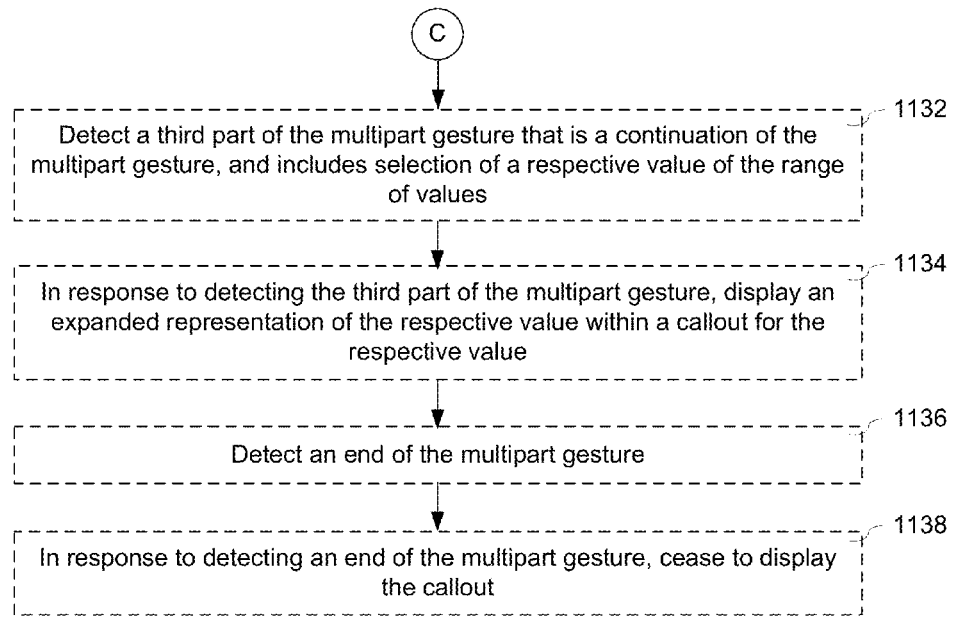

FIG. 9 is a flow diagram illustrating a method 900 of navigating through a range of values using a navigation bar that has a primary axis with a minimum endpoint and a maximum endpoint in accordance with some embodiments. The method 900 is performed at a multifunction device (e.g., device 300, FIG. 3, or portable multifunction device 100, FIG. 1) with a touch-sensitive display. Some operations in method 900 may be combined and/or the order of some operations may be changed.

As described below, the method 900 provides an intuitive way to navigate through a range of values. The method reduces the cognitive burden on a user when navigating through a range of values, thereby creating a more efficient human-machine interface. For battery-operated computing devices, enabling a user to navigate through ranges of values faster and more efficiently conserves power and increases the time between battery charges.

The device displays (902) a navigation bar (e.g., 5002 in FIGS. 5O-5R) that presents a range of values (e.g., the days in the month of November 2009). The navigation bar has a primary axis (e.g., 5066 in FIGS. 5O-5R) with a minimum endpoint and a maximum endpoint that represent a minimum value (e.g., Nov. 1, 2009) and a maximum value (e.g., Nov. 30, 2009) of the range of values, respectively.

The device detects (904) movement of a contact 5068 from a position (e.g., contact 5068-*a* in FIG. 5O) on the touch-sensitive display that is between the minimum endpoint and the maximum endpoint to a position (e.g., contact 5068-*c* in FIG. 5Q) in a predefined region (e.g., 5070 in FIG. 5Q) proximate to a respective one of the endpoints (e.g., a predefined region 5070 that is adjacent to the respective endpoint along the direction of the primary axis in FIGS. 5P-5R).

In response to detecting the movement of the contact, when the position in the predefined region is outside of the displayed range of values for the navigation bar, the device navigates (906) to a value outside of the range of values based on a distance between the position in the predefined region and the respective endpoint. In other words, when the position in the predefined region corresponds to a value that is outside of the range of values, the device navigates to the value. For example, in FIG. 5Q, the contact 5068-*c* is at a location on the touch-sensitive surface that corresponds to a position in the predefined region 5070 on the display that is outside of the range of values (e.g., is not between the minimum and maximum endpoints of the primary axis 5066), and the device navigates to a value (e.g., Dec. 2, 2009) that is outside of the range of values (e.g., the days in November, 2009) based on the horizontal component of the distance between the position 5068-*c* in the predefined region and the respective endpoint of the primary axis 5066 in FIG. 5Q. Alternatively, the device navigates to a value that is outside of the range of values based on the time that the contact is in one or more predefined zones 5074, as discussed above with respect to FIG. 5S.

FIGS. 10A-10D are flow diagrams illustrating a method 1000 of navigating through a range of values using a navigation bar that has a focus region in accordance with some embodiments. The method 1000 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, the method 1000 provides an intuitive way to navigate through a range of values. The method reduces the cognitive burden on a user when navigating through a range of values, thereby creating a more efficient human-machine interface. For battery-operated computing devices, enabling a user to navigate through ranges of values faster and more efficiently conserves power and increases the time between battery charges.

The device displays (1002) a navigation bar (e.g., 5002 in FIG. 5FF-5MM) that represents a range of date/time values (e.g., date and/or time values). The navigation bar includes (1004) a plurality of currently displayed subunits (e.g., 5080 in FIG. 5FF), including a first subunit (e.g., 5080-1) that is initially selected. Each of the subunits represents a subset of date/time values of the range of date/time values. In some embodiments, the subunits are (1006) weeks. For example, in FIG. 5FF, the subunits each represent a week (e.g., seven consecutive days). In this example, the first subunit 5080-1 that is currently selected is the week of November 22-Nov. 28, 2009.

The navigation bar also includes (1008) a focus region (e.g., 5082 in FIGS. 5FF-5MM). An initial position of the focus region is determined based at least in part on a current date/time and a date/time of the first subunit. The first subunit is displayed in the focus region. For example, if the current date is Dec. 23, 2009, the device compares the dates in the first subunit (e.g., November 22-Nov. 28, 2009) to the current date to determine a location of the focus region. The device displays (1010), in a content window (e.g., 5007 in FIGS. 5FF-5MM), content associated with a date/time in the subset of date/time values of the first subunit. For example, in FIG. 5FF, the device displays events that occur in the week of November 22-Nov. 28, 2009 in the content window 5007.

The device detects (1012) a first input (e.g., tap gesture 5084 in FIG. 5FF) that selects a second subunit (e.g., 5080-2 in FIG. 5FF). Operations 1016-1046 are performed (1014) in response detecting to the first input.

The device determines (1016) an updated position for the focus region (e.g., 5082 in FIGS. 5GG-5II) based on the current date/time and a date/time of the second subunit. When the updated position (e.g., 5082 in FIGS. 5GG-5II) is distinct from the initial position (e.g., 5082 in FIG. 5FF) of the focus region, the device moves (1018) the focus region of the navigation bar to the updated position. For example, in FIG. 5GG, the focus region has been moved to a new location proximate to the center of the navigation bar 5002. When the updated position is the same as the initial position of the focus region, the device leaves (1020) the focus region of the navigation bar in the initial position.

The device adjusts (1022) the subunits in the navigation bar so as to display the second subunit in the focus region of the navigation bar. For example, as illustrated in FIG. 5HH, in some embodiments the device displays an animation of the subunits sliding to the left along the navigation bar 5002 so that the second subunit is displayed in the focus region 5082 in FIG. 5II. In some embodiments, the device also displays an animation of a page including the content associated with the first subunit turning or flipping up to reveal the content associated with the second subunit. In some embodiments, the device displays an animation of multiple pages turning or flipping up, showing interstitial content that is associated with interstitial subunits that fall between the first subunit and the second subunit.

In general, moving the focus region to an updated position that is determined based on the current date/time is advantageous because it allows the device to anticipate and display subunits that the user is most likely to select. For example, if the currently selected subunit is far in the future, it is likely that the user will want to select a subunit that is less far in the future, so in some embodiments the focus region is positioned so that, in such a situation, more of the subunits associated with dates/times less far in the future are displayed in the navigation bar. Likewise, if the currently selected subunit is far in the past, it is likely that the user will want to select a subunit that is less far in the past, so in some embodiments the focus region is positioned so that, in such a situation, more of the subunits associated with dates/times less far in the past are displayed in the navigation bar. Moving the focus region in this way reduces the cognitive burden on the user and increases the efficiency of the device by displaying subunits that are more likely to be selected by the user, thereby reducing the amount of time and the number of operations that must be performed by the user to achieve the desired result. Moreover, it will be understood that the location of the focus region can be determined based on the date/time for the second subunit and the current date/time in many different ways. Some particular exemplary rules for determining the location of the updated focus region are described below, however, it will be understood that these rules are merely exemplary and do not limit the method to these examples.

In some embodiments, when the date/time of the second subunit includes the current date/time, the updated position of the focus region (e.g., 5082 in FIG. 5GG) is (1024) in a center of the navigation bar (e.g., 5002 in FIG. 5GG). For example in FIGS. 5GG-5KK, the second subunit is Dec. 20-26, 2009, which includes the current date/time (e.g., Dec. 23, 2009). In this example, the navigation bar 5002 includes ten subunits representing weeks, the second subunit (e.g., 5080-2 in FIGS. 5GG-5II) represents a week including the current date (e.g., Dec. 23, 2009), and therefore the updated focus region (e.g., 5082 in FIG. 5GG-5II) is moved to the center of the navigation bar 5002, so that when the subunits are adjusted so as to display the second subunit (e.g., 5080-2 in FIG. 5II) in the focus region (e.g., 5082 in FIG. 5II), approximately half (e.g., four) of the displayed subunits are subunits that represents weeks prior to the current week, while approximately half (e.g., four) of the displayed subunits are subunits that represent weeks subsequent to the current week.

In some embodiments, when the date/time of the second subunit (e.g., 5080-2 in FIG. 5JJ) includes the current date/time, the updated position of the focus region (e.g., 5082 in FIG. 5JJ) is (1026) offset from the center of the navigation bar 5002 so that a majority of the subunits are associated with dates/times that occur after the date/time of the second subunit. For example, in FIGS. 5JJ-5KK, the second subunit 5080-2 is a representation of the week of Dec. 20-26, 2009, which includes the current date/time (e.g., Dec. 23, 2009). In this example, the navigation bar 5002 includes ten subunits representing weeks, and the second subunit (e.g., 5080-2 in FIGS. 5JJ-5KK) represents a week including the current date (e.g., Dec. 23, 2009), and therefore the updated focus region (e.g., 5082 in FIGS. 5JJ-5KK) is offset from the center of the navigation bar 5002 such that the ten subunits include three subunits that represents weeks prior to the current week, the subunit representing the current week, and six subunits that represent weeks subsequent to the current week.

In some embodiments, when the date/time of the second subunit is more than a predefined time period before the current date (e.g., if the second subunit includes a date that is more than one month in the past), the updated position of the focus region is (1028) offset from a center of the navigation bar so that at least seventy percent of the subunits are associated with dates/times that occur after the date/time of the second subunit (e.g., when there are ten subunits are displayed in the navigation bar, at least seven of the subunits are associated with weeks that occur after the week represented by the second subunit, when it is displayed in the focus region). In some embodiments, when the date/time of the second subunit (e.g., 5080-3 in FIG. 5LL) is more than a predefined time period after the current date (e.g., if the second subunit includes a date that is more than six months in the future), the updated position of the focus region (e.g., 5082 in FIG. 5LL) is (1030) offset from a center of the navigation bar (e.g., 5002 in FIG. 5LL) so that seventy percent of the subunits are associated with dates/times that occur before the date/time of the second subunit (e.g., when there are ten subunits are displayed in the navigation bar, at least seven of the subunits are associated with weeks that occur before the week represented by the currently selected subunit, when it is displayed in the focus region, as illustrated in FIG. 5LL).

In some embodiments, the updated position for the focus region is adjusted (1032) based at least in part on an activity-level metric associated with subunits having dates/times that are within a predefined period before and a predefined period after the date/time of the second subunit.

In some of these embodiments, the device determines (1034) a first activity-level metric for subunits having dates/times in a predefined period of time before the date/time of the second subunit (e.g., the first activity metric is based on a number of events that are scheduled for days within a month before the currently selected week). In some of these embodiments, the device determines (1036) a second activity-level metric for subunits having dates/times in a predefined period of time after the date/time of the second subunit (e.g., the second activity level metric is based on a number of events that are scheduled for days within a month after the currently selected week). In some of these embodiments, in response to the first input (e.g., tap gesture 5085 in FIG. 5FF), when the first activity-level metric is greater than the second activity-level metric, the device adjusts (1038) the updated position of the focus region so as to display more of the subunits that are associated with dates/times that occur after the date/time (e.g., Jan. 3-9, 2010) of the second subunit (e.g., 5080-4 in FIG. 5MM). For example, in FIG. 5MM, a preliminary updated position (e.g., 5082-*a* in FIG. 5MM) of the focus region is determined based on the current date/time if there are more events scheduled in the month before Jan. 6, 2010, the device would adjust the updated position of the focus region to the left to an adjusted updated position (e.g., 5082-*b* in FIG. 5MM), so that when the second subunit (e.g., 5080-4 in FIG. 5MM) is moved so as to be displayed in the focus region, the navigation bar includes more subunits that are associated with free time (e.g., the subunits associated with weeks in the future). This embodiment is particularly advantageous in situations where the user is searching for a date/time to schedule an event, and is thus more likely to be looking for times when they are available to schedule an event. It will be understood that, in accordance with these embodiment, if the first activity-level metric is lower than the second activity-level metric, the preliminary updated position of the focus region would be shifted to the right, because shifting the update focus region to the left would display more subunits that were associated with free time.

In some of these embodiments, the device determines (1040) a first activity-level metric for with subunits having dates/times in a predefined period of time before the date/time of the second subunit (e.g., the first activity level metric is based on a number of events that are scheduled for days within a month before the currently selected week). In some of these embodiments the device determines (1042) a second activity-level metric for subunits having dates/times in a predefined period of time after the date/time of the second subunit (e.g., the second activity level metric is based on a number of events that are scheduled for days within a month prior to the currently selected week). In some of these embodiments, in response to the first input (e.g., tap gesture 5085 in FIG. 5FF), when the first activity-level metric is greater than the second activity-level metric, the device adjusts (1044) the updated position of the focus region so as to display more of the subunits that are associated with dates/times that occur before the date/time (e.g., Jan. 6-9, 2010) of the second subunit (e.g., 5080-4 in FIG. 5MM). For example, in FIG. 5MM, a preliminary updated position (e.g., 5082-*a* in FIG. 5MM) of the focus region is determined based on the current date/time if there are more events scheduled in the month before Jan. 6, 2010, the device would adjust the updated position of the focus region to the right to an adjusted updated position (e.g., 5082-*c* in FIG. 5MM), so that when the second subunit (e.g., 5080-4 in FIG. 5MM) is moved so as to be displayed in the focus region, the navigation bar includes more subunits that are associated with a high activity level time (e.g., the subunits associated with weeks in the past). This embodiment is particularly advantageous in situations where the user is searching for a preexisting event, and is thus more likely to be looking for dates/times that include a large number of events. It will be understood that, in accordance with these embodiment, if the first activity-level metric is lower than the second activity-level metric, the preliminary updated position of the focus region would be shifted to the left, because shifting the update focus region to the left would display more subunits that were associated with a large number of events.

FIGS. 11A-11D are flow diagrams illustrating a method 1100 of navigating through a range of values including displaying a callout having text associated with a currently selected value of the range of values in accordance with some embodiments. The method 1100 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1100 may be combined and/or the order of some operations may be changed.

As described below, the method 1100 provides an intuitive way to navigate through a range of values. The method reduces the cognitive burden on a user when navigating through a range of values, thereby creating a more efficient human-machine interface. For battery-operated computing devices, enabling a user to navigate through ranges of values faster and more efficiently conserves power and increases the time between battery charges.

The device displays (1102) a navigation bar (e.g., 5002 in FIGS. 5NN-5SS) that represents a range of values. In some embodiments, content associated with a currently selected value of the range of values is displayed in content area (5007 in FIGS. 5NN-5SS) of the user interface on the display. The device detects (1104) a first part of a multipart gesture (e.g., contact 5086-*a*, FIG. 5NN). The first part of the multipart gesture corresponds to selection of a first value in the range of values (e.g., the device detects an input that corresponds to the location of a representation 5088-1 of Jul. 2, 2010).

In response to detecting the first part of the multipart gesture, the device displays (1106) a callout (e.g., 5090 in FIG. 5OO) proximate to a location of a representation (e.g., 5088-1 in FIG. 5OO) of the first value on the navigation bar 5002. The callout includes (1108) first text (e.g., "Friday Jul. 2, 2010") that is descriptive of the first value. The callout has (1110) a plurality of horizontally adjacent regions (e.g., 5092-1, 5092-2 and 5092-3 in FIG. 5OO). The plurality of horizontally adjacent regions include a first region (e.g., 5092-1) that includes a beginning part (e.g., "Friday") of the first text and has an initial first region size. The initial first region size is based on a length of the beginning part of the first text (e.g., the initial first region is large enough to hold the first text). The plurality of horizontally adjacent regions include a second region (e.g., 5092-2 in FIG. 5OO) that includes a middle part (e.g., "July 2") of the first text and has an initial second region size. The initial second region size is based on a length of the middle part of the first text (e.g., the initial second region is large enough to hold the second text). The plurality of horizontally adjacent regions include a third region (e.g., 5092-3 in FIG. 5OO) that includes an end part (e.g., "2010") of the first text and has an initial third region size. The initial third region size is based on a length of the end part of the first text (e.g., the initial third region is large enough to hold the third text).

In some embodiments, the first region is (1112) right justified, the second region is center justified the third region is left justified. In some embodiments, the first text includes (1114) a first date (e.g., Friday, Jul. 2, 2010), the beginning part of the first text is a day-of-the-week of the first date (e.g., Friday), the middle part of the first text is a month and day-of-the-month of the first date (e.g., July 2), and the end part of the first text is a year of the first date (e.g., 2010). In some embodiments the size of one or more of the regions is also based on the length of another one of the parts of the text. For example, the first region and the third region are the same size and the size is determined based on the larger of the first part of the first text and the third part of the text. In other words, in these embodiments, the size of the first and or third regions is linked so as to keep the callout symmetrically sized. Thus, if the first text is larger than the third text, then the first and third regions are both sized based on the length of the first text. Similarly, if the third text is larger than the first text, then the first and third regions are both sized based on the length of the third text.

In some embodiments, while displaying a callout (e.g., 5090 in FIGS. 5OO-5RR) for a respective value in the range of values, the device highlights (1116) a representation of the respective value in the navigation bar (e.g., in addition to displaying the callout). For example, in FIG. 5OO, the device displays a visual highlighting (e.g., 5094 in FIG. 5OO) around the representation. In some embodiments the representation of the respective value is highlighted by changing the brightness, contrast, color, size, hue and/or saturation, of the representation or background of the representation, or by animating the representation.

In some embodiments, a callout (e.g., 5090 in FIG. 5OO) for a respective value further includes (1118) a graphical representation (e.g., 5096 in FIG. 5OO-5QQ) of an activity level for the respective value. In some embodiments, the graphical representation of the activity level shows a general activity level (e.g., by displaying a "high activity level", "medium activity level" or "low activity level" indicator). In some embodiments, the graphical representation of the activity level shows a number of events.

The device detects (1120) a second part of the multipart gesture that is a continuation of the multipart gesture. For example, in FIG. 5PP the device detects movement of the contact (e.g., from the first location 5086-*a* on the touch screen 112 in FIG. 5OO) to a second location (e.g., contact location 5086-*b* on the touch screen 112 in FIG. 5PP). The second part of the multipart gesture corresponds to selection of a second value of the range of values (e.g., the device detects contact 5086-*b* at a location on the touch screen 112 that corresponds to a representation 5088-2 of Jul. 21, 2010 in FIG. 5PP).

In response to detecting the second part of the multipart gesture, the device displays (1122) the callout (e.g., 5090 in FIG. 5PP) proximate to a location of a representation (e.g., 5088-2 in FIG. 5PP) of the second value on the navigation bar (e.g., 5002 in FIG. 5PP). The callout includes (1124) second text (e.g., "Wednesday Jul. 21, 2010") that is descriptive of the second value. The callout has (1126) an updated plurality of horizontally adjacent regions (e.g., 5092-1, 5092-2 and 5092-3 in FIG. 5PP). The updated plurality of horizontally adjacent regions includes a first region (e.g., 5092-1 in FIG. 5PP) that includes a beginning part (e.g., "Wednesday") of the second text and has an updated first region size. The updated first region size is the larger of the initial first region size and a size based on a length of the beginning part of the second text. The updated plurality of horizontally adjacent regions also includes a second region (e.g., 5092-2 in FIG. 5PP) that includes a middle part (e.g., "July 21") of the second text and has an updated second region size. The updated second region size is the larger of the initial second region size and a size based on a length of the middle part of the second text. The updated plurality of horizontally adjacent regions also includes a third region (e.g., 5092-3 in FIG. 5PP) that includes an end part (e.g., "2010") of the second text and has an updated third region size. The updated third region size is the larger of the initial third region size and a size based on a length of the end part of the second text. In some embodiments, as discussed above, the size of the horizontally adjacent regions is based at least in part on the size of the part of the text in other regions of the callout.

In some embodiments, the second text includes (1128) a second date (e.g., Wednesday, Jul. 21, 2010), the beginning part of the second text is a day-of-the-week of the second date (e.g., Wednesday), the middle part of the second text is a month and day-of-the-month of the second date (e.g., July 21), the end part of the second text is a year of the second date (e.g., 2010).

In some embodiments, the initial first region size, the initial second region size, the initial third region size, the updated first region size, the updated second region size and the updated third region size are determined (1130) based at least in part on a language of the first text.

In some embodiments, the callout 5090 starts at a minimum size necessary to hold the first text (e.g., as illustrated in FIG. 5OO) and then increases in size when necessary to fit all units of information inside the callout (e.g., as illustrated in FIG. 5PP). In some embodiments, the callout (e.g., 5090 in FIGS. 5OO-5RR) does not decrease size until contact is released. For example, if the device detects a third part of the multipart gesture (e.g., movement of the contact from the second position 5086-b to a third position 5086-c that is at a location on the touch-sensitive surface that corresponds to a location on the display that is proximate to the representation of the first value of the range of values), in response, the device selects the first value (e.g., Jul. 2, 2010) in the range of values and displays a callout (e.g., 5090 in FIG. 5QQ) including a further updated first region (e.g., 5092-1 in FIG. 5QQ), a further updated second region (e.g., 5092-2 in FIG. 5QQ) and a further updated third region (e.g., 5092-3 in FIG. 5QQ). However, because the first text is shorter than the second text, the regions do not need to be expanded further. Moreover, each of the regions retains its size (e.g., as it was expanded to fit the second text), even though the regions no longer need to have the expanded size in order to fit the first text. This hysteresis behavior in the callout 5090, where the regions in the callout 5090 are dynamically resized to fit larger text as new values in the range of values are selected, but does not shrink back down to its original size as the new values are selected reduces visual jitter by reducing the number of resizing operations performed on the callout. For example, instead of resizing the callout every time that a new value is selected, the device will resize the callout only when a larger region is needed to fit a part of the text. Moreover, once the regions reach a maximum size, the device will not change the size of the callout. Reducing visual jitter increases the efficiency of the machine-human interface by removing unnecessary distractions from the user, thereby reducing the cognitive burden on the user and enabling the user to perform operations on the device (e.g., navigating to a value in the range of values) more quickly and conserving energy and battery life on the device.

In some embodiments, the device detects (1132) a third part of the multipart gesture that is a continuation of the multipart gesture, and includes selection of a respective value of the range of values. In some embodiments, the third part of the multipart gesture corresponds to continued selection of a representation of a respective value on the navigation bar for a predetermined period of time. For example, in FIG. 5RR, the device continues to detect the contact (e.g., contact 5086-c in FIG. 5RR) with a respective value (e.g., Friday Jul. 2, 2010 in FIG. 5RR) for a predetermined period of time. In response to detecting the third part of the multipart gesture, the device displays (1134) an expanded representation (e.g., 5098 in FIG. 5RR) of the respective value within a callout (e.g., 5090 in FIG. 5RR) for the respective value. In some embodiments, the expanded representation of the respective value within the callout is a month view indicating the amount of activity on each of the days in the month including the day that is associated with the respective value, as illustrated in FIG. 5RR, where each day in the month includes an indicator of the activity level for the day. In some embodiments, the values in the range of values are months, and the expanded representation is a representation of the activity level for a month that is currently selected. In some embodiments, the callout is interactive and a user may initiate actions by activating selectable objects (e.g., icons) within the callout.

In some embodiments, the device detects (1136) an end of the multipart gesture (e.g., liftoff of contact 5086-c in FIG. 5SS). In response to detecting an end of the multipart gesture, the device ceases (1138) to display the callout (e.g., in FIG. 5SS the device has ceased to display the callout). In some embodiments, in addition to ceasing to display the callout (e.g., 5090 in FIGS. 5OO-5RR), the device also displays content associated with the respective value in a content area (e.g., 5007) on the display. For example, in FIG. 5SS the respective value is Jul. 2, 2010, and the device displays events that are scheduled to occur on Jul. 2, 2010 in the content area on the display (e.g., 5007 in FIG. 5SS).

Figure 12A:
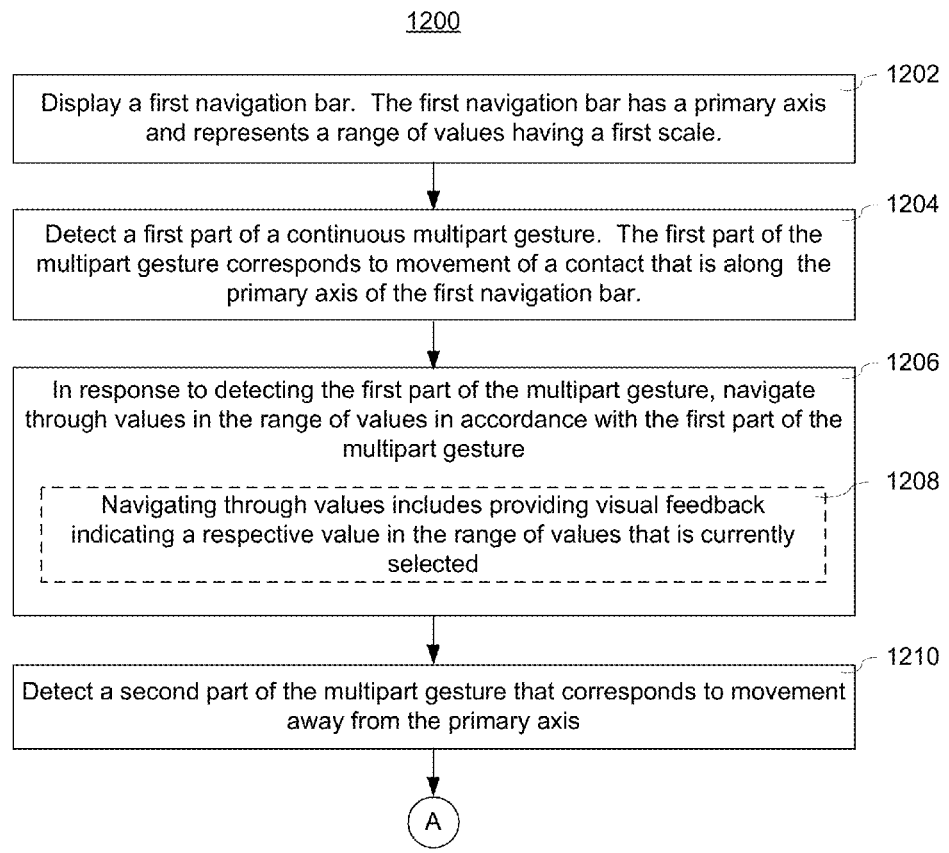
FIGS. 12A-12C are flow diagrams illustrating a method of navigating through a range of values including displaying a first navigation bar having a first scale and in response to user actions, displaying a second navigation bar having a second scale that is distinct from the first scale in accordance with some embodiments.
Figure 12B:
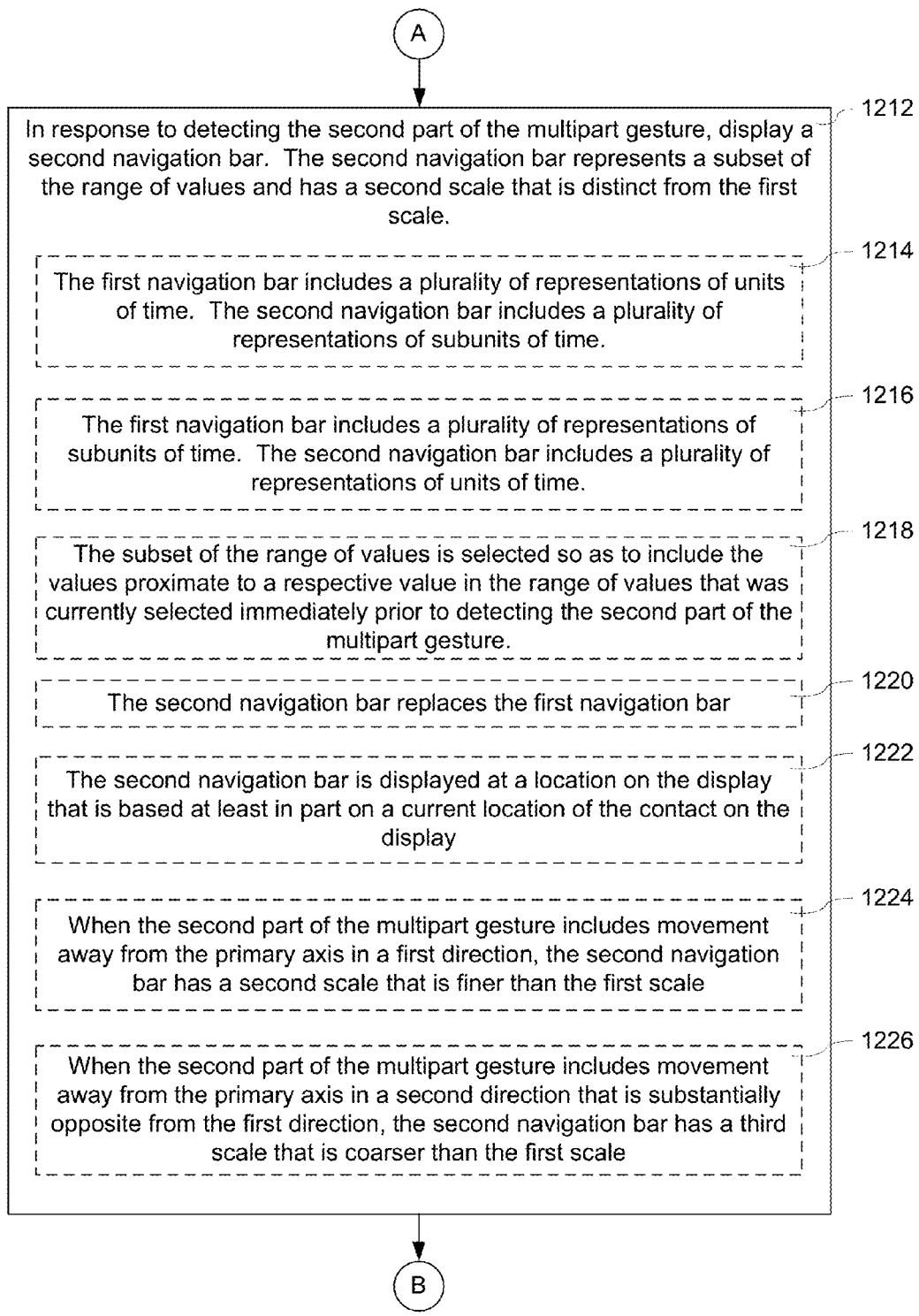
Figure 12C:
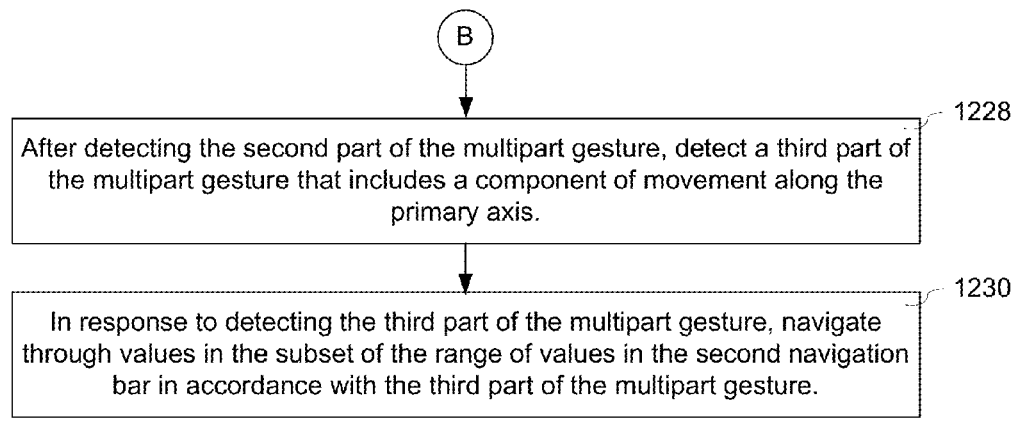

FIGS. 12A-12C are flow diagrams illustrating a method 1200 of navigating through a range of values including displaying a first navigation bar having a first scale and in response to detected inputs, displaying a second navigation bar having a second scale that is distinct from the first scale in accordance with some embodiments. The method 1200 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1200 may be combined and/or the order of some operations may be changed.

As described below, the method 1200 provides an intuitive way to navigate through a range of values. The method reduces the cognitive burden on a user when navigating through a range of values, thereby creating a more efficient human-machine interface. For battery-operated computing devices, enabling a user to navigate through ranges of values faster and more efficiently conserves power and increases the time between battery charges.

The device displays (1202) a first navigation bar (e.g., 5002 in FIG. 5TT-5CCC). The first navigation bar has a primary axis (e.g., 5066 in FIGS. 5TT-5CCC) and represents a range of values having a first scale (e.g., the navigation bar represents the months in the year 2009). In some embodiments, the device displays content associated with the currently selected value (e.g., the device displays events associated with a currently selected month) in the content area (e.g., 5007 in FIGS. 5TT-5CCC).

The device detects (1204) a first part of a continuous multipart gesture. The first part of the continuous multipart gesture corresponds to movement of a contact (e.g., the device detects contact 5100-a in FIG. 5TT moving along the navigation bar 5002 from a first subunit region 5102-1 to a second subunit region 5102-2) that is along the primary axis (e.g., 5066 in FIG. 5TT) of the first navigation bar (e.g., 5002 in FIG. 5TT). In some embodiments, the continuous multipart gesture is a touch gesture (e.g., the contact is a contact on a touch screen or a touch pad). As noted above, for touch gestures, "continuous" refers to the requirement that contact is maintained with the touch-sensitive surface throughout the continuous multipart gesture. In some embodiments, the continuous multipart gesture is a mouse gesture that includes movement of a cursor (e.g., a mouse-based input).

In some embodiments, movement along the primary axis of the first navigation bar 5002 is movement along the touch-sensitive surface that corresponds to movement on the display in a direction that is parallel to or substantially parallel to the primary axis of the first navigation bar (e.g., as illustrate in FIG. 5TT).

In response to detecting the first part of the multipart gesture, the device navigates (1206) through values in the range of values in accordance with the first part of the multipart gesture. For example, in FIGS. 5TT-5VV the device detects movement of a contact 5100 from first location (e.g., 5100-a in FIG. 5TT) on the touch screen 112 to a second location (e.g., 5100-b in FIG. 5VV) on the touch screen 112, and in response to detecting the movement of the contact, the device navigates from the month of November (e.g., 5102-1 in FIG. 5TT) to the month of July (e.g., 5102-2 in FIG. 5VV). In some embodiments, navigating through values includes providing (1208) visual feedback indicating a respective value in the range of values that is currently selected. For example, in FIGS. 5TT-5VV the currently selected value (e.g., subunit region) is highlighted by displaying an emphasis ring (e.g., 5104 in FIGS. 5TT-5VV). However, it will be understood that the visual highlighting could include one or more of adjusting the color, saturation, brightness, contrast, color, hue, size or other characteristic of the subunit region.

The device detects (1210) a second part of the multipart gesture that corresponds to movement away from the primary axis (e.g., movement that is perpendicular to or substantially perpendicular to the primary axis). For example in FIGS. 5VV-5UU the device detects upwards movement of the contact from the second location (e.g., 5100-b in FIG. 5VV) to a third contact location (e.g., 5100-c in FIG. 5WW) that is above the horizontal navigation bar (e.g., 5002 in FIG. 5WW). In response to detecting the second part of the multipart gesture, the device displays (1212) a second navigation bar. For example, in FIG. 5WW, the device displays a second navigation bar 5106. In accordance with some embodiments, the second navigation bar represents a subset of the range of values and has a second scale that is distinct from the first scale. For example, in FIG. 5WW, the first navigation bar 5002 has a scale that represents a set of months (e.g., the months in 2009), while the second navigation bar 5106 has a scale that represents a set of days in a month (e.g., days in July 2009).

In some embodiments, the first navigation bar (e.g., 5002 in FIG. 5WW) includes (1214) a plurality of representations of units of time, and the second navigation bar (e.g., 5106 in FIG. 5WW) includes a plurality of representations of subunits of time. For example, in FIG. 5WW the second navigation bar 5106 includes a plurality of subunit regions 5110 which represent the days in July, 2009, while the first navigation bar 5002 includes a plurality of unit regions which represent the months in 2009, which includes July 2009. In some embodiments, the first navigation bar includes (1216) a plurality of representations of subunits of time (e.g., months), and the second navigation bar includes a plurality of representations of units of time (e.g., years), as described in greater detail below with reference to FIGS. 5AAA-5CCC. In some embodiments, the units are years and the subunits are months. In some embodiments, the units are months and the subunits are weeks. In some embodiments, the units are months and the subunits are days. In some embodiments, the units are weeks and the subunits are days. In some embodiments, the units are days and the subunits are hours.

In some embodiments, the subset of the range of values is selected (1218) so as to include the values proximate to a respective value in the range of values that was currently selected immediately prior to detecting the second part of the multipart gesture (e.g., the range of values in the second navigation bar is based on the position of the contact on the navigation bar when the contact moved off of the navigation bar). For example, in FIGS. 5UU-5WW, while the contact (e.g., 5100-b in FIG. 5VV) is located at a position that corresponds to the representation of the month of July 2009 (e.g., 5102-2 in FIG. 5VV), the device detects movement of the contact away from the navigation bar 5002, and displays a second navigation bar 5106 (FIG. 5WW) that includes representations of a range of values including the days in July 2009 (e.g., subunit regions 5110 in FIG. 5WW).

In some embodiments, the second navigation bar replaces (1220) the first navigation bar (e.g., the first navigation bar displays units of time and the units of time are replaced with subunits of time that constitute the second navigation bar), as described in greater detail below with reference to FIGS. 5YY-5ZZ.

In some embodiments, the second navigation bar is displayed (1222) at a location on the display that is based at least in part on a current location of the contact on the display (e.g., the second navigation bar "floats" with the contact as the contact moves upwards). For example, in FIG. 5WW the second navigation bar 5106 is displayed directly under the contact 5100-c. Moreover, it will be understood that, in accordance with some embodiments, if the contact were to move vertically (e.g., upwards or downwards) the device would adjust the vertical position of the second navigation bar so as to continue to display the second navigation bar under the contact 5100-c. Adjusting the vertical position of the second navigation bar in this way in accordance with these embodiments, is advantageous in many situations, because it provides the user with useful context, and provides visual feedback that indicates the result of further movements of the contact. Moreover, adjusting the vertical position of the second navigation bar is also advantageous, because it allows the user to determine the best location for the second navigation bar, thereby enabling the user to easily move the second navigation bar out of the way of any information in the display area that is obscured by the second navigation bar.

In some embodiments, the second scale is finer than the first scale (e.g., the size of the primary divisions of the second scale is smaller than the size of the primary divisions of the first scale). For example, in FIG. 5WW the scale of the second navigation bar 5106 is a day-scale, while the scale of the first navigation bar 5002 is a month-scale. In some embodiments, the second scale is coarser than the first scale (e.g., the size of the primary divisions of the second scale is larger than the size of the primary divisions of the first scale), as described in greater detail below with reference to FIGS. 5AAA-5CCC.

In some embodiments, when the second part of the multipart gesture includes movement away from the primary axis in a first direction (e.g., upwards), the second navigation bar has (1224) a second scale that is finer than the first scale, as described in greater detail above with reference to FIGS. 5TT-5WW. In some embodiments, when the second part of the multipart gesture includes movement away from the primary axis in a second direction (e.g., downwards) that is substantially opposite from the first direction, the second navigation bar has (1226) a third scale that is coarser than the first scale, as described in greater detail below with reference to FIGS. 5AAA-5CCC.

After detecting the second part of the multipart gesture, the device detects (1228) a third part of the multipart gesture that includes a component of movement along the primary axis. For example, in FIG. 5XX the device detects movement of the contact from the third contact location (e.g., 5100-c in FIG. 5WW) that corresponds to a representation of Jul. 20, 2009 on the display to a fourth contact location (e.g., 5100-d in FIG. 5XX) that corresponds to a representation of Jul. 14, 2009. In response to detecting the third part of the multipart gesture, the device navigates (1230) through values in the subset of the range of values (e.g., the device navigates through the days in the month of July 2009) in the second navigation bar (e.g., 5106 in FIGS. 5WW-5XX) in accordance with the third part of the multipart gesture (e.g., in accordance with the component of movement along the primary axis in the third part of the multipart gesture).

In some embodiments, when the device detects a second part of the multipart gesture that corresponds to movement away from the primary axis (e.g., movement that is perpendicular to or substantially perpendicular to the primary axis), the device replaces the first navigation bar with the second navigation bar instead of displaying the second navigation bar in addition to the first navigation bar. For example in FIGS. 5VV, 5YY-5ZZ the device detects the movement of the contact from the second location (e.g., 5100-*b* in FIG. 5VV) to a third contact location (e.g., 5100-*c* in FIG. 5YY) that is above the navigation bar (e.g., 5002 in FIG. 5VV). In response to detecting the second part of the multipart gesture, the device displays a second navigation bar (e.g., 5106 in FIG. 5YY) at the location that was previously occupied by the first navigation bar (e.g., 5002 in FIG. 5VV). As discussed in greater detail above, the second navigation bar represents a subset of the range of values and has a second scale that is distinct from the first scale (e.g., in FIG. 5VV, the first navigation bar 5002 has a scale that represents a set of months, while in FIG. 5YY the second navigation bar 5106 has a scale that represents a set of days in a month).

After detecting the second part of the multipart gesture, the device detects a third part of the multipart gesture that includes a component of movement along the primary axis. For example, in FIG. 5ZZ the device detects movement of the contact from the third contact location (e.g., 5100-*c* in FIG. 5YY) that corresponds to a representation of Jul. 20, 2009 to a fourth contact location (e.g., 5100-*d* in FIG. 5ZZ) that corresponds to a representation of Jul. 14, 2009. In response to detecting the third part of the multipart gesture, the device navigates through values in the subset of the range of values (e.g., the device navigates through the days in the month of July 2009) in the second navigation bar (e.g., 5106 in FIGS. 5YY-5ZZ) in accordance with the third part of the multipart gesture (e.g., in accordance with the component of movement along the primary axis in the third part of the multipart gesture).

In some embodiments, when the device detects a second part of the multipart gesture that corresponds to movement away from the primary axis (e.g., movement that is perpendicular to or substantially perpendicular to the primary axis), in a direction that is opposite the first direction (e.g., in a direction opposite to the direction of the movement in FIG. 5WW), the device displays a second navigation bar that has a coarser scale than the first navigation bar instead of displaying a second navigation bar that has a finer scale than the first navigation bar. For example in FIGS. 5AAA-5BBB the device detects the movement of the contact from the second location (e.g., 5100-*b* in FIG. 5AAA) to a third contact location (e.g., 5100-*e* in FIG. 5BBB) that is below the navigation bar (e.g., 5002 in FIG. 5AAA). In response to detecting the second part of the multipart gesture, the device displays a second navigation bar (e.g., 5112 in FIG. 5BBB). In this embodiment, the second navigation bar (e.g., 5112 in FIG. 5BBB) represents a plurality of ranges of values that includes the range of values represented by the first navigation bar (e.g., 5002 in FIG. 5AAA). In this embodiment, the first navigation bar has a first scale and the second navigation bar has a second scale that is distinct from the first scale. For example, in FIG. 5AAA, the first navigation bar 5002 has a scale that represents a set of months in a year (e.g., 2009), while in FIG. 5BBB the second navigation bar 5112 has a scale that represents a set of years (e.g., 2000-2013) including the year represented by the first navigation bar (e.g., 2009). In some embodiments, the second navigation bar replaces the first navigation bar (not shown).

After detecting the second part of the multipart gesture, the device detects a third part of the multipart gesture that includes a component of movement along the primary axis. For example, in FIG. 5CCC the device detects movement of the contact from the third contact location (e.g., 5100-*e* in FIG. 5BBB) that corresponds to a representation of 2007 to a fourth contact location (e.g., 5100-*f* in FIG. 5CCC) that corresponds to a representation of 2005. In response to detecting the third part of the multipart gesture, the device navigates through values in the subset of the range of values (e.g., the device navigates through the years to the year 2005) in the second navigation bar (e.g., 5112 in FIGS. 5BBB-5CCC) in accordance with the third part of the multipart gesture (e.g., in accordance with the component of movement along the primary axis in the third part of the multipart gesture).

While the examples shown in FIGS. 5VV-5CC describe multipart gestures that include movements above and/or below a horizontal navigation bar, it will be understood that corresponding multipart gestures may also be made that include movements to the right or left of a vertical navigation bar or, more generally, corresponding multipart gestures may also be made that include movements to two opposite sides of a navigation bar at an arbitrary orientation (e.g., a diagonal orientation).

In addition, while the examples shown in FIGS. 5VV-5CC describe multipart gestures that result in the display of two navigation bars during a respective gesture, it will be understood that these multipart gestures may be extended to result in the display of three, four, or more navigation bars during a respective gesture. Thus, for example, a multipart gesture may be used to select a year on a navigation bar with a range of years, followed by selection of a month on a navigation bar with a range of months, followed by selection of a day on a navigation bar with a range of days, followed by selection of an hour on a navigation bar with a range of hours.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6D, 7, 8A-8H, 9, 10A-10D, 11A-11D, and 12A-12C may be implemented by components depicted in FIGS. 1A-1C. For example, display operation 602, detection operation 620, and selection operation 640 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface. When a respective predefined event or sub-event is detected, event recognizer 180 activates an event handler 180 associated with the detection of the event or sub-event. Event handler 180 may utilize or call data updater 176 or object updater 177 to update the internal state of application 136-1 data. In some embodiments, event handler 180 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multifunction device, comprising:
   a display and a touch-sensitive surface;
   one or more processors;
   memory; and
   one or more programs, wherein the one or more programs are stored in the memory and configured to be executed by the one or more processors, the one or more programs including instructions for:
   displaying a navigation bar that represents a range of date/time values, the navigation bar including:
   a plurality of currently displayed subunits, including a first subunit that is initially selected, wherein, each of the subunits represents a subset of date/time values of the range of date/time values; and
   a focus region, wherein an initial position of the focus region is determined based at least in part on a current date/time and a date/time of the first subunit, and the first subunit is displayed in the focus region; and
   displaying, in a content window, content associated with a date/time in the subset of date/time values of the first subunit;
   detecting a first input that selects a second subunit; and, in response detecting to the first input:
   determining an updated position for the focus region based on the current date/time and a date/time of the second subunit;
   when the updated position is distinct from the initial position of the focus region, moving the focus region of the navigation bar to the updated position;
   when the updated position is the same as the initial position of the focus region, leaving the focus region of the navigation bar in the initial position; and
   adjusting the subunits in the navigation bar so as to display the second subunit in the focus region of the navigation bar.

2. The device of claim 1, wherein when the date/time of the second subunit includes the current date/time, the updated position of the focus region is in a center of the navigation bar.

3. The device of claim 1, wherein when the date/time of the second subunit includes the current date/time, the updated position of the focus region is offset from a center of the navigation bar so that a majority of the subunits are associated with dates/times that occur after the date/time of the second subunit.

4. The device of claim 1, wherein when the date/time of the second subunit is more than a predefined time period before the current date, the updated position of the focus region is offset from a center of the navigation bar so that at least seventy percent of the subunits are associated with dates/times that occur after the date/time of the second subunit.

5. The device of claim 1, wherein when the date/time of the second subunit is more than a predefined time period after the current date, the updated position of the focus region is offset from a center of the navigation bar so that seventy percent of the subunits are associated with dates/times that occur before the date/time of the second subunit.

6. The device of claim 1, wherein the subunits are weeks.

7. The device of claim 1, wherein the updated position for the focus region is adjusted based at least in part on an activity-level metric associated with subunits having dates/times that are within a predefined period before and a predefined period after the date/time of the second subunit.

8. The device of claim 7, including instructions for:
   determining a first activity-level metric for with subunits having dates/times in a predefined period of time before the date/time of the second subunit;
   determining a second activity-level metric for with subunits having dates/times in a predefined period of time after the date/time of the second subunit; and
   in response to the first input, when the first activity-level metric is greater than the second activity-level metric, adjusting the updated position of the focus region so as to display more of the subunits that are associated with dates/times that occur after the date/time of the second subunit.

9. The device of claim 7, including instructions for:
   determining a first activity-level metric for with subunits having dates/times in a predefined period of time before the date/time of the second subunit;
   determining a second activity-level metric for with subunits having dates/times in a predefined period of time after the date/time of the second subunit; and
   in response to the first input, when the first activity-level metric is greater than the second activity-level metric, adjusting the updated position of the focus region so as to display more of the subunits that are associated with dates/times that occur before the date/time of the second subunit.

10. A method, comprising:
    at a multifunction device with a display and a touch-sensitive surface:
    displaying a navigation bar that represents a range of date/time values, the navigation bar including:
    a plurality of currently displayed subunits, including a first subunit that is initially selected, wherein, each of the subunits represents a subset of date/time values of the range of date/time values; and
    a focus region, wherein an initial position of the focus region is determined based at least in part on a current date/time and a date/time of the first subunit, and the first subunit is displayed in the focus region; and
    displaying, in a content window, content associated with a date/time in the subset of date/time values of the first subunit;

detecting a first input that selects a second subunit; and, in response detecting to the first input:
   determining an updated position for the focus region based on the current date/time and a date/time of the second subunit;
   when the updated position is distinct from the initial position of the focus region, moving the focus region of the navigation bar to the updated position;
   when the updated position is the same as the initial position of the focus region, leaving the focus region of the navigation bar in the initial position; and
   adjusting the subunits in the navigation bar so as to display the second subunit in the focus region of the navigation bar.

11. The method of claim 10, wherein when the date/time of the second subunit includes the current date/time, the updated position of the focus region is in a center of the navigation bar.

12. The method of claim 10, wherein when the date/time of the second subunit includes the current date/time, the updated position of the focus region is offset from a center of the navigation bar so that a majority of the subunits are associated with dates/times that occur after the date/time of the second subunit.

13. The method of claim 10, wherein when the date/time of the second subunit is more than a predefined time period before the current date, the updated position of the focus region is offset from a center of the navigation bar so that at least seventy percent of the subunits are associated with dates/times that occur after the date/time of the second subunit.

14. The method of claim 10, wherein when the date/time of the second subunit is more than a predefined time period after the current date, the updated position of the focus region is offset from a center of the navigation bar so that seventy percent of the subunits are associated with dates/times that occur before the date/time of the second subunit.

15. The method of claim 10, wherein the subunits are weeks.

16. The method of claim 10, wherein the updated position for the focus region is adjusted based at least in part on an activity-level metric associated with subunits having dates/times that are within a predefined period before and a predefined period after the date/time of the second subunit.

17. The method of claim 16, further comprising:
determining a first activity-level metric for with subunits having dates/times in a predefined period of time before the date/time of the second subunit;
determining a second activity-level metric for with subunits having dates/times in a predefined period of time after the date/time of the second subunit; and
in response to the first input, when the first activity-level metric is greater than the second activity-level metric, adjusting the updated position of the focus region so as to display more of the subunits that are associated with dates/times that occur after the date/time of the second subunit.

18. The method of claim 16, further comprising:
determining a first activity-level metric for with subunits having dates/times in a predefined period of time before the date/time of the second subunit;
determining a second activity-level metric for with subunits having dates/times in a predefined period of time after the date/time of the second subunit; and
in response to the first input, when the first activity-level metric is greater than the second activity-level metric, adjusting the updated position of the focus region so as to display more of the subunits that are associated with dates/times that occur before the date/time of the second subunit.

19. A non-transitory computer readable storage medium storing one or more programs, the one or more programs comprising instructions, which when executed by a portable multifunction device with a display and a touch-sensitive surface, cause the device to:
display a navigation bar that represents a range of date/time values, the navigation bar including:
   a plurality of currently displayed subunits, including a first subunit that is initially selected, wherein, each of the subunits represents a subset of date/time values of the range of date/time values; and
   a focus region, wherein an initial position of the focus region is determined based at least in part on a current date/time and a date/time of the first subunit, and the first subunit is displayed in the focus region; and
display, in a content window, content associated with a date/time in the subset of date/time values of the first subunit;
detect a first input that selects a second subunit; and,
in response detecting to the first input, the one or more programs further comprise instructions to:
   determine an updated position for the focus region based on the current date/time and a date/time of the second subunit;
   when the updated position is distinct from the initial position of the focus region, move the focus region of the navigation bar to the updated position;
   when the updated position is the same as the initial position of the focus region, leave the focus region of the navigation bar in the initial position; and
   adjust the subunits in the navigation bar so as to display the second subunit in the focus region of the navigation bar.

20. The non-transitory computer readable storage medium of claim 19, wherein when the date/time of the second subunit includes the current date/time, the updated position of the focus region is in a center of the navigation bar.

21. The non-transitory computer readable storage medium of claim 19, wherein when the date/time of the second subunit includes the current date/time, the updated position of the focus region is offset from a center of the navigation bar so that a majority of the subunits are associated with dates/times that occur after the date/time of the second subunit.

22. The non-transitory computer readable storage medium of claim 19, wherein when the date/time of the second subunit is more than a predefined time period before the current date, the updated position of the focus region is offset from a center of the navigation bar so that at least seventy percent of the subunits are associated with dates/times that occur after the date/time of the second subunit.

23. The non-transitory computer readable storage medium of claim 19, wherein when the date/time of the second subunit is more than a predefined time period after the current date, the updated position of the focus region is offset from a center of the navigation bar so that seventy percent of the subunits are associated with dates/times that occur before the date/time of the second subunit.

24. The non-transitory computer readable storage medium of claim 19, wherein the subunits are weeks.

25. The non-transitory computer readable storage medium of claim 19, wherein the updated position for the focus region is adjusted based at least in part on an activity-level metric associated with subunits having dates/times that are within a predefined period before and a predefined period after the date/time of the second subunit.

26. The non-transitory computer readable storage medium of claim 25, including instructions which cause the device to:
- determine a first activity-level metric for with subunits having dates/times in a predefined period of time before the date/time of the second subunit;
- determine a second activity-level metric for with subunits having dates/times in a predefined period of time after the date/time of the second subunit; and
- in response to the first input, when the first activity-level metric is greater than the second activity-level metric, adjust the updated position of the focus region so as to display more of the subunits that are associated with dates/times that occur after the date/time of the second subunit.

27. The non-transitory computer readable storage medium of claim 25, including instructions which cause the device to:
- determine a first activity-level metric for with subunits having dates/times in a predefined period of time before the date/time of the second subunit;
- determine a second activity-level metric for with subunits having dates/times in a predefined period of time after the date/time of the second subunit; and
- in response to the first input, when the first activity-level metric is greater than the second activity-level metric, adjust the updated position of the focus region so as to display more of the subunits that are associated with dates/times that occur before the date/time of the second subunit.

* * * * *